United States Patent
Boyers

(10) Patent No.: US 11,320,983 B1
(45) Date of Patent: May 3, 2022

(54) METHODS AND GRAPHICAL USER INTERFACES FOR POSITIONING A SELECTION, SELECTING, AND EDITING, ON A COMPUTING DEVICE RUNNING APPLICATIONS UNDER A TOUCH-BASED OPERATING SYSTEM

(71) Applicant: David Graham Boyers, Los Altos, CA (US)

(72) Inventor: David Graham Boyers, Los Altos, CA (US)

(*) Notice: Subject to any disclaimer, the term of this patent is extended or adjusted under 35 U.S.C. 154(b) by 56 days.

(21) Appl. No.: 16/395,181

(22) Filed: Apr. 25, 2019

Related U.S. Application Data

(60) Provisional application No. 62/662,588, filed on Apr. 25, 2018.

(51) Int. Cl.
| | | |
|---|---|---|
| G06F 3/0488 | (2013.01) | |
| G06F 3/0484 | (2013.01) | |
| G06F 3/0482 | (2013.01) | |
| G06F 3/0481 | (2013.01) | |
| G06F 3/04883 | (2022.01) | |
| G06F 3/04845 | (2022.01) | |
| G06F 3/04817 | (2022.01) | |

(52) U.S. Cl.
CPC ........ G06F 3/04883 (2013.01); G06F 3/0482 (2013.01); G06F 3/04817 (2013.01); G06F 3/04845 (2013.01)

(58) Field of Classification Search
CPC ............. G06F 3/04812; G06F 3/04817; G06F 3/0482; G06F 3/04842; G06F 3/04883; G06F 3/0486; G06F 3/0488

USPC .......................................................... 715/822
See application file for complete search history.

(56) References Cited

U.S. PATENT DOCUMENTS

| | | | |
|---|---|---|---|
| 5,539,427 A * | 7/1996 | Bricklin | G06F 3/04883 345/622 |
| 5,717,939 A * | 2/1998 | Bricklin | G06F 40/166 715/212 |
| 7,856,605 B2 | 12/2010 | Ording et al. | |
| 8,201,109 B2 | 6/2012 | Van Os et al. | |
| 8,255,830 B2 * | 8/2012 | Ording | G06F 3/04886 715/810 |
| 8,370,736 B2 | 2/2013 | Ording et al. | |
| 8,510,665 B2 | 8/2013 | Ording et al. | |
| 8,570,278 B2 | 10/2013 | Kocienda et al. | |

(Continued)

OTHER PUBLICATIONS

Vim, "Highlight Current Line," 2004, Vim Tips Wiki, Published on Web; http://vim.wikia.com/wiki/Highlight_current_line.

(Continued)

*Primary Examiner* — Sheree N Brown

(57) ABSTRACT

A graphical user interface on a computing device with a touch-sensitive display wherein: a selection is displayed within content; a control icon is displayed; a contact on the touch-sensitive display is detected; in response to detecting a change in a horizontal and vertical position of the contact beginning anywhere on the control icon, a horizontal position of the selection relative to the control icon is changed and a vertical position of the selection is changed; and in response to detecting a tap and change in a position of a contact beginning anywhere on the control icon, a portion of the content is selected beginning at a position of the selection within the content.

30 Claims, 87 Drawing Sheets

(56) References Cited

U.S. PATENT DOCUMENTS

| | | |
|---|---|---|
| 8,584,050 B2 | 11/2013 | Ording et al. |
| 8,610,671 B2 | 12/2013 | Ording et al. |
| 8,650,507 B2 | 2/2014 | Westerman et al. |
| 8,661,362 B2 | 2/2014 | Kocienda et al. |
| 8,698,773 B2 | 4/2014 | Westerman et al. |
| 8,756,534 B2 | 6/2014 | Ording et al. |
| 9,032,338 B2 | 5/2015 | Murrett et al. |
| 9,207,855 B2 | 12/2015 | Kocienda et al. |
| 9,747,270 B2* | 8/2017 | Campbell ............ G06F 3/04883 |
| 10,534,502 B1* | 1/2020 | Boyers .................. G06F 3/0488 |
| 10,719,224 B1* | 7/2020 | Boyers ................ G06F 3/04812 |
| 10,732,825 B2* | 8/2020 | Campbell ........... G06F 3/04883 |
| 2008/0048980 A1 | 2/2008 | Love |
| 2009/0167700 A1* | 7/2009 | Westerman ......... G06F 3/04883 345/173 |
| 2009/0174679 A1* | 7/2009 | Westerman ........... G06F 3/0488 345/173 |
| 2009/0228842 A1* | 9/2009 | Westerman ........... G06F 40/166 715/863 |
| 2010/0110025 A1* | 5/2010 | Lim ....................... G08C 21/00 345/173 |
| 2010/0295806 A1* | 11/2010 | Homma ................ G06F 3/0488 345/173 |
| 2011/0007000 A1* | 1/2011 | Lim ...................... G06F 3/0488 345/173 |
| 2011/0165913 A1* | 7/2011 | Lee ..................... G06F 3/04855 455/566 |
| 2011/0239110 A1* | 9/2011 | Garrett .................. G06F 3/0426 715/256 |
| 2011/0279384 A1 | 11/2011 | Miller |
| 2012/0017147 A1* | 1/2012 | Mark .................... H04N 9/3173 715/702 |
| 2012/0173963 A1* | 7/2012 | Hoke ...................... G06F 40/18 715/234 |
| 2012/0180002 A1* | 7/2012 | Campbell ............... G06F 40/18 715/863 |
| 2012/0306772 A1* | 12/2012 | Tan ..................... G06F 3/04842 345/173 |
| 2012/0311507 A1* | 12/2012 | Murrett .................. G06F 3/041 715/863 |
| 2013/0042199 A1* | 2/2013 | Fong ..................... G06F 3/0488 715/780 |
| 2013/0067373 A1* | 3/2013 | Weir ................... G06F 3/04842 715/769 |
| 2013/0069915 A1* | 3/2013 | Kukulj .................. G06F 40/169 345/175 |
| 2014/0013234 A1* | 1/2014 | Beveridge ............. G06F 3/0488 715/740 |
| 2014/0078056 A1* | 3/2014 | Yu ....................... G06F 3/03545 345/157 |
| 2014/0109016 A1* | 4/2014 | Ouyang ................ G06F 40/166 715/856 |
| 2014/0253463 A1* | 9/2014 | Hicks .................. G06F 3/04847 345/173 |
| 2014/0282211 A1* | 9/2014 | Ady ....................... G06F 3/0484 715/780 |
| 2014/0289659 A1* | 9/2014 | Harrison ............. G06F 3/04842 715/765 |
| 2014/0372856 A1* | 12/2014 | Radakovitz ............. G06F 40/18 715/220 |
| 2014/0372932 A1* | 12/2014 | Rutherford ............. G06F 9/451 715/776 |
| 2014/0372952 A1* | 12/2014 | Otero ...................... G06F 40/18 715/835 |
| 2015/0074578 A1* | 3/2015 | Liang .................. G06F 3/04886 715/770 |
| 2015/0100562 A1* | 4/2015 | Kohlmeier ........ G06F 16/24578 707/706 |
| 2015/0149429 A1* | 5/2015 | Chilakamarri ...... G06F 16/9532 707/706 |
| 2015/0161095 A1* | 6/2015 | Wang ..................... G06F 40/18 715/212 |
| 2015/0169531 A1* | 6/2015 | Campbell ............. G06F 3/0488 715/212 |
| 2015/0212683 A1* | 7/2015 | Arita .................... G06F 3/0485 715/786 |
| 2015/0277744 A1* | 10/2015 | Tang .................... G06F 40/166 715/863 |
| 2016/0041965 A1* | 2/2016 | Ghassabian ......... G06F 3/04886 715/261 |
| 2016/0274686 A1* | 9/2016 | Alonso Ruiz ....... G06F 3/04812 |
| 2017/0097751 A1* | 4/2017 | Lee ..................... G06F 3/04812 |
| 2017/0300222 A1* | 10/2017 | Campbell ........... G06F 3/04845 |

OTHER PUBLICATIONS

Head Minion, "Scroll a Word Document, Without Moving the Cursor," Aug. 23, 2010, Bitter Minion Development, Blog Article Published on Web; http://www.bitterminion.com/2010/08/23/stationinary-scrolling-in-microsoft-word/.

\* cited by examiner

2500

| begin at a computing device with a touch-sensitive display | |
|---|---|
| | ~2502 | display a selection positioning and control (SPC) icon

FIG. 25

METHODS AND GRAPHICAL USER INTERFACES FOR POSITIONING A SELECTION, SELECTING, AND EDITING, ON A COMPUTING DEVICE RUNNING APPLICATIONS UNDER A TOUCH-BASED OPERATING SYSTEM

RELATED APPLICATIONS

This application is related to US Patent Application, "Methods and Graphical User Interfaces for Positioning the Cursor and Selecting Text on Computing Devices with Touch-Sensitive Displays" (Application Number 15040717), filed by the applicant.

This application is related to US Patent Application, "Methods and User Interfaces for Positioning a Selection, Selecting Text, and Editing, on a Computing Device Running Applications under a Touch-Based Operating System, Using Gestures on a Touchpad Device," (Application Number 16278084), filed by the applicant.

This application claims priority from US Patent Provisional Application, "Methods and User Interfaces for Positioning a Selection, Selecting, and Editing on a Computing Device Running under a Touch-Based Operating System," (Provisional Application No. 62/662,588), filed by the applicant

TECHNICAL FIELD

The disclosed embodiments relate generally to computing devices running applications under a touch-based operating system, particularly to computer-implemented methods and graphical user interfaces for enabling a user to conveniently position a selection, select text, select text-objects, select image-objects, select menu items, and edit on such a device.

BACKGROUND

Mobile computing devices with touch-sensitive displays such as smart phones and tablet computing devices are two of the fastest growing categories of computing devices. These devices threaten to displace notebook and desktop computers as the preferred platform for many tasks that users engage in every day. Developers of these mobile devices have eschewed mouse and touchpad pointing devices in favor of on-screen graphical user interfaces and methods that have the user select content and edit content on touch-sensitive displays using direct manipulation of objects on the screen. Ording, et. al. describe one example of this current approach in U.S. Pat. No. 8,255,830 B2. However, the performance and usability of these current solutions is generally inferior to the mouse and/or touchpad based solutions commonly employed with conventional notebook and desktop devices running applications designed for a pointer-based operating system. Whereas these current solutions support a simple task such as quick selection of a single word or an entire content, they do not support quick selection of a character, group of characters, or group of words. In addition, they do not support equally well tasks performed at any position on the display ranging from tasks near the center of the display to those near the edge of the display. These existing solutions also do not support user setting of key control parameters to meet user preferences and user needs. Finally, these existing solutions do not support user accessibility settings to enable the broadest set of users to access applications on these powerful devices.

These existing solutions have a number of deficiencies including the following:
1. Positioning the selection is awkward and error-prone;
2. Selecting multiple words and characters is awkward and error prone;
3. The solution for selecting text is different from the solution for positioning the insertion mark;
4. The user's finger occludes direct view of the selection position;
5. The edit menu does not enable a user to quickly select from a large menu of options;
6. The edit menu is displayed for every selection—even when not needed by user.

We have developed methods and graphical user interfaces for positioning a selection, selecting, and editing on a computing device, which not only overcome the deficiencies of existing solutions, but also add valuable new functionality for the user of any computing device running applications under a touch-based operating system. We have developed methods and graphical user interfaces for positioning a selection, selecting, and editing not only within text-content such as found in word processing, email, web-browsing, note-taking, text-messaging, and database applications, but also within text-object content such as found in spreadsheet applications. We have also developed methods and user interfaces for editing other objects such as images.

SUMMARY

A graphical user interface on a computing device with a touch-sensitive display wherein a selection is displayed within content; a control icon is displayed; a contact on the touch-sensitive display is detected; in response to detecting a change in a horizontal and vertical position of the contact beginning anywhere on the control icon, a horizontal position of the selection relative to the control icon is changed and a vertical position of the selection is changed; and in response to detecting a tap and change in a position of a contact beginning anywhere on the control icon, a portion of the content is selected beginning at a position of the selection within the content. In a first example, the selection is a zero-length selection within editable text content. In a second example, the selection is a one-character-length selection within read-only text content. In a third example, the selection is a text-object selection within text-object content.

BRIEF DESCRIPTION OF THE DRAWINGS

For a better understanding of the embodiments of the invention, reference should be made to the detailed description, in conjunction with the following drawings in which like reference numerals refer to corresponding parts throughout the figures.

FIG. 25 is a flow diagram illustrating a method for displaying an image-object selection, performing a secondary-click action with respect to an image-object selection, on a computing device with a touch-sensitive display, in accordance with some embodiments.

DETAILED DESCRIPTION

Reference will now be made in detail to embodiments, examples of which are illustrated in the included drawings. In the following detailed description, many specific details are set forth in order to provide a thorough understanding of the present invention. However, it will be apparent to one of ordinary skill in the art that the present invention can be practiced without these specific details. In other embodiments, well-known methods, procedures, components, circuits, and networks have not been described in detail so as to not obscure aspects of the embodiments.

The terminology used in the description of the invention is for the purpose of describing particular embodiments only and is not intended to be limiting of the invention. As used in the description, the singular forms "a", "an", and "the" are intended to include the plural forms as well, unless the context clearly indicates otherwise. It will also be understood that the term "and/or" as used herein refers to and encompasses any and all possible combinations of one or more of the associated listed items.

Embodiments of computing devices, user interfaces for such devices, and associated processes for using such devices are described. In some embodiments, the computing device can be a handheld mobile computing device such as a smart phone. In some embodiments, the computing device can be a handheld mobile computing device such as a tablet. Examples of such handheld mobile computing devices include, without limitation, the iPhone by Apple computer, the Windows phone by Microsoft, and Galaxy phone by Samsung, the Pixel phone by Google, the iPad by Apple computer, the Surface by Microsoft, and the Galaxy Tab by Samsung, and the Pixel tablet by Google. The device can support a variety of applications including a web browser, an email application, a contacts application, and productivity applications included with the device when sold. The device also supports a variety of applications (apps) developed by third parties that are available for purchase and download from an application store. Typically, an application store makes available applications written to run on a particular mobile operating system. Exemplary operating systems for handheld mobile computing devices include, without limitation, iOS by Apple, Windows by Microsoft, and Android by Google.

Figure 1:
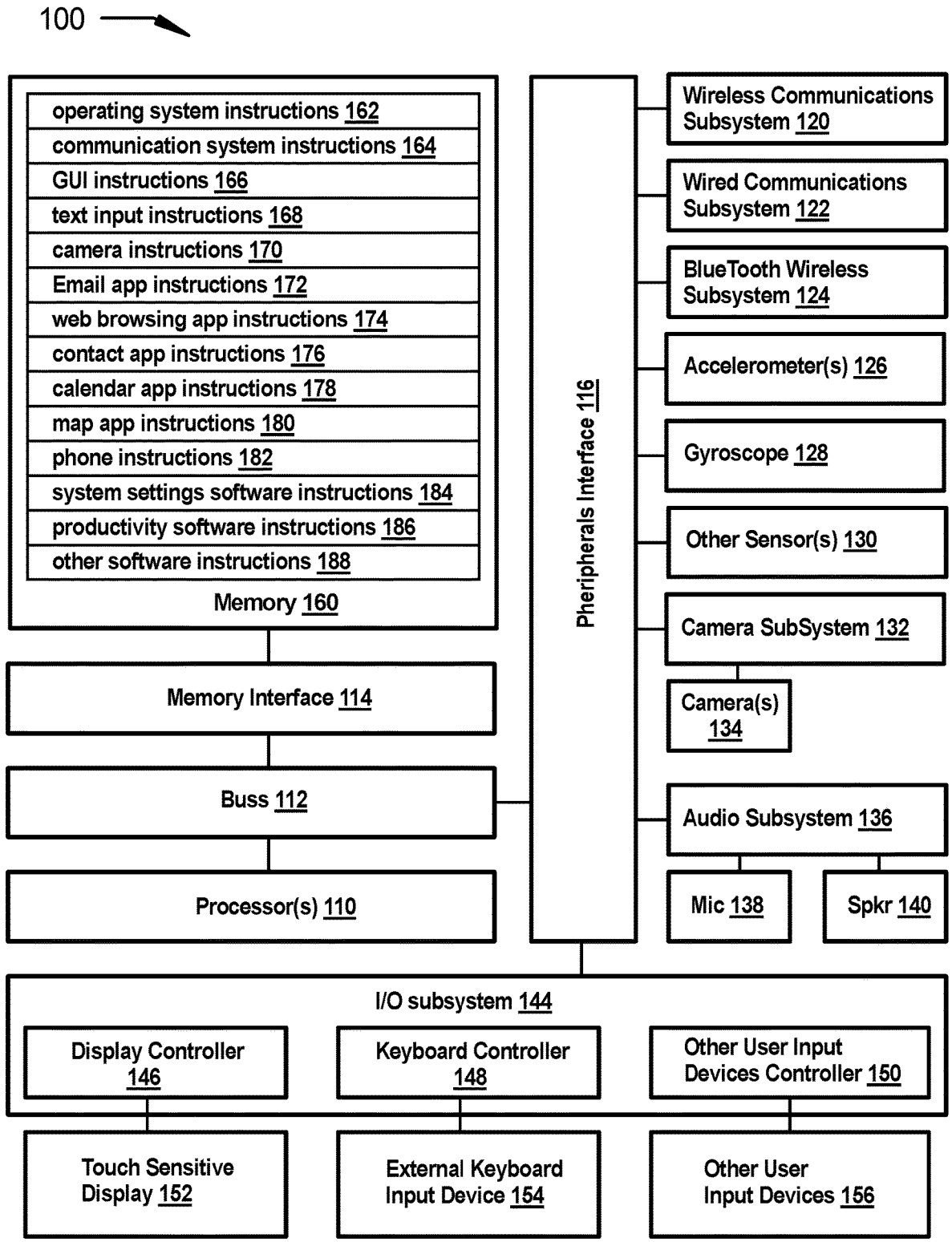
FIG. 1 is a block diagram illustrating a mobile computing device with a touch-sensitive display.

1.0 Block diagram: FIG. 1 is a block diagram illustrating a computing device 100 with a touch-sensitive display in accordance with some embodiments. The device includes processor(s) 110 connected via buss 112 to memory interface 114 to memory 160. The memory will typically contain operating system instructions 162, communication system instructions 164, GUI (graphical user interface) instructions 166, and text input instructions 168. The memory can contain camera instructions 170, email app instructions 172, web browsing app instructions 174, contact app instructions 176, calendar app instructions 178, map app instructions 180, phone app instructions 182, system settings software instructions 184, productivity software instructions 186, and other software instructions 188. The device also includes processors(s) 110 connected via buss 112 to peripherals interface 116. Peripherals interface 116 can be connected to a wireless communications subsystem 120, wired communications subsystem 122, Bluetooth wireless communications subsystem 124, accelerometer(s) 126, gyroscope 128, other sensor(s) 130, camera subsystem 132, and audio subsystem 136. The wireless communication system includes elements for supporting wireless communication via Wi-Fi or cellular or any other wireless networking system. The accelerometers provide information regarding device orientation to the GUI instructions to enable the change of the orientation of the graphical user interface to match the orientation of the device as the device is viewed in portrait or landscape orientation. The camera subsystem is connected to camera(s) 134. These cameras can include one or more cameras for supporting real time video conferencing over a network connection. The audio system can be connected to microphone 138 and speaker 140. The peripherals interface 116 is connected to I/O subsystem 144 comprising display controller 146, keyboard controller 148, and other user input devices controller 150. Display controller 146 is connected to touch-sensitive display 152. Keyboard controller 148 can be connected to other physical keyboard input device including external keyboard input device 154.

It should be understood that the device 100 is only one example of a computing device 100, and that the device 100 can have more or fewer components than those shown, can combine two or more components, or can have a different configuration or arrangement of components. The components shown in FIG. 1 can be implemented in hardware, software, or a combination of hardware and software.

Figure 2A:
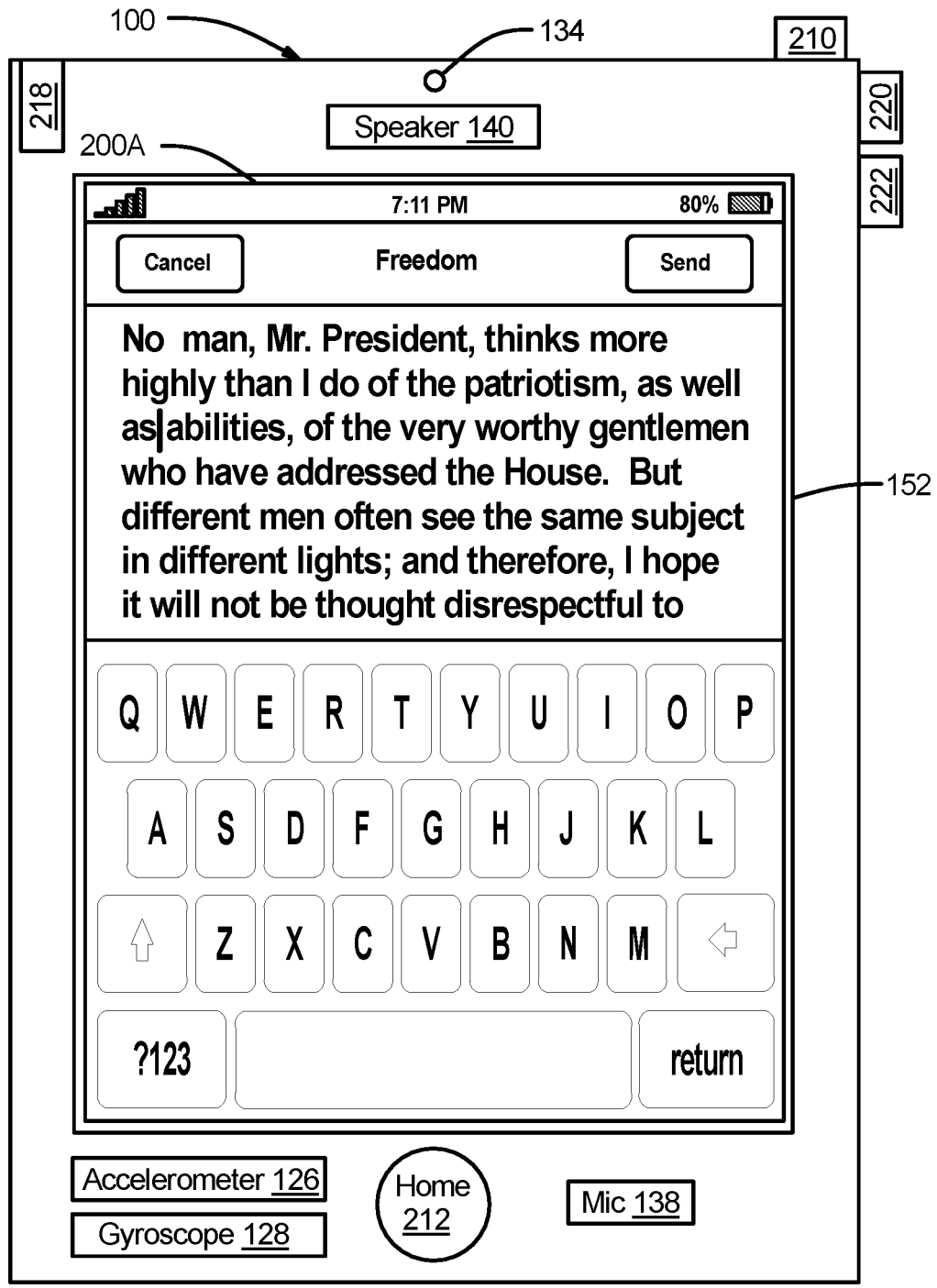
FIG. 2A illustrates a computing device in portrait orientation having a touch-sensitive display and on-screen keyboard.
Figure 2B:
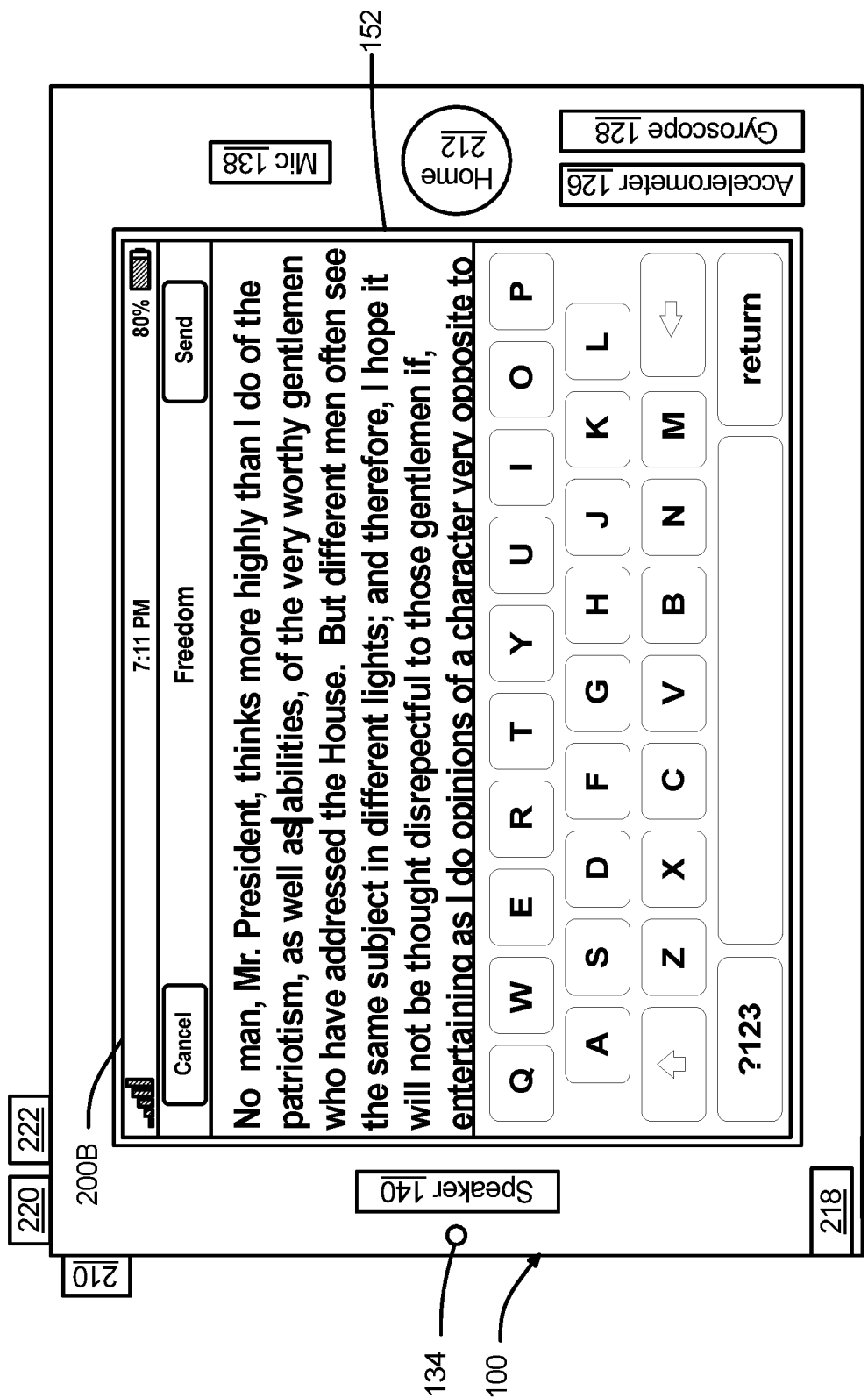
FIG. 2B illustrates a computing device in landscape orientation having a touch-sensitive display and on-screen keyboard.

2.0 Example computing devices: FIGS. 2A-2B illustrate examples of a computing device 100 having a touch-sensitive display 152 in accordance with some embodiments. Handheld computing device 100 can be a smart phone or a tablet. The touch-sensitive display can display one or more graphics within a user interface on touch-sensitive display 152. In this embodiment, as well as others described below, a user can select one or more graphics (in many instances these graphics are in the form of icons), by making contact with or touching the graphics, for example, with one or more fingers. In some embodiments, selection occurs when a user breaks contact with one or more graphics. In some embodiments, the contact can include a finger gesture, such as one or more taps, or swipes. A swipe finger gesture can be used to drag one icon to the location of another icon, for example. The device 100 can include one or more physical buttons such sleep/wake or power off/on button 210, home button 212, and volume up and down button pair 220 and 222. The device can include one or more accelerometers 126, a gyroscope 128 for sensing the position of the device position in space. The device can include a microphone 138, and speaker 140. The device can include earphone/microphone jack 218 for connection to an external headset. The device can include camera 134, status bar, and soft keyboard 240. FIG. 2A illustrates a computing device in portrait orientation having a touch-sensitive display and on-screen keyboard. FIG. 2B illustrates a computing device in landscape orientation having a touch-sensitive display and on-screen keyboard.

Attention is now directed towards embodiments of user interfaces and methods that can be implemented on computing device 100. The device detects the location of a finger contact and movement of a finger contact, across touch-sensitive display 152. In some embodiments the finger contact is part of a finger gesture. The device can detect the location of a finger gesture and type of finger gesture. Example finger gestures include, but are not limited to, a tap finger gesture (momentary contact of a single finger on touch-sensitive display 152 with no motion across touch-sensitive display 152, a long-press finger gesture (extended contact of a single finger on the touch-sensitive display 152 with no motion across touch-sensitive display 152 with the duration of the finger contact being approximately 0.5 seconds for example), a two-finger-tap finger gesture (momentary and simultaneous contact of two fingers on touch-sensitive display 152 with no motion across touch-sensitive display 152, a slide finger gesture (extended and uninterrupted contact of a single finger on touch-sensitive display 152 together with motion across touch-sensitive display 152, and a tap-and-slide finger gesture (momentary contact of a single finger on touch-sensitive display 152 with no motion across touch-sensitive display 152, followed by extended and uninterrupted contact of a single finger on touch-sensitive display 152 together with motion across touch-sensitive display 152 which begins at the location of the initial tap). The device responds to user gestures and displays a UI based upon the location and type of gesture that the device detects.

In the description below, we describe methods and graphical user interfaces for positioning a selection, selecting, and editing, on a computing device running applications under a touch-based operating system, using gestures on touch-sensitive display 152. This includes the description in reference to FIGS. 3A-3H, FIGS. 4A-4J, FIGS. 5A-5G, FIGS. 6A-6J, FIGS. 7A-7CC, FIGS. 8A-8N, FIGS. 9A-9P, FIGS. 10A-10N, FIGS. 11A-11M, FIGS. 12A-12B, FIGS. 24A-24L, FIGS. 27A-27B and the methods and user interfaces described in FIG. 13, FIG. 14, FIG. 15, FIG. 16, FIG. 17, FIG. 18, FIG. 19, FIG. 20, FIG. 21, FIG. 22, FIG. 23, FIG. 25, and FIG. 26.

3.0 Displaying and moving a selection of length equal to one character within read-only content: FIGS. 3A-3H illustrate an exemplary graphical user interface and method for positioning unit-length selection 310, with selection start point 305 and selection end point 307, within read-only content on a computing device with a touch-sensitive display. This user interface and method described in reference to FIGS. 3A-3H, was disclosed at least in part by Applicant in a related application. This figure and description is included here to provide context for the disclosure described in reference to FIGS. 7, 8, 9, 10, 11, and 12.

FIGS. 3A-3E illustrate an example of displaying selection 310 and changing both the horizontal and vertical position of selection 310 using a diagonal slide finger gesture. FIGS. 3F-3G illustrate moving the content with a page scroll finger gesture.

Figure 3A:
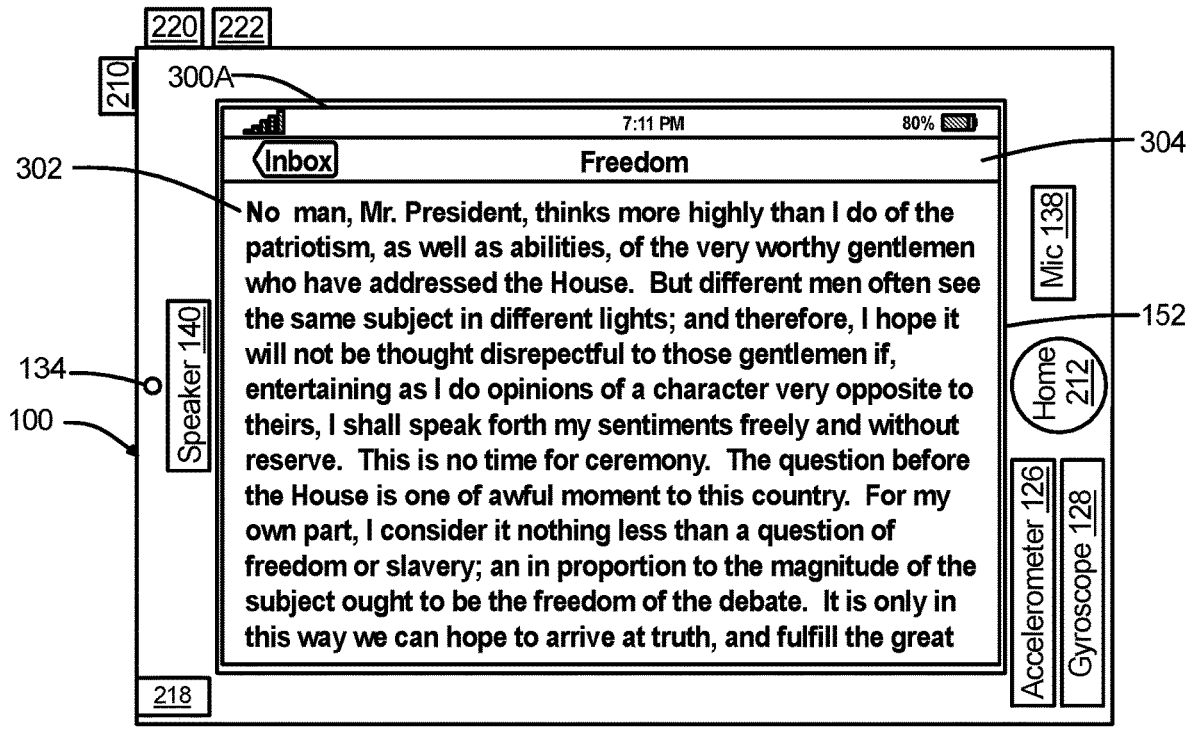
FIGS. 3A-3H illustrate an exemplary graphical user interface and method for displaying and moving a selection of length equal to one character within read-only content, on a computing device with a touch-sensitive display, in accordance with some embodiments.
Figure 3B:
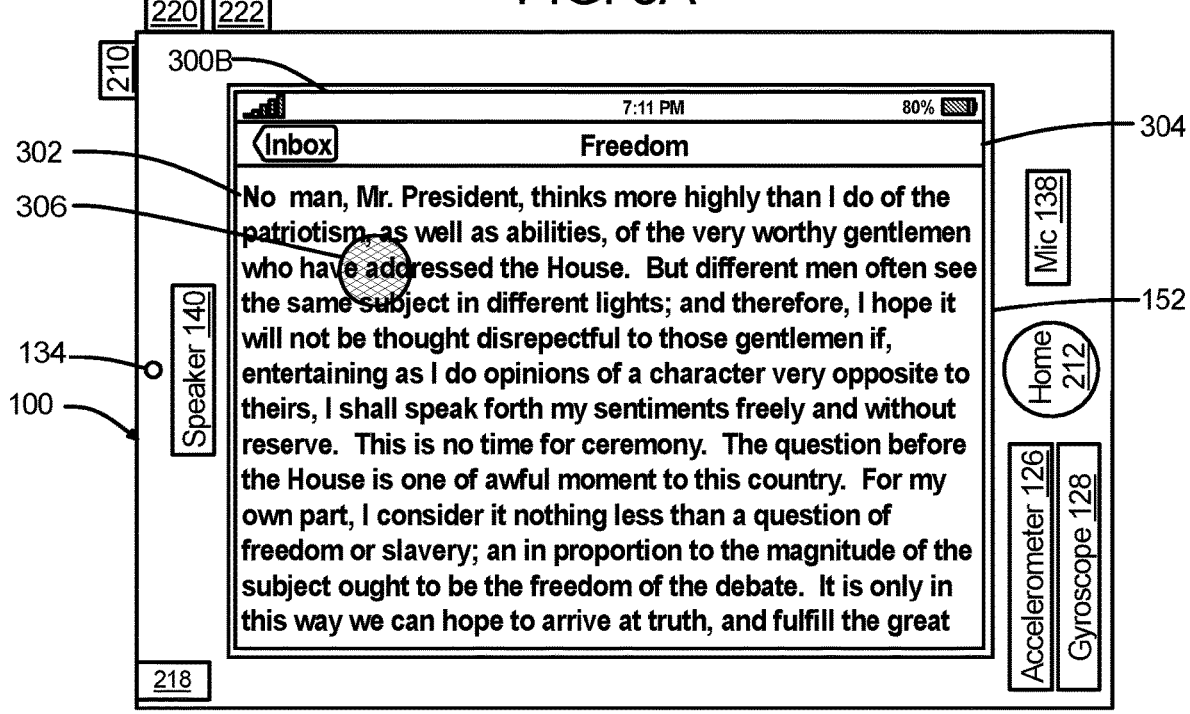
Figure 3C:
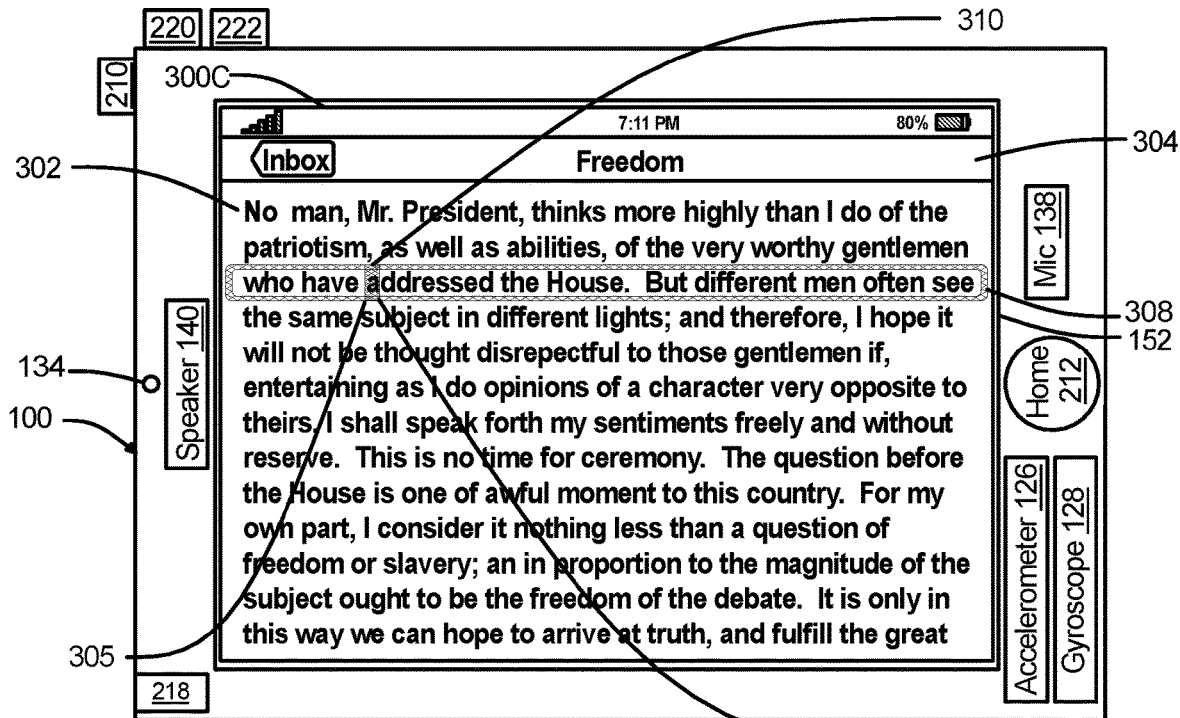
Figure 3D:
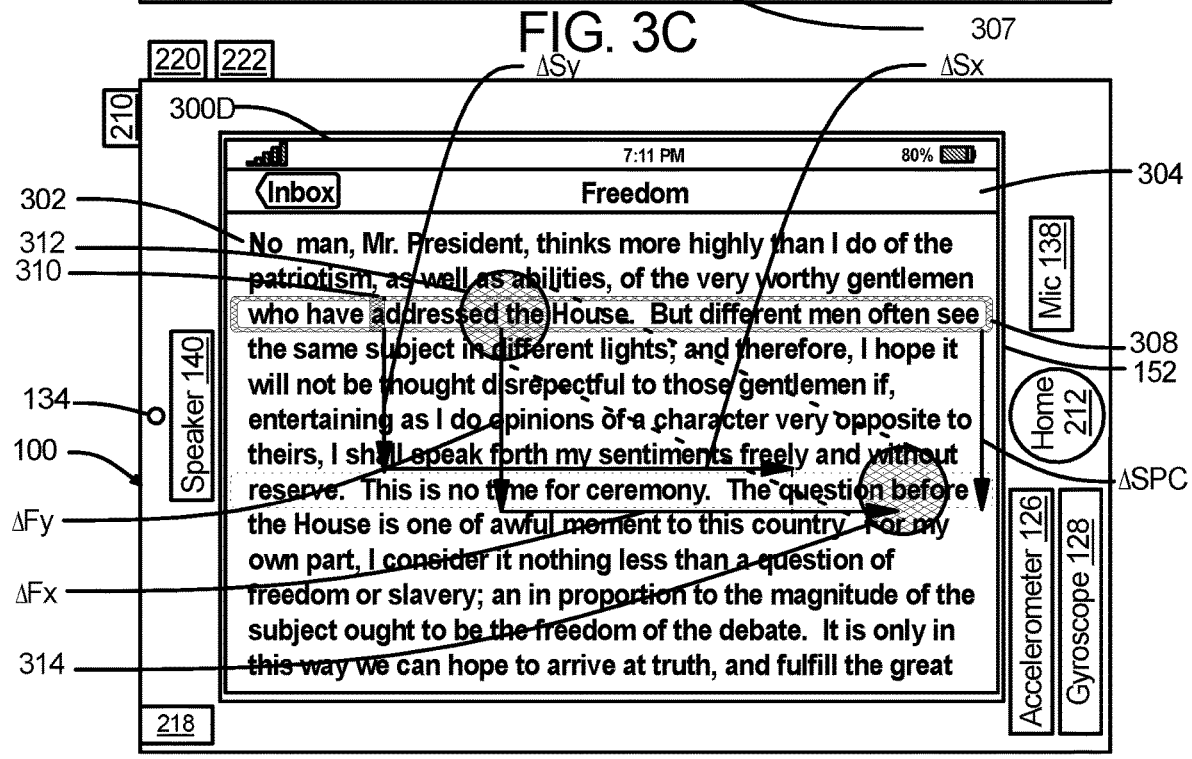
Figure 3E:
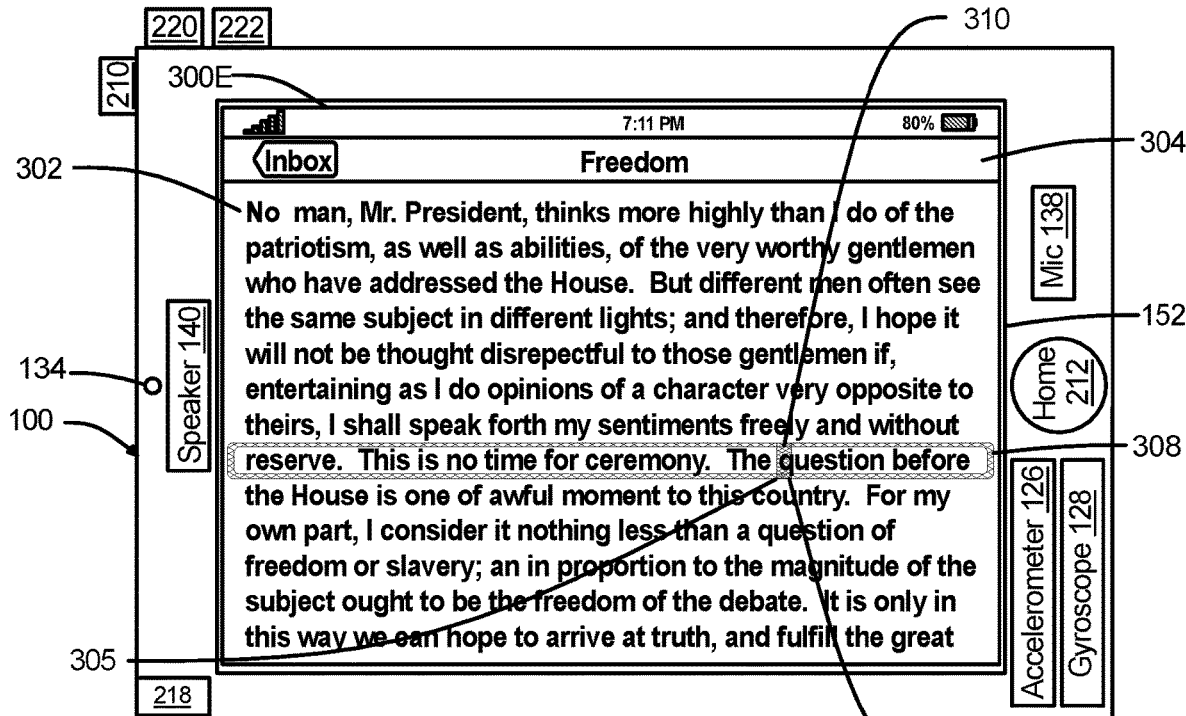
Figure 3F:
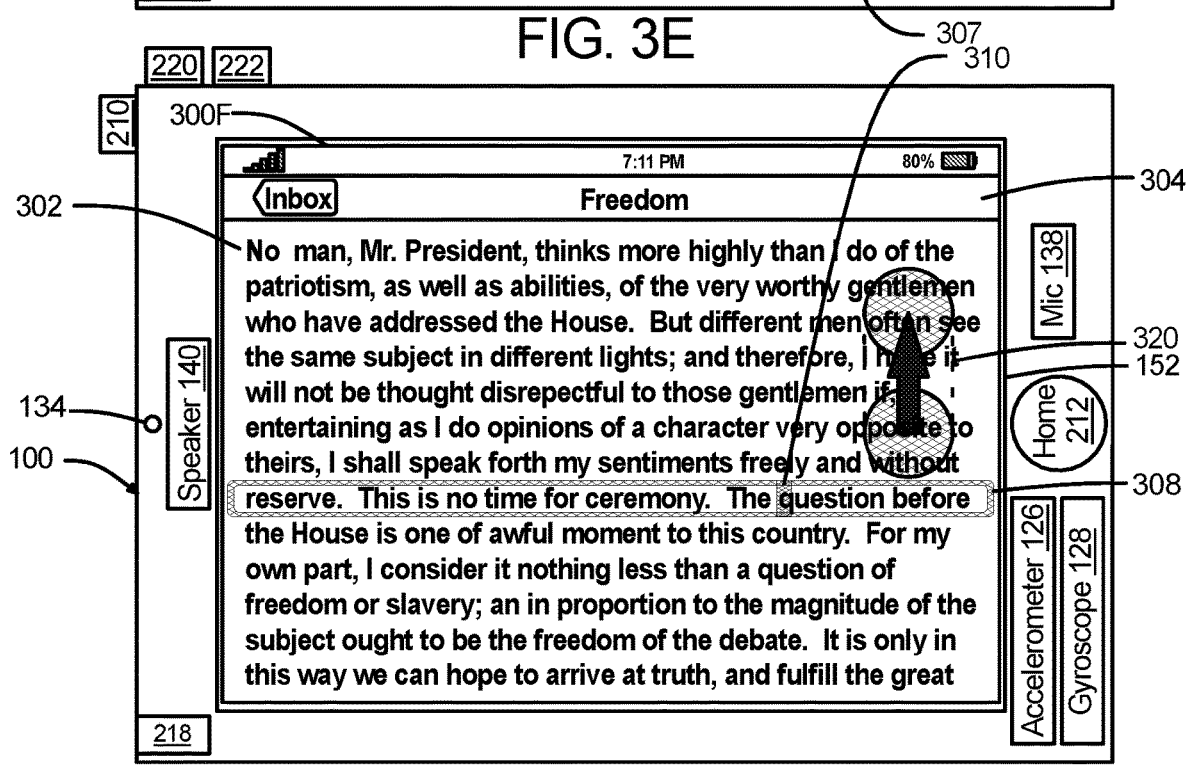
Figure 3G:
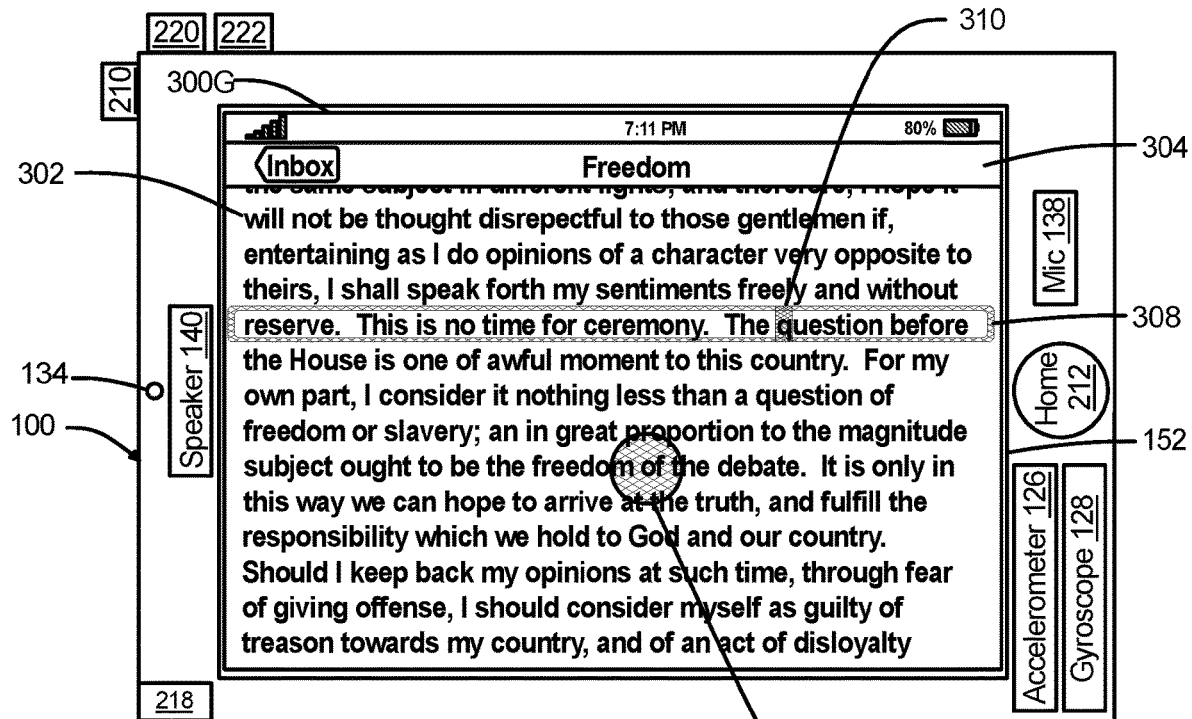
Figure 3H:
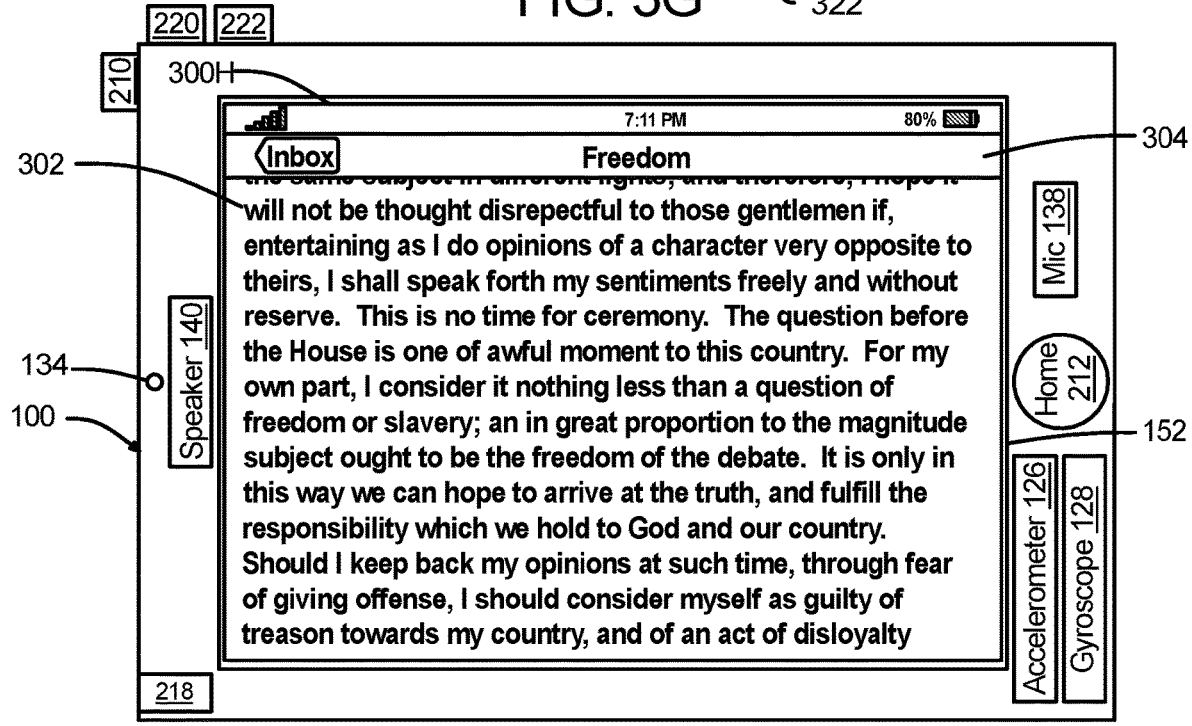

The device can display read-only content 302 in UI 300A (FIG. 3A). The device can also display application navigation bar 304. A user can perform a long-press finger gesture 306 on the read-only content (FIG. 3B). In response to detecting the finger gesture on the content, the device can display UI 300C (FIG. 3C) with selection positioning and control (SPC) icon 308 at an SPC icon first position and selection 310 of one-character length at a selection first position. In one exemplary embodiment, the selection first position is the location of the finger gesture on the content. With selection 310 at a first position, a user can perform a diagonal-slide finger gesture 312 to 314 beginning anywhere on SPC icon 308 (FIG. 3D). In response to detecting $\Delta Fx$ (a change in the horizontal position) and $\Delta Fy$ (a change in the vertical position) of a finger contact on the SPC icon, the device changes the position of selection 310 on the display from a first position to a second position. In one example embodiment, $\Delta Sx$ (the change in the horizontal position of selection 310) is approximately proportional to $\Delta Fx$, and $\Delta Sy$ (the change in the vertical position of selection 310) and $\Delta SPCy$ (the change in the vertical position of SPC icon 308) are equal and are approximately proportional to $\Delta Fy$ as illustrated in FIG. 3D. This can be written as $\Delta Sx=Kx\Delta Fx$ where Kx is a proportionality constant and $\Delta Sy=\Delta SPCy=Ky\Delta Fy$ where Ky is a proportionality constant. Again, in this exemplary embodiment Ky=1. The device displays UI 300E (FIG. 3E) with selection 310 at a second position. The user can also change just the horizontal or just the vertical position of selection 310 using a similar approach. For example, a user can perform a horizontal slide gesture beginning anywhere on SPC icon 308. In response to detecting $\Delta Fx$, the device changes the horizontal position of selection 310 on the display from the selection first position to a selection second position such that $\Delta Sx$ is approximately proportional to $\Delta Fx$. This can be written as $\Delta Sx=Kx\Delta Fx$ where Kx is a proportionality constant. For example a user can perform a vertical slide finger gesture beginning anywhere on SPC icon 308. In response to detecting $\Delta Fy$, the device changes the vertical position of selection 310 and SPC icon 308 such that $\Delta Sy$ and $\Delta SPCy$ and are equal and proportional to $\Delta Fy$. This can be written as $\Delta Sy=\Delta SPCy=\Delta Fy$ where Ky is a proportionality constant. In this exemplary embodiment Ky=1. Kx can be less than one, equal to one, or greater than one. In some embodiments, Kx can be a function of the slide gesture speed in the x-direction.

A user can scroll up the page by performing a page-scroll-up slide finger gesture 320. Upon detection of a vertical page-scroll-up slide finger gesture 320 on content 302 as illustrated in UI 300F (FIG. 3F), the device displays UI 300G (FIG. 3G) with both content 302 and selection 310 and SPC icon 308 scrolled up by an amount equal to the length of page-scroll-up slide finger gesture 320. A user can also perform a horizontal pan gesture or diagonal pan gesture on content 302 if the content 302 can be moved both vertically and horizontally. A user can perform tap finger gesture 322 at any position on the display screen that is not on the SPC icon 308 as illustrated in FIG. 3G. In response, the device displays UI 300H (FIG. 3H) in which both selection 310 and SPC icon 308 are no longer displayed.

Vertical auto-scroll: A user can move unit-length selection 310 until the position of selection 310 is approximately one line from the bottom (top) boundary of the display. In response, the device scrolls the content up (down) by one line until selection 310 is moved to the last (first) line of the text content.

Figure 4A:
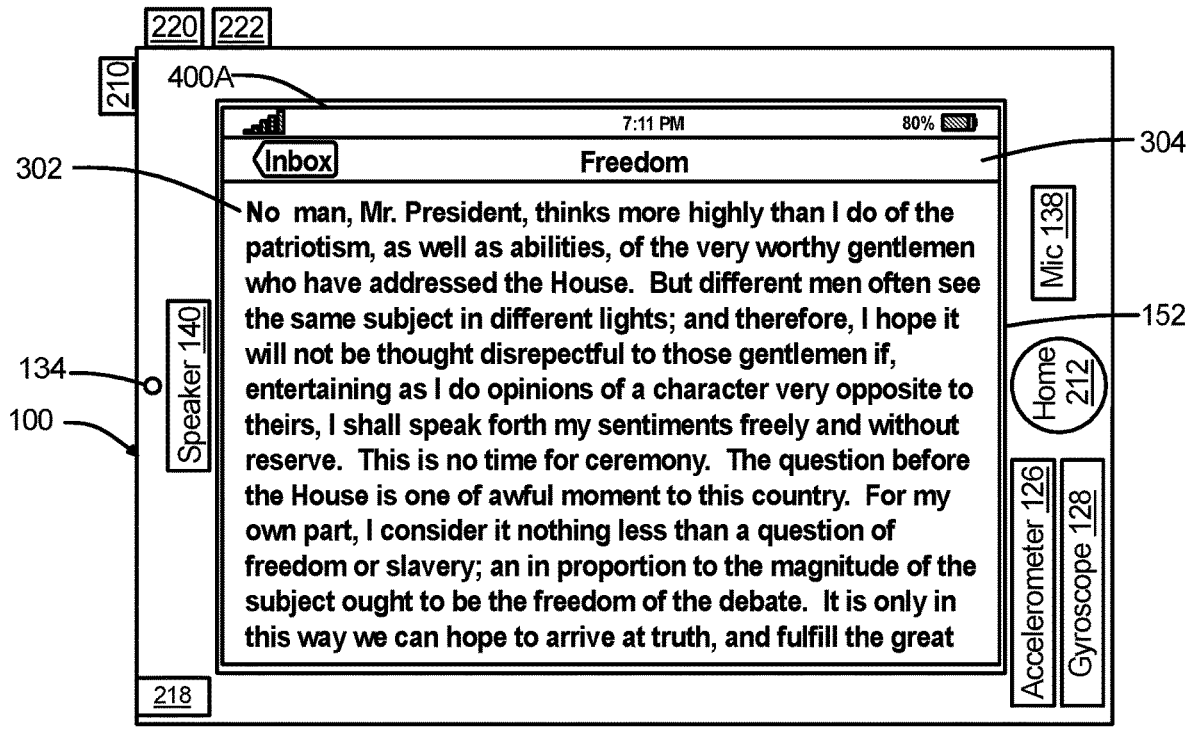
FIGS. 4A-4J illustrate an exemplary graphical user interface and method for displaying and moving a selection of length equal to one character and selecting text within read-only content with drag-lock off, on a mobile computing device with a touch-sensitive display, in accordance with some embodiments.
Figure 4B:
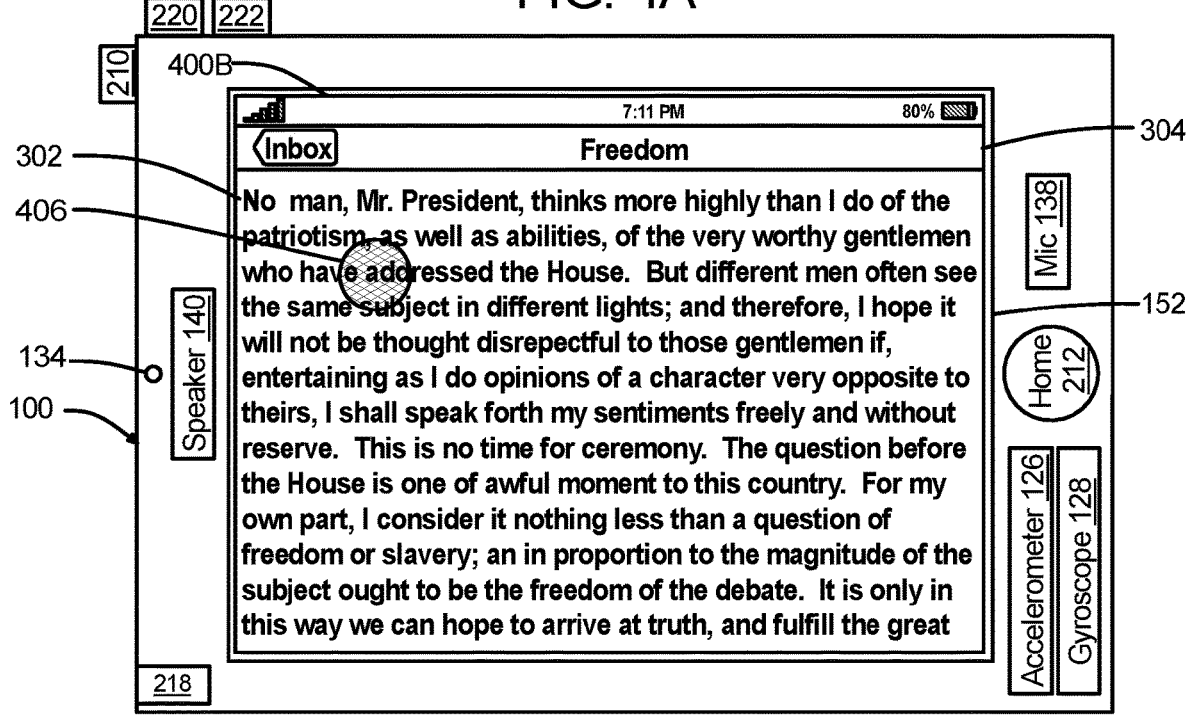
Figure 4C:
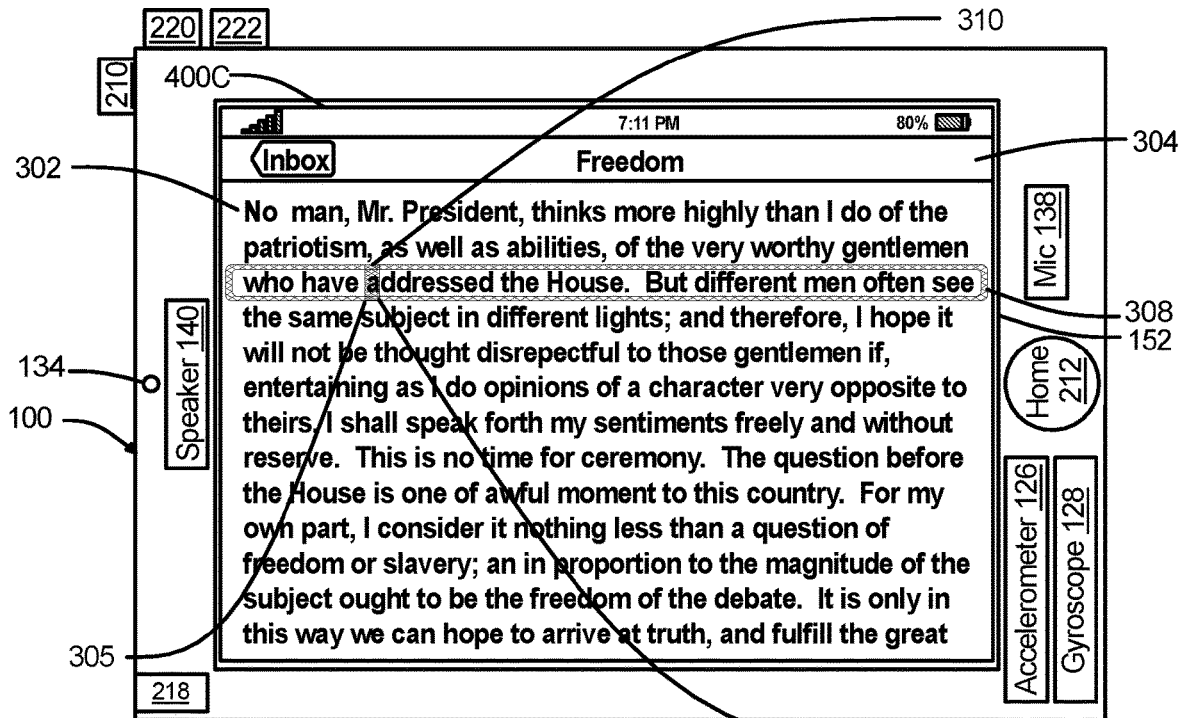
Figure 4D:
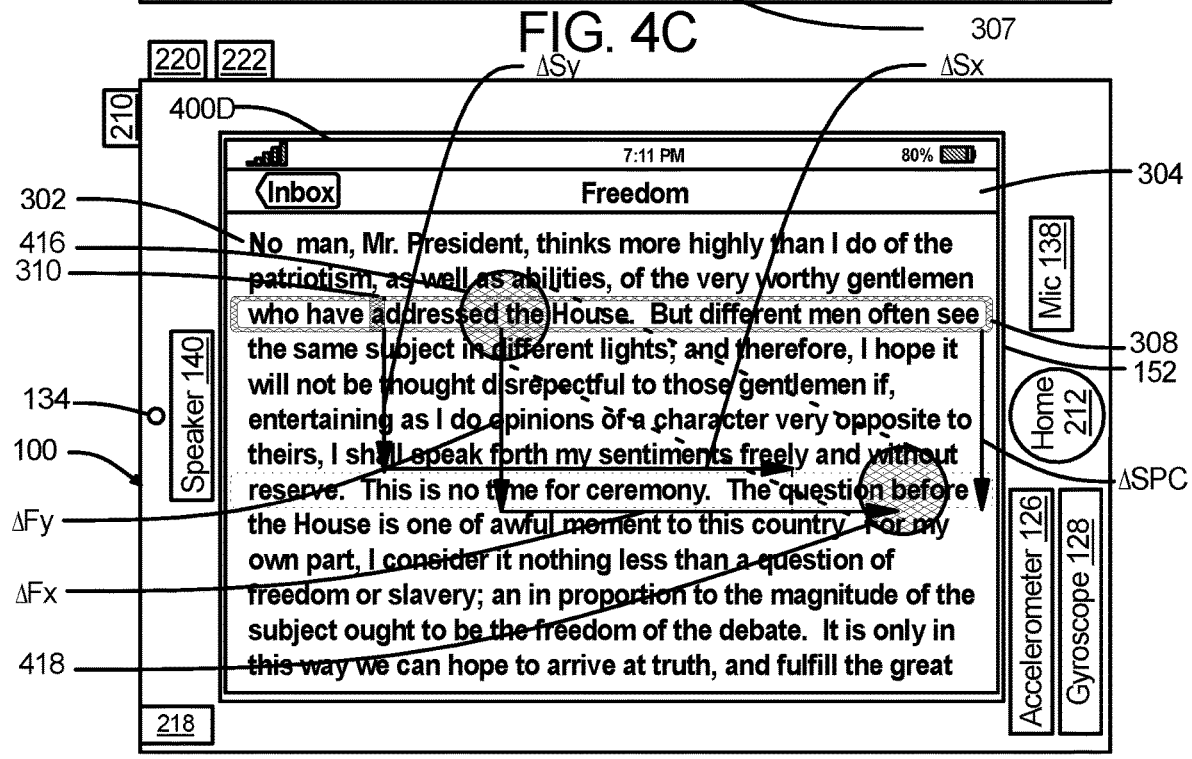
Figure 4E:
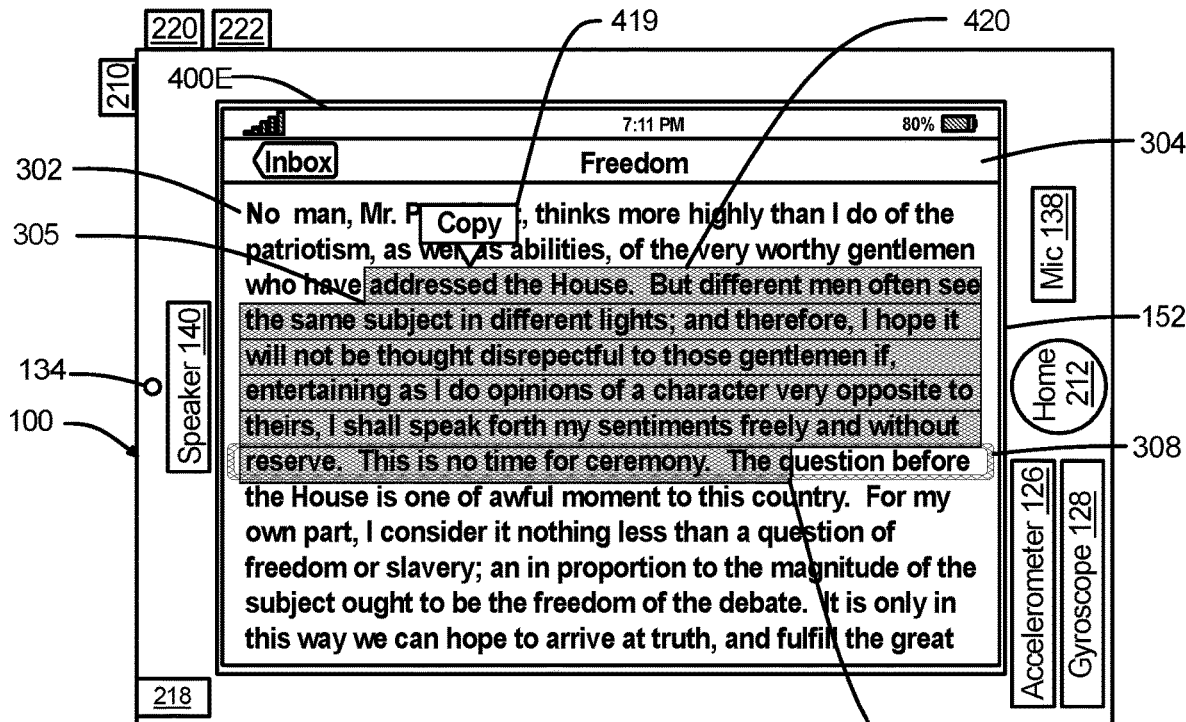

4. Displaying and moving a selection of length equal to one character and selecting text within read-only content w/drag-lock off: FIGS. 4A-4J illustrate an exemplary graphical user interface and method for displaying and moving a selection of length equal to one character and selecting text within read-only content with drag-lock off, using gestures on a touch-sensitive display. This user interface and method described in reference to FIGS. 4A-4J, was disclosed at least in part by Applicant in a related application. This figure and description is included here to provide context for the disclosure described in reference to FIGS. 7, 8, 9, 10, 11, and 12. The device can display read-only content 302 in UI 400A (FIG. 4A). A user can perform a long-press finger gesture 406 on the read-only content as illustrated in UI 400B (FIG. 4B). In response to detecting the finger gesture on the content, the device can display UI 400C (FIG. 4C) with selection positioning and control (SPC) icon 308 at an SPC icon first position and selection 310 of one character length at a selection first position, with selection start point 305 and selection end point 307. In one exemplary embodiment, the selection first position is the location of the finger gesture on the content. With selection 310 at a first position, a user can perform a diagonal tap-and-slide finger gesture 416 to 418 beginning anywhere on selection positioning and control (SPC) icon 308 as illustrated in FIG. 4. In response to detecting the tap and ΔFx (a change in the horizontal position) and ΔFy (a change in the vertical position) of a finger contact on the SPC icon, the device selects text on the display from a first position to a second position as illustrated in FIG. 4E. In one exemplary embodiment, ΔSx (the change in the horizontal position of the selection end point) is proportional to ΔFx, and ΔSy (the change in the vertical position of the selection end point) and ΔSPCy (the change in the vertical position of SPC icon 308) are equal and are approximately proportional to ΔFy, as illustrated in UI 400D (FIG. 4D). This can be written as ΔSx=KxΔFx where Kx is a proportionality constant and ΔSy=ΔSPCy=KyΔFy where Ky is a proportionality constant. Again, in this exemplary embodiment Ky=1. Kx can be less than one, equal to one, or greater than one. In some embodiments, Kx can be a function of the slide gesture speed in the x-direction. The device can also display the edit menu icon 419 for the selection 420. The edit menu displays available actions with respect to the selection. In the case of selected read-only text, copy can be an action. A user can tap on a displayed edit menu icon to perform an action with respect to the selected read-only text. For example, a user can tap on the copy icon to copy the selected text to the clipboard.

Figure 4F:
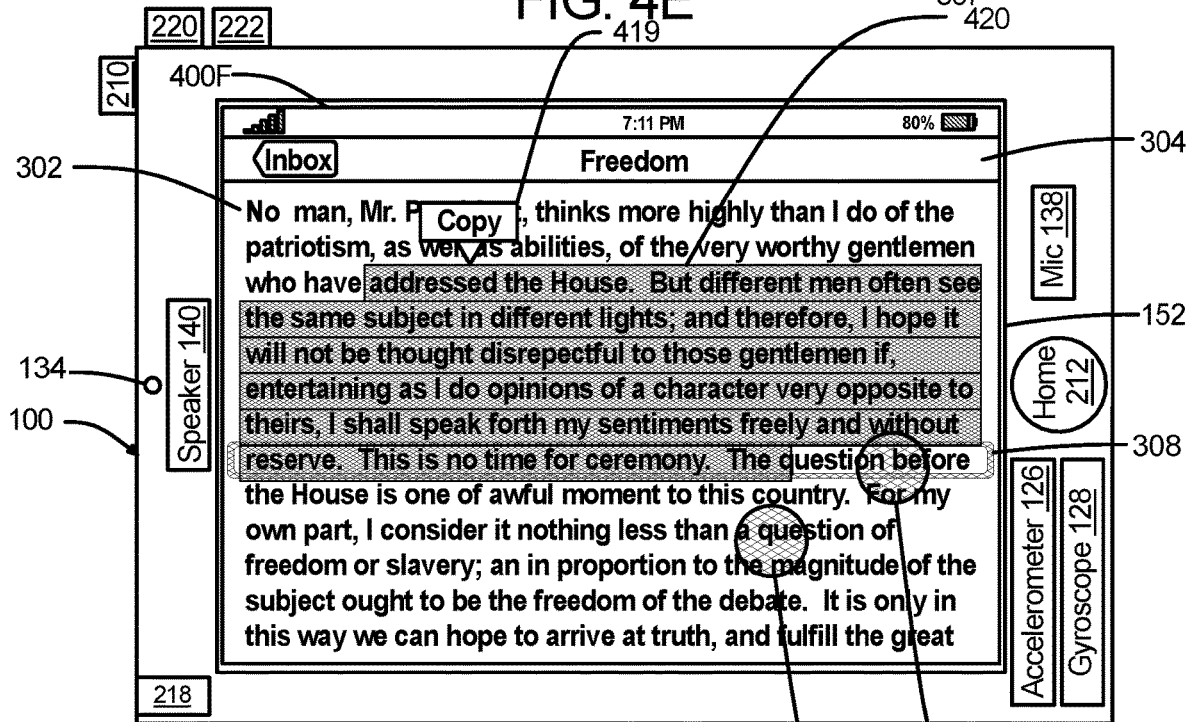
Figure 4G:
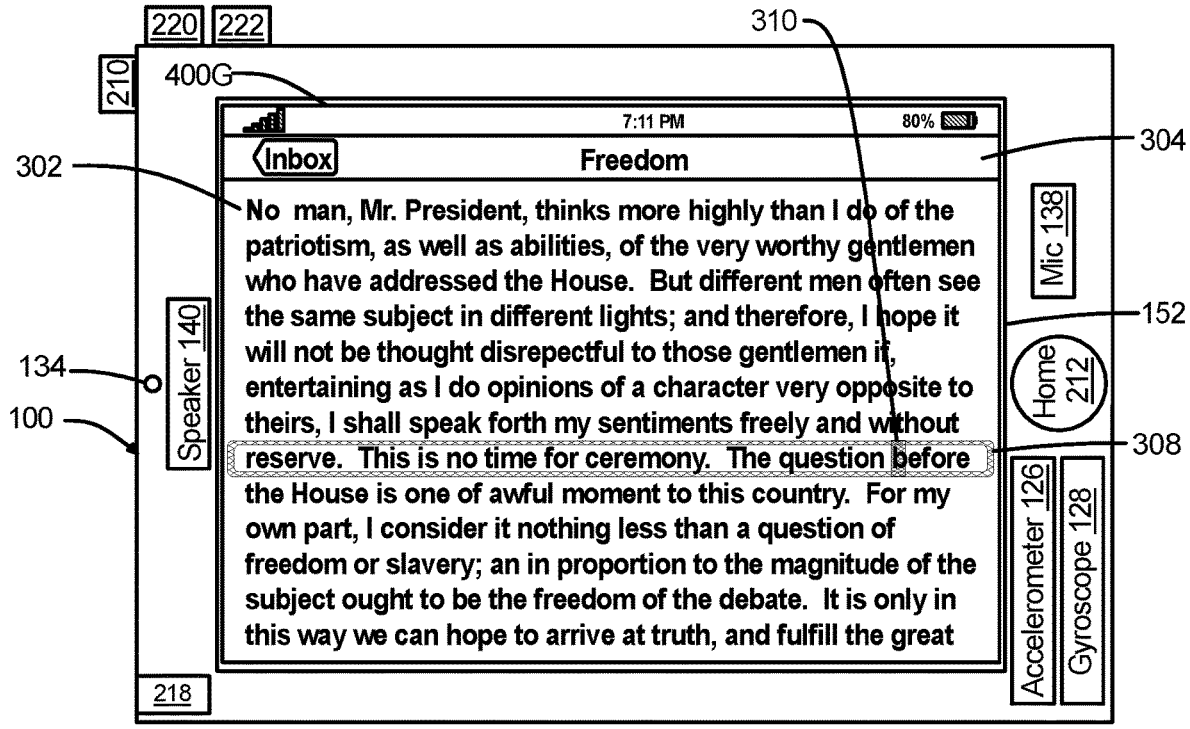

A user can perform tap finger gesture 422 at any position on SPC icon 308 as illustrated in FIG. 4F. In response, the device displays UI 400G (FIG. 4G) with SPC icon 308 displayed, with selection 420 cancelled and with unit-length selection 310 displayed at the tap location. Alternatively, a user can perform tap finger gesture 424 at any position on read-only content 302 but not on SPC icon 308 as illustrated in FIG. 4F. In response, the device displays UI 400H (FIG. 4H) with SPC icon 308 cancelled and selection 420 cancelled.

Figure 4H:
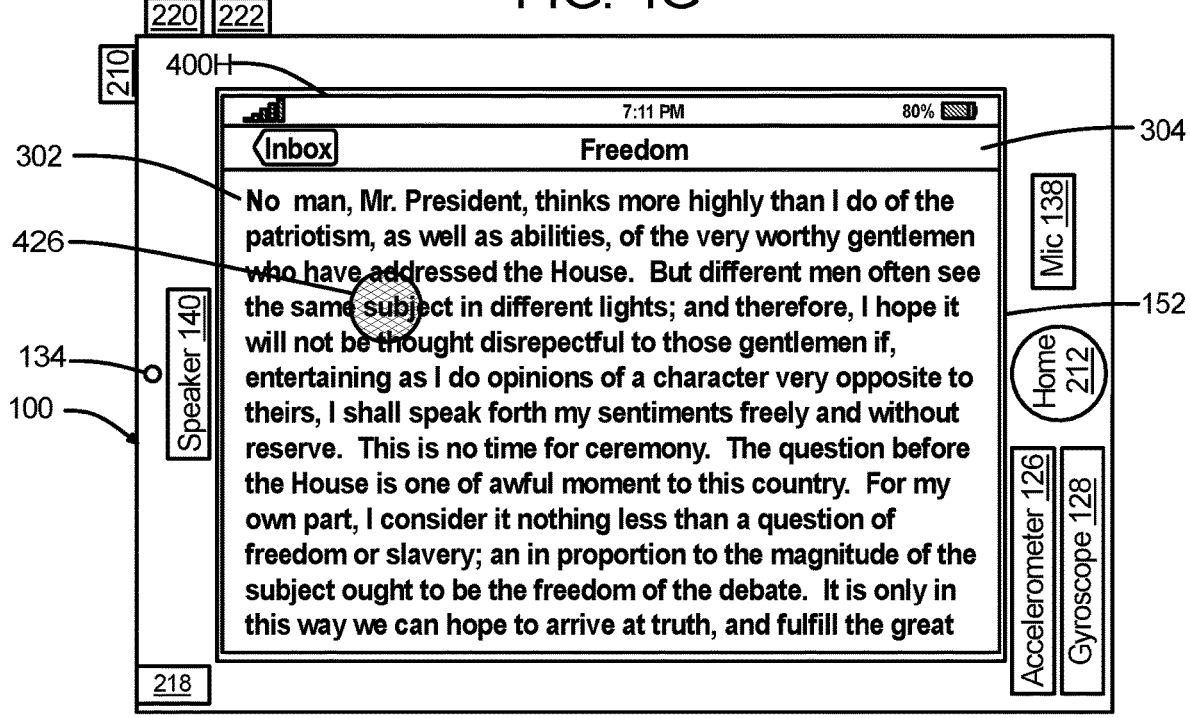
Figure 4I:
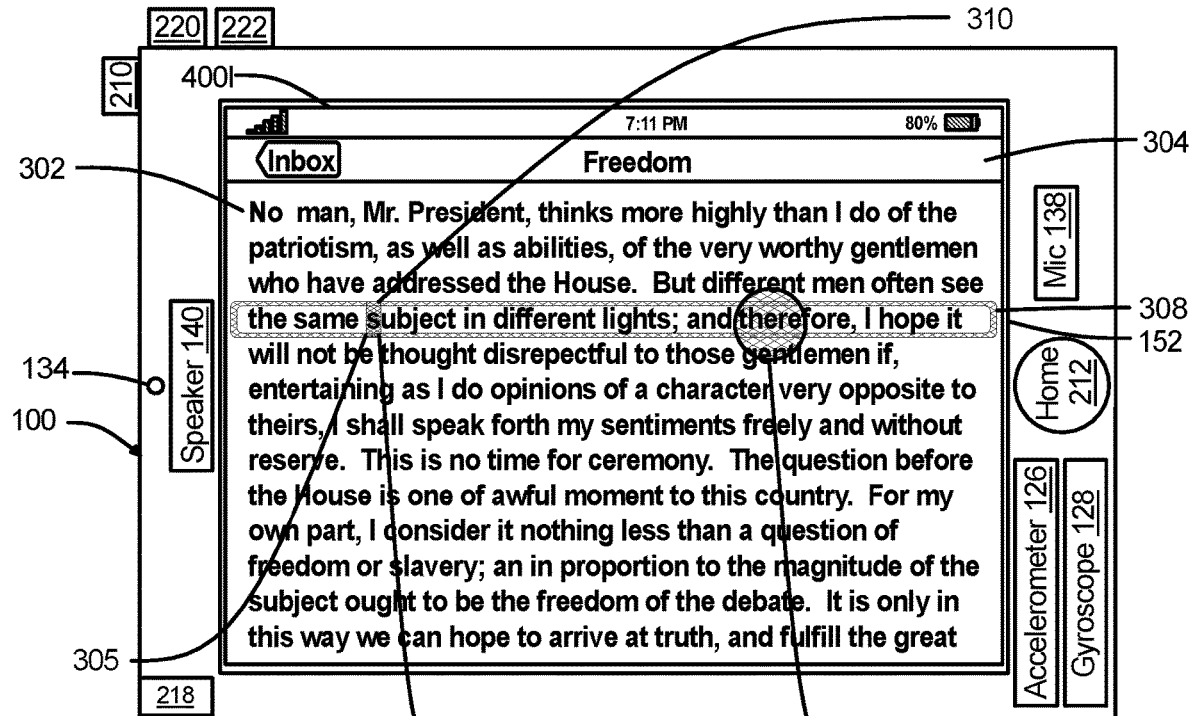
Figure 4J:
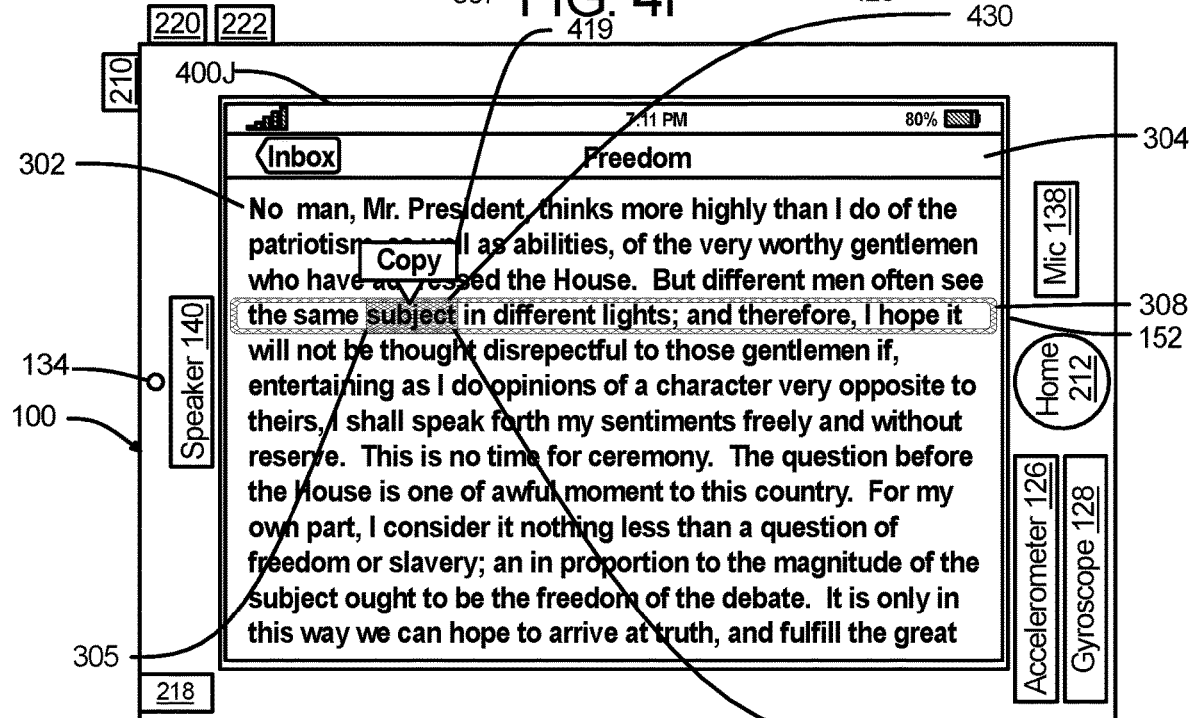

Double-tap on SPC icon to select word at L=1 selection position (FIGS. 4H-4J): A user can perform a finger gesture 426 (a long press finger gesture for example) on read-only text 302 as illustrated in FIG. 4H. In response to detecting the finger gesture, the device displays unit-length selection 310 at a selection first position and SPC icon 308 at a first position as illustrated in UI 400I (FIG. 4I). In one example embodiment, the unit length selection 310 can be displayed at the long press position. A user can change the position of unit-length selection 310 with a slide gesture on SPC icon 308 as described above in reference to FIG. 3. Once selection 310 is positioned within a target word, a user can perform a double-tap finger gesture 428 on SPC icon 308 as illustrated in FIG. 4I. In response to detecting the double-tap finger gesture on SPC icon 308, the device selects the word at the position of unit length selection 310 as illustrated in UI 400J (FIG. 4J). The device can also display edit menu icon 419 for the selection 430.

Auto-scroll: A user can move unit-length selection 310 until the position of selection 310 is approximately one line from the bottom (top) boundary of the display. In response, the device scrolls the content up (down) by one line until selection 310 is moved to the last (first) line of the text content. Similarly, a user can select text from start point 305 to end point 307 until the end point 307 is approximately one line from the bottom (top) boundary of the display. In response, the device scrolls the content up (down) by one line until end point 307 is moved to the last (first) line of the text content.

5.0 Displaying and moving a selection of length equal to one character and selecting text within read-only content w/drag-lock on: FIGS. 5A-5G illustrate an exemplary graphical user interface and method for displaying and moving a selection of length equal to one character and selecting text within read-only content with drag-lock on using gestures on the touch-sensitive display. This user interface and method described in reference to FIGS. 5A-5G, was disclosed at least in part by Applicant in a related application. This figure and description is included here to provide context for the disclosure described in reference to FIGS. 7, 8, 9, 10, 11, and 12.

Figure 5A:
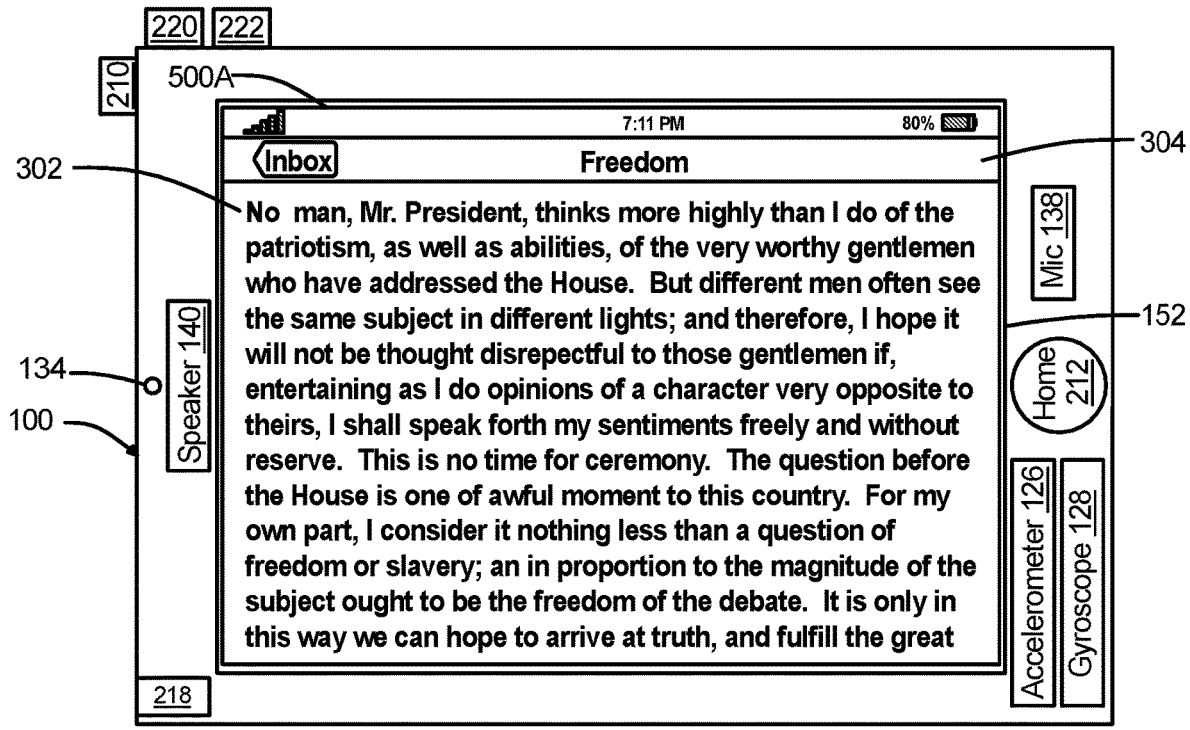
FIGS. 5A-5G illustrate an exemplary graphical user interface and method for displaying and moving a selection of length equal to one character and selecting text within read-only content with drag-lock on, on a mobile computing device with a touch-sensitive display, in accordance with some embodiments.
Figure 5B:
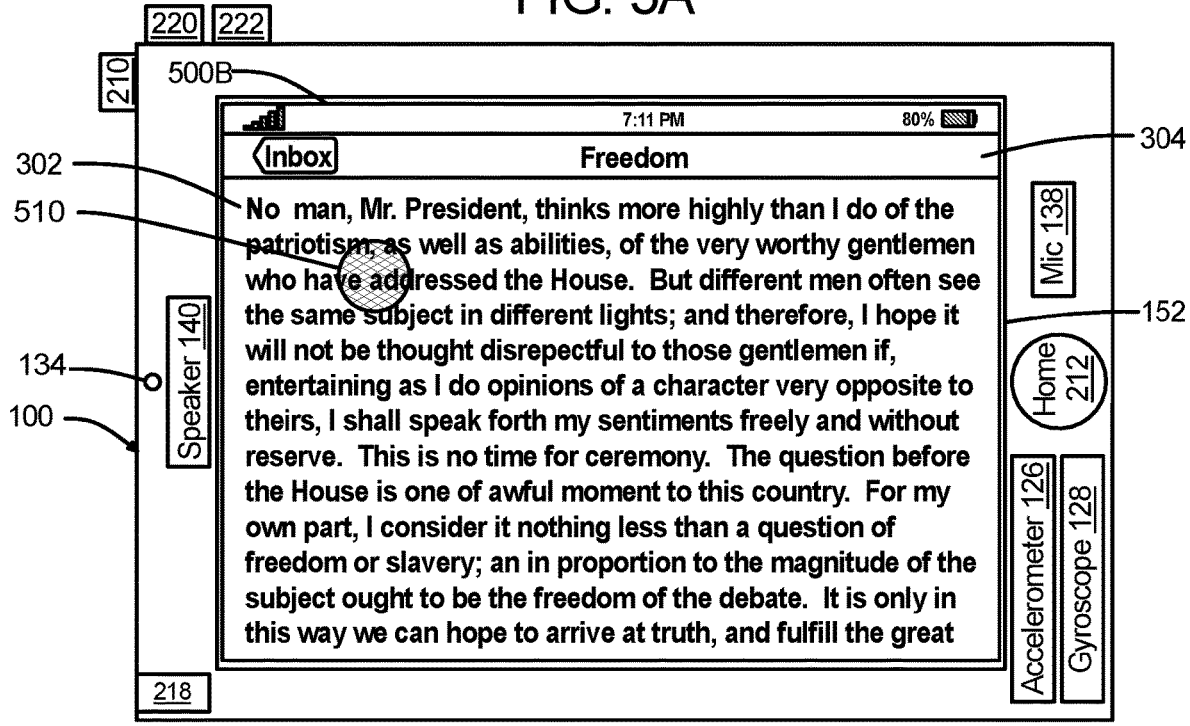
Figure 5C:
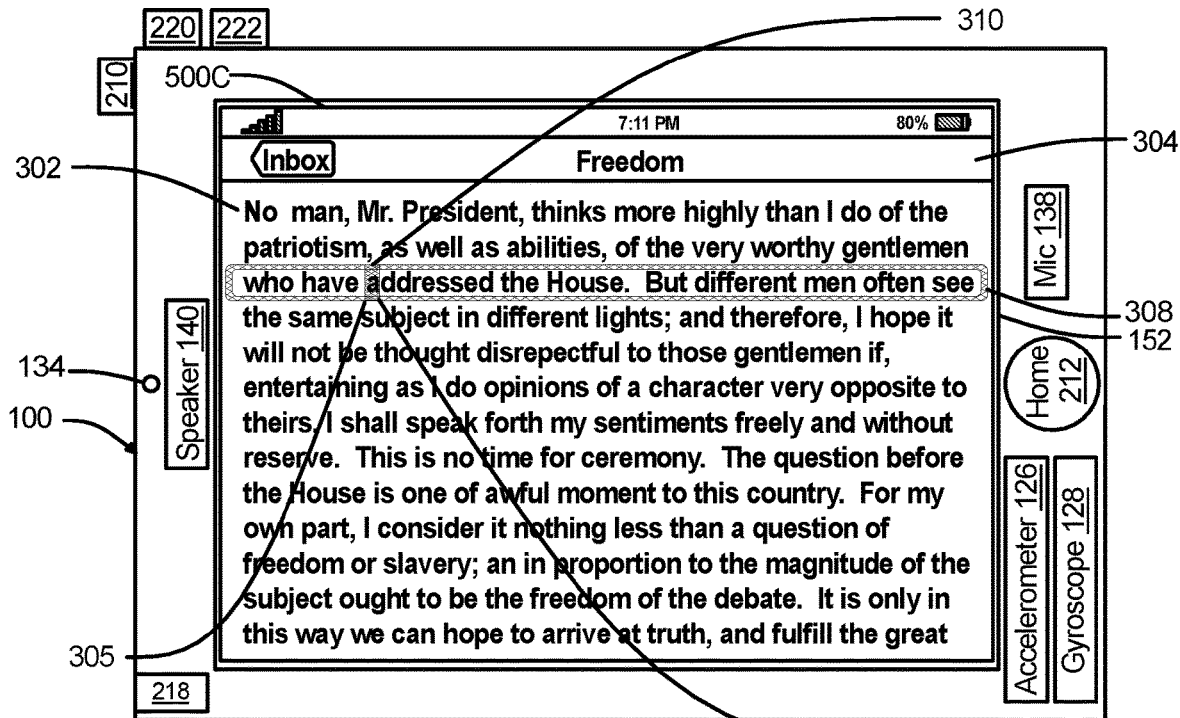
Figure 5D:
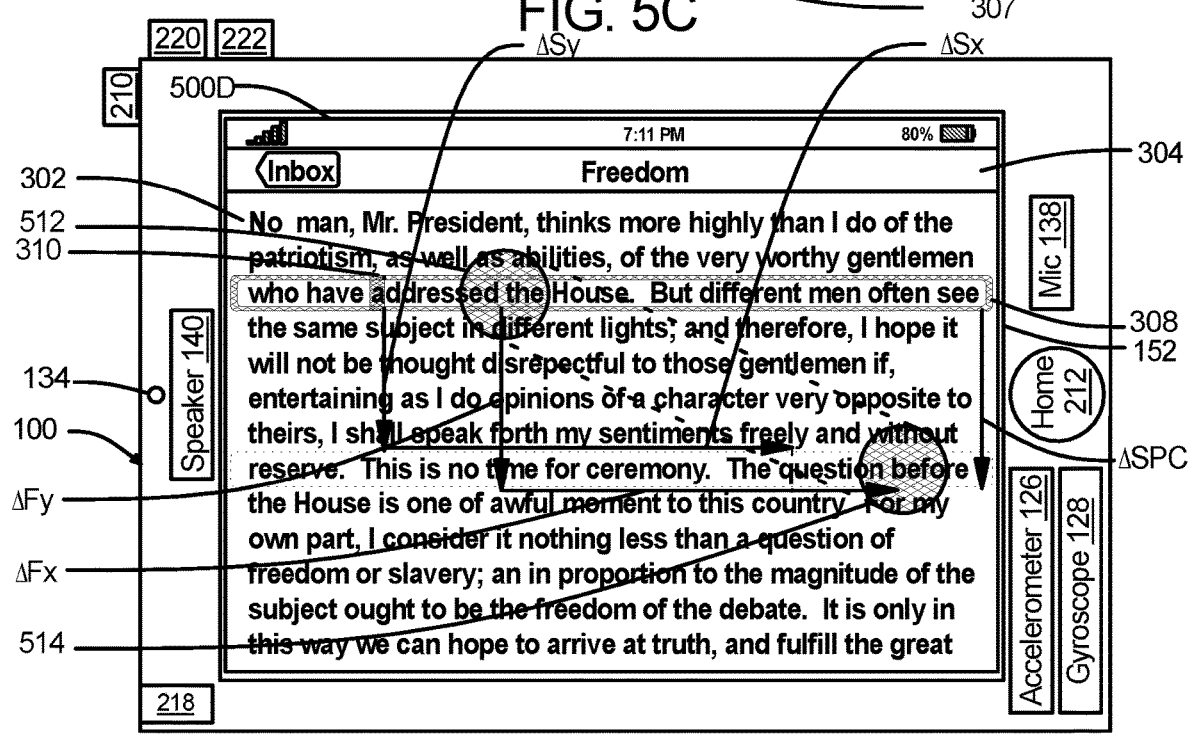
Figures 5E, 5F:
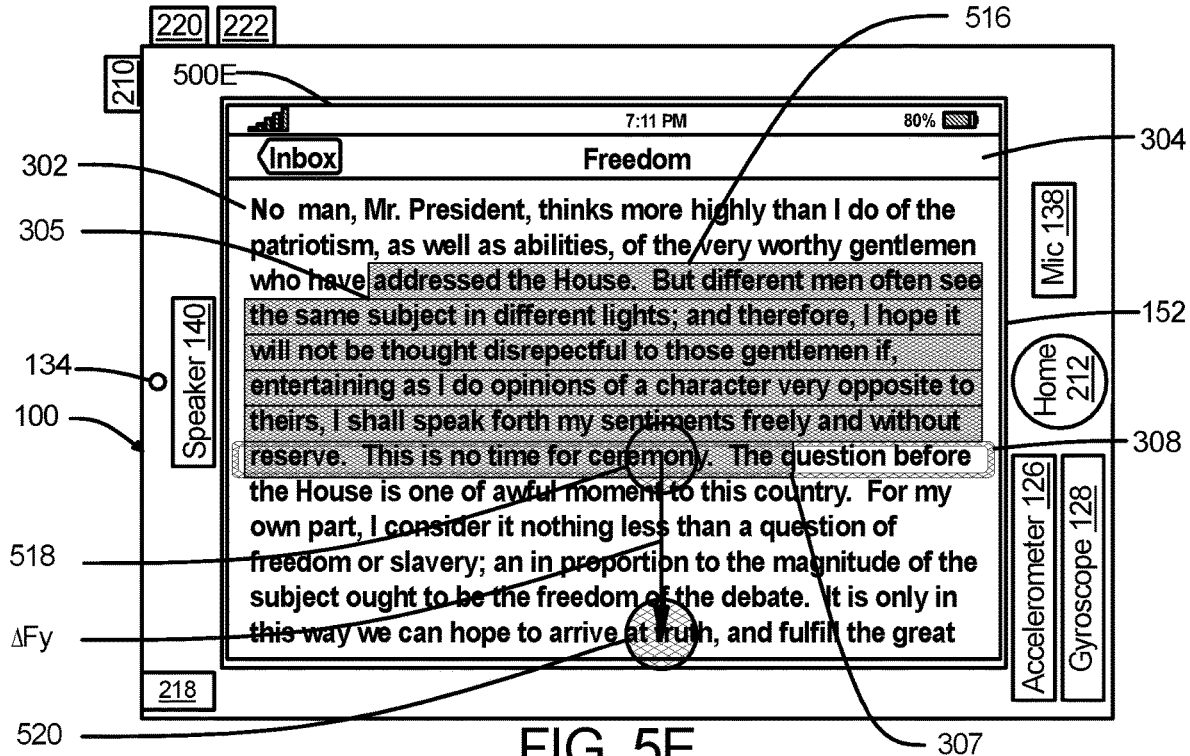
Figure 5G:
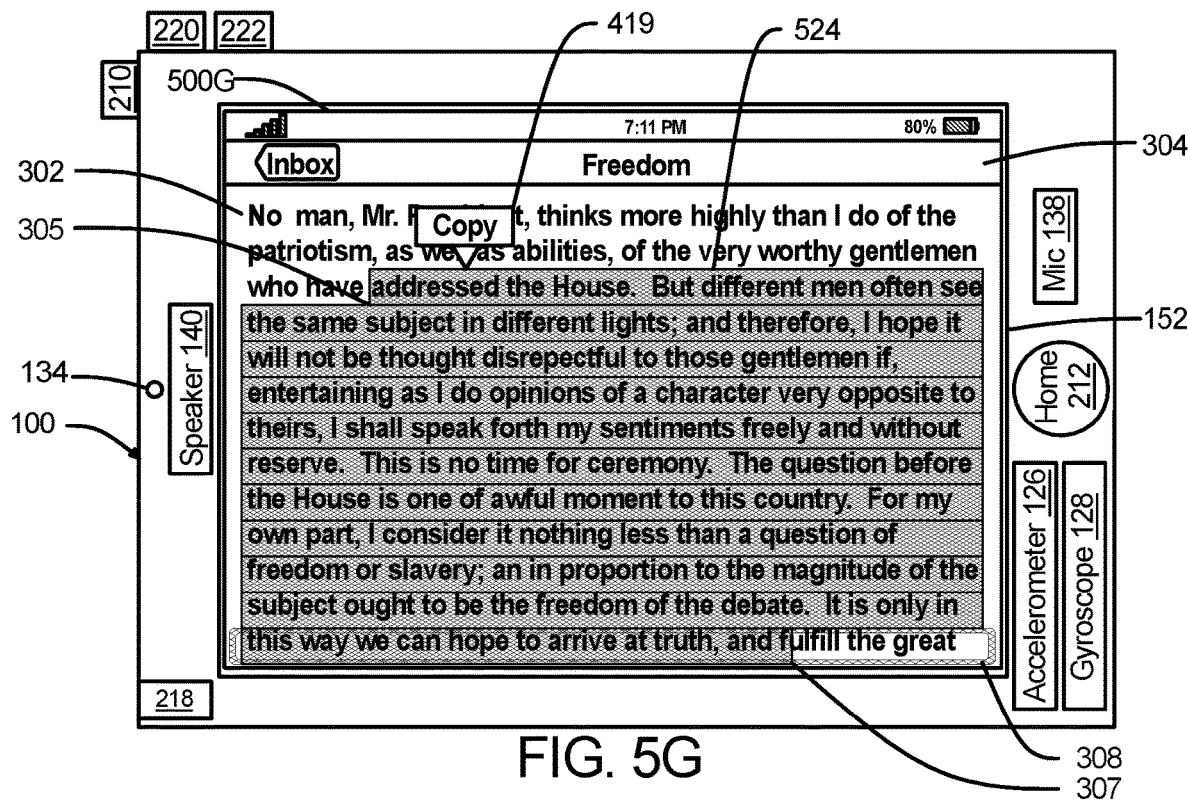

The device can display read-only content 302 in UI 500A (FIG. 5A). A user can perform a long-press finger gesture 510 on the read-only content as illustrated in UI 500B (FIG. 5B). In response to detecting the finger gesture on the content, the device can display UI 500C (FIG. 5C) with selection positioning and control (SPC) icon 308 at an SPC icon first position and selection 310 of one character length at a selection first position. In one exemplary embodiment, the selection first position is the location of the finger gesture on the content. With selection 310 at a first position, a user can perform a diagonal tap-and-slide finger gesture 512 to 514 beginning anywhere on SPC icon 308. In response to detecting the tap and ΔFx (a change in the horizontal position) and ΔFy (a change in the vertical position) of a finger contact on the SPC icon, the device selects text on the display from a first position to a second position. In one exemplary embodiment, ΔSx (the change in the horizontal position of the selection end point) is proportional to ΔFx, and ΔSy (the change in the vertical position of the selection end point) and ΔSPCy (the change in the vertical position of SPC icon 308) are equal and are approximately proportional to ΔFy, as illustrated in UI 500D (FIG. 5D). This can be written as ΔSx=KxΔFx where Kx is a proportionality constant and ΔSy=ΔSPCy=KyΔFy where Ky is a proportionality constant. Again, in this exemplary embodiment Ky=1. Kx can be less than one, equal to one, or greater than one. In some embodiments, Kx can be a function of the slide gesture speed in the x-direction. With drag-lock OFF, the extent of the selection is finalized with a finger lift from SPC icon 308 at the end of a tap and slide gesture as illustrated above in UI 400E (FIG. 4E). However, with drag-lock ON, the extent of the selection is not finalized with a finger lift from SPC icon 308 at the end of a tap and slide gesture. With drag lock ON, the extent of the selection is finalized with a finger lift followed by a finger tap on SPC icon 308. The user can change the selection extent with one or more additional slide gestures on SPC icon 308. For example, a user can perform a vertical slide gesture 518 to 520 to modify the extent of selection as illustrated in UI 500E (FIG. 5E). In response to detecting ΔFy (a change in the vertical position) of uninterrupted finger contact on selection positioning and control (SPC) icon 308, the device modifies the extent of the selection to selection 522 as illustrated in UI 500F (FIG. 5F). The user can continue change the extent of the selection with additional slide gestures beginning anywhere on SPC icon 308. Once satisfied with the selection extent, the user can finalize the selection with tap gesture 524 anywhere on SPC icon 308 as illustrated in FIG. 5F. In response to detecting the finger tap finalizing the selection extent, the device displays UI 500G (FIG. 5G) with selection 524. The device can also display the edit menu icon 419 for the selection 524.

Auto-scroll: The device can auto-scroll content as previously described in reference to FIG. 4A-4J.

6.0 Displaying and moving a selection of length equal to zero and selecting text within editable content w/drag-lock off: FIGS. 6A-6J illustrate an exemplary graphical user interface and method for displaying and moving a selection of length equal to zero and selecting text within editable content with drag-lock off, using gestures on a touch-sensitive display. This user interface and method described in reference to FIGS. 6A-6J, was disclosed at least in part by Applicant in a related application. This figure and description is included here to provide context for the disclosure described in reference to FIGS. 7, 8, 9, 10, 11, and 12.

Figure 6A:
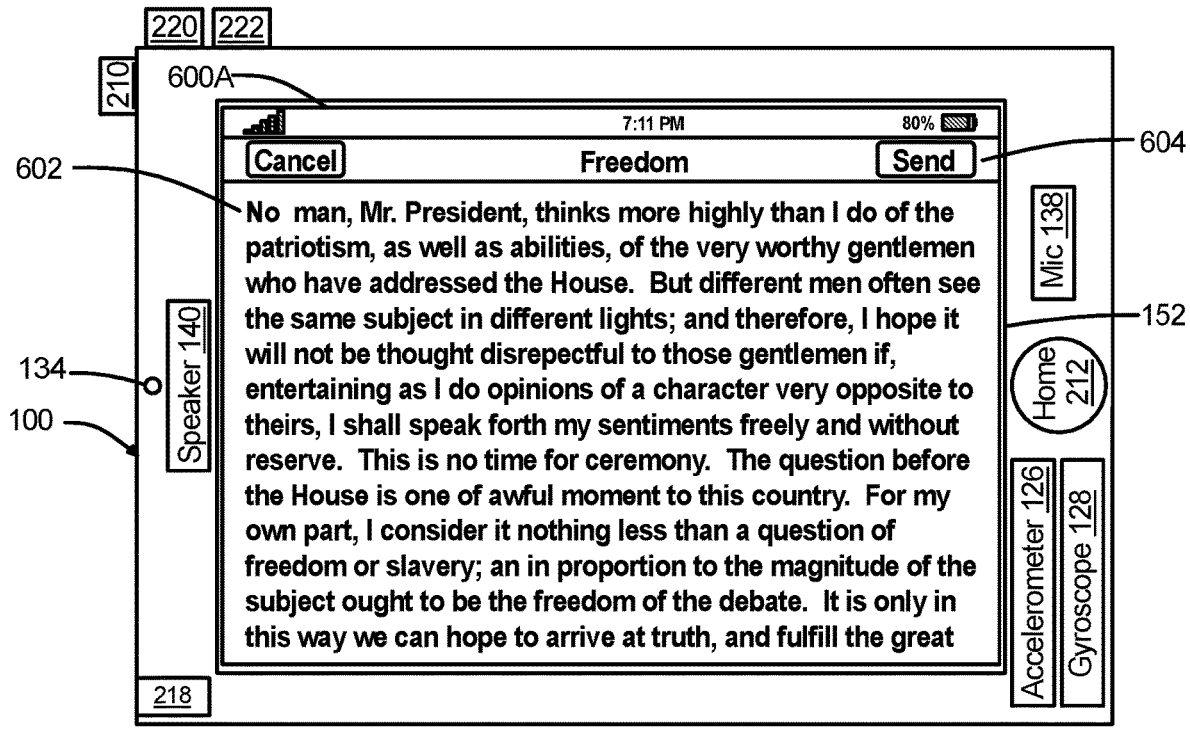
FIGS. 6A-6J illustrate an exemplary graphical user interface and method for displaying and moving a selection of length equal to zero and selecting text within editable content with drag-lock off, on a mobile computing device with a touch-sensitive display, in accordance with some embodiments.
Figure 6B:
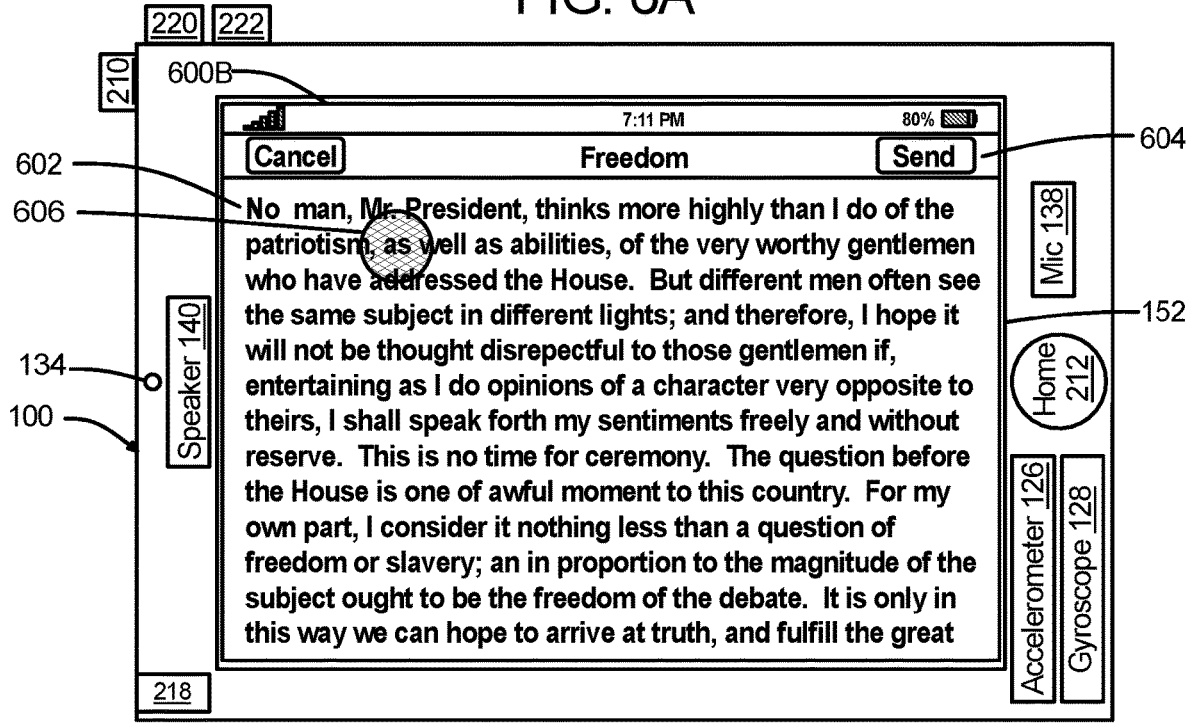
Figure 6C:
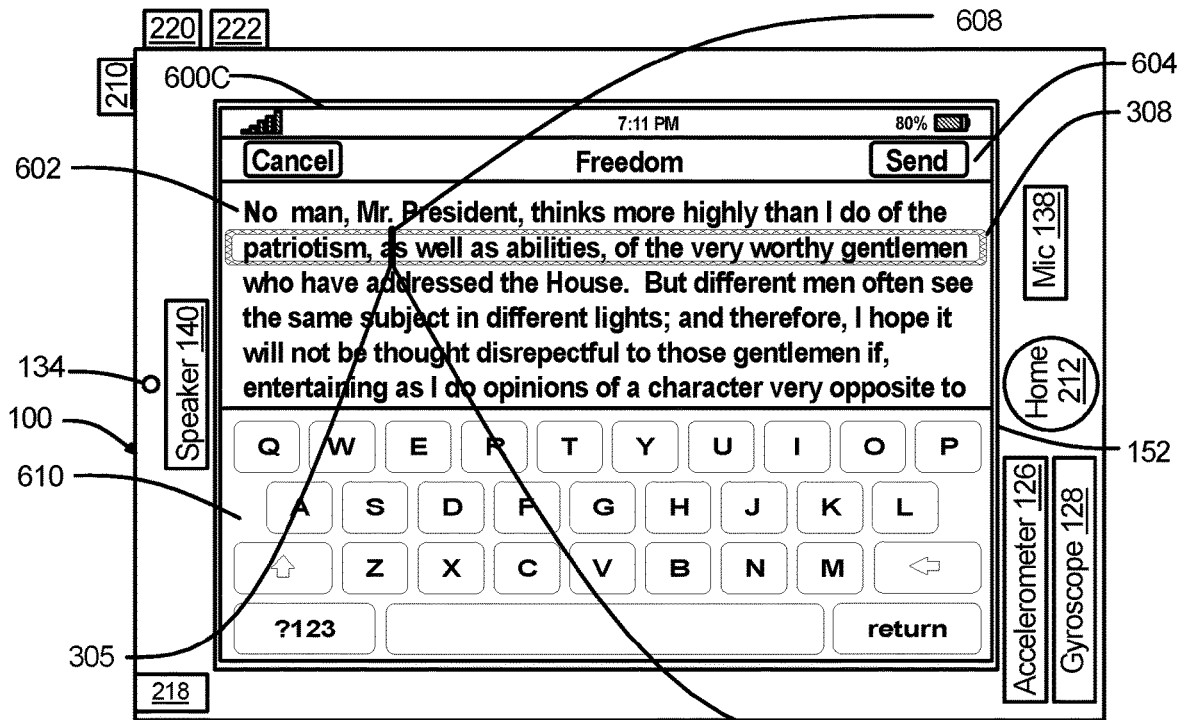
Figure 6D:
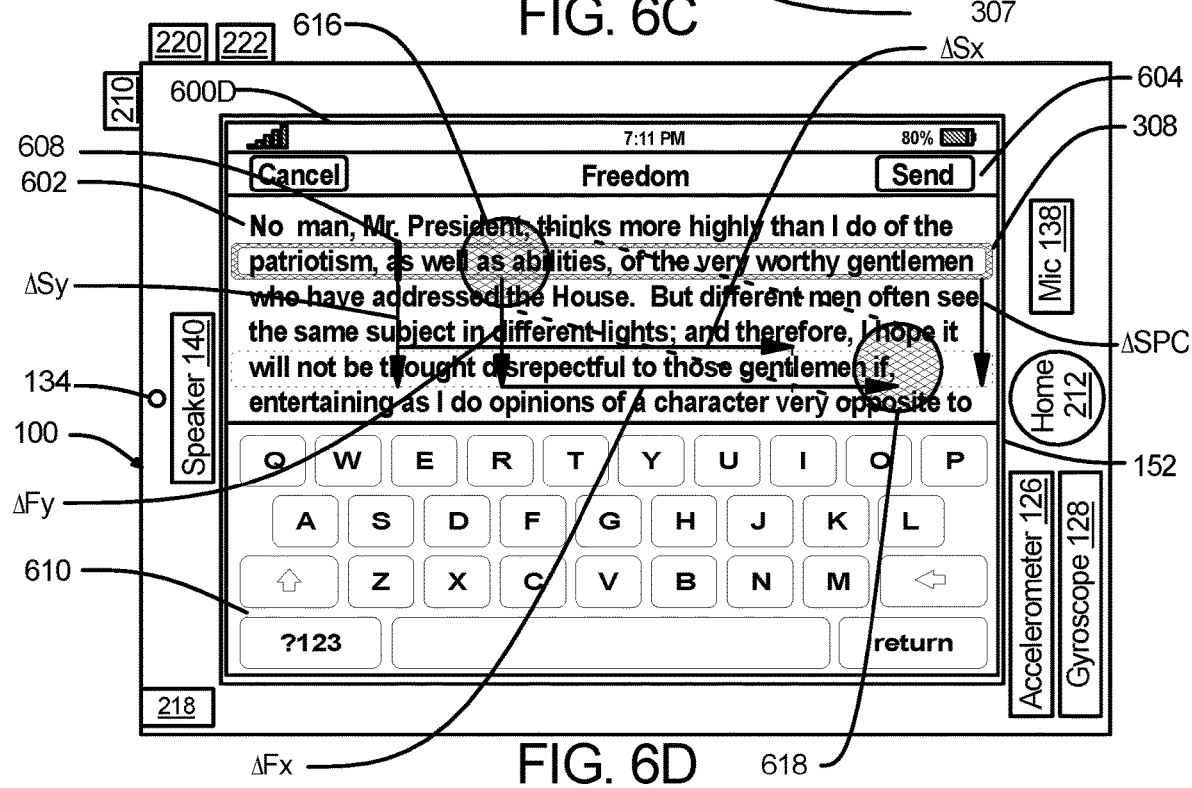
Figure 6E:
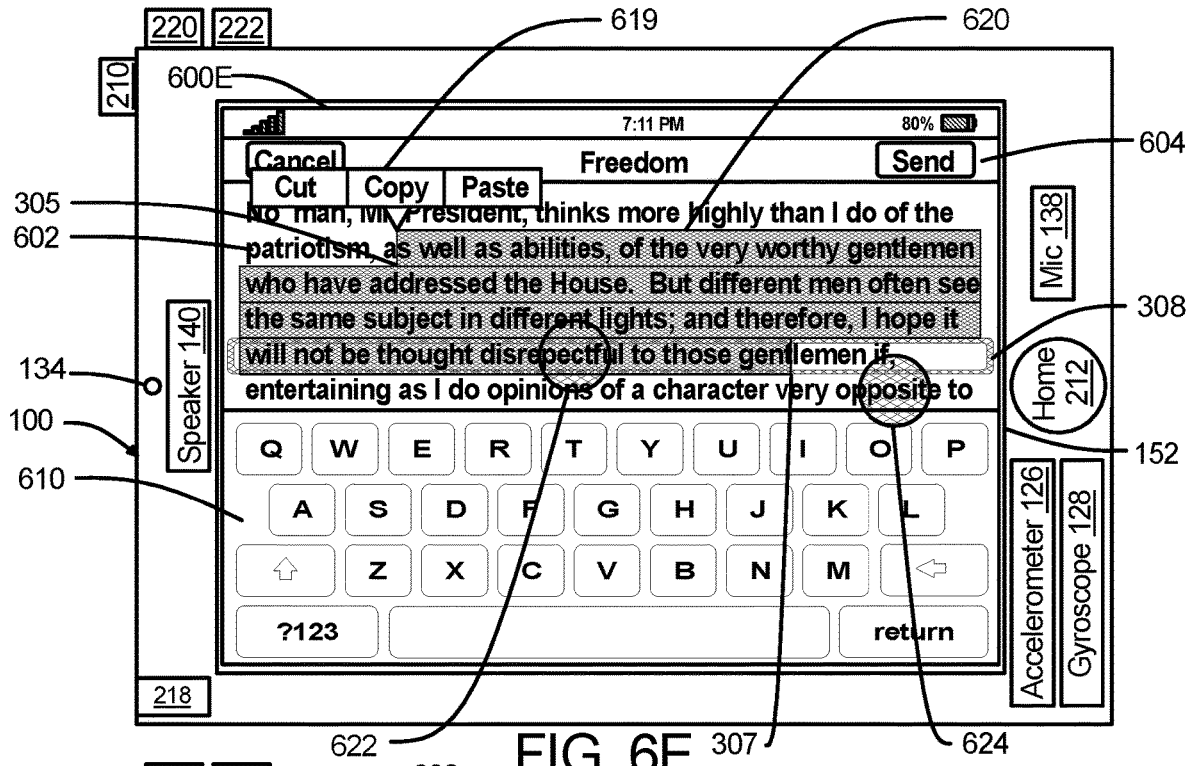
Figure 6F:
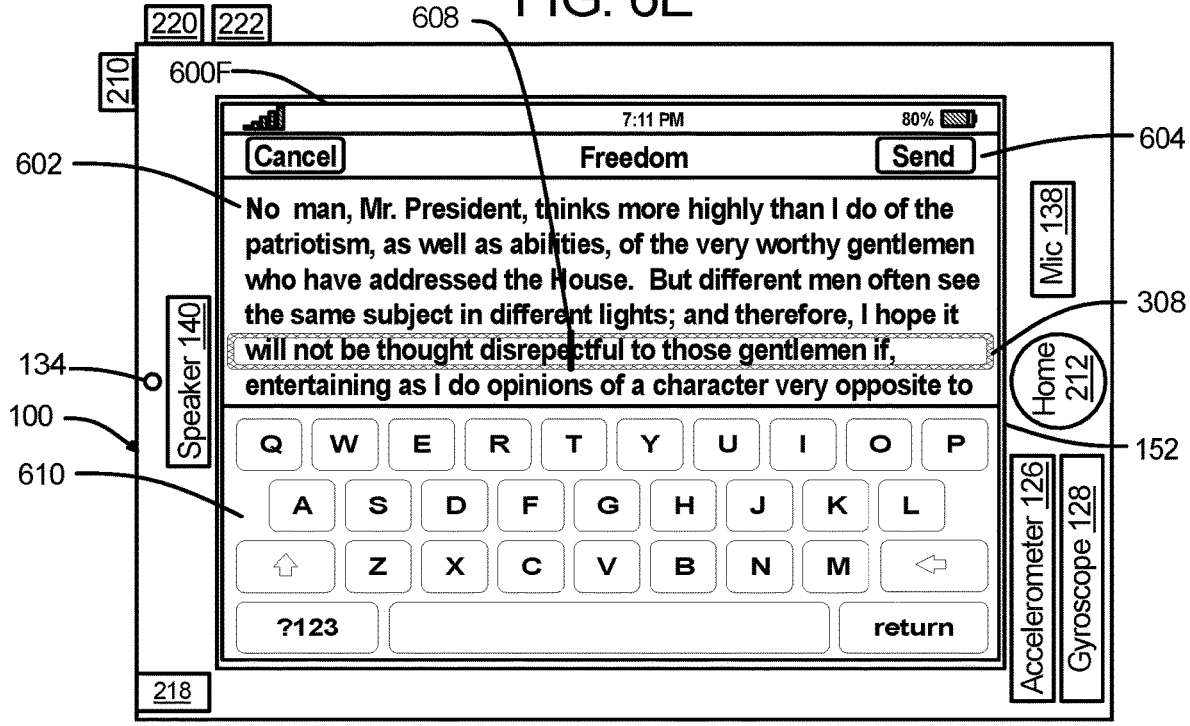
Figure 6G:
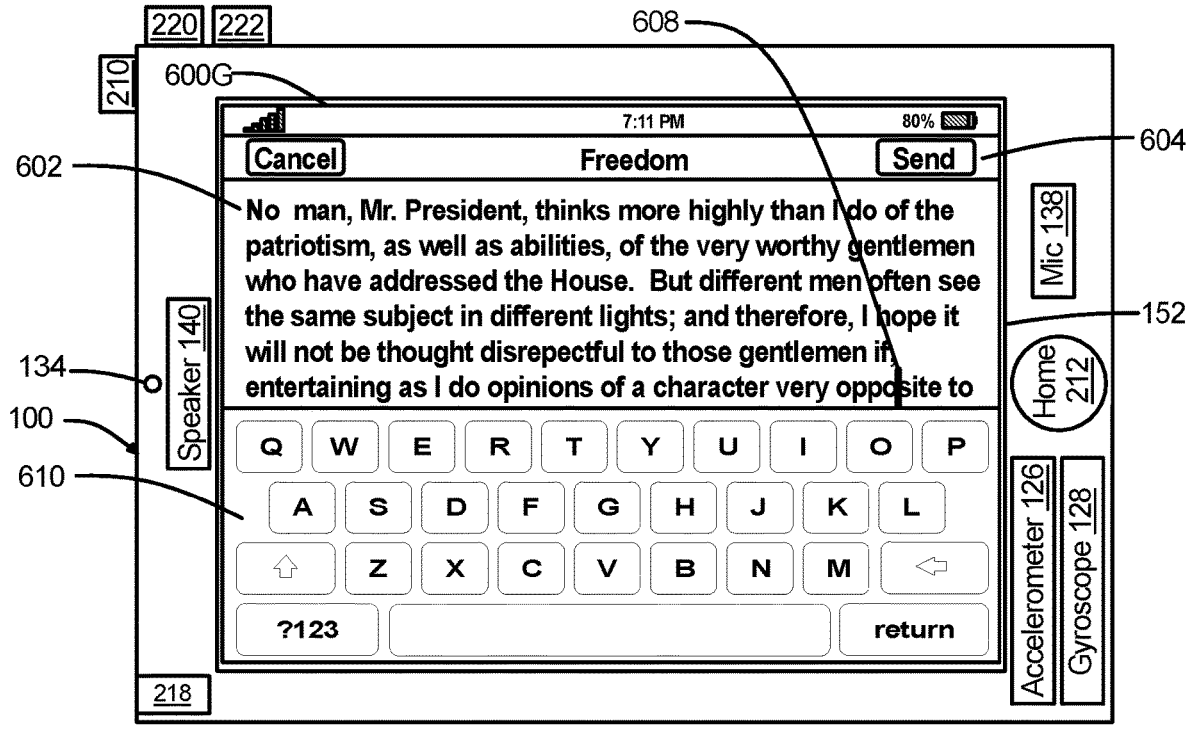

The device can display editable content 602 in UI 600A (FIG. 6A). A user can perform a long-press finger gesture 606 on the editable content 602 as illustrated in UI 600B (FIG. 6B). In response to detecting the finger gesture on the content, the device can display UI 600C (FIG. 6C) with selection positioning and control (SPC) icon 308 at an SPC icon first position and selection 608 of zero-length at a selection first position with selection start point 305 and selection end point 307. In one exemplary embodiment, the selection first position is the location of the finger gesture on the content. The device can also display on-screen keyboard 610. With selection 608 at a first position, a user can perform a diagonal tap-and-slide finger gesture 616 to 618 beginning anywhere on selection positioning and control (SPC) icon 308 as illustrated in FIG. 6D. In response to detecting the tap and $\Delta Fx$ (a change in the horizontal position) and $\Delta Fy$ (a change in the vertical position) of a finger contact on the SPC icon, the device selects text on the display from a first position to a second position as illustrated in FIG. 6E. In one exemplary embodiment, $\Delta Sx$ (the change in the horizontal position of the selection end point 307) is proportional to $\Delta Fx$, and $\Delta Sy$ (the change in the vertical position of the selection end point 307) and $\Delta SPCy$ (the change in the vertical position of SPC icon 308) are equal and are approximately proportional to $\Delta Fy$, as illustrated in FIGS. 6D-6E. This can be written as $\Delta Sx = Kx \Delta Fx$ where Kx is a proportionality constant and $\Delta Sy = \Delta SPCy = Ky \Delta Fy$ where Ky is a proportionality constant. Again, in this exemplary embodiment Ky=1. Kx can be less than one, equal to one, or greater than one. In some embodiments, Kx can be a function of the slide gesture speed in the x-direction. The device can also display the edit menu icon 619 for the selection 620. The icon displays available actions with respect to the selection. In the case of selected editable text, cut, copy, or paste can be an action as illustrated in FIG. 6E. A user can perform tap finger gesture 622 at any position on SPC icon 308 as illustrated in FIG. 6E. In response, the device displays UI 600F (FIG. 6F) with SPC icon 308 displayed, with selection 620 cancelled, and with zero-length selection 608 displayed at the tap location.

Alternatively, a user can perform tap finger gesture 624 at any position on editable content 602 but not on SPC icon 308 as illustrated in FIG. 6E. In response, the device displays UI 600G (FIG. 6G) with SPC icon 308 cancelled and selection 620 cancelled, and with zero-length selection 608 displayed at the tap location.

Figure 6H:
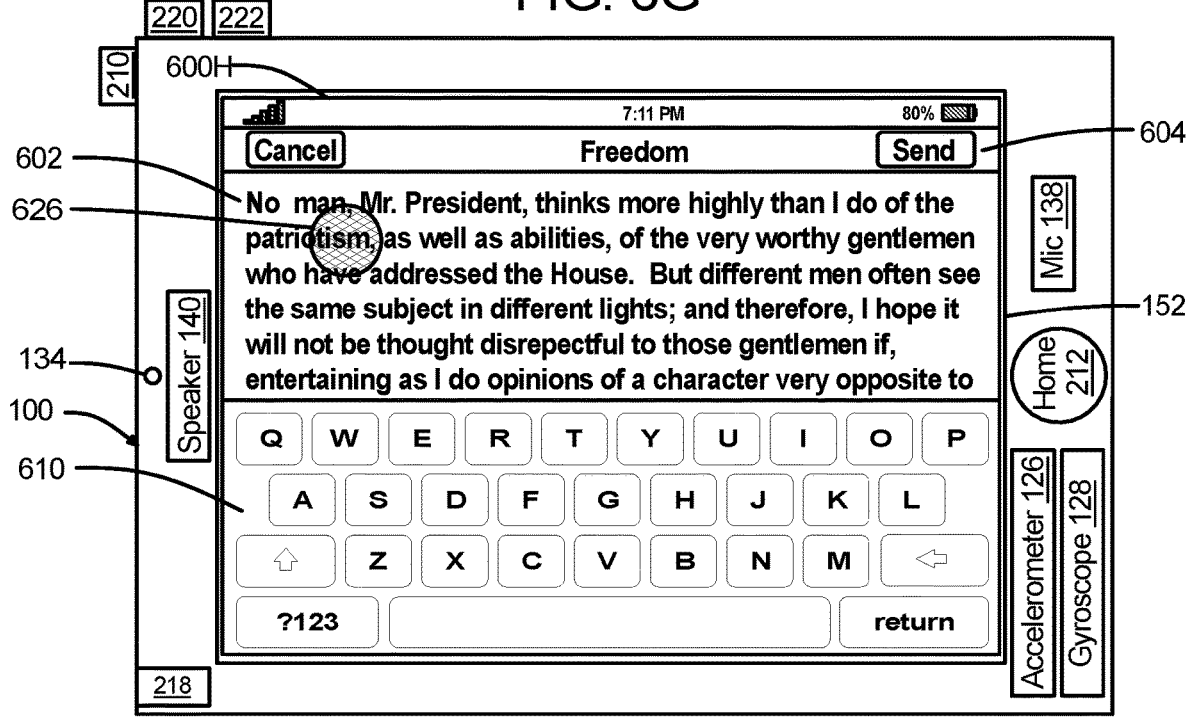
Figure 6I:
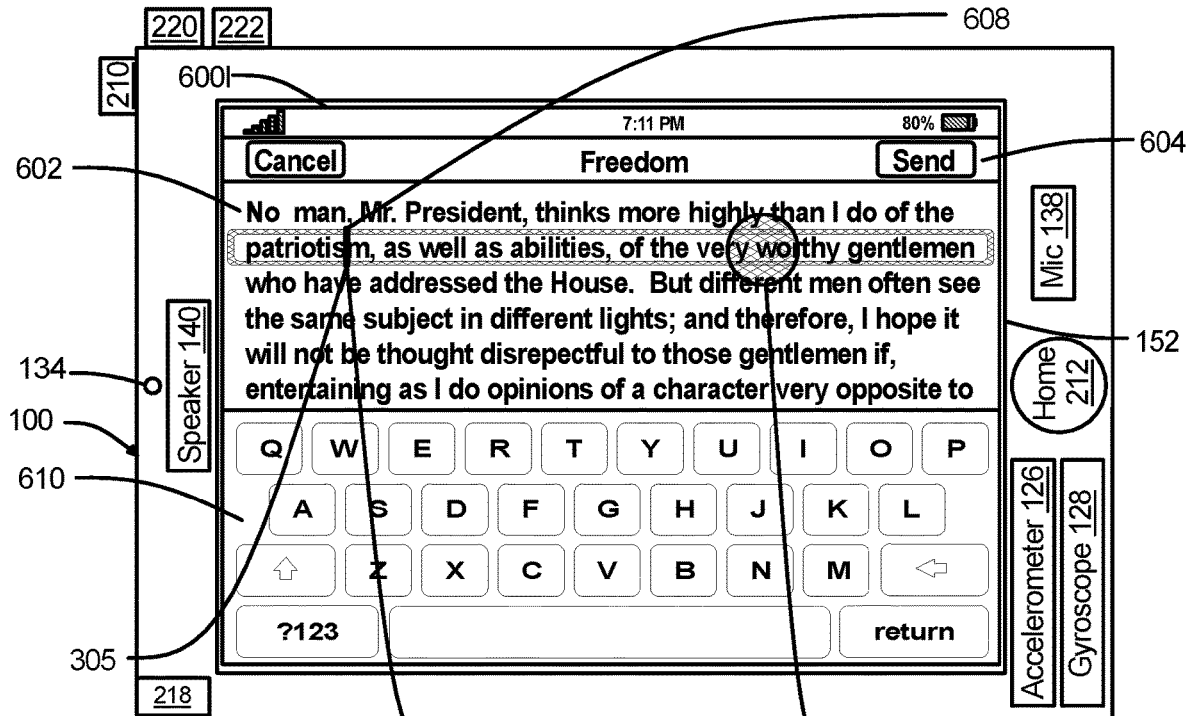
Figure 6J:
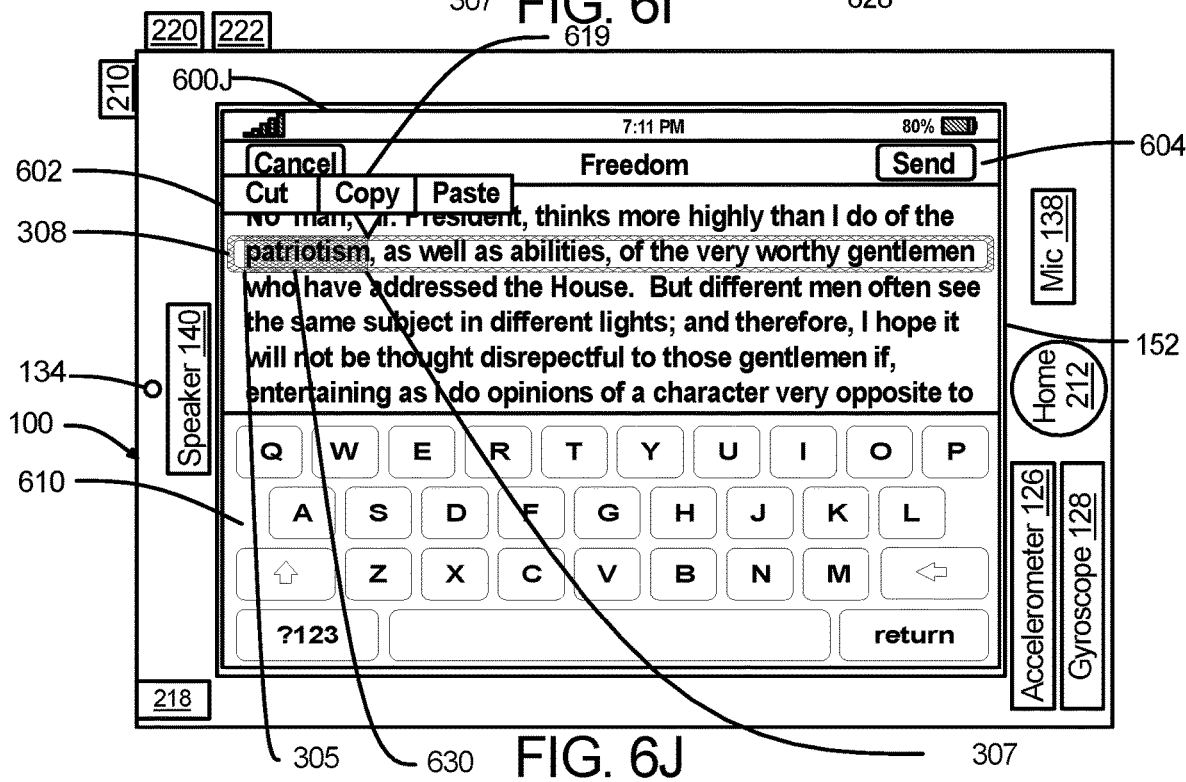

Double-tap on SPC icon to select word at L=0 selection position (FIGS. 6H-6J): A user can perform a finger gesture 626 (a long press finger gesture for example) on editable text 602 as illustrated in FIG. 6H. In response to detecting the finger gesture 626, the device displays zero-length selection 608 at a selection first position and SPC icon 308 at a first position as illustrated in UI 600I (FIG. 6I). In one example embodiment, the zero length selection 608 can be displayed at the long press position. A user can perform a double-tap finger gesture 628 on SPC icon 308 as illustrated in FIG. 6I. In response to detecting the double-tap finger gesture on selection positioning and control (SPC) icon 308, the device selects the word at the position of zero length selection 608 as illustrated in UI 600J (FIG. 6J). The device can also display edit menu icon 619 for the selection 630.

Auto-scroll: A user can move zero-length selection 608 until the position of selection 608 is approximately one line from the bottom (top) boundary of the display. In response, the device scrolls the content up (down) by one line until selection 608 is moved to the last (first) line of the text content. Similarly, a user can select text from start point 306 to end point 307 until the end point 307 is approximately one line from the bottom (top) boundary of the display. In response, the device scrolls the content up (down) by one line until end point 307 is moved to the last (first) line of the text content.

Figure 7A:
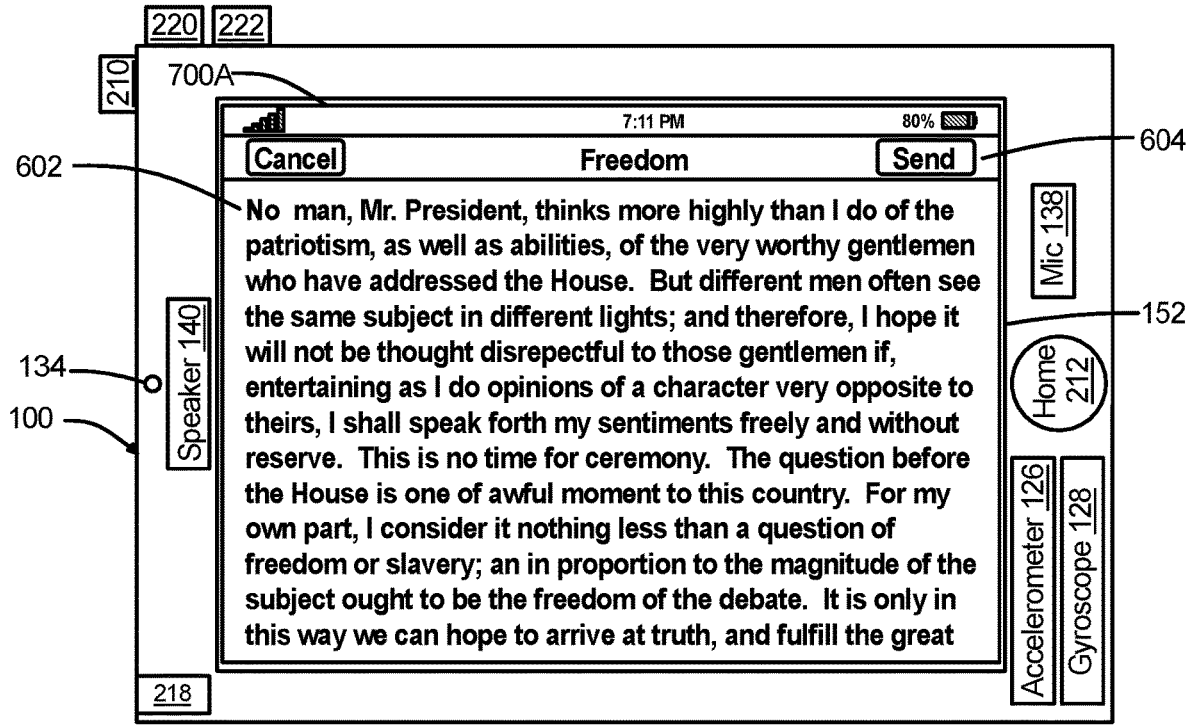
FIGS. 7A-7CC illustrate an exemplary graphical user interface and method for performing a secondary-click action with respect to a selection within editable text content, on a computing device with a touch-sensitive display, in accordance with some embodiments.
Figure 7B:
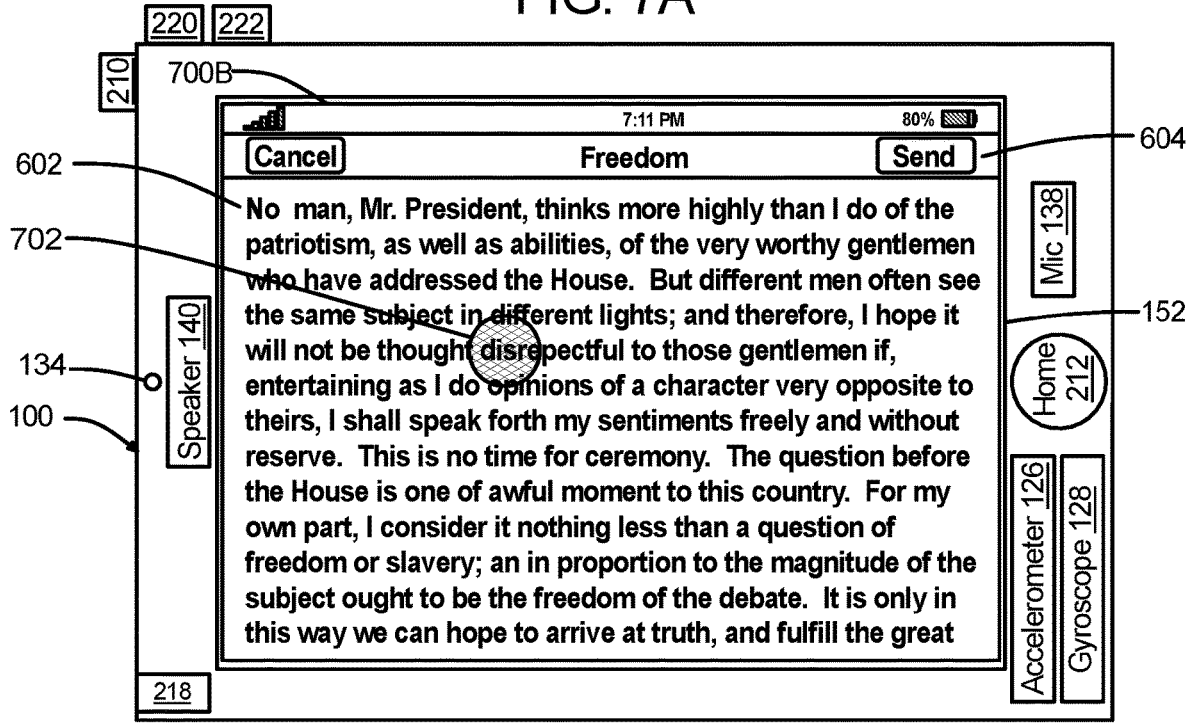
Figure 7C:
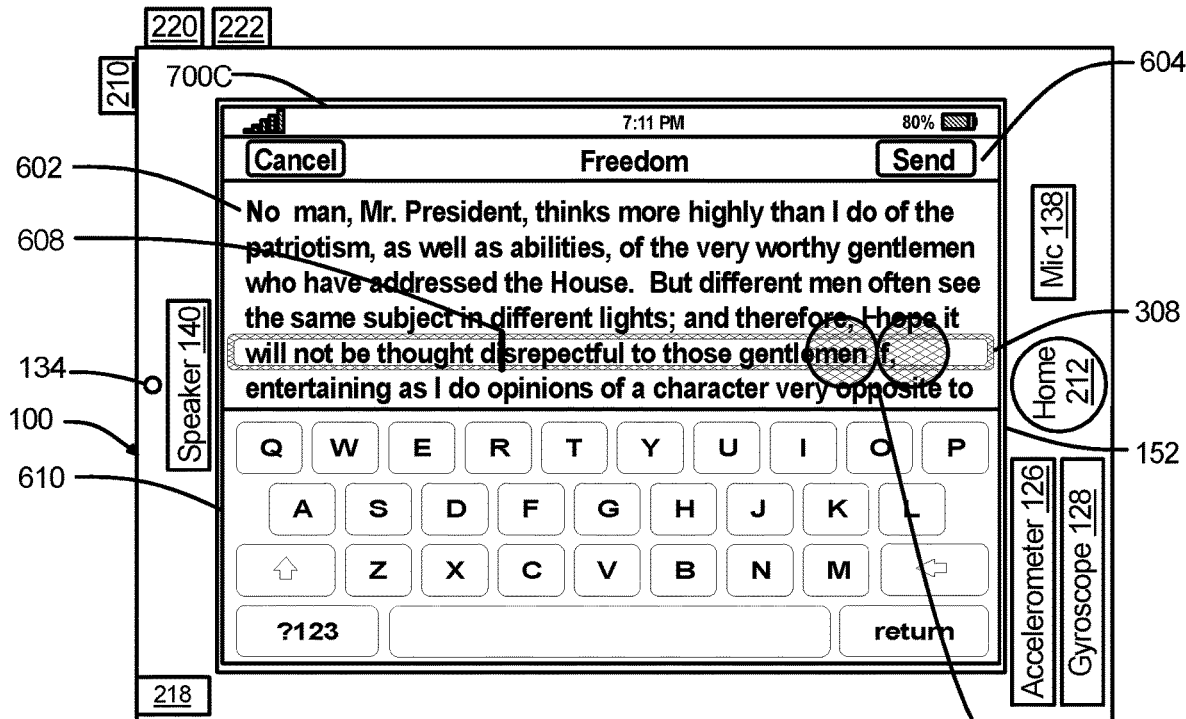

7.0 Performing a secondary-click action with respect to a selection within editable text content: FIGS. 7A-7CC illustrate an exemplary graphical user interface and method for performing a secondary-click action with respect to a selection within editable text content using gestures on the touch-sensitive display.

The device can display editable content 602 in UI 700A (FIG. 7A). A user can perform a long-press finger gesture 702 on the editable content 602 as illustrated in UI 700B (FIG. 7B). In response to detecting the finger gesture on the content, the device can display UI 700C (FIG. 7C) with selection positioning and control (SPC) icon 308 at an SPC icon first position and selection 608 of zero length at a selection first position. In one exemplary embodiment, the selection first position is the location of the finger gesture on the content. The device can also display on-screen keyboard 610.

Figure 7D:
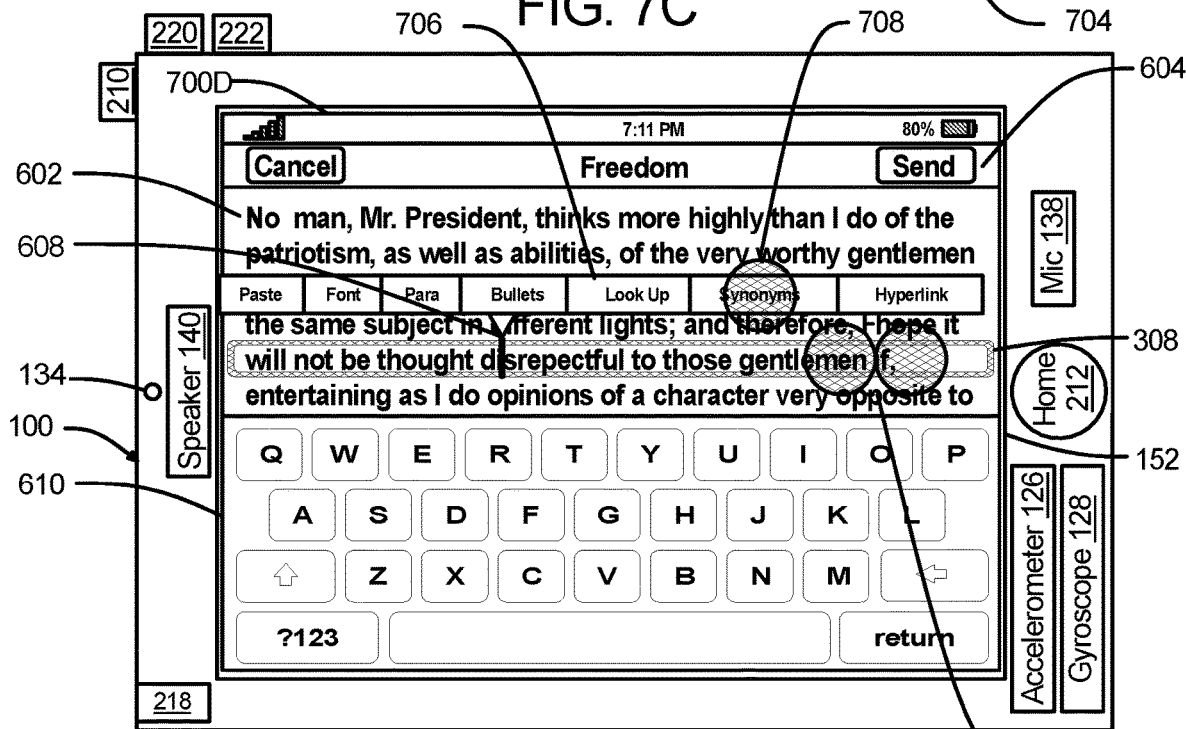

First Example: A user can perform secondary-click gesture 704 (a two-finger tap gesture for example) on selection positioning and control (SPC) icon 308 as illustrated in FIG. 7C. In response to detecting secondary-click gesture 704 on SPC icon 308, the device displays secondary-click menu 706 adjacent to zero-length selection 608 as illustrated in UI 700D (FIG. 7D). Secondary-click menu 706 displays a list of actions that can be performed with respect to a selection. In the example shown with a selection of zero-length, the cut and copy actions are not applicable and not displayed. In the example shown the available actions are a follows: "Paste", "Font", "Para", "Bullets", "Look Up", "Synonyms", and "Hyperlink".

Cancel display of a secondary-click menu: a user can perform a secondary-click menu cancel gesture 707 (a two-finger tap gesture for example) on selection positioning and control (SPC) icon 308 as illustrated in FIG. 7D. In response to detecting the secondary-click menu cancel gesture, the device redisplays UI 700C (FIG. 7C).

A user can perform a tap gesture 708 on the item "Synonyms" in the secondary-click menu 706. In response, the device displays sub-menu 716 showing a list of synonyms UI as illustrated in UI 700E (FIG. 7E).

The list of synonyms is for the word at the position of zero-length selection 610 when the secondary-click gesture was performed. In this example, the word is "disrespectful."

Figures 7E, 7F:
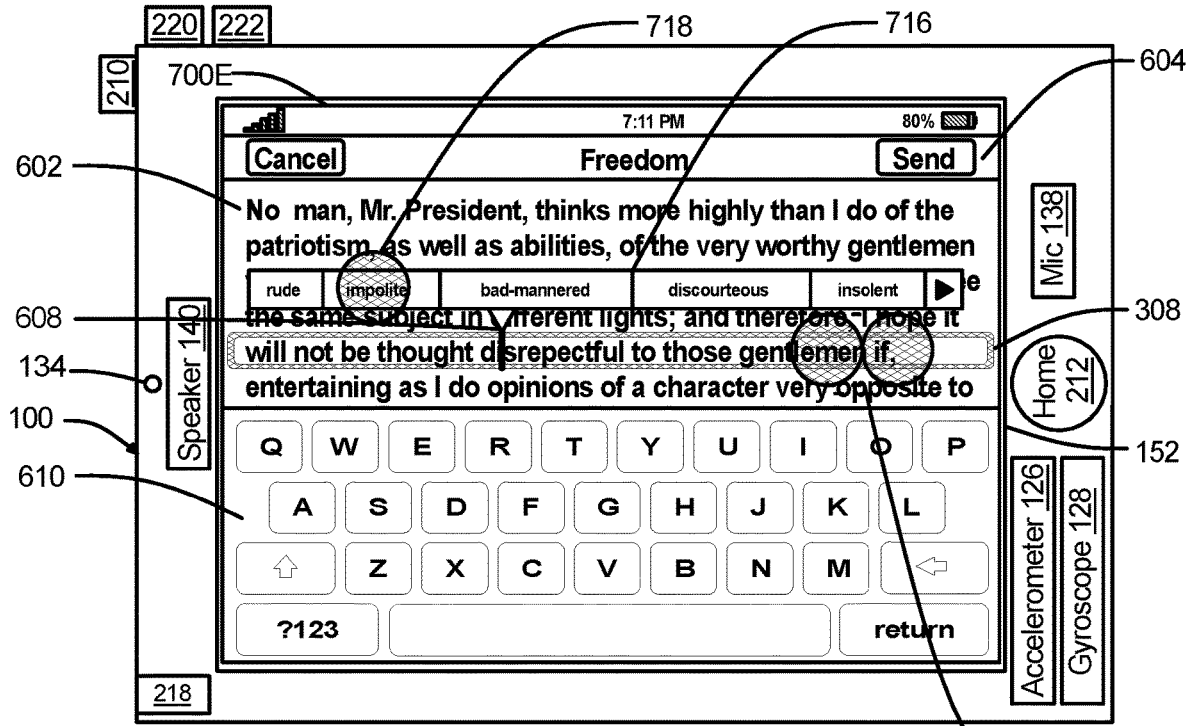

Cancel display of a secondary-click menu: a user can perform a secondary-click menu cancel gesture 717 (a two-finger tap gesture for example) on selection positioning and control (SPC) icon 308 as illustrated in FIG. 7F. In response to detecting the secondary-click menu cancel gesture, the device redisplays menu 706 as illustrated in UI 700D (FIG. 7D)

A user can perform a tap gesture on the item "impolite" in sub-menu 716 as illustrated in UI 700E (FIG. 7E). In response, the device replaces the word "disrespectful" with the synonym "impolite" as illustrated UI 700F (FIG. 7F).

We have described a method for displaying a secondary-click menu and performing a secondary-click action with respect to a selection of zero-length. A similar approach can be used with respect to other selections. This includes, but is not limited to, selections of multiple characters within text content.

Figure 7G:
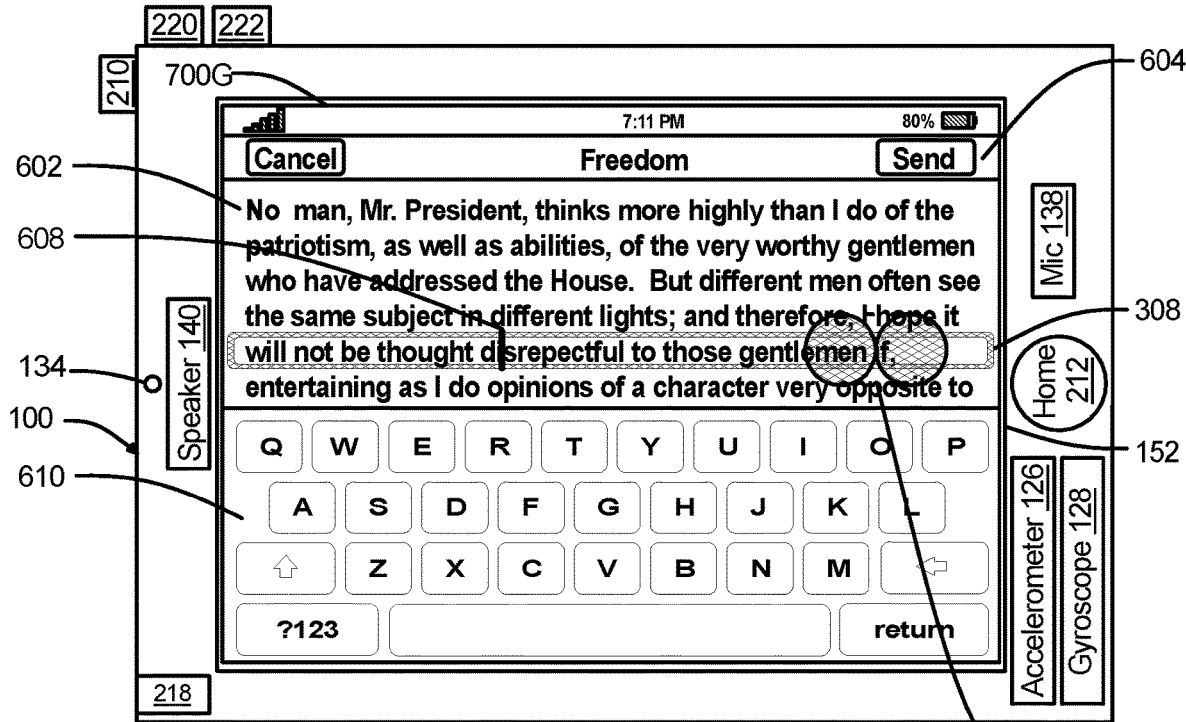
Figure 7H:
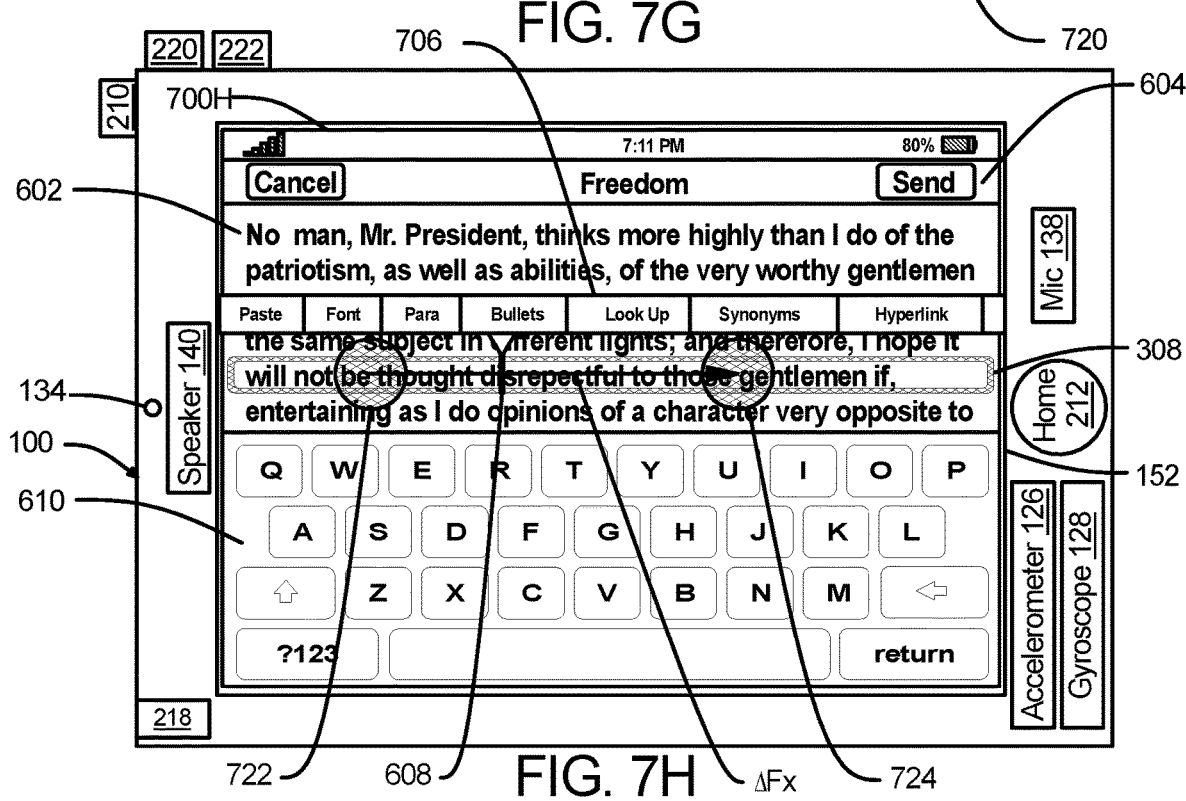

Second Example: With zero-length selection 608 and SPC icon 308 displayed as illustrated in UI 700G (FIG. 7G), a user can perform secondary-click gesture 720 (a two-finger tap gesture for example) on selection positioning and control (SPC) icon 308 as illustrated in FIG. 7G. In response to detecting the secondary-click gesture on SPC icon 308, the device displays secondary-click menu 706 adjacent to zero-length selection 608 as illustrated in UI 700H (FIG. 7H). Secondary-click menu 706 displays a list of actions that can be performed with respect to zero-length selection 608.

Figure 7I:
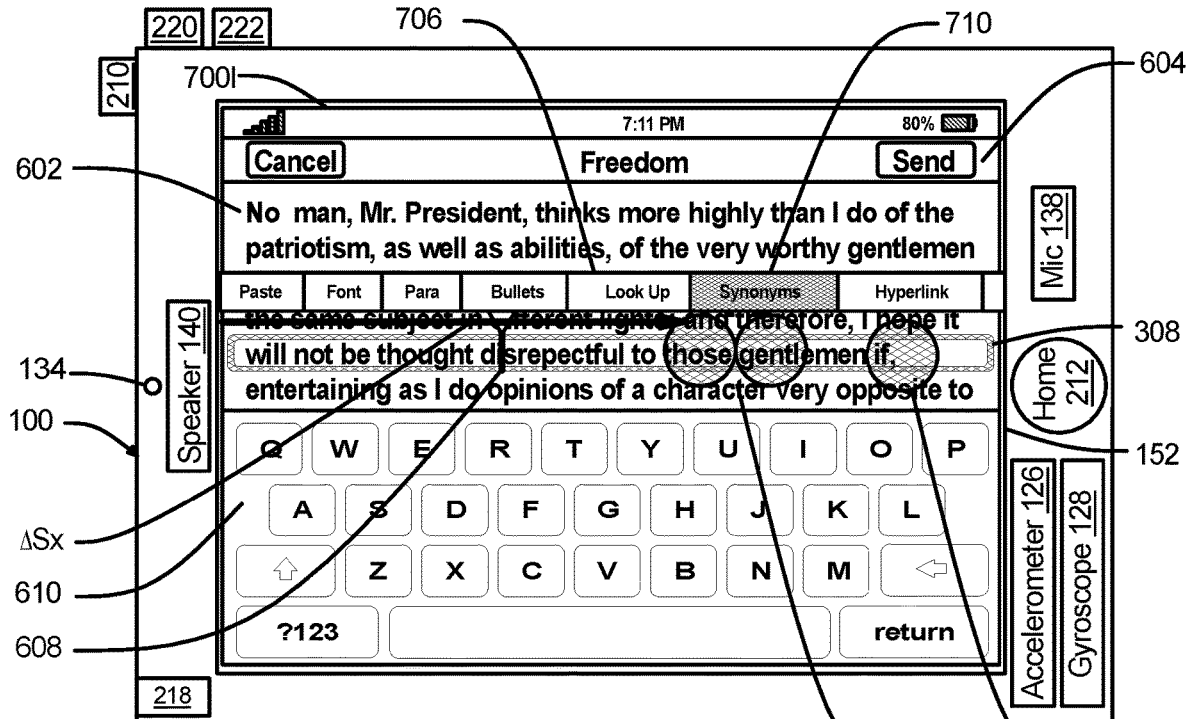

1) A user can perform a horizontal slide finger gesture 722 to 724 beginning anywhere on SPC icon 308 as illustrated in UI 700H (FIG. 7H). In response to detecting a change in a horizontal position of a finger contact (ΔFx) on SPC icon 308, the device can display menu item preselection 710 at a position within a secondary-click menu and change a position (ΔSx) of menu item preselection 710 within secondary-click menu 706 as illustrated in UI 700I (FIG. 7I). In the example shown, the user has performed a slide gesture right, until the device changes the horizontal position of menu item preselection 710 to the item "Synonyms" on secondary-click menu 706 as illustrated in FIGS. 7H-7I.

Cancel display of a secondary-click menu: a user can perform a secondary-click menu cancel gesture 727 (a two-finger tap gesture for example) on selection positioning and control (SPC) icon 308 as illustrated in FIG. 7I. In response to detecting the secondary-click menu cancel gesture, the device redisplays UI 700G (FIG. 7G).

Figure 7J:
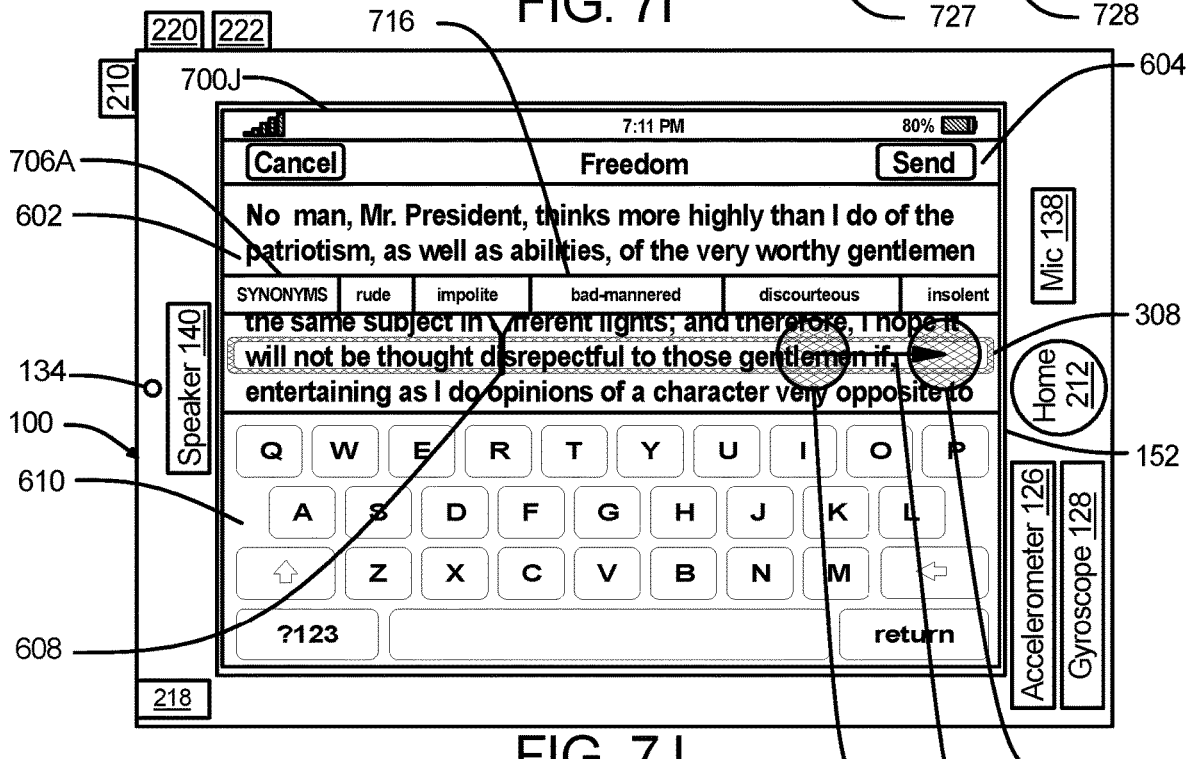

2) A user can perform tap gesture 728 on SPC icon 308 as illustrated in FIG. 7I. In response, the device displays sub-menu 716 showing a list of synonyms as illustrated in UI 700J (FIG. 7J). As in the first example, the list of synonyms is for the word at the position of zero-length selection 610 when the secondary-click gesture was performed. As in the first example, the word is "disrespectful."

Figure 7K:
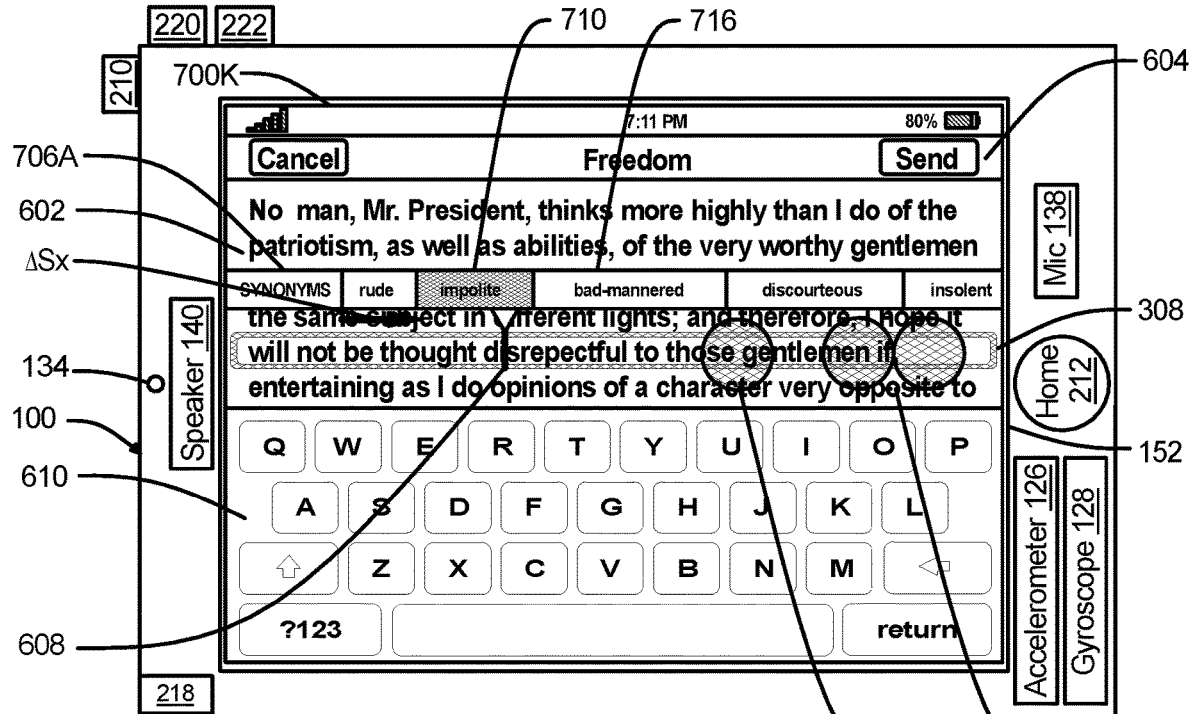

3) A user can perform a horizontal slide finger gesture 730 to 732 beginning anywhere on SPC icon 308. In response to detecting a change in a horizontal position of a finger contact (ΔFx) on SPC icon 308, the device can display menu item preselection 710 at a position within a secondary-click menu and change a position (ΔSx) of menu item preselection 710 within secondary-click sub-menu 716 as illustrated in UI 700K (FIG. 7K). In the example shown the user has performed a slide gesture in the rightward direction, until the device changes the horizontal position of menu item preselection 710 to the item "impolite" on sub-menu 716 as illustrated in UI 700K (FIG. 7K).

In some instances, sub-menu 716 can have a horizontal extent that exceeds the display horizontal extent. A user can move menu item preselection 710 until the position of preselection 710 is approximately one menu item from the right (left) boundary of the display. In response, the device scrolls sub-menu 716 left (right) by one menu item until menu item preselection 710 has moved to the last (first) menu item.

Cancel display of a secondary-click menu: a user can perform a secondary-click menu cancel gesture 733 (a two-finger tap gesture for example) on selection positioning and control (SPC) icon 308 as illustrated in FIG. 7K. In response to detecting the secondary-click menu cancel gesture, the device redisplays menu 706 as illustrated in UI 700I (FIG. 7I).

Figure 7L:
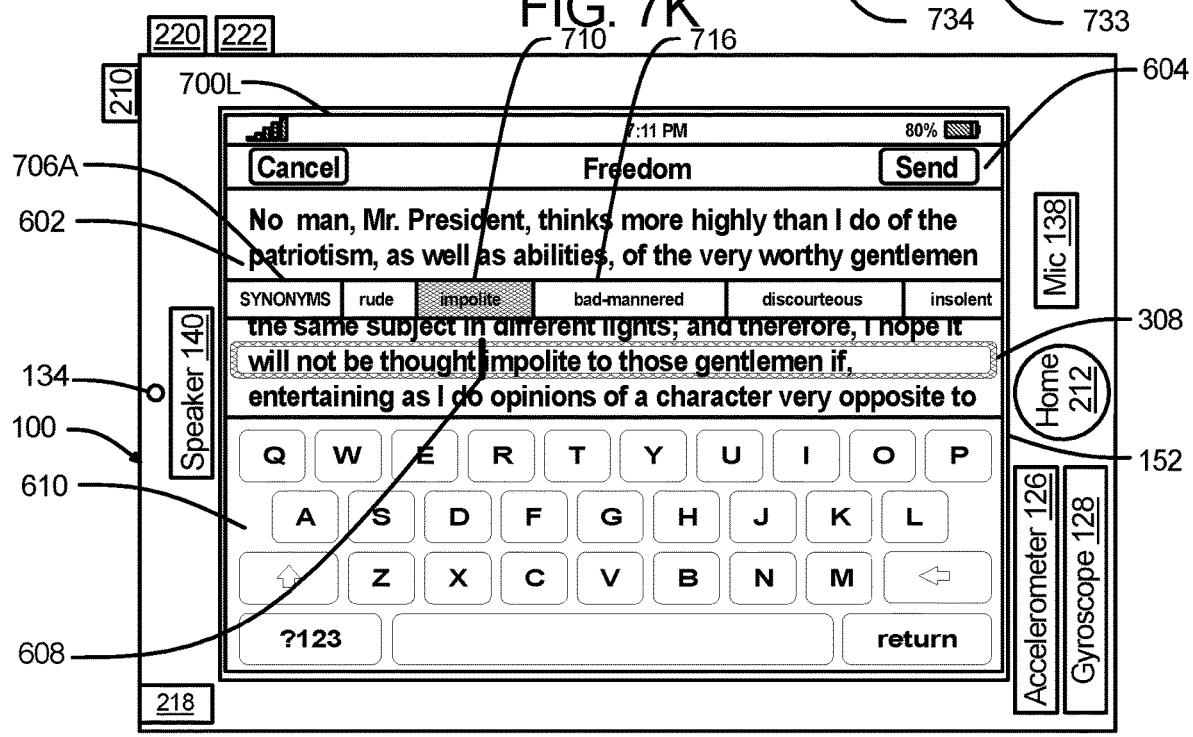

4) A user can perform tap gesture 734 on SPC icon 308 as illustrated in FIG. 7K. In response, the device replaces the word "disrespectful" with the synonym "impolite" as illustrated in FIG. 7L.

In these two examples, we have described methods for performing a secondary-click action with respect to a zero-length selection within editable text. These same methods can be used to perform a secondary-click action with respect to a unit-length selection within read-only text. These same methods can be used to perform a secondary-click action with respect to a selection of one or more characters within editable or read-only text. In all cases, the secondary-click menu can display those available actions that are applicable to the particular selection.

In the second example, we described the use of gestures on the selection positioning and control icon to position of menu item preselection 710 within a secondary-click menu and sub-menu. The second method can offer the user method for quickly and accurately navigating with a secondary-click menu and sub-menu that contains a large number of items which cannot be displayed within the width of the device display. With left-right auto-scroll of a menu, a very large number of menu items that can be presented to the user in a given menu or sub-menu.

Figure 7M:
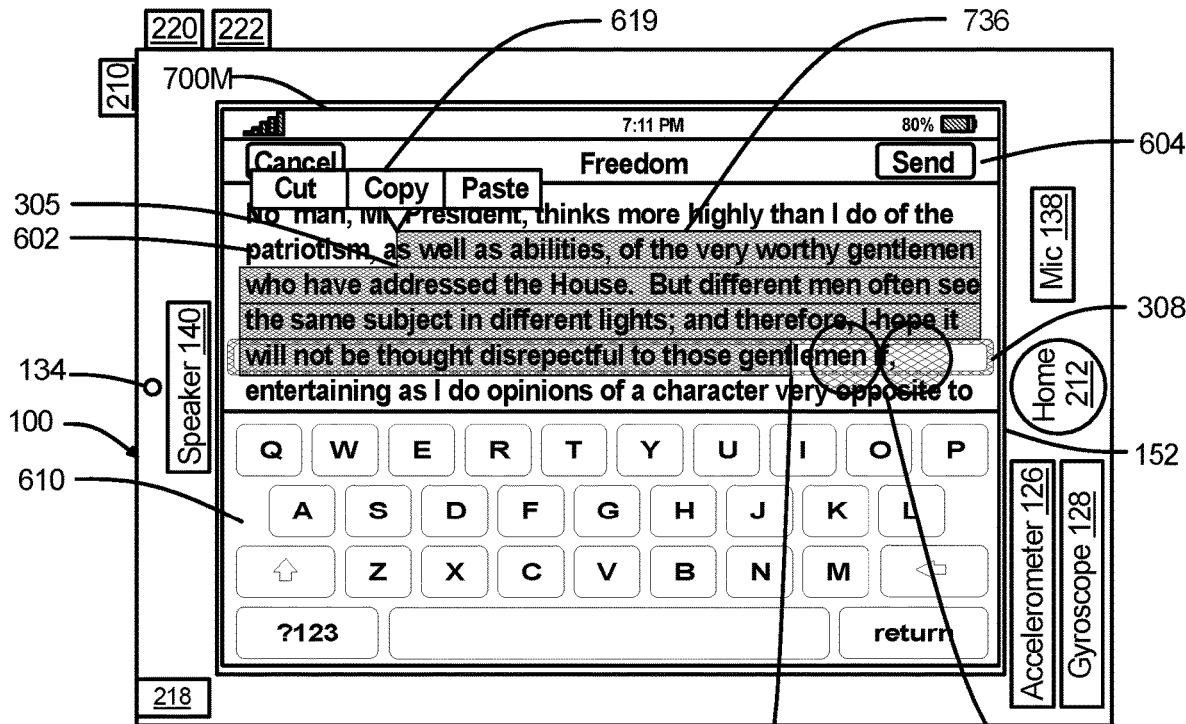
Figure 7N:
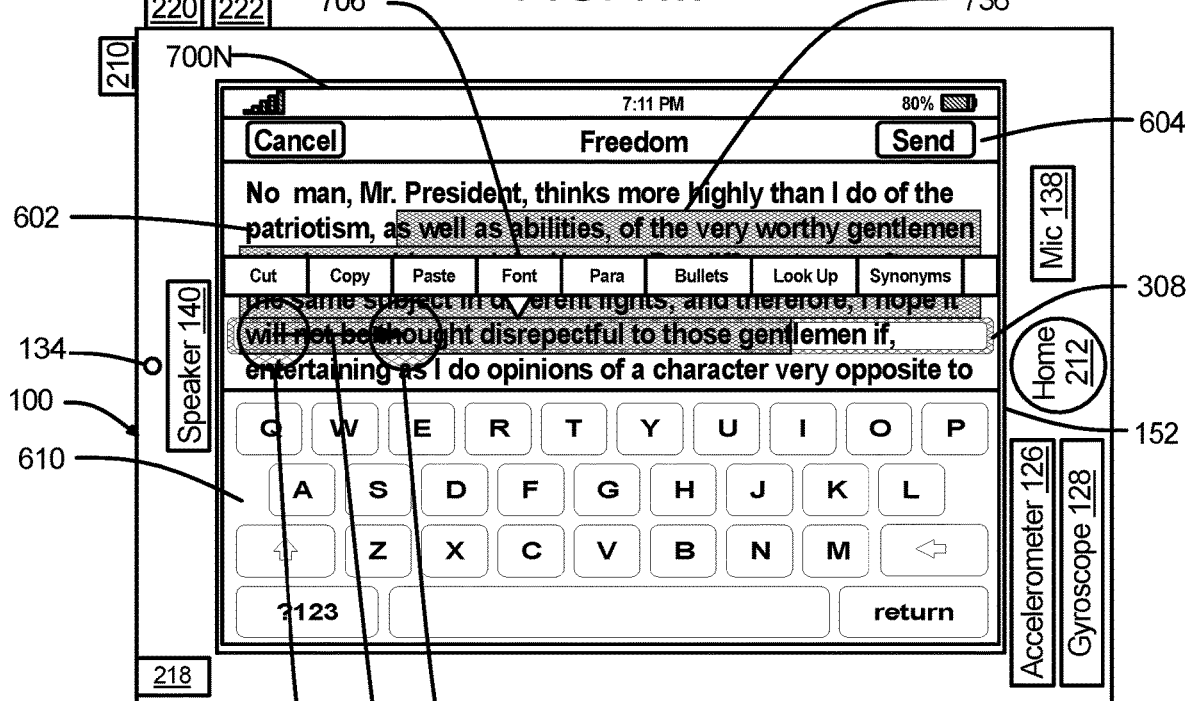

Third Example: A user can perform a gesture on SPC icon 308 to select text on the display from a first position to a second position using methods similar to those described above in reference to FIGS. 6A-6E. In response, the device displays selection 736 as illustrated in FIG. 7M. A user can perform secondary-click gesture 738 (a two-finger tap gesture for example) on selection positioning and control (SPC) icon 308 as illustrated in FIG. 7M. In response to detecting the secondary-click gesture on SPC icon 308, the device displays secondary-click menu 706 adjacent to selection 736 as illustrated in UI 700N (FIG. 7N). Secondary-click menu 706 displays a list of actions that can be performed with respect to selection 736. In the example shown, the edit menu 619 is displayed for the selection as illustrated in FIG. 7M. In the example shown, the edit menu is not displayed when secondary-click menu 706 is displayed as illustrated in FIG. 7N. In some embodiments the edit menu is displayed for a selection and hidden when a secondary click menu is displayed to provide a simple set of basic edit actions when the user has no need to access the larger number of actions available in secondary-click menu 706.

Figure 7O:
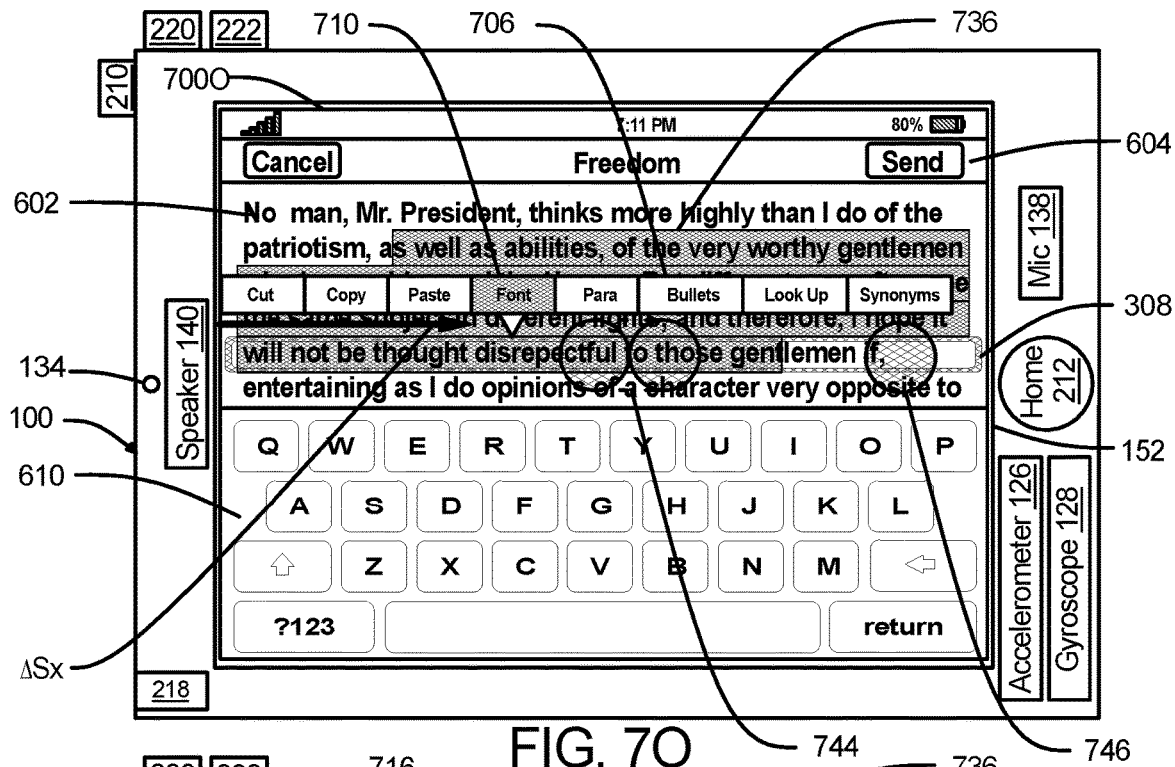

1) A user can perform a horizontal slide finger gesture 740 to 742 beginning anywhere on SPC icon 308 as illustrated in UI 700N (FIG. 7N). In response to detecting a change in a horizontal position of a finger contact (ΔFx) on SPC icon 308, the device can display menu item preselection 710 at a position within a secondary-click menu and change a position (ΔSx) of menu item preselection 710 within a secondary-click menu 706 as illustrated in UI 700O (FIG. 7O). In the example shown, the user has performed a slide gesture right, until the device changes the horizontal position of menu item preselection 710 to the item "Font" on secondary-click menu 706 as illustrated in FIGS. 7N-7O.

In some instances, secondary-click menu 706 can have a horizontal extent that exceeds the display horizontal extent. A user can move menu item preselection 710 until the position of preselection 710 is approximately one menu item from the right (left) boundary of the display. In response, the device scrolls secondary-click menu 706 left (right) by one menu item until preselection 710 has moved to the last (first) menu item.

Cancel display of a secondary-click menu: a user can perform a secondary-click menu cancel gesture 744 (a two-finger tap gesture for example) on selection positioning and control (SPC) icon 308 as illustrated in FIG. 7O. In response to detecting the secondary-click menu cancel gesture, the device redisplays UI 700M (FIG. 7M).

Figure 7P:
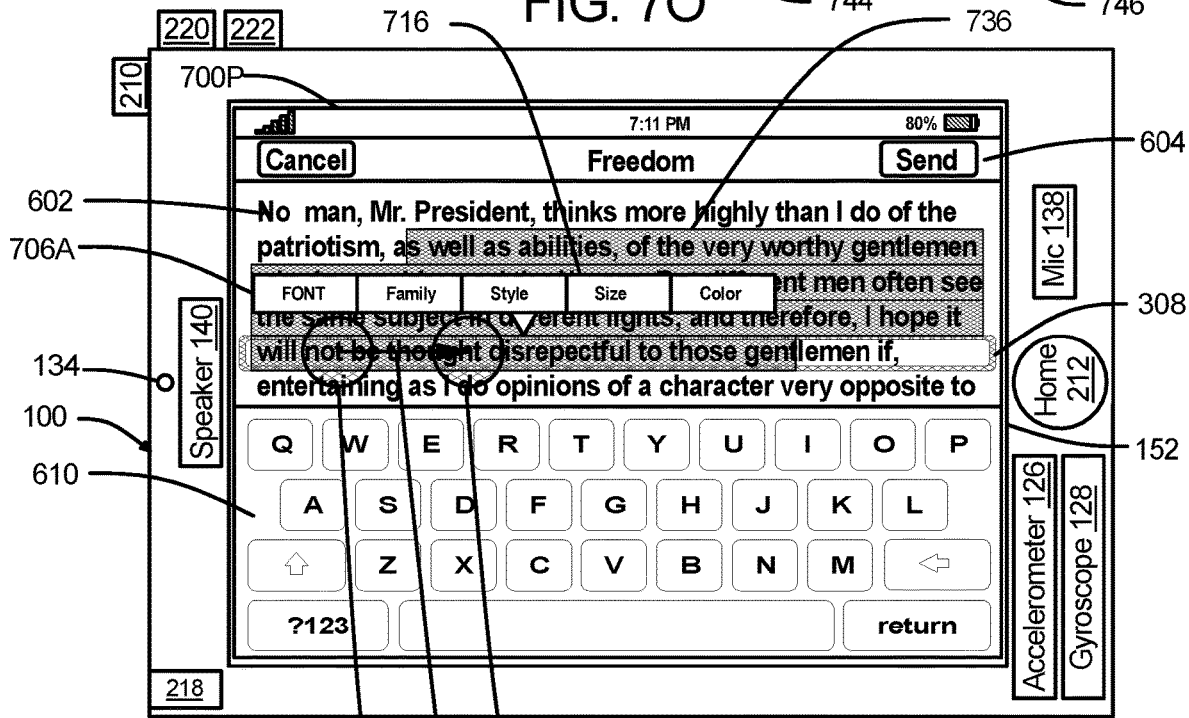

2) A user can perform tap gesture 746 on SPC icon 308 as illustrated in FIG. 7O. In response, the device displays sub-menu 716 showing a list of font attributes as illustrated in UI 700P (FIG. 7P). The device can also display menu selection 706A "FONT" to provide context for sub-menu 716. The list of font attributes is for the selection 736 when the secondary-click gesture was performed.

Figure 7Q:
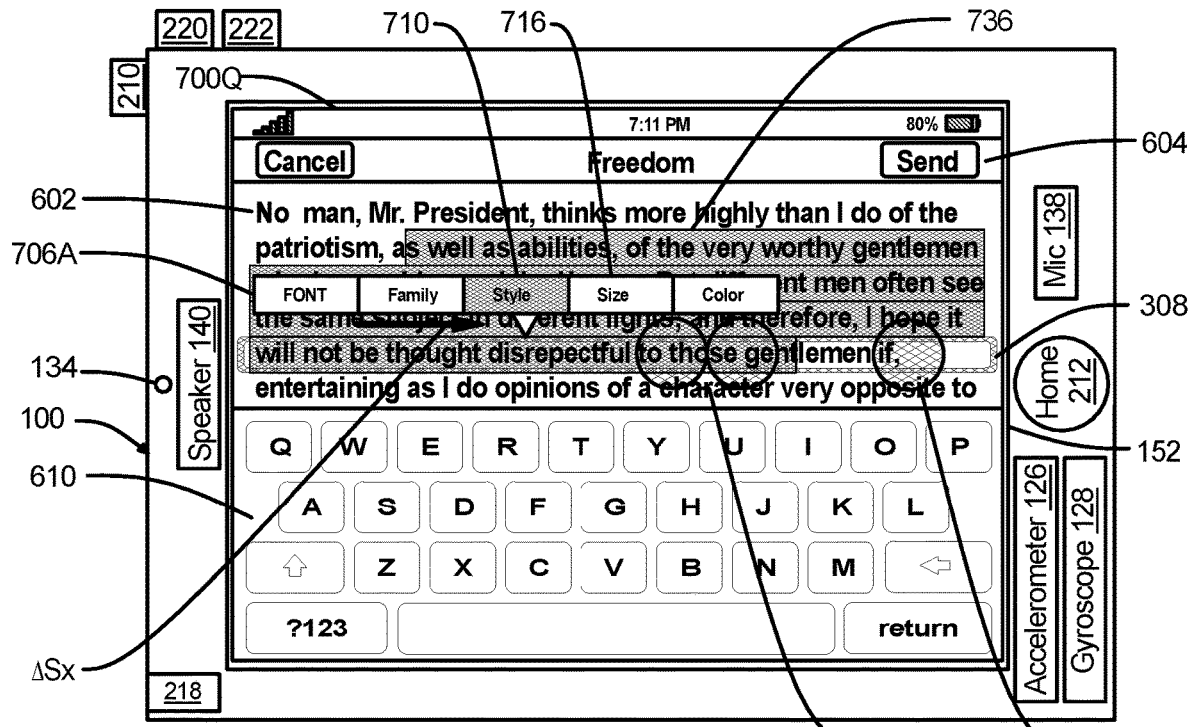

3) A user can perform a horizontal slide finger gesture 748 to 750 beginning anywhere on SPC icon 308. In response to detecting a change in a horizontal position of a finger contact (ΔFx) on SPC icon 308, the device can display menu item preselection 710 at a position within a secondary-click menu and change a position (ΔSx) of menu item preselection 710 within a secondary-click sub-menu 716 as illustrated in FIG. 7Q. In the example shown the user has performed a slide gesture in the rightward direction, until the device changes the horizontal position of menu item preselection 710 to the item "Style" on sub-menu 716 as illustrated in UI 700Q (FIG. 7Q).

In some instances, sub-menu 716 can have a horizontal extent that exceeds the display horizontal extent. A user can move menu item preselection 710 until the position of preselection 710 is approximately one menu item from the right (left) boundary of the display. In response, the device scrolls sub-menu 716 left (right) by one menu item until menu item preselection 710 has moved to the last (first) menu item.

Cancel display of a secondary-click menu: a user can perform a secondary-click menu cancel gesture 751 (a two-finger tap gesture for example) on selection positioning and control (SPC) icon 308 as illustrated in FIG. 7Q. In response to detecting the secondary-click menu cancel gesture, the device redisplays menu 706 as illustrated in UI 700O (FIG. 7O).

Figure 7R:
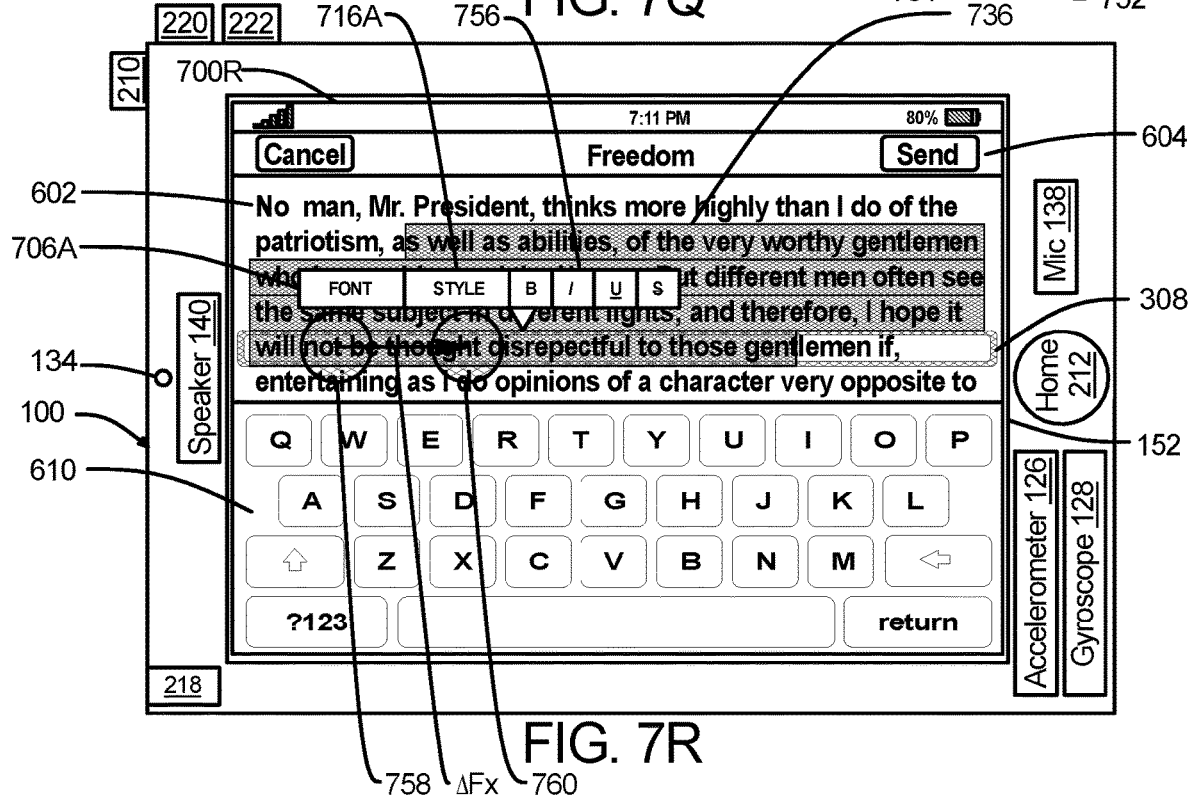

4) A user can perform tap gesture 752 on SPC icon 308 as illustrated in FIG. 7Q. In response, the device displays $2^{ND}$ sub-menu 756 showing a list of "Font" "Style" attributes as illustrated in UI 700R (FIG. 7R). In this example, the action is the display of sub-menu 716 showing the Font Style attributes "B (Bold)," "I (Italic)", "U (Underline)," and "S (Strikethrough)."

5) A user can perform a horizontal slide finger gesture 758 to 760 beginning anywhere on SPC icon 308. In response to detecting a change in a horizontal position of a finger contact (ΔFx) on SPC icon 308, the device can display menu item preselection 710 at a position within a secondary-click menu and change a position (ΔSx) of menu item preselection 710 within secondary-click $2^{nd}$ sub-menu 756 as illustrated in FIG. 7S.

Figure 7S:
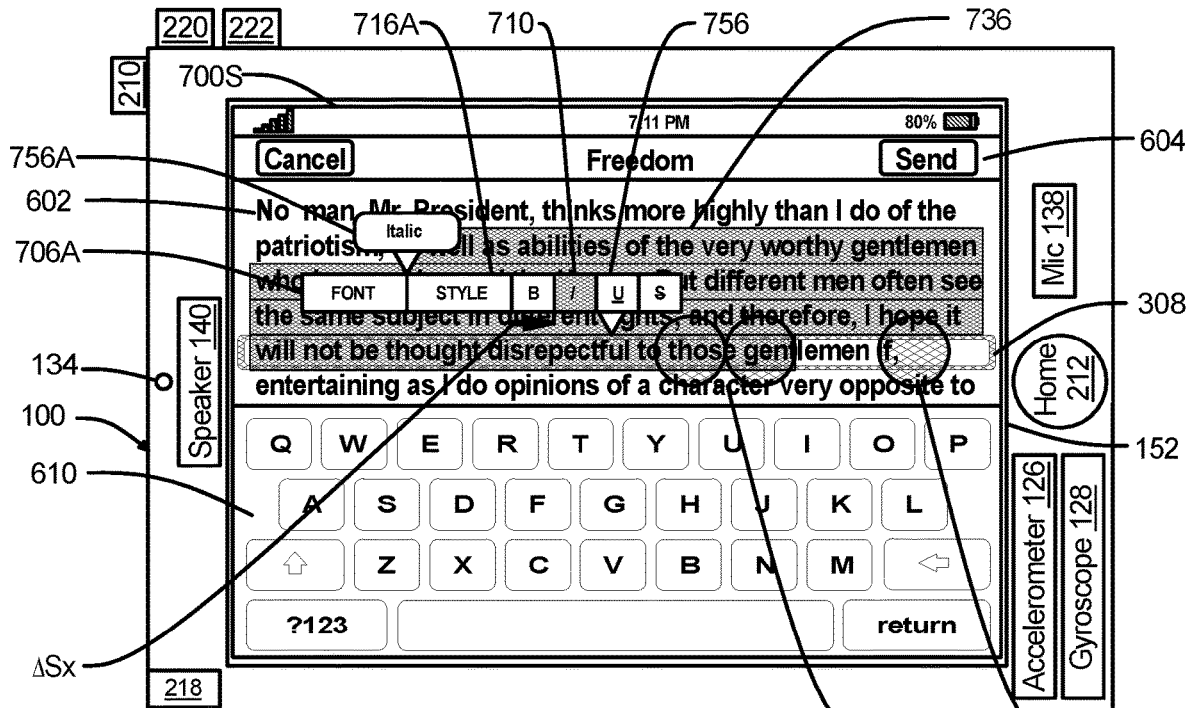

In the example shown the user has performed a slide gesture in the rightward direction, until the device changes the horizontal position of menu item preselection 710 to the item "I(Italic)" on $2^{nd}$ sub-menu 756 as illustrated in UI 700S (FIG. 7S).

Cancel display of a secondary-click menu: a user can perform a secondary-click menu cancel gesture 761 (a two-finger tap gesture for example) on selection positioning and control (SPC) icon 308 as illustrated in FIG. 7S. In response to detecting the secondary-click menu cancel gesture, the device redisplays menu 716 as illustrated in UI 700Q (FIG. 7Q).

Figure 7T:
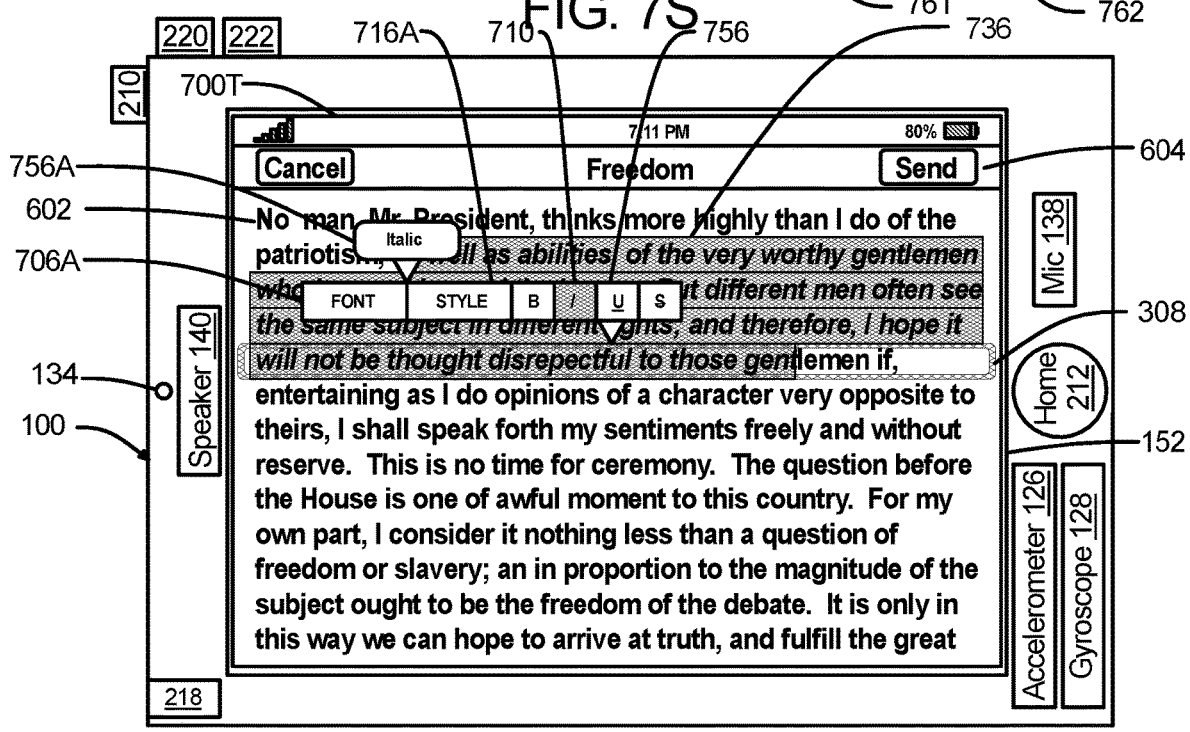

6) A user can perform tap gesture 762 on SPC icon 308 as illustrated in FIG. 7S. In response, the device changes the font style of the selection 736 to "Italic" as illustrated in FIG. 7T.

In the third example we described methods for performing a secondary-click action with respect to an extended selection within editable text. These same methods can be used to perform a secondary-click action with respect to a selection of one or more characters within read-only text. The secondary-click menu can display those available actions that are applicable to the selection.

In the third example described above in reference to FIGS. 7M-7T, a user performed a secondary-click action on SPC icon 308 to display secondary-click menu 706 showing "Cut", "Copy", "Paste", "Font", "Para", "Bullets", "Look Up", and "Synonyms". The user then performed a slide gesture on SPC icon 308 to position menu item preselection 710 at the item "Font". The user then performed a tap gesture on SPC icon 308. In response the device displayed sub-menu 716 showing the Font attributes "Family", "Style", "Size", and "Color". The user then performed a slide gesture on SPC icon 308 to position menu item preselection 710 at the item "Style". The user then performed a tap gesture on SPC icon 308. In response the device displayed $2^{nd}$ sub-menu 756 showing the Font Style attributes "Bold (B)", "Italic (I)", "Underline (U)", and "Strikethrough (S)". The user then performed a slide gesture on SPC icon 308 to position menu item preselection 710 at the item "Italic (I)". The user then performed a tap gesture on SPC icon 308. In response the device changed the Font Style of selection 736 to Italic Style.

Fourth Example: In a fourth example, a user has performed a secondary-click action on SPC icon 308 to display secondary-click menu 706 showing "Cut", "Copy", "Paste", "Font", "Para", "Bullets", "Look Up", and "Synonyms". As in the third example, the user has then performed a slide gesture on SPC icon 308 to position menu item preselection 710 at the item "Font". The user then performed a tap gesture on SPC icon 308. In response the device displayed sub-menu 716 showing the Font attributes "Family", "Style", "Size", and "Color". The user then performed a slide gesture on SPC icon 308 to position menu item preselection 710 at the item "Color" as illustrated in FIG. 7U.

Figure 7U:
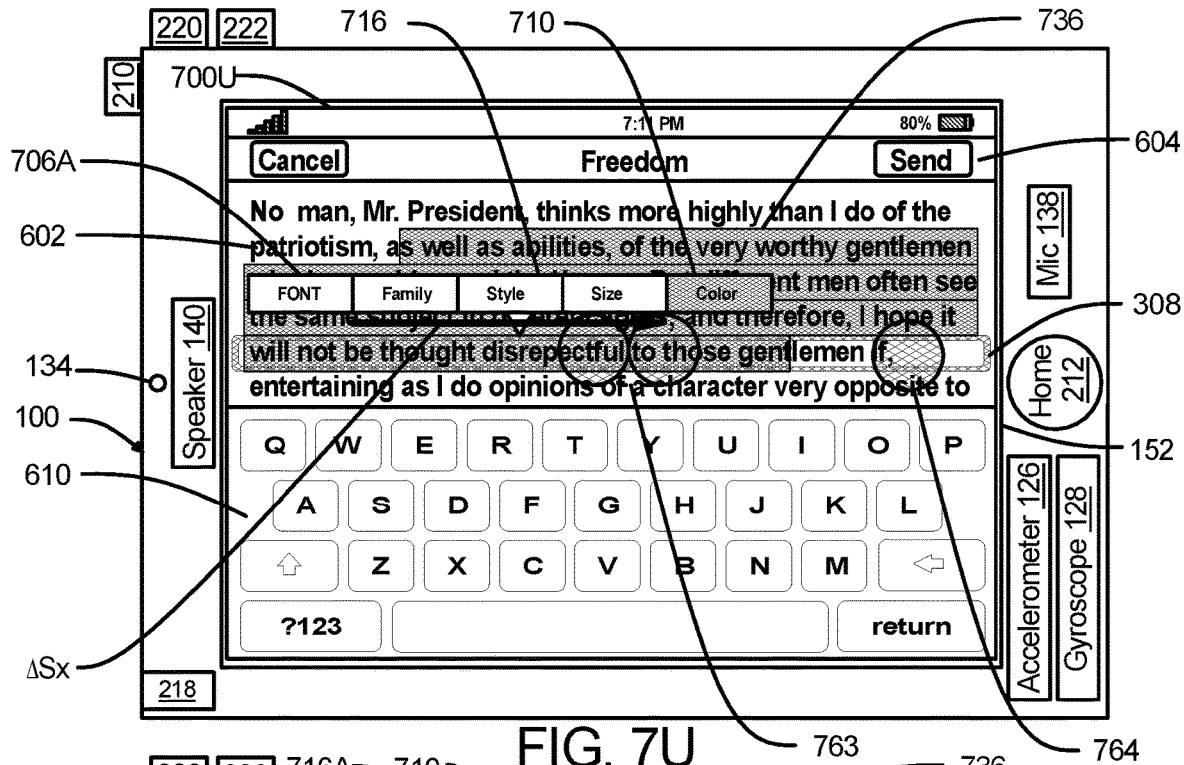
Figure 7V:
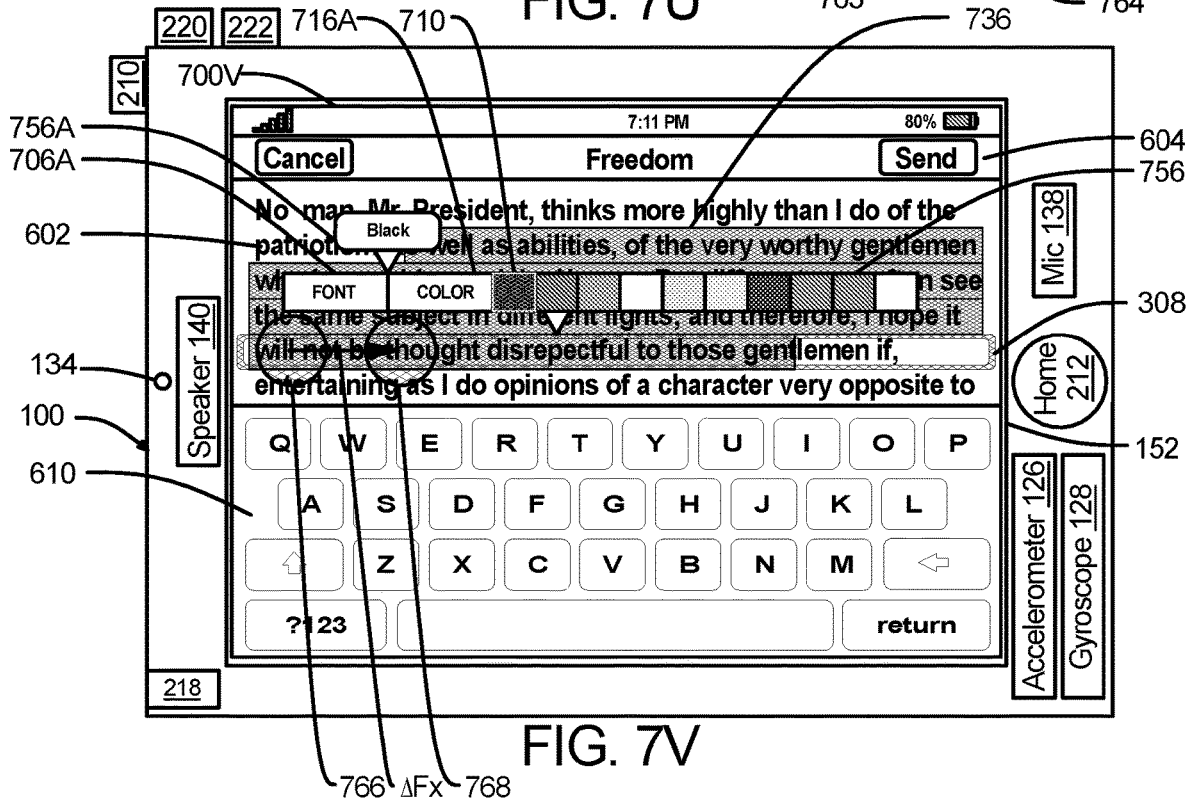

1) A user can perform tap gesture 764 on SPC icon 308 as illustrated in FIG. 7U. In response, the device displays $2^{ND}$ sub-menu 756 showing a list of "Font" "Color" attributes as illustrated in UI 700V (FIG. 7V). In this example, the action is the display of $2^{ND}$ sub-menu 756 showing the Font Color attributes "Black", "Red", "Orange", "Yellow", "Green", "Cyan", "Blue", "Magenta", "Gray", and "White".

Menu item preselection 710 can be initially positioned at the Font Color "Black" corresponding to the current font color of the selection 736. The $2^{nd}$ sub-menu 756 can include the display of menu item selection 706A "FONT" and sub-menu item selection 716A "COLOR" to provide the user context for the items listed in $2^{nd}$ submenu 756.

Figure 7W:
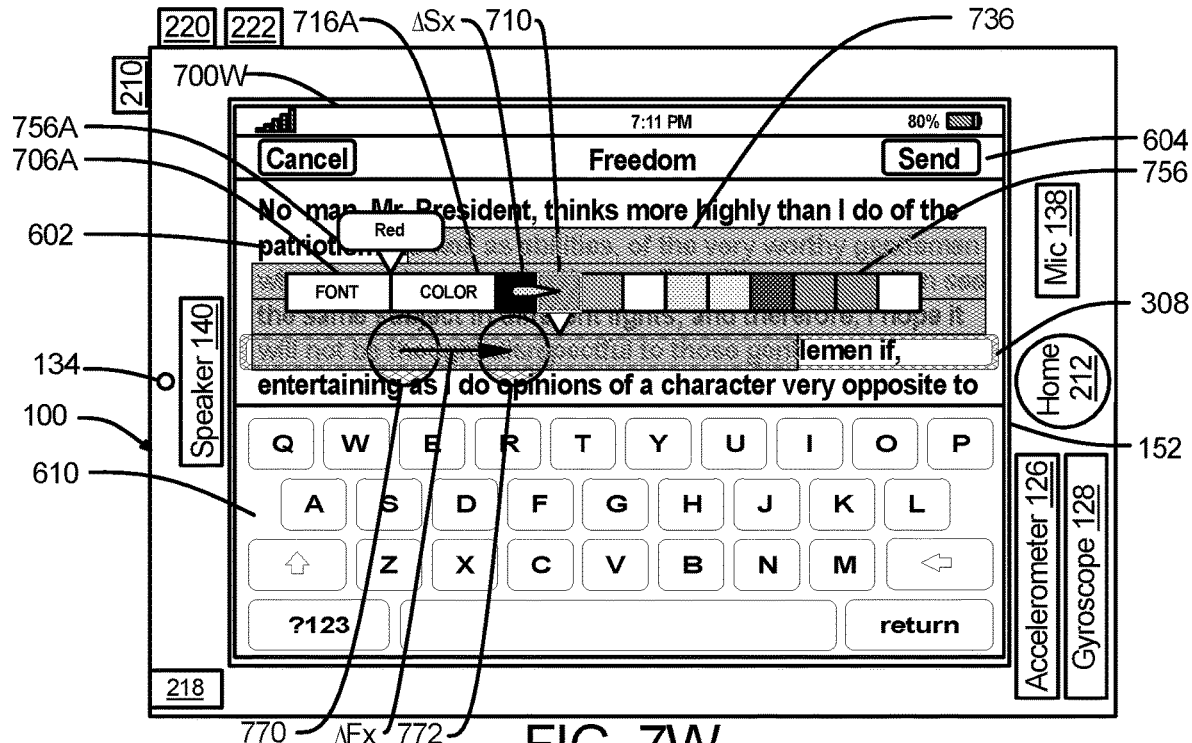

In this example embodiment, the device can immediately change the font color of the selected text to Font Color at the position of preselection 710 as the preselection is moved within the sub-menu. This enables the user to immediately view the text selection with different font attributes (font color in this example) applied to the text selection. This enables the user to "tune" in real time the font attribute to an attribute (font color in this example) preferred by the user. This is described in the example below:

2a) A user can perform a horizontal slide finger gesture 766 to 768 beginning anywhere on SPC icon 308. In response to detecting a change in the horizontal position of a finger contact (ΔFx) on SPC icon 308, the device can change the position (ΔSx) of menu item preselection 710 on $2^{nd}$ sub-menu 756 from the first item "Black" to the second item "Red" as illustrated in FIGS. 7V-7W.

Figure 7X:
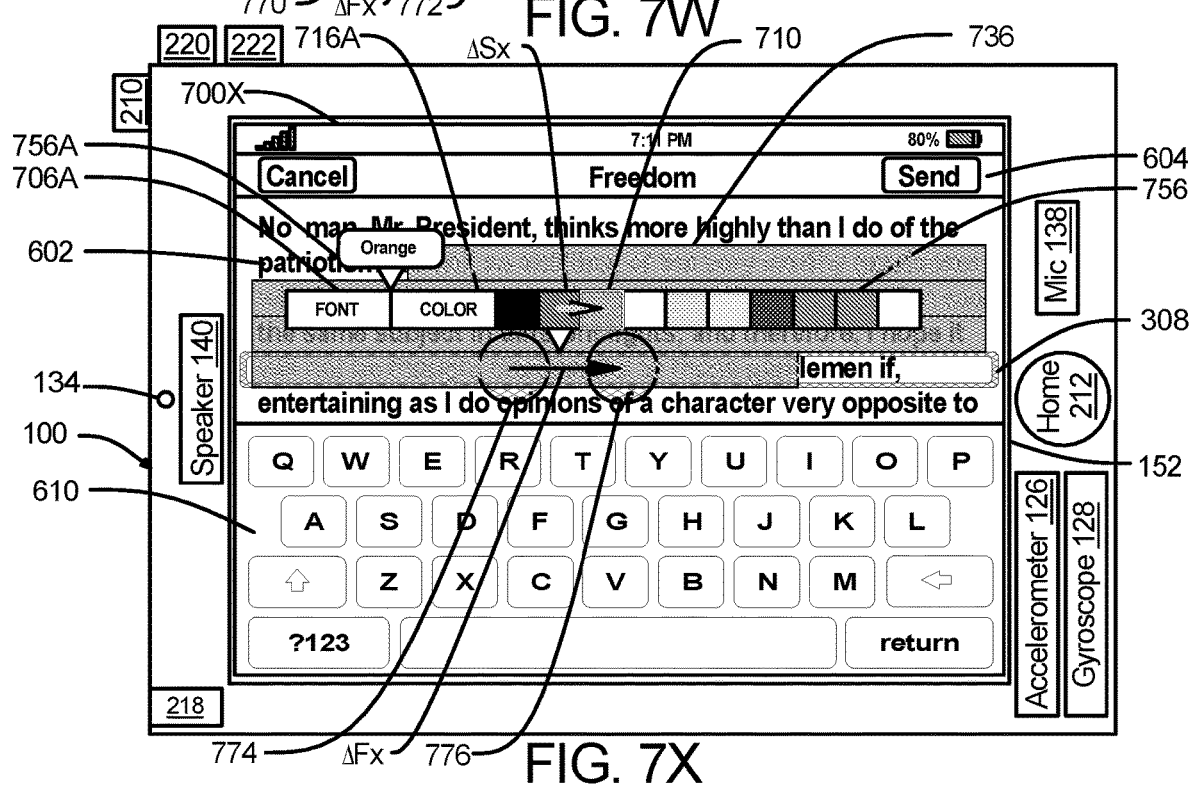

2b) A user can perform a horizontal slide finger gesture 770 to 772 beginning anywhere on SPC icon 308. In response to detecting a change in the horizontal position of a finger contact (ΔFx) on SPC icon 308, the device can change the position (ΔSx) of menu item preselection 710 on $2^{nd}$ sub-menu 756 from second item "Red" to third item "Orange" as illustrated in FIGS. 7W-7X.

Figure 7Y:
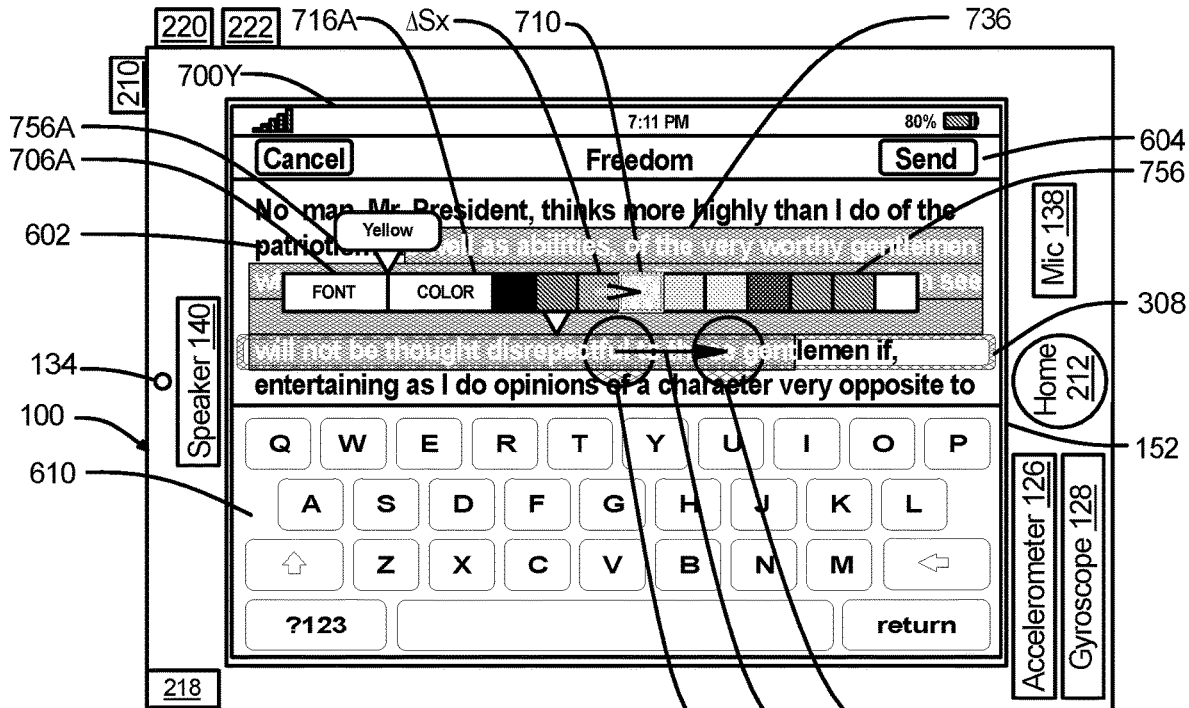

2c) A user can perform a horizontal slide finger gesture 774 to 776 beginning anywhere on SPC icon 308. In response to detecting a change in the horizontal position of a finger contact (ΔFx) on SPC icon 308, the device can change the position (ΔSx) of menu item preselection 710 on $2^{nd}$ sub-menu 756 from third item "Orange" to fourth item "Yellow" as illustrated in FIGS. 7X-7Y.

Figure 7Z:
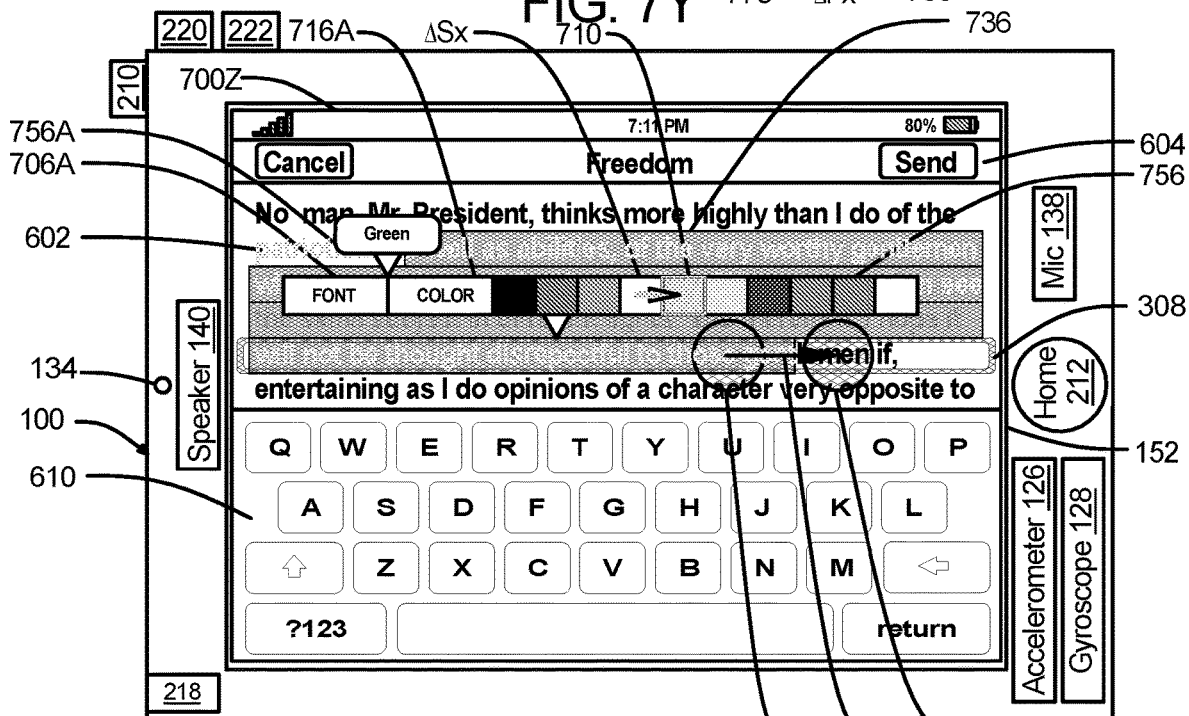
Figures 7A, 7B:
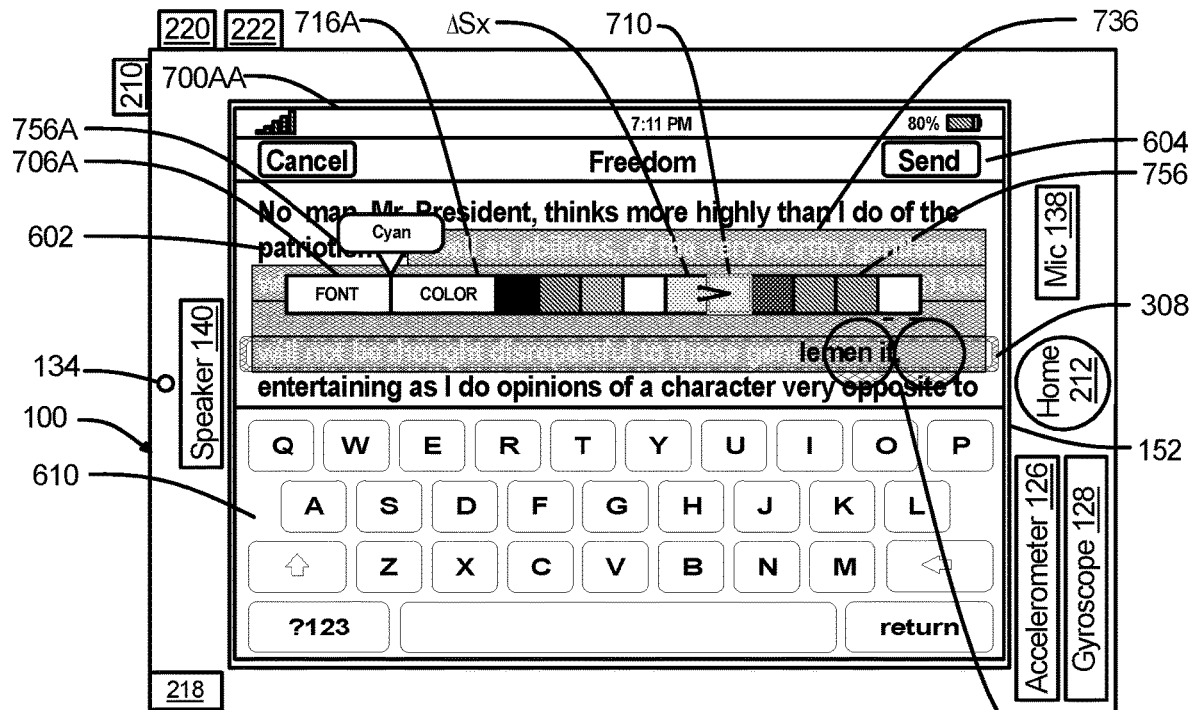
Figure 7C:
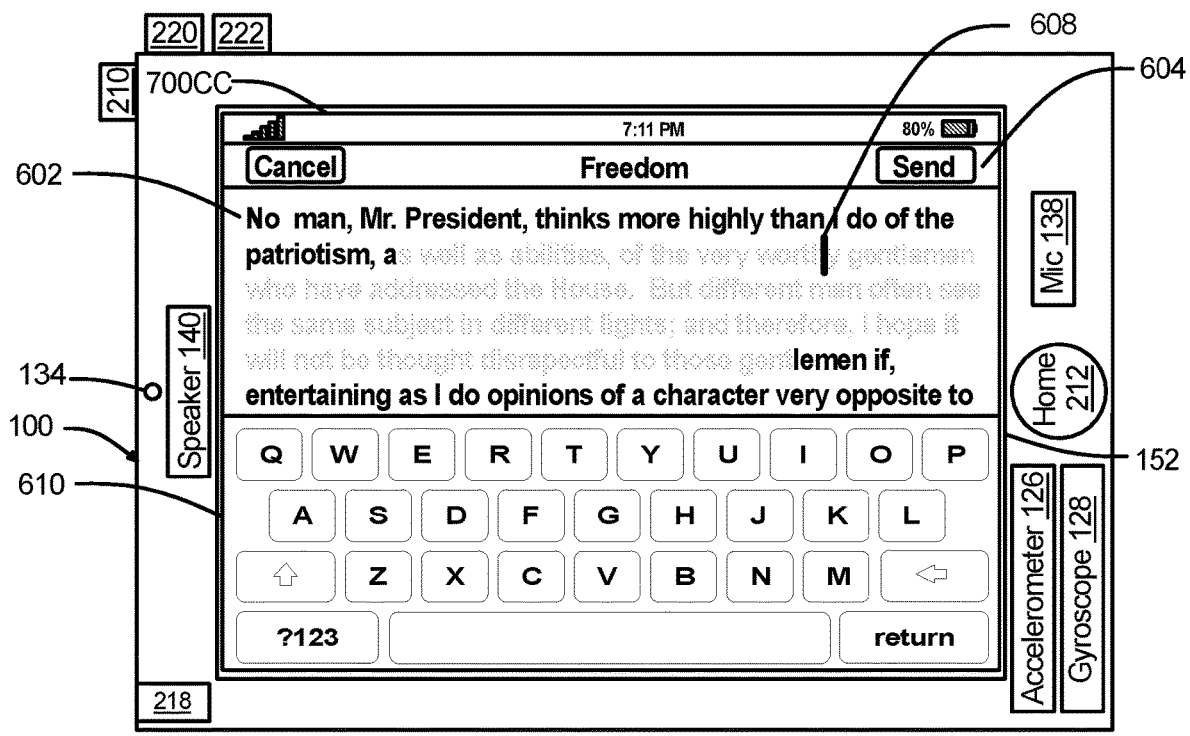

2d) A user can perform a horizontal slide finger gesture 778 to 780 beginning anywhere on SPC icon 308. In response to detecting a change in the horizontal position of a finger contact (ΔFx) on SPC icon 308, the device can change the position (ΔSx) of menu item preselection 710 on $2^{nd}$ sub-menu 756 from fourth item "Yellow" to fifth item "Green" as illustrated in FIGS. 7Y-7Z.

2e) A user can perform a horizontal slide finger gesture 782 to 784 beginning anywhere on SPC icon 308. In response to detecting a change in the horizontal position of a finger contact (ΔFx) on SPC icon 308, the device can change the position (ΔSx) of menu item preselection 710 on $2^{nd}$ sub-menu 756 from fifth item "Green" to sixth item "Cyan" as illustrated in FIGS. 7Z-7AA.

Cancel display of a secondary-click menu: a user can perform a secondary-click menu cancel gesture 786 (a two-finger tap gesture for example) on selection positioning and control (SPC) icon 308 as illustrated in FIG. 7AA. In response to detecting the secondary-click menu cancel gesture, the device cancels display of $2^{nd}$ sub-menu 756 and redisplays sub-menu 716 as illustrated in UI 700BB (FIG. 7BB).

A user can perform a tap gesture 788 anywhere outside of SPC icon 308 as illustrated in FIG. 7BB. In response, the device cancels the display of selection of 736 and cancels the display of SPC icon 308, displays zero-length selection 608 at the tap location, and displays content 602 with the previously selected text with "Cyan" font color as illustrated in FIG. 7CC.

In the case of a menu item such as font, with a large number of characteristics and sub-characteristics, items can be selected using a menu, a $1^{st}$ sub-menu, and a $2^{nd}$ sub-menu architecture. a) For example, the selected menu item could be Font, and the 1st sub-menu could comprise Font Family, Font Style, Font Size, Font Color, Font Underline Style, and Font Highlight Color. If the Font Color is selected from the $1^{st}$ sub-menu, then the $2^{nd}$ sub-menu could comprise a list of a large number of font colors ("Black", "Red", "Orange", "Yellow", "Green", "Cyan", "Blue", "Magenta", "Gray", and "White") in text label format or colored icon format. If the Font Type is selected from the $1^{st}$ sub-menu, then the $2^{nd}$ sub-menu could comprise a list of a large number of font families (Arial, Helvetica, Times New Roman, . . . ). If the Font Highlight Color is selected from the $1^{st}$ sub-menu, then the $2^{nd}$ sub-menu could comprise a list of a large number of font highlight colors. b) For example, the selected menu item could be Bullets or Numbering, and the $1^{st}$ sub-menu could comprise Bullet Styles or Numbered Styles.

Figure 8A:
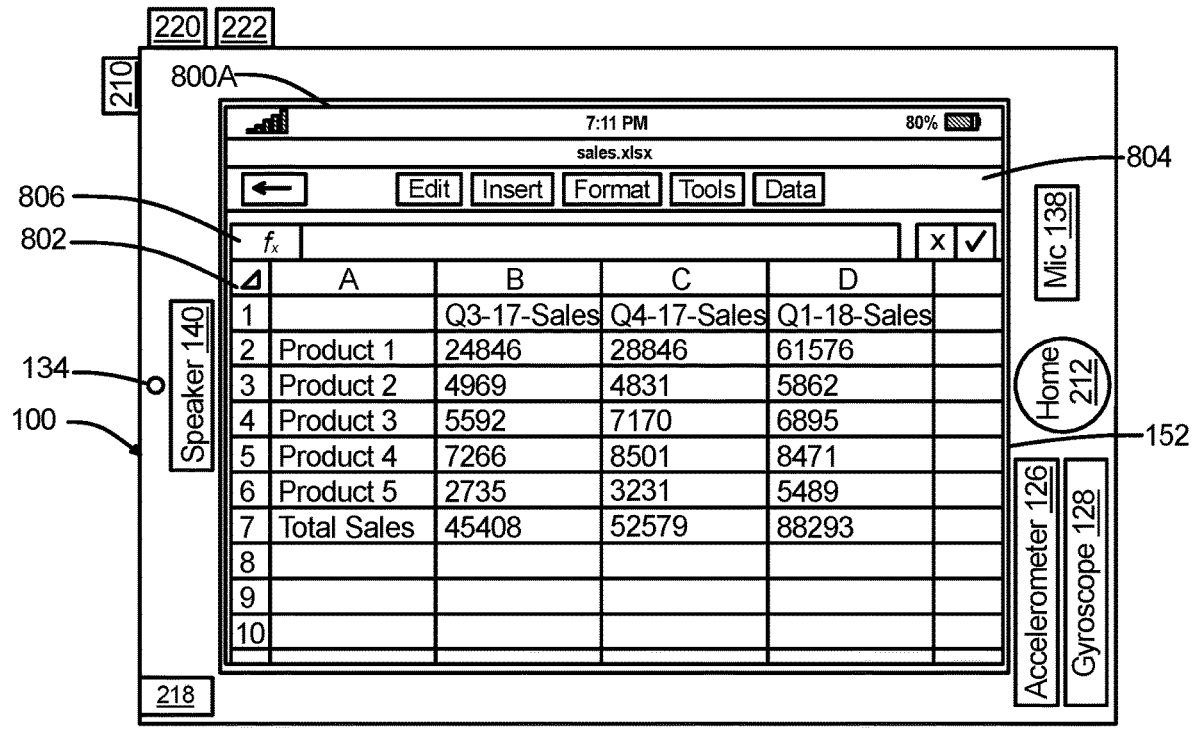
FIGS. 8A-8N illustrate an exemplary graphical user interface and method for displaying a text-object selection within text-object content (a spreadsheet), and moving a text-object selection within text-object content (a spreadsheet), on a mobile computing device with a touch-sensitive display, in accordance with some embodiments.
Figure 8B:
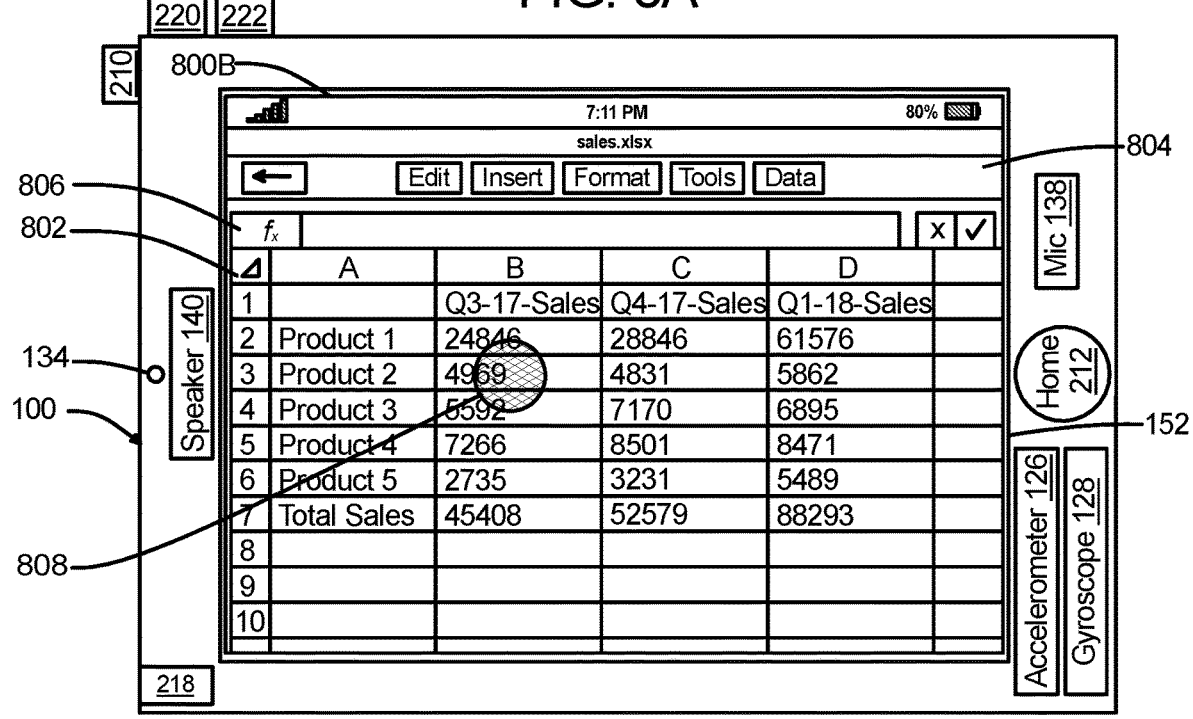
Figure 8C:
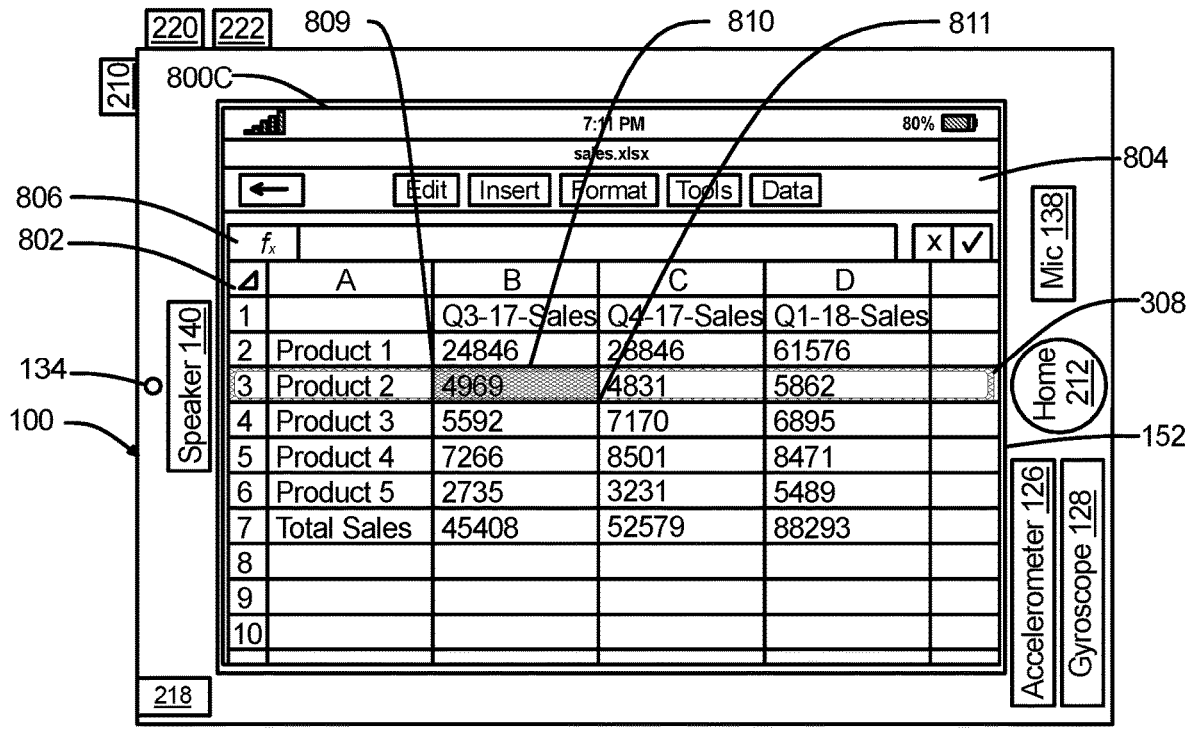

8.0 Displaying and moving a text-object selection within text-object content: FIGS. 8A-8N illustrate an exemplary graphical user interface and method for displaying a text-object selection within text-object content (a spreadsheet), and moving a text-object selection within text-object content (a spreadsheet). In this disclosure we will sometimes refer to "text-object selection 810" simply as "selection 810".

The device can display editable text-object content 802 as illustrated in FIG. 8A. The device can also display application navigation bar 804. A user can perform a long-press finger gesture 808 on text-object content 802 (FIG. 8B). In response to detecting the finger gesture on content 802, the device can display UI 800C (FIG. 8C) with selection positioning and control (SPC) icon 308 at an SPC icon first position and text-object selection 810, with start position 809 and end position 881, at a selection first position. In one exemplary embodiment, the selection first position is the location of the finger gesture on the content.

Figure 8D:
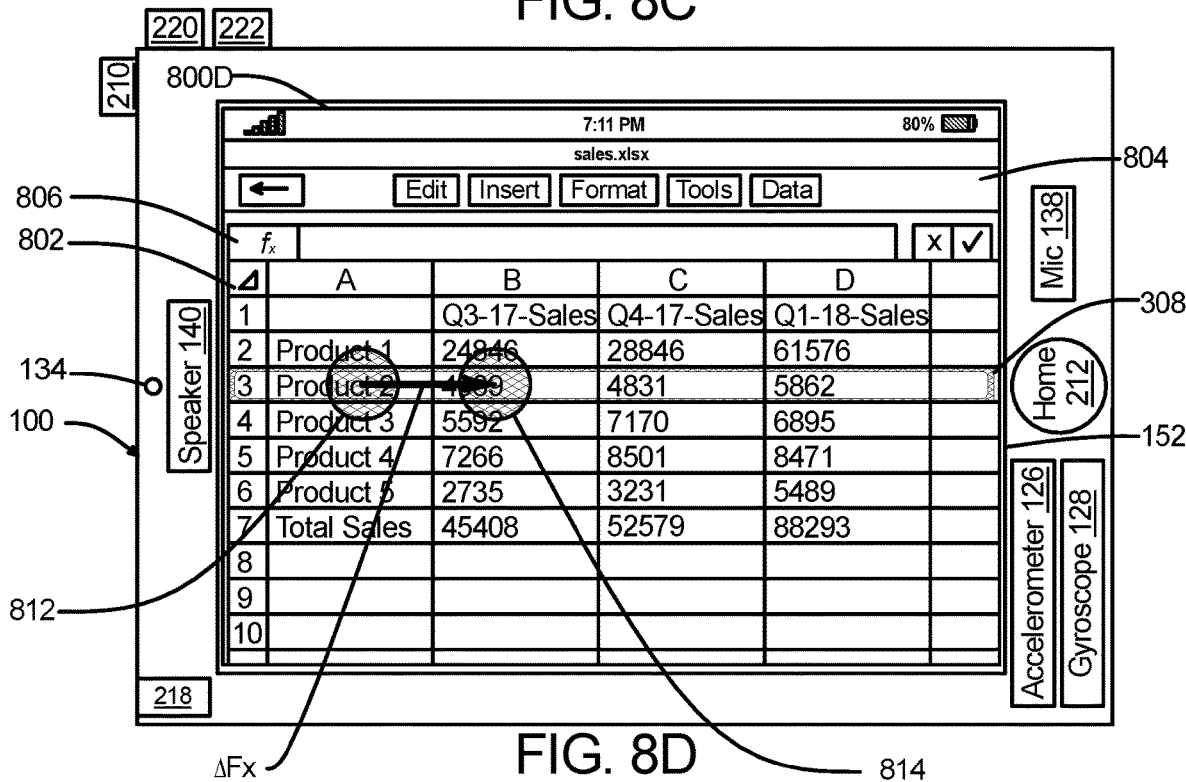
Figure 8E:
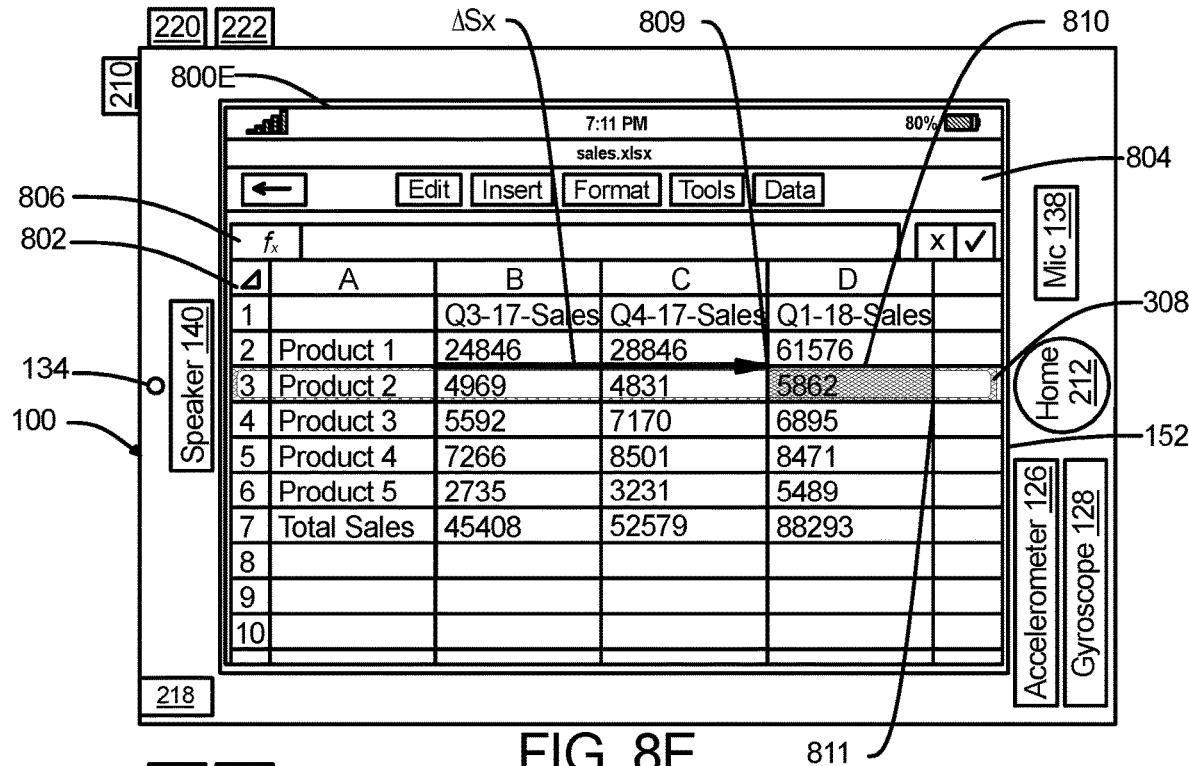

With text-object selection 810 at a first position, a user can perform a horizontal slide finger gesture 812 to 814 beginning anywhere on SPC icon 308 as illustrated in FIG. 8D. In response to detecting ΔFx (a change in the horizontal position of a finger contact on the SPC icon), the device changes the position of text-object selection 810 on the display from a first position to a second position as illustrated in FIGS. 8D-8E. The device displays UI 800E (FIG. 8E) with selection 810 at a second position. In one example embodiment, ΔSx (the change in the horizontal position of selection 810) is approximately proportional to ΔFx. This can be written as ΔSx=KxΔFx where Kx is a proportionality constant. In this example, Kx>1. In some embodiments, Kx can be a function of the slide gesture speed in the x-direction.

Figure 8F:
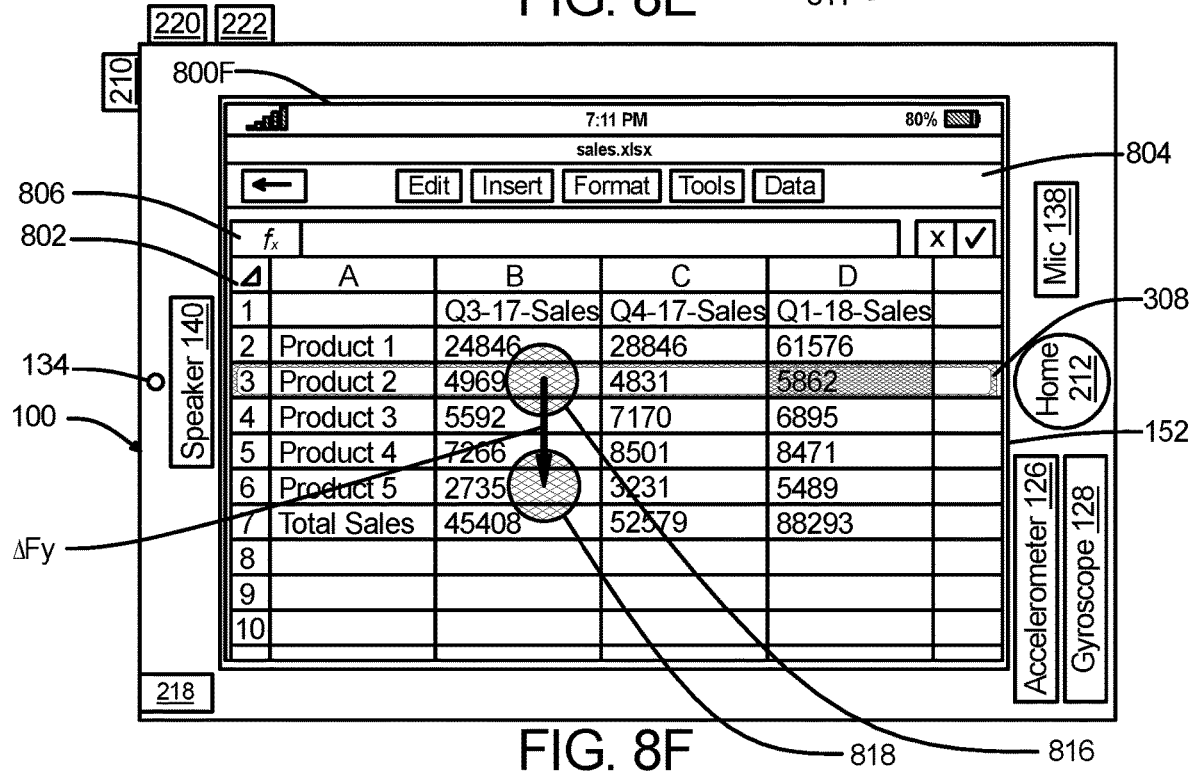
Figure 8G:
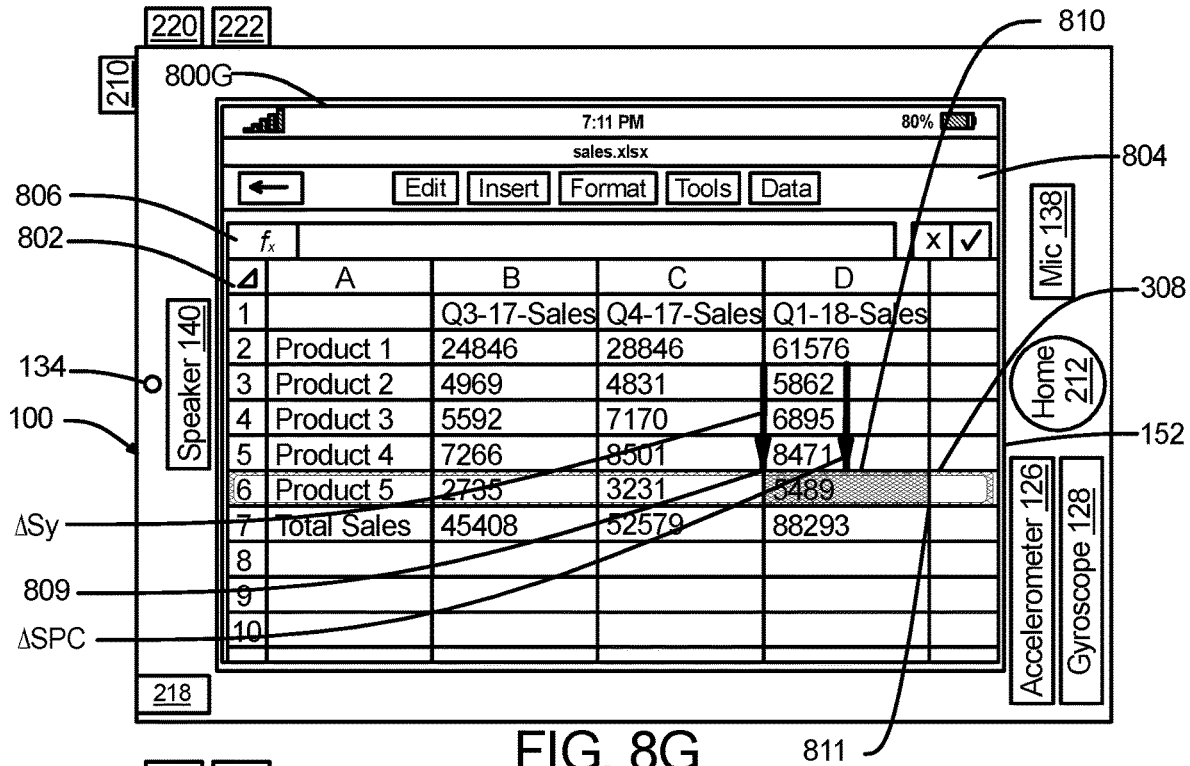

A user can perform a vertical-slide finger gesture 816 to 818 beginning anywhere on SPC icon 308 as illustrated in FIG. 8F). In response to detecting ΔFy (a change in the vertical position) of a finger contact on the SPC icon, the device changes the position of selection 810 on the display from a first position to a second position. In one example embodiment, ΔSy (the change in the vertical position of selection 810) and ΔSPCy (the change in the vertical position of SPC icon 308) are equal and are approximately proportional to ΔFy as illustrated in FIGS. 8F-8G). This can be written as ΔSy=ΔSPCy=KyΔFy where Ky is a proportionality constant. Again, in this exemplary embodiment Ky=1. The device displays UI 800G (FIG. 8G) with selection 810 at a second position within text-object content 802 (a spreadsheet in this example). In some embodiments, Kx can be a function of the slide gesture speed in the x-direction.

Figure 8H:
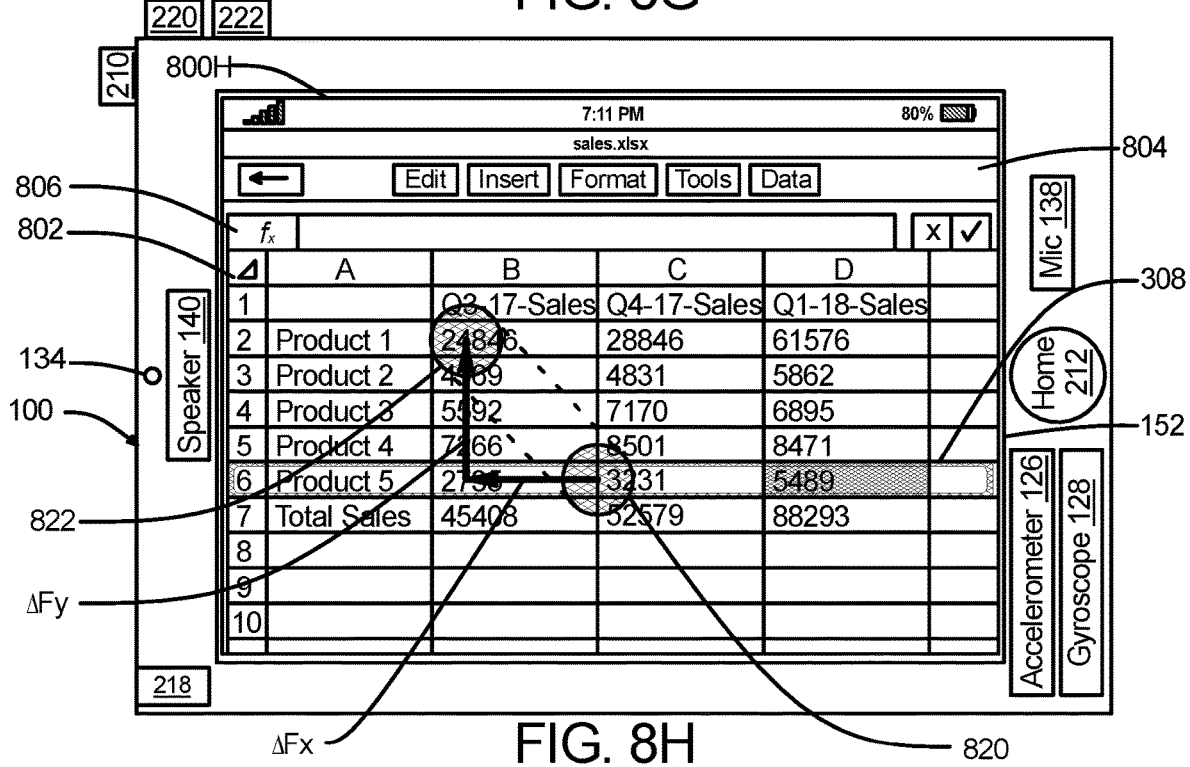
Figure 8I:
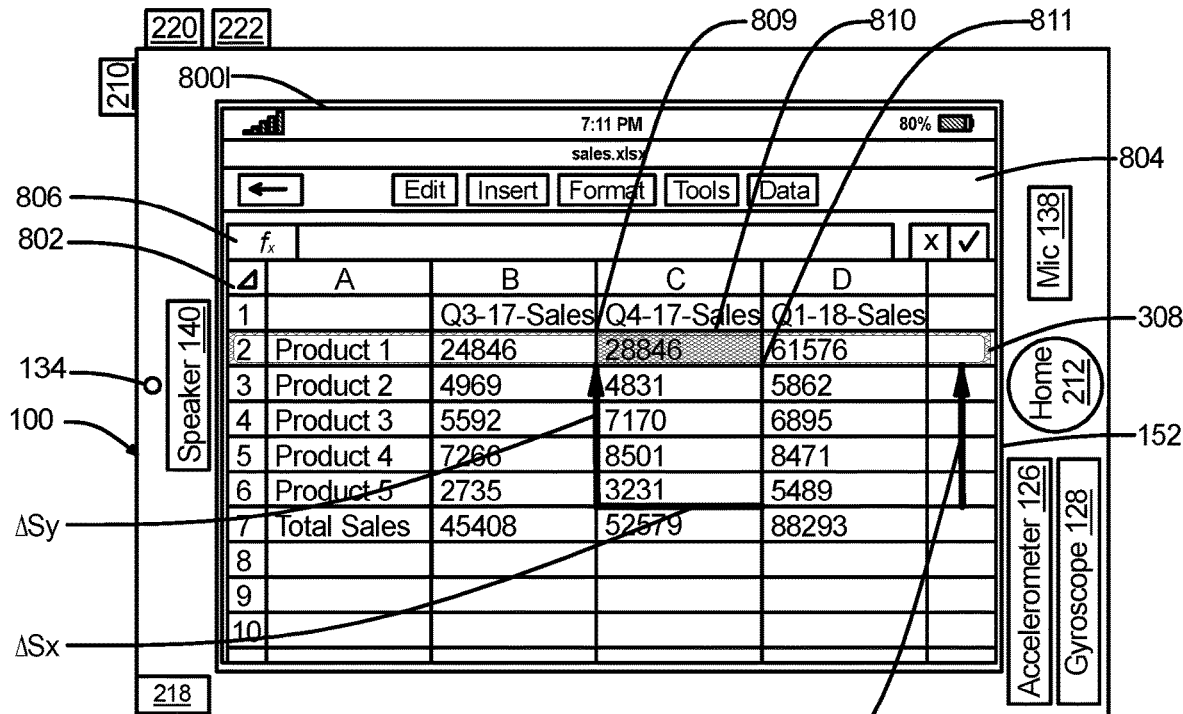

A user can perform a diagonal-slide finger gesture 820 to 822 beginning anywhere on SPC icon 308 as illustrated in FIG. 8H. In response to detecting ΔFx (a change in the horizontal position) and ΔFy (a change in the vertical position) of a finger contact on the SPC icon, the device changes the position of selection 810 on the display from a first position to a second position. In one example embodiment, ΔSx (the change in the horizontal position of selection 310) is approximately proportional to ΔFx, and ΔSy (the change in the vertical position of selection 310) and ΔSPCy (the change in the vertical position of SPC icon 308) are equal and are approximately proportional to ΔFy as illustrated in FIGS. 8H-8I. This can be written as ΔSx=KxΔFx where Kx is a proportionality constant and ΔSy=ΔSPCy=KyΔFy where Ky is a proportionality constant. In this example, Kx~1 and Ky=1. The device displays UI 8001 (FIG. 8I) with selection 810 at a second position. In some embodiments, Kx can be a function of the slide gesture speed in the x-direction.

Figure 8J:
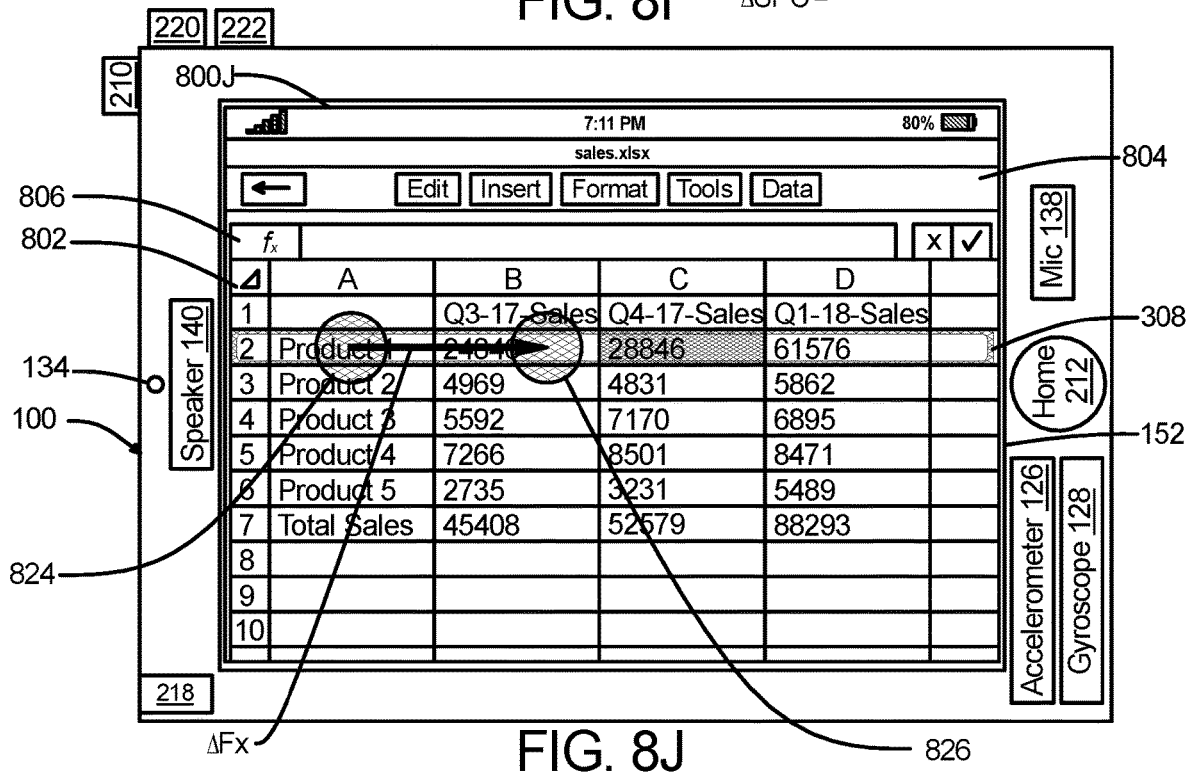
Figure 8K:
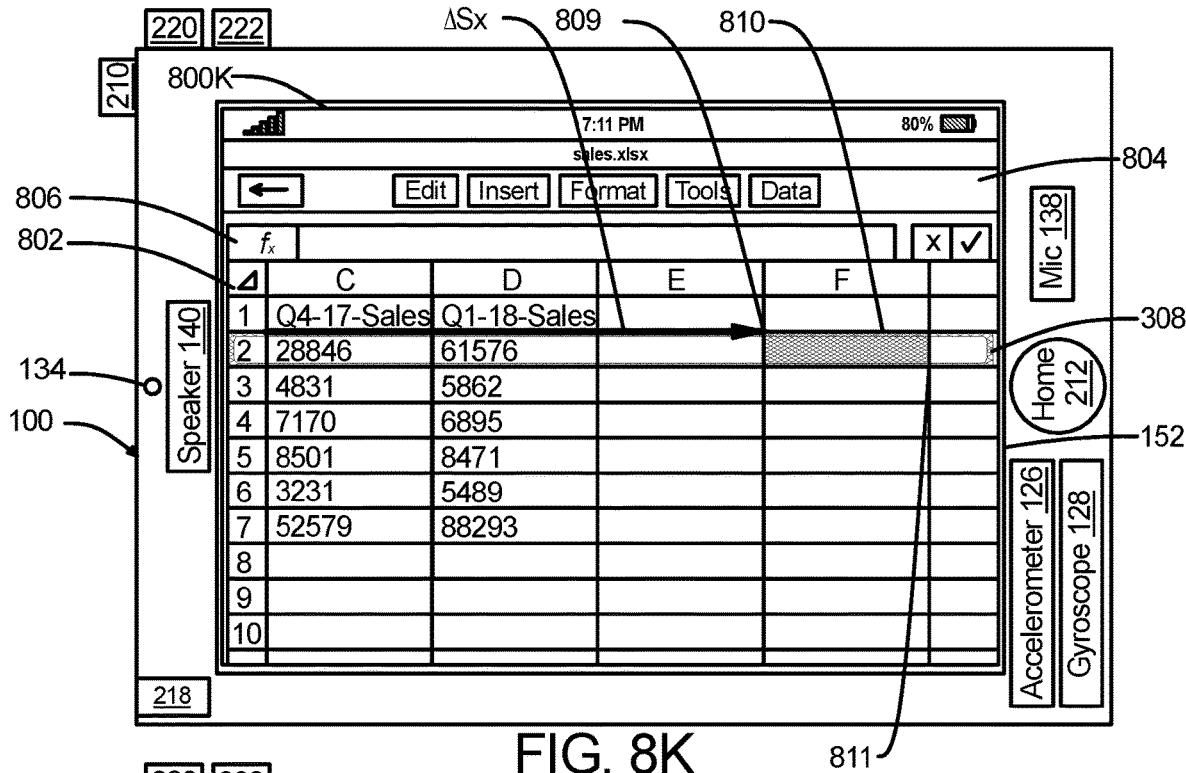

With text-object selection 810 at a first position, a user can perform a horizontal slide finger gesture 824 to 826 to the right beginning anywhere on SPC icon 308 as illustrated in FIG. 8J. In response to detecting ΔFx (a change in the horizontal position of a finger contact on the SPC icon), the device changes the position of text-object selection 810 on the display from a first position to a second position and auto-scrolls the text-object content to the left as illustrated in FIGS. 8J-8K. In this example, Kx>1 and text-object selection 810 is moved from cell C2 to cell F2.

Figure 8L:
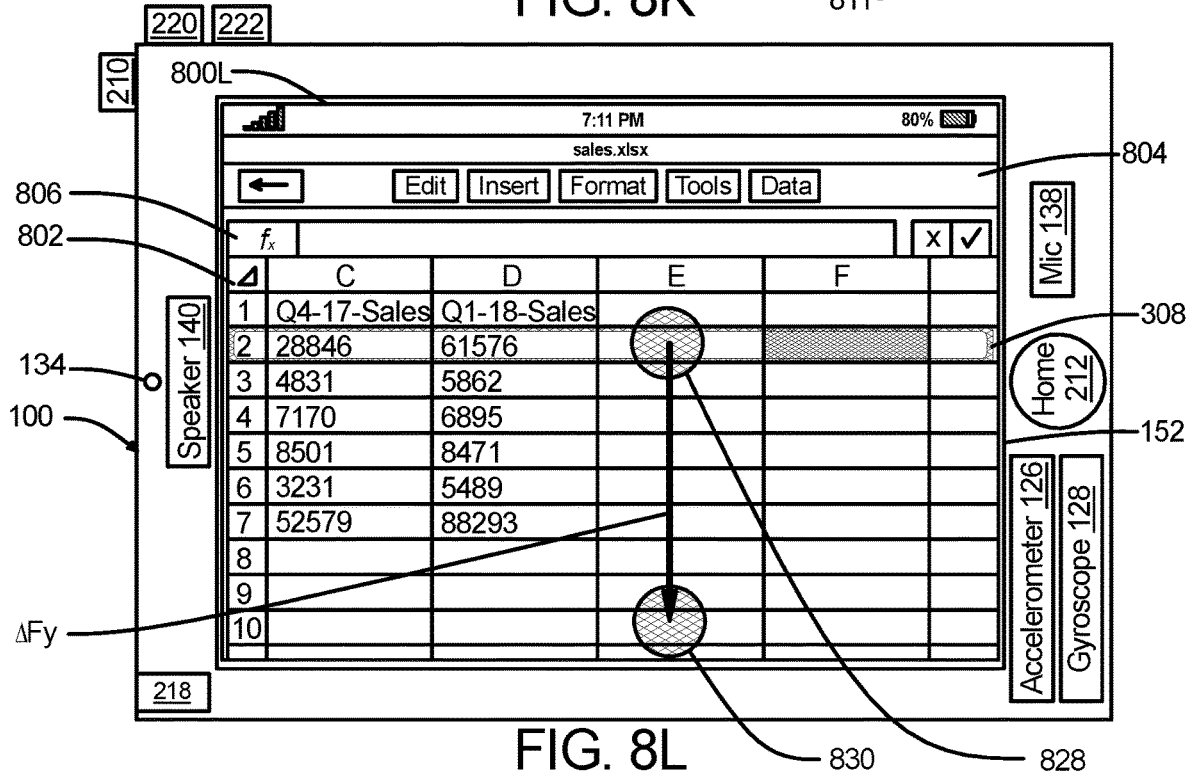
Figure 8M:
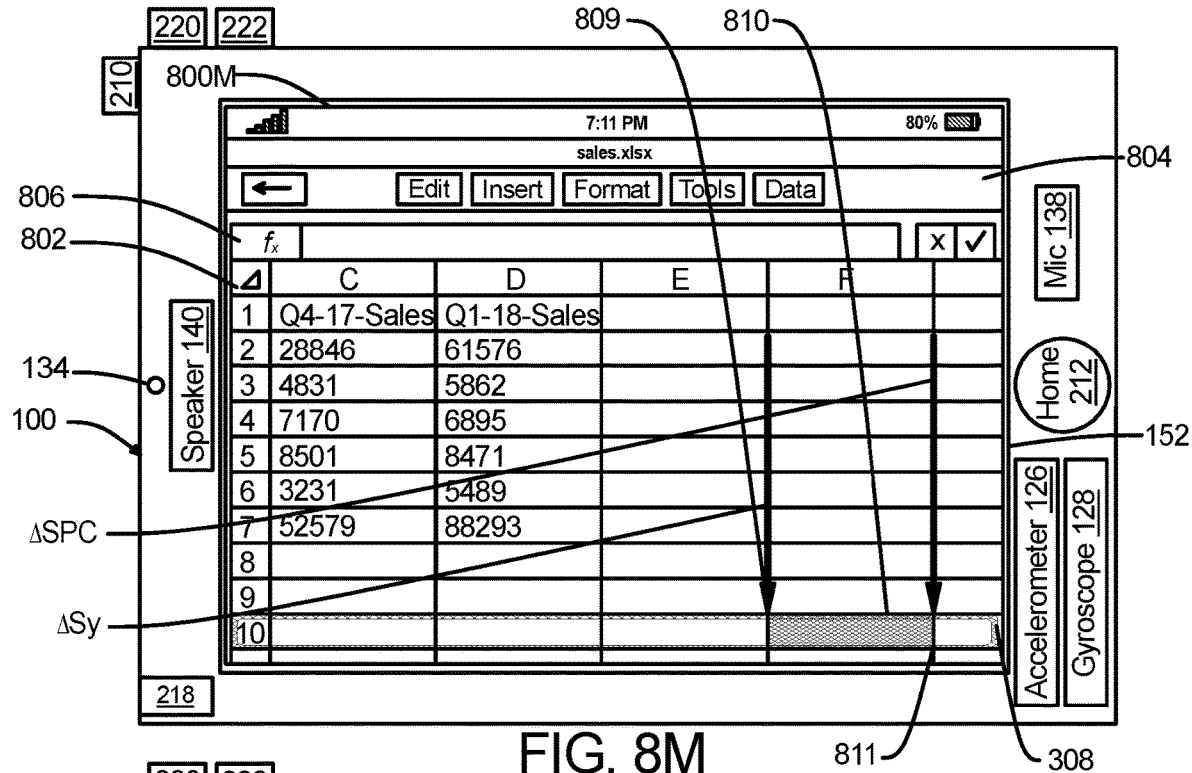
Figure 8N:
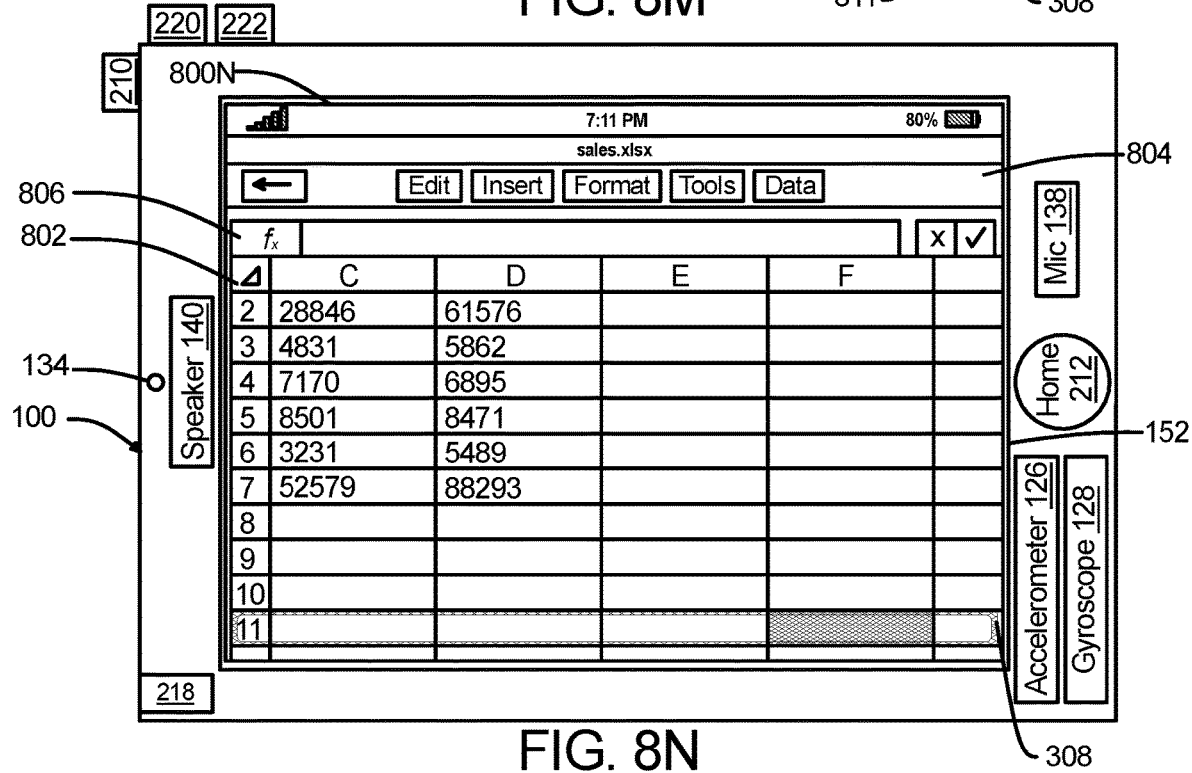

With text-object selection 810 at a first position, a user can perform a vertical slide finger gesture 828 to 830 beginning anywhere on SPC icon 308 as illustrated in FIG. 8L. In response to detecting ΔFY (a change in the vertical position of a finger contact on the SPC icon), the device changes the vertical position of text-object selection 810 on the display from a first position to a second position as illustrated in FIGS. 8L-8M. In this example, text-object selection 810 is moved from cell F2 to cell F10. In response to detecting an additional (not shown) ΔFY (a change in the vertical position of a finger contact on the SPC icon), toward the bottom boundary of the display, the device auto-scrolls the text-object content up and changes the vertical position of text-object selection 810 on the display from a first position to a second position as illustrated in FIGS. 8M-8N. In this example, text-object selection 810 is moved from cell F10 to cell F11.

Content Vertical Auto-scroll: A user can move text-object selection 810 until the position of selection 810 is less than one text-object from the bottom (top) boundary of the display. In response, the device scrolls the text-object content up (down) by one row until selection 810 is moved to the last (first) row of the text-object content, or until the text-object is moved to a position that is greater than or equal to one text object from the bottom (top) boundary of the display.

Content Horizontal Auto-scroll: A user can move text-object selection 810 until the position of selection 810 is less than one text-object from the right (left) boundary of the display. In response, the device scrolls the text-object content left (row) by one column until selection 810 is moved to the last (first) column of the text-object content, or until the text-object is moved to a position that is greater than or equal to one text object from the right (left) boundary of the display.

Content Scroll by User: Text-Object content 802 can be moved vertically (scrolled) or moved horizontally with a slide finger gesture on the content at any position outside selection positioning and control (SPC) icon 308 in a manner similar to that illustrated in FIGS. 3F-3G for text content.

The display of selection positioning and control (SPC) icon 308 can be canceled with a tap gesture anywhere on editable text-object content 802 anywhere outside selection positioning and control (SPC) icon 308. In response to the detection of a tap gesture on editable text-object content 802 anywhere outside SPC icon 308 the device cancels the display of SPC icon 308 and displays text-object selection 810 at the tap position. This is similar to that illustrated in FIG. 6E and FIG. 6G for editable text content.

Figure 9A:
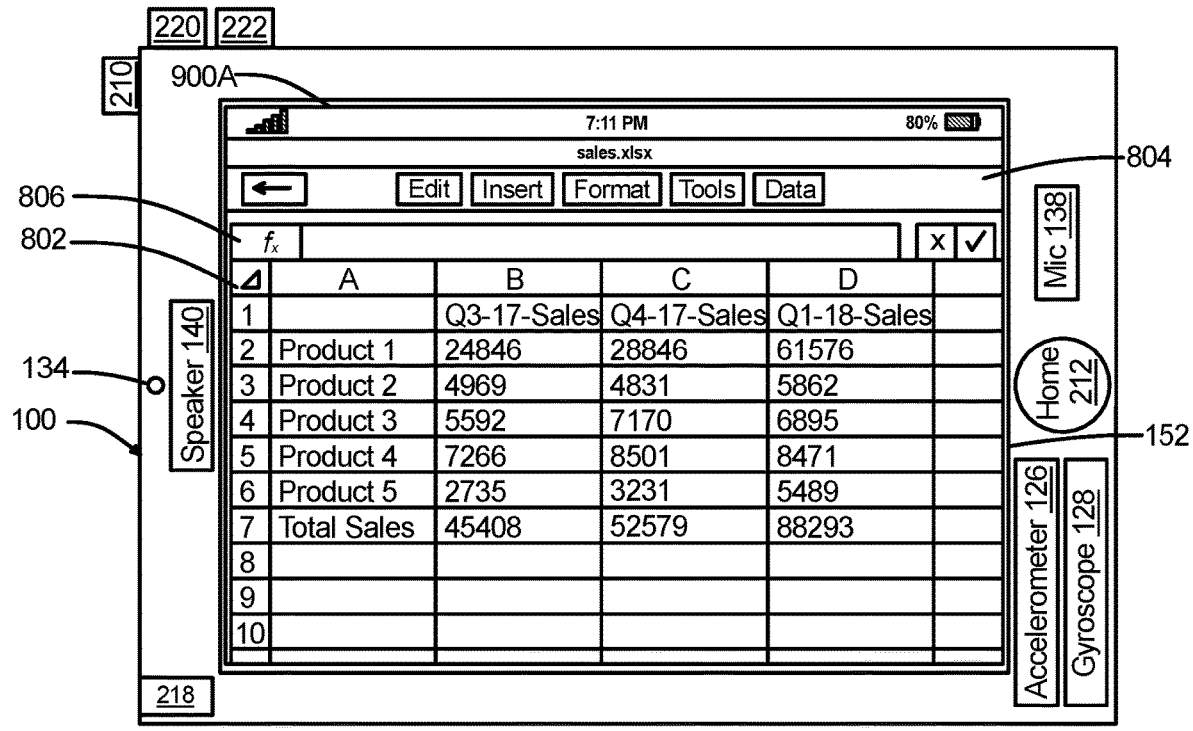
FIGS. 9A-9P illustrate an exemplary graphical user interface and method for displaying a text-object selection within text-object content (a spreadsheet), displaying a zero-length selection within an editable text-object (a spreadsheet cell), and moving the zero-length selection within the editable text-object (a spreadsheet cell), on a mobile computing device with a touch-sensitive display, in accordance with some embodiments.
Figure 9B:
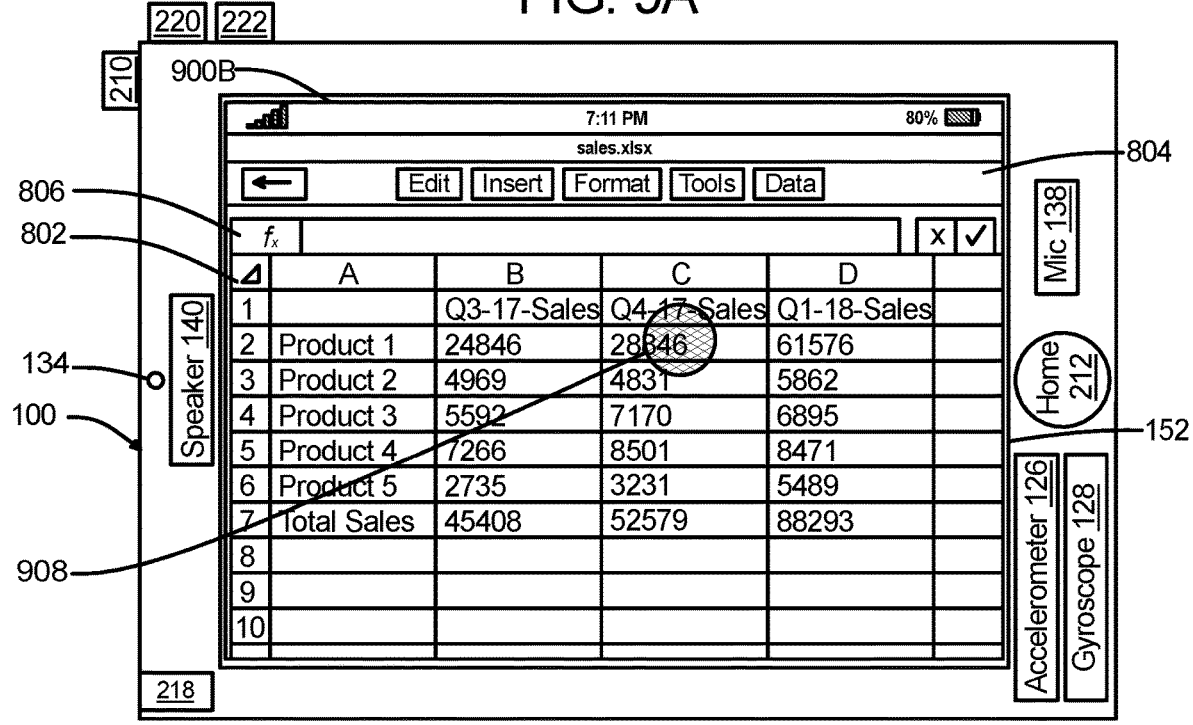
Figure 9C:
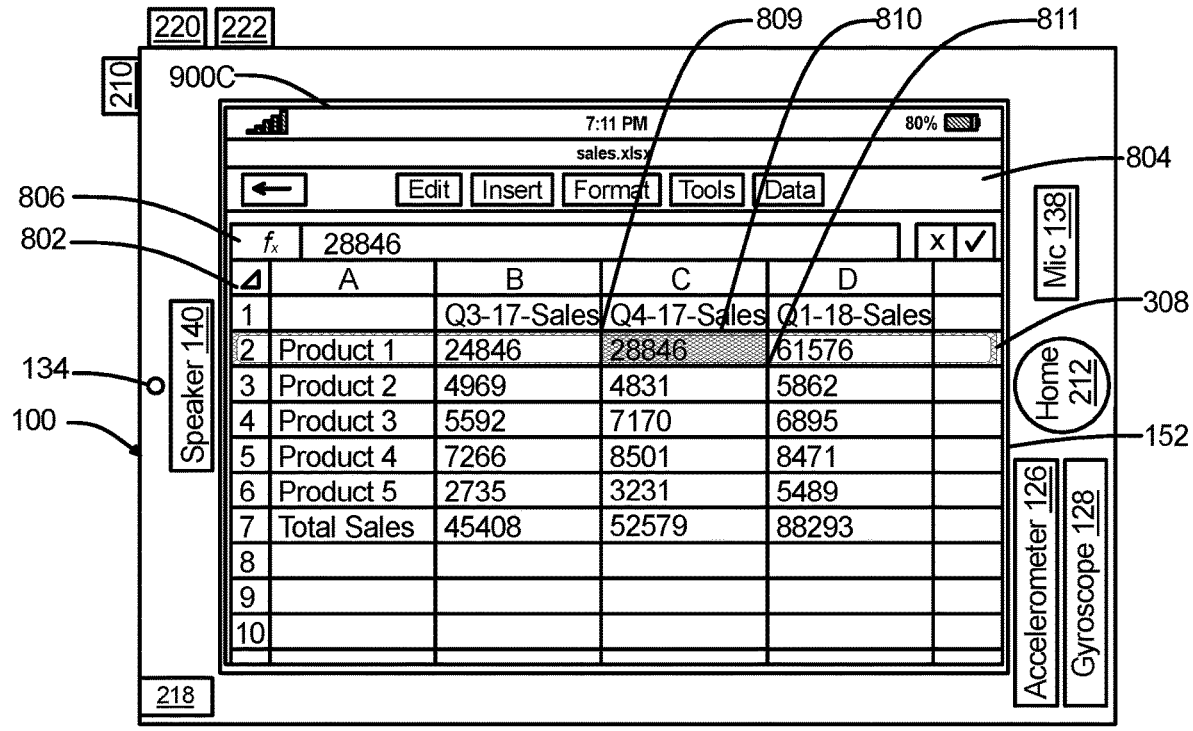

9.0 Displaying a text-object selection within editable text-object content, displaying and moving a zero-length selection within an editable text-object: FIGS. 9A-9P illustrate an exemplary graphical user interface and method for displaying a text-object selection within text-object content (a spreadsheet), displaying a zero-length selection within an editable text-object (a spreadsheet cell), and moving the zero-length selection within the editable text-object (a spreadsheet cell).

The device can display editable text-object content 802 as illustrated in FIG. 9A. The device can also display application navigation bar 804. A user can perform a long-press finger gesture 908 on text-object content 802 (FIG. 9B). In response to detecting the finger gesture on content 802, the device can display UI 900C (FIG. 9C) with selection positioning and control (SPC) icon 308 at an SPC icon first position and text-object selection 810 at a selection first position. In one exemplary embodiment, the selection first position is the location of the finger gesture on the content.

Figure 9D:
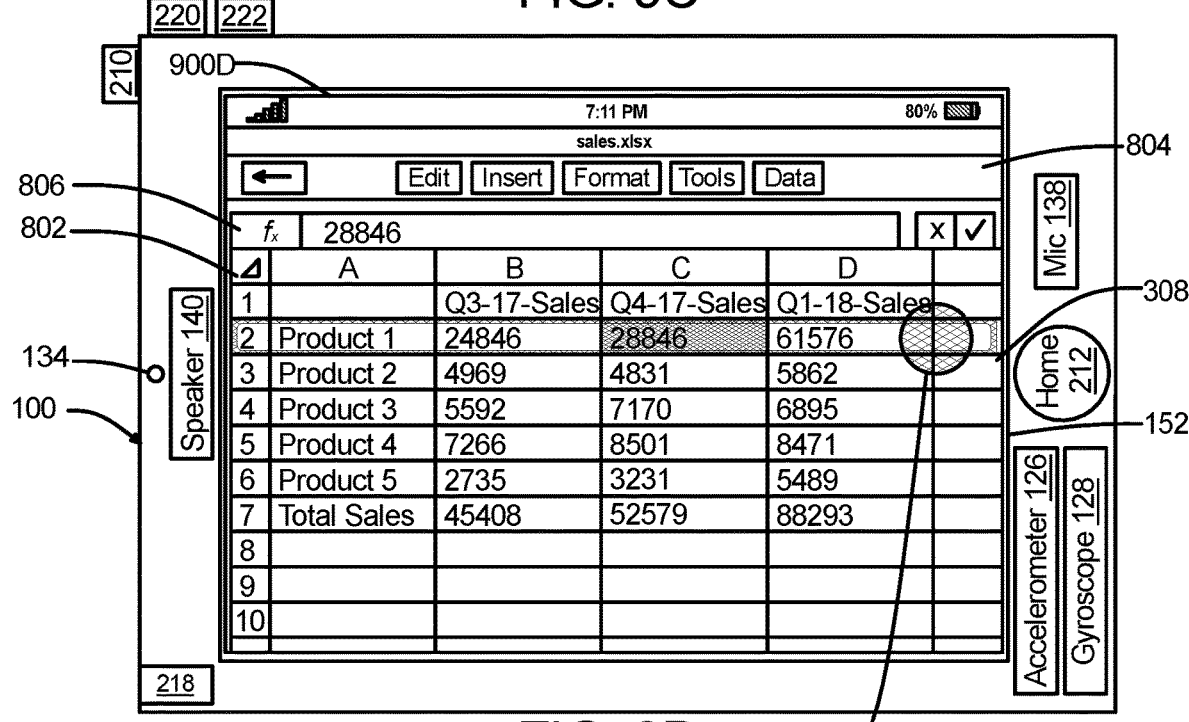
Figure 9E:
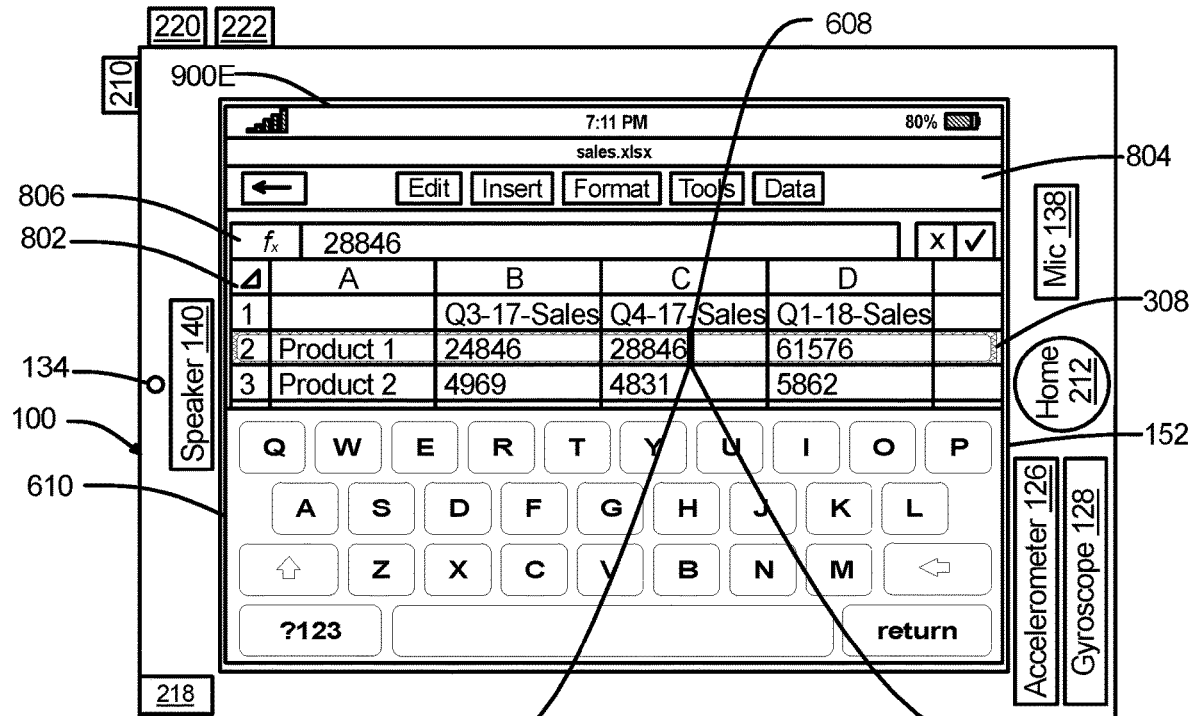

With text-object selection 810 at a first position, a user can perform a double-tap finger gesture 910 anywhere on SPC icon 308 as illustrated in FIG. 9D. In response to detecting double-tap finger gesture 910, the device displays zero-length selection 608 within the text object (spreadsheet cell in this example) at the text object-selection 810. In one exemplary embodiment, the position of zero-length selection within the spreadsheet cell is after the last character in the cell as illustrated in FIG. 9E.

Figure 9F:
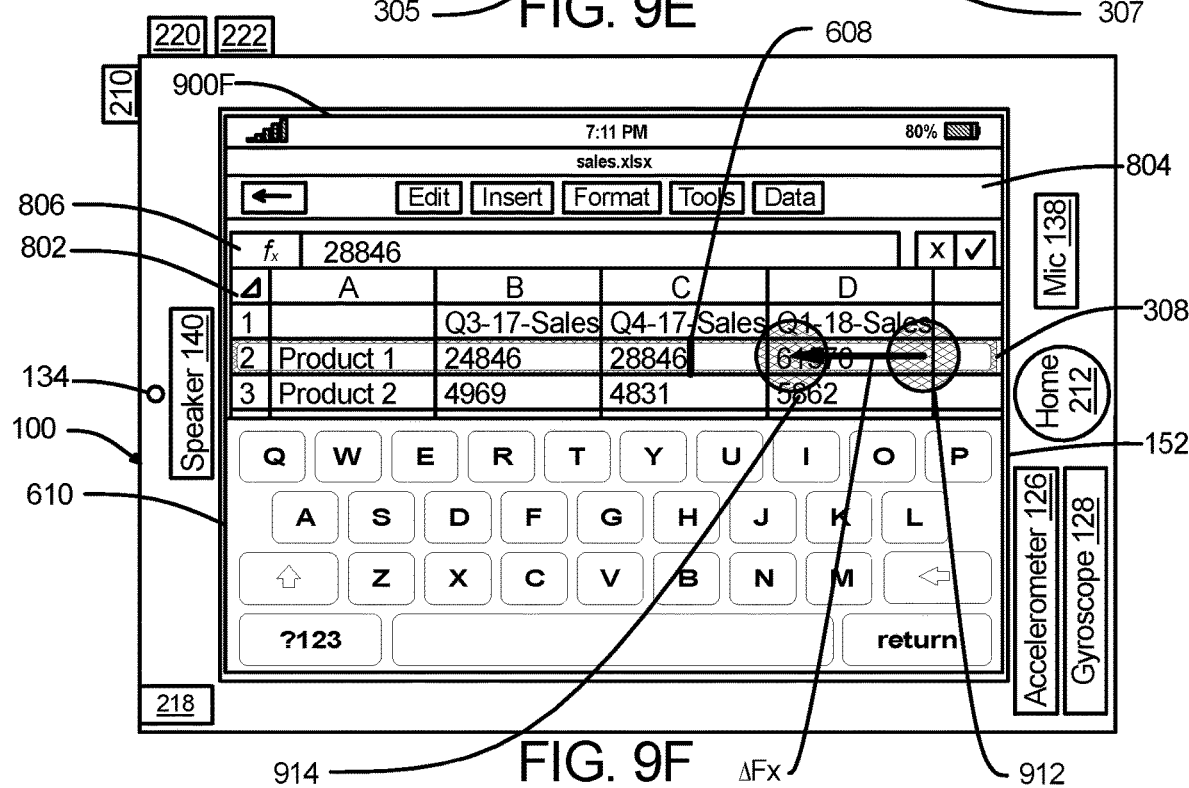
Figure 9G:
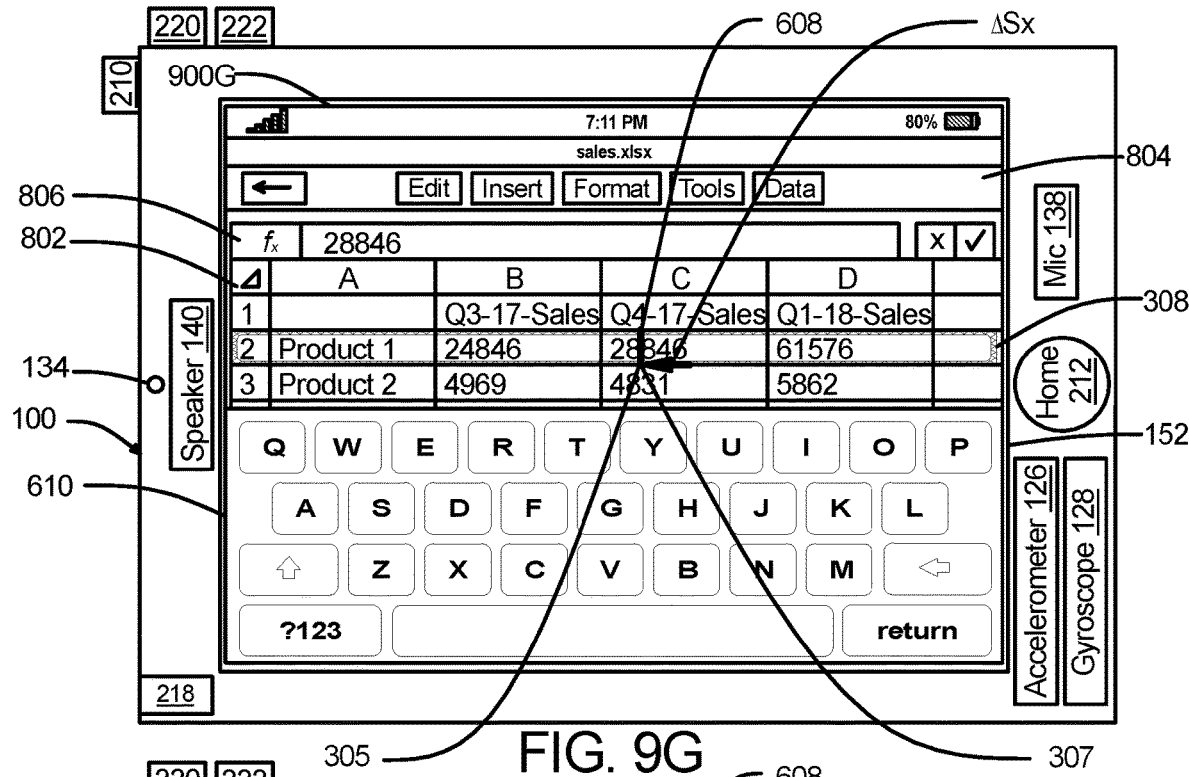

With selection 608 at a first position within the text-object, a user can perform a horizontal-slide finger gesture 912 to 914 beginning anywhere on selection positioning and control (SPC) icon 308 as illustrated in FIG. 9F. In response to detecting ΔFx (a change in the horizontal position) of a finger contact on the SPC icon, the device changes the position of selection 608 from a first position to a second position as illustrated in FIGS. 9F-9G. In one exemplary embodiment, ΔSx (the change in the horizontal position of the selection) is approximately proportional to ΔFx, as illustrated in FIGS. 9F-9G. This can be written as ΔSx=KxΔFx where Kx is a proportionality constant. Kx can be less than one, equal to one, or greater than one. In some embodiments, Kx can be a function of the slide gesture speed in the x-direction. In this example, Kx<1.

Figure 9H:
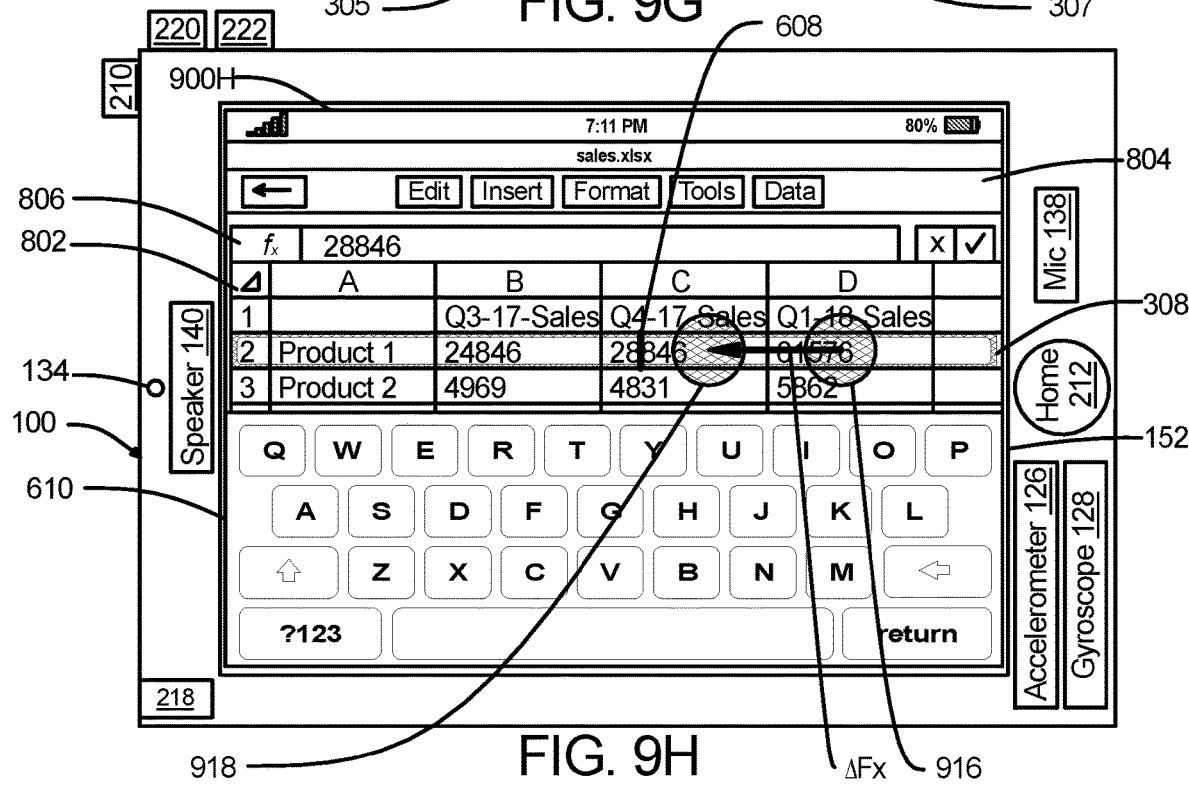
Figure 9I:
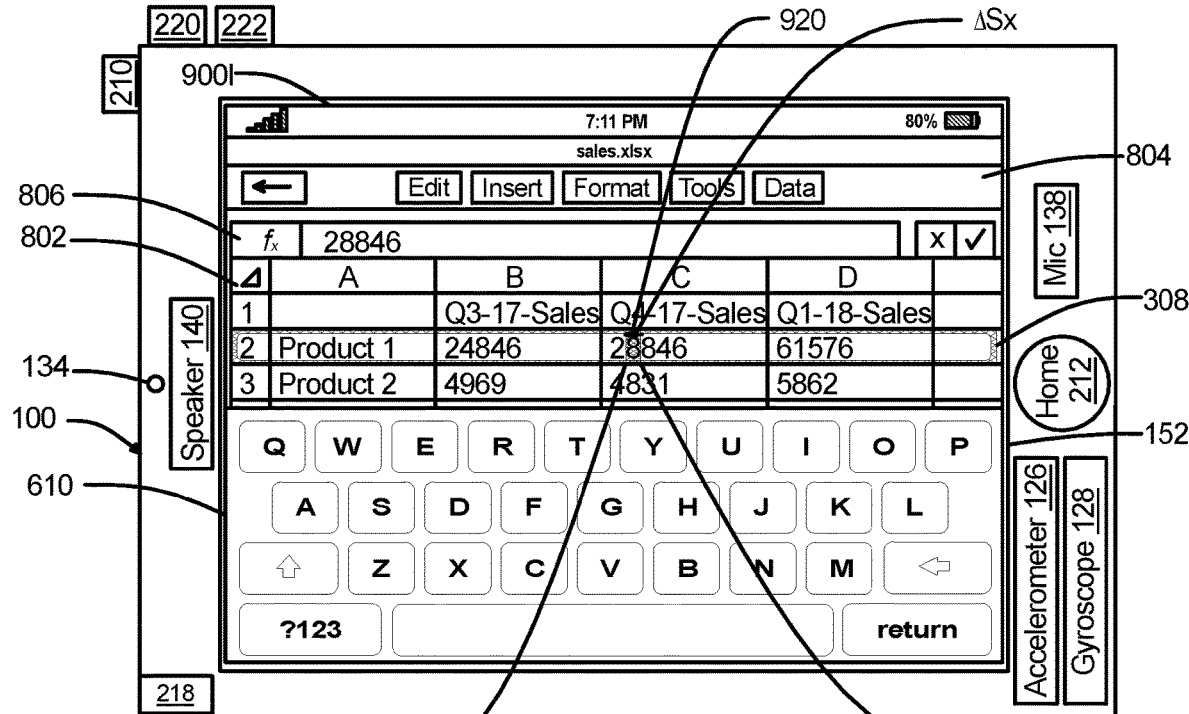
Figure 9J:
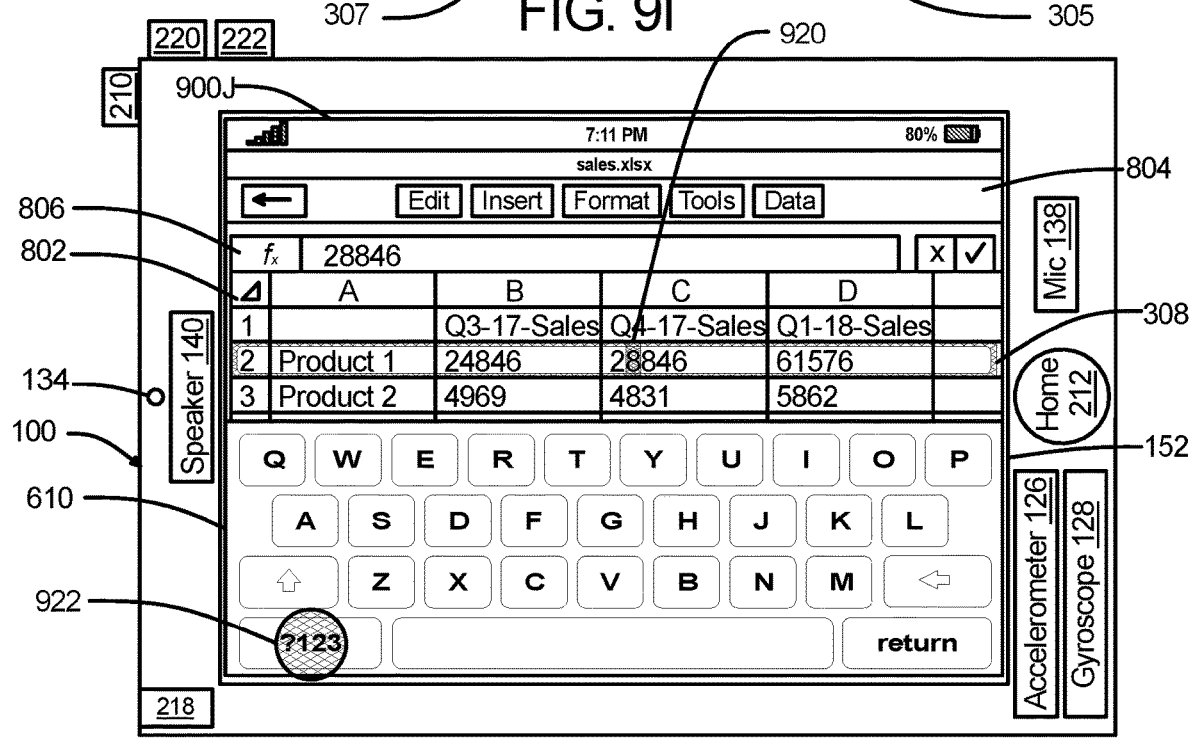

With selection 608 at a new first position within the text-object as illustrated in FIG. 9H, a user can perform a horizontal tap-and-slide finger gesture 916 to 918 beginning anywhere on selection positioning and control (SPC) icon 308 as illustrated in FIG. 9H. In response to detecting a tap and change in the horizontal position (ΔFx) of a finger contact on the SPC icon, the device selects text within the text-object from a first position to a second position as illustrated in FIGS. 9H-9I. In one exemplary embodiment, ΔSx (the change in the horizontal position of the selection) is approximately proportional to ΔFx, as illustrated in FIGS. 9H-9I. This can be written as ΔSx=KxΔFx where Kx is a proportionality constant. Kx can be less than one, equal to one, or greater than one. In some embodiments, Kx can be a function of the slide gesture speed in the x-direction. In this example, Kx<1. In this example the "8" character is selected.

Figure 9K:
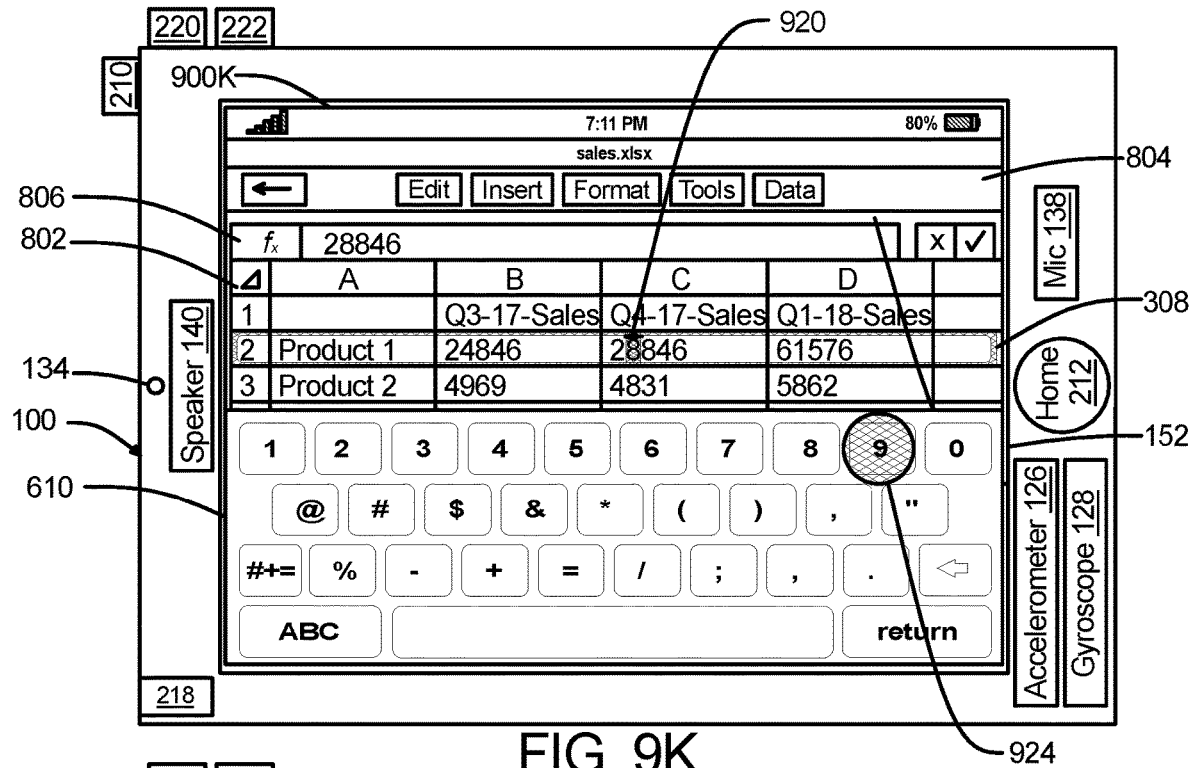
Figure 9L:
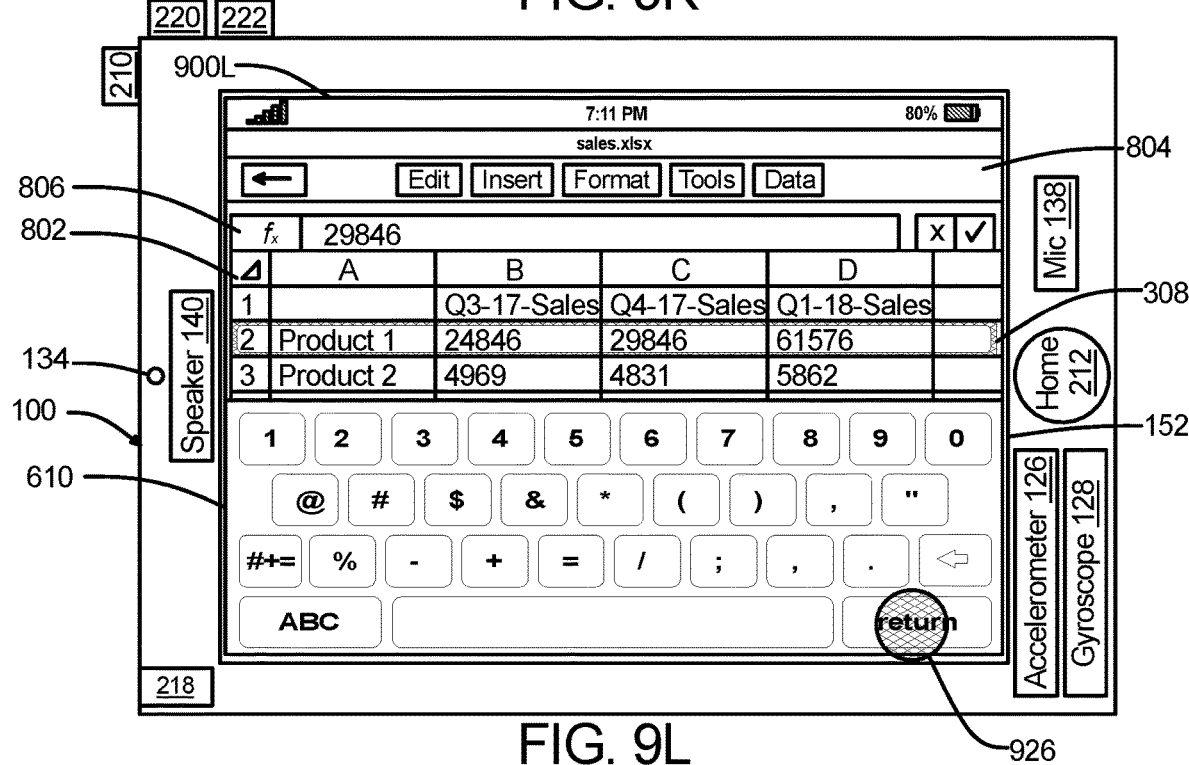
Figure 9M:
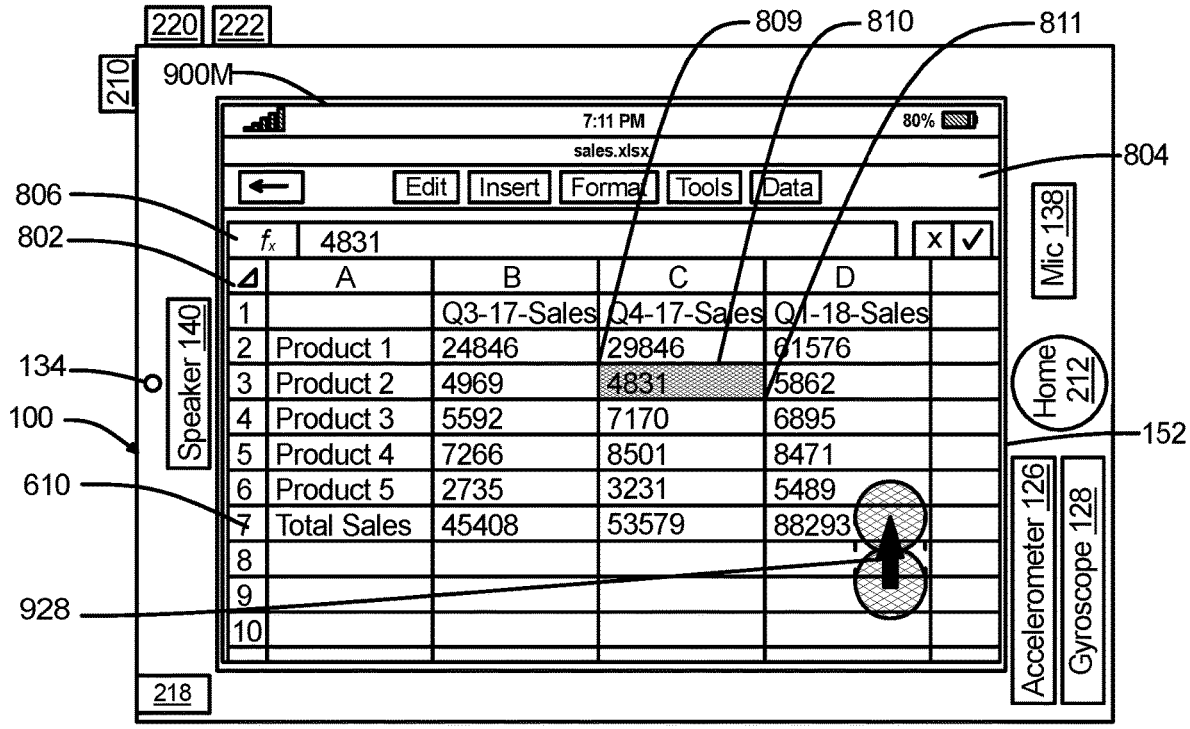

With the selection 920 (the "8" character) displayed, a user can perform tap gesture 922 on keyboard selection key, to display the numeric and punctuation keyboard; a user can perform tap gesture 924 on the "9" key to enter the "9" character at the position of selection 920 as illustrated in FIGS. 9K-9L. In response, the device displays UI 900M with the value in cell C2 changed from 28846 to 29846, the total in cell C7 updated from 52579 to 53579, and with the SPC icon and keyboard no longer displayed as illustrated in FIG. 9M.

Figure 9N:
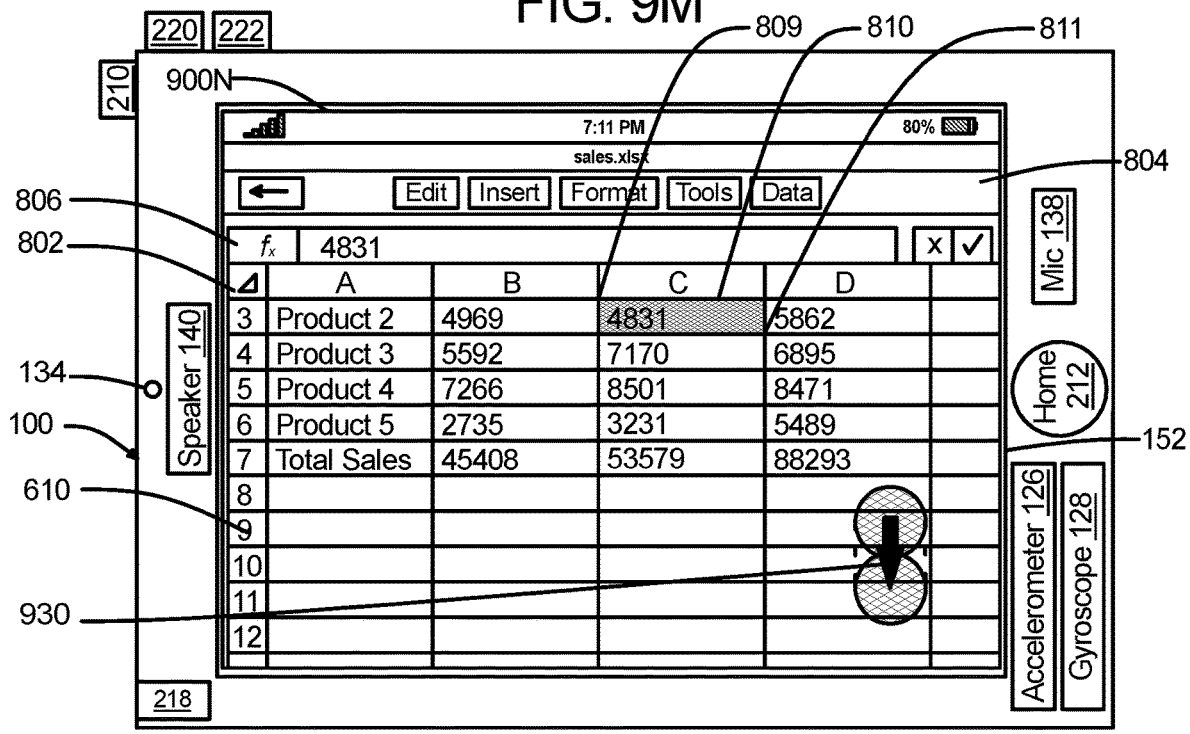
Figure 9O:
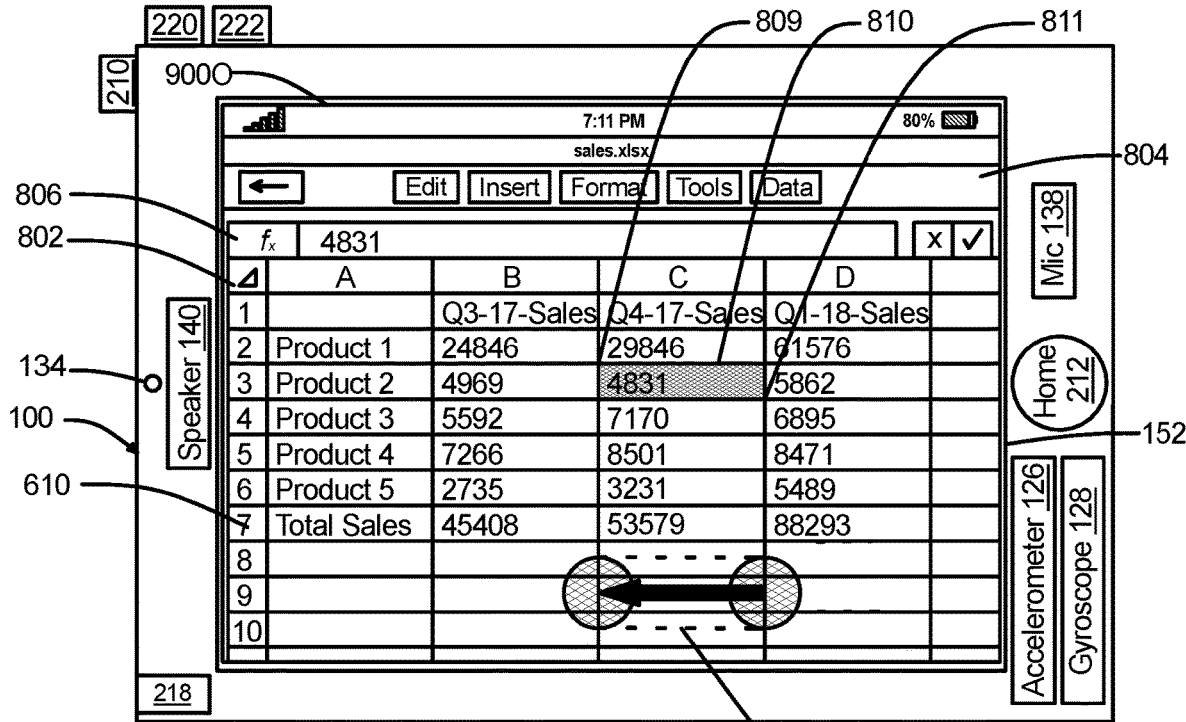
Figure 9P:
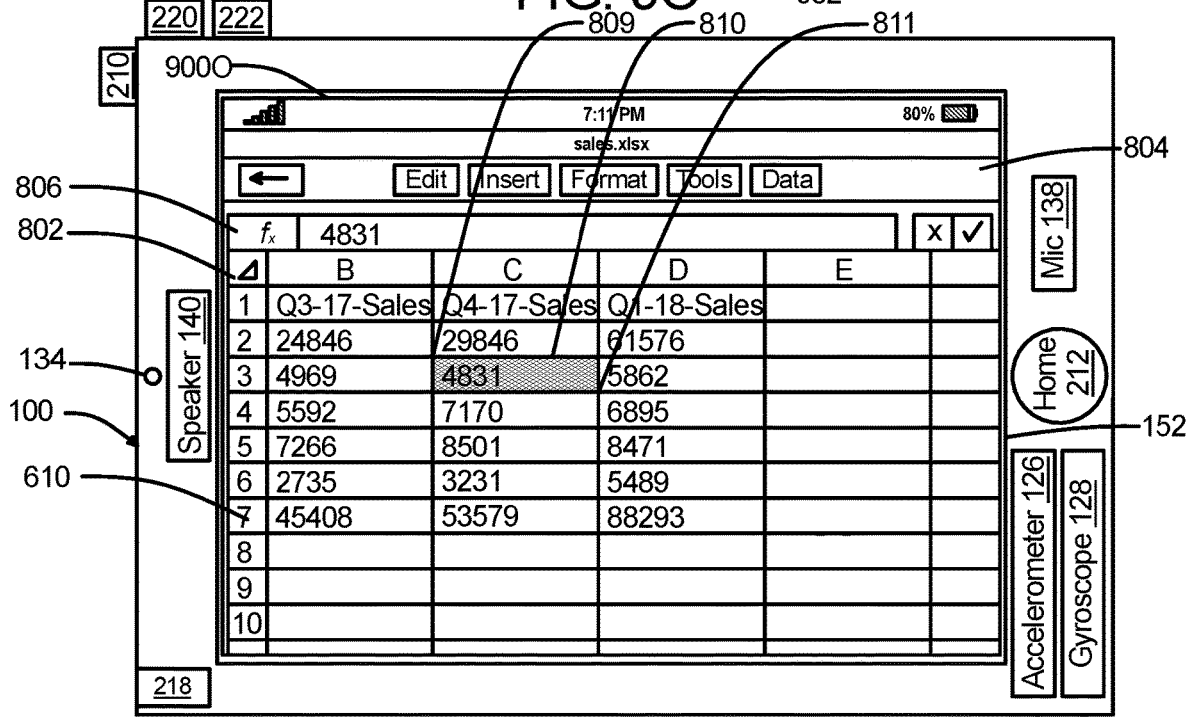

Content scroll by user: 1) Text-object content 802 can be moved vertically (scrolled) or moved horizontally with a slide finger gesture at any position on the content if SPC icon 308 is not present. A user can perform a vertical scroll gesture (sometimes called a pan gesture) 928 on content 802 to move the text-object content up as illustrated in FIGS. 9M-9N. Similarly, a user can perform a vertical scroll gesture (sometimes called a pan gesture) 930 on content 802 to move the text-object content down as illustrated in FIGS. 9N-9O. A user can perform a horizontal scroll gesture (sometimes called a pan gesture) 932 on content 802 to move the text-object content horizontally as illustrated in FIGS. 9O-9P. 2) Text-object content 802 can be moved vertically (scrolled) or moved horizontally with a slide finger gesture at any position on the content. The pan gesture is positioned outside selection positioning and control (SPC) icon 308 if the SPC icon is present.

Figure 10A:
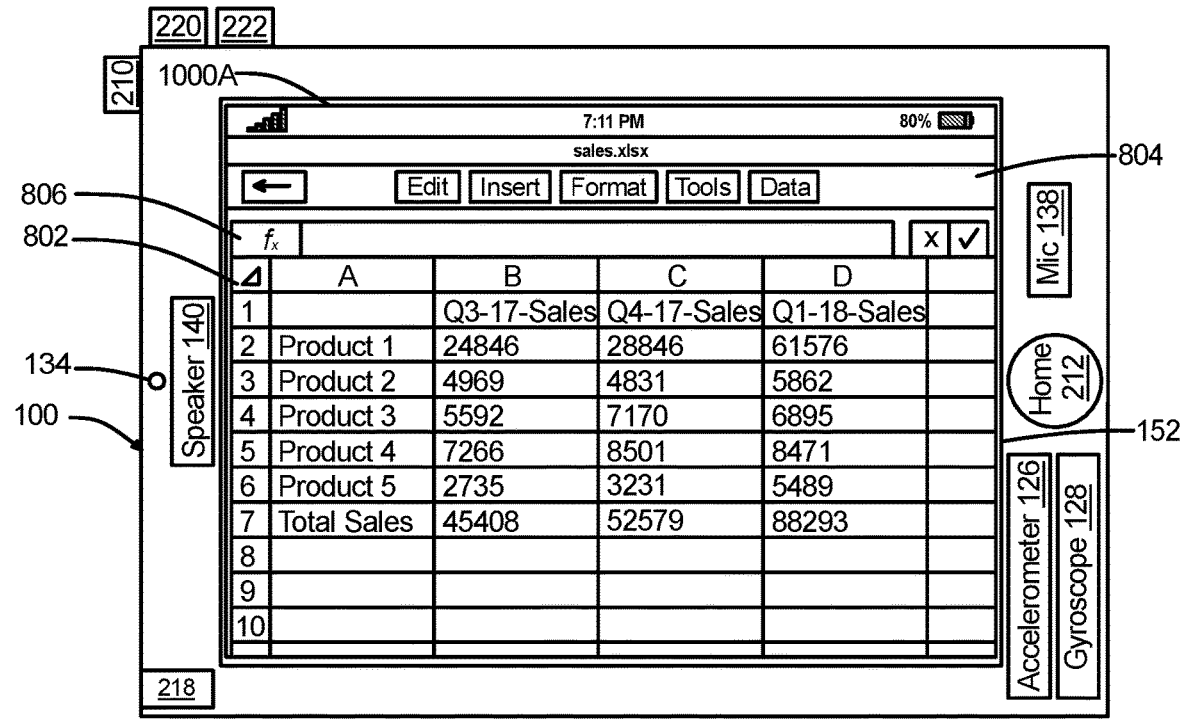
FIGS. 10A-10N Illustrate an exemplary graphical user interface and method for performing a secondary-click action with respect to one or more selected text-objects (spreadsheet cells) within editable text-object content (a spreadsheet), on a mobile computing device with a touch-sensitive display, in accordance with some embodiments.
Figure 10B:
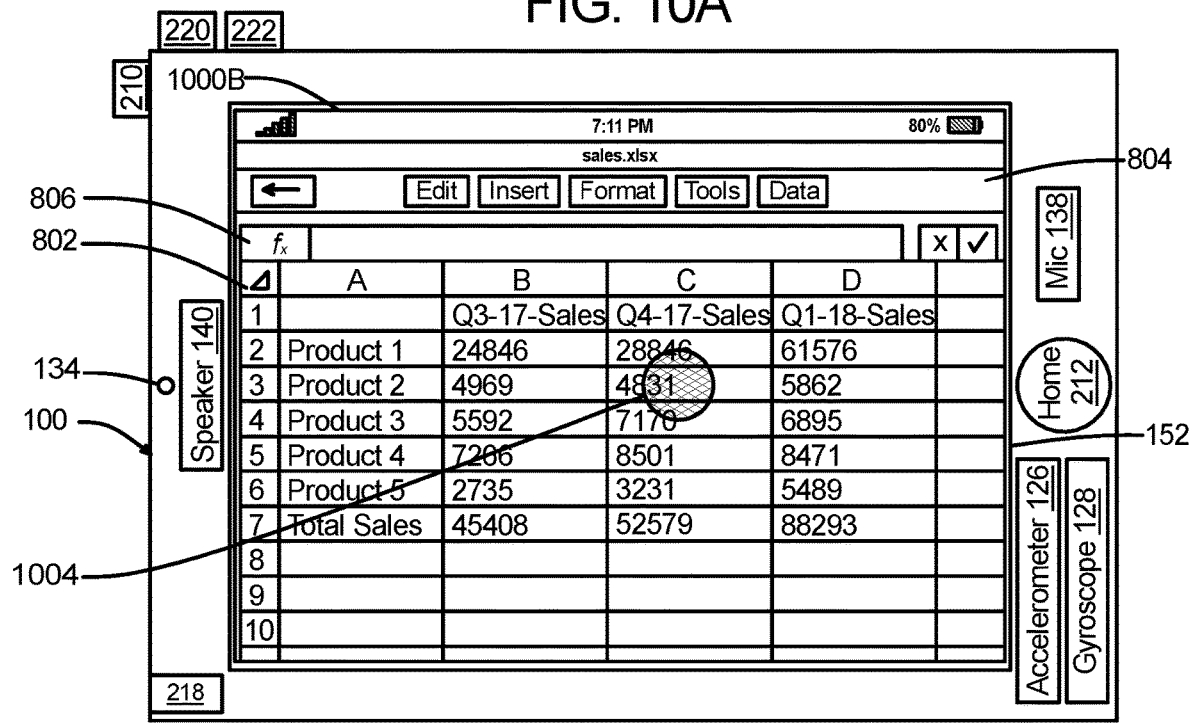

10.0 Performing a secondary-click action with respect to a text-object selection within editable text text-object content: FIGS. 10A-10N Illustrate an exemplary graphical user interface and method for performing a secondary-click action with respect to selected text-objects (spreadsheet cells) within editable text-object content (a spreadsheet). The device can display editable text-object content 802 in UI 1000A (FIG. 10A).

First Example: A user can perform a long-press finger gesture 1004 on the editable text-object content 802 as illustrated in UI 1000B (FIG. 10B). In response to detecting the finger gesture on the content, the device can display UI 1000C (FIG. 10C) with selection positioning and control (SPC) icon 308 at an SPC icon first position and text-object selection 810 at a selection first position. In one exemplary embodiment, the selection first position is the location of the finger gesture on the content.

Figure 10C:
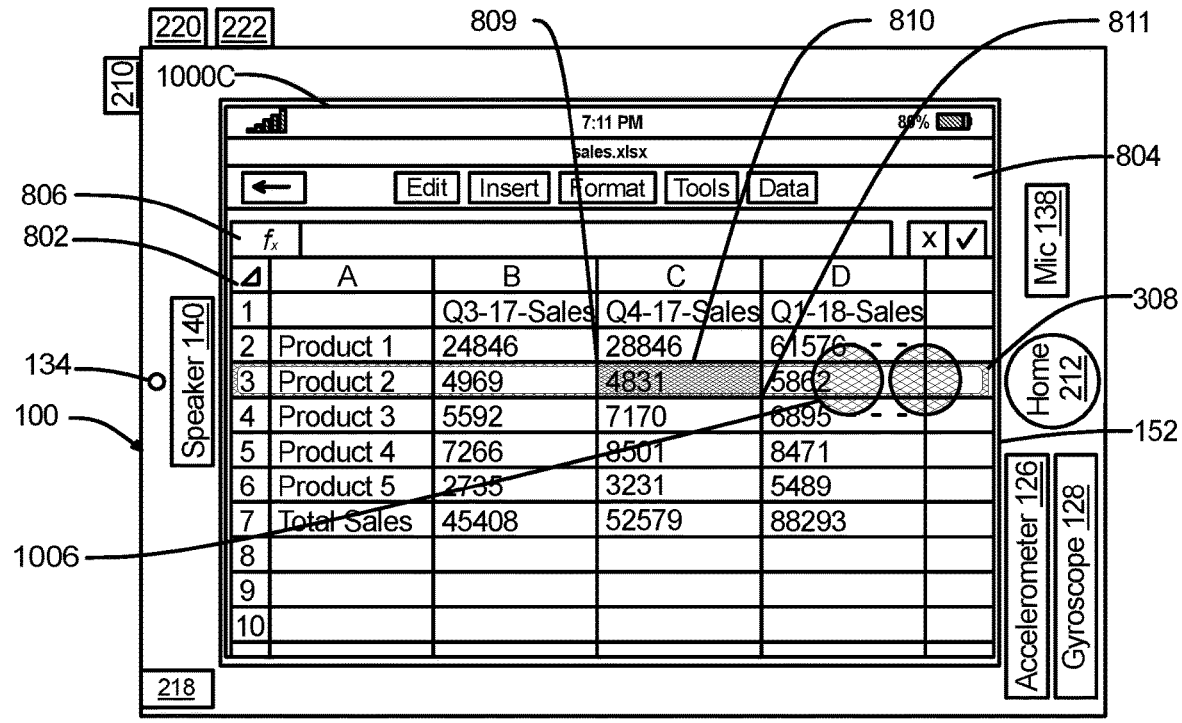
Figure 10D:
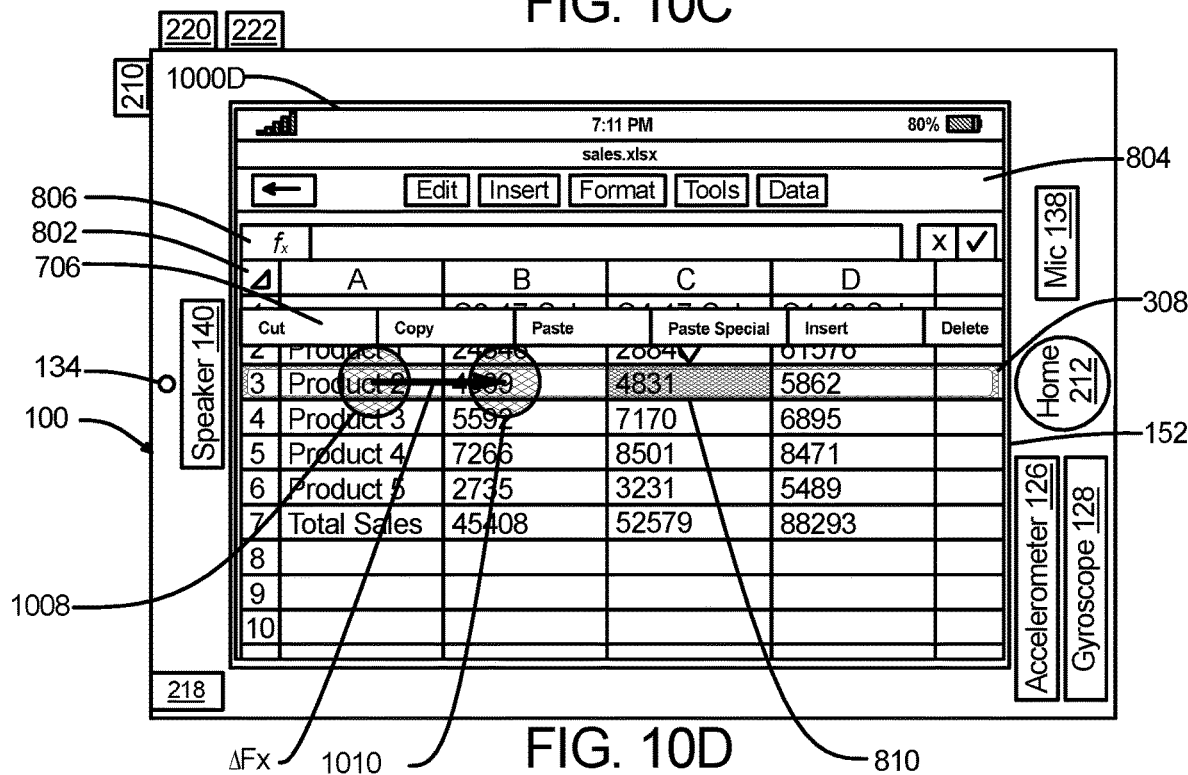

A user can perform secondary-click gesture 1006 (a two-finger tap gesture for example) on selection positioning and control (SPC) icon 308 as illustrated in UI 1000C (FIG. 10C). In response to detecting the secondary-click gesture on SPC icon 308, the device displays secondary-click menu 706 adjacent to text-object selection 810 as illustrated in UI 1000D (FIG. 10D). Secondary-click menu 706 displays a list of actions that can be performed with respect to text-object selection 810. A similar approach can be used to perform an action with respect to an extended selection of multiple text-objects.

1) A user can perform a horizontal slide finger gesture 1008 to 1010 beginning anywhere on SPC icon 308 as illustrated in UI 1000D (FIG. 10D). In response to detecting a change in a horizontal position of a finger contact (ΔFx) on SPC icon 308, the device can display menu item preselection 710 at a position within a secondary-click menu and change a position (ΔSx) of menu item preselection 710 to "Delete" on secondary-click menu 706 as illustrated in UI 1000E (FIG. 10E).

Figure 10E:
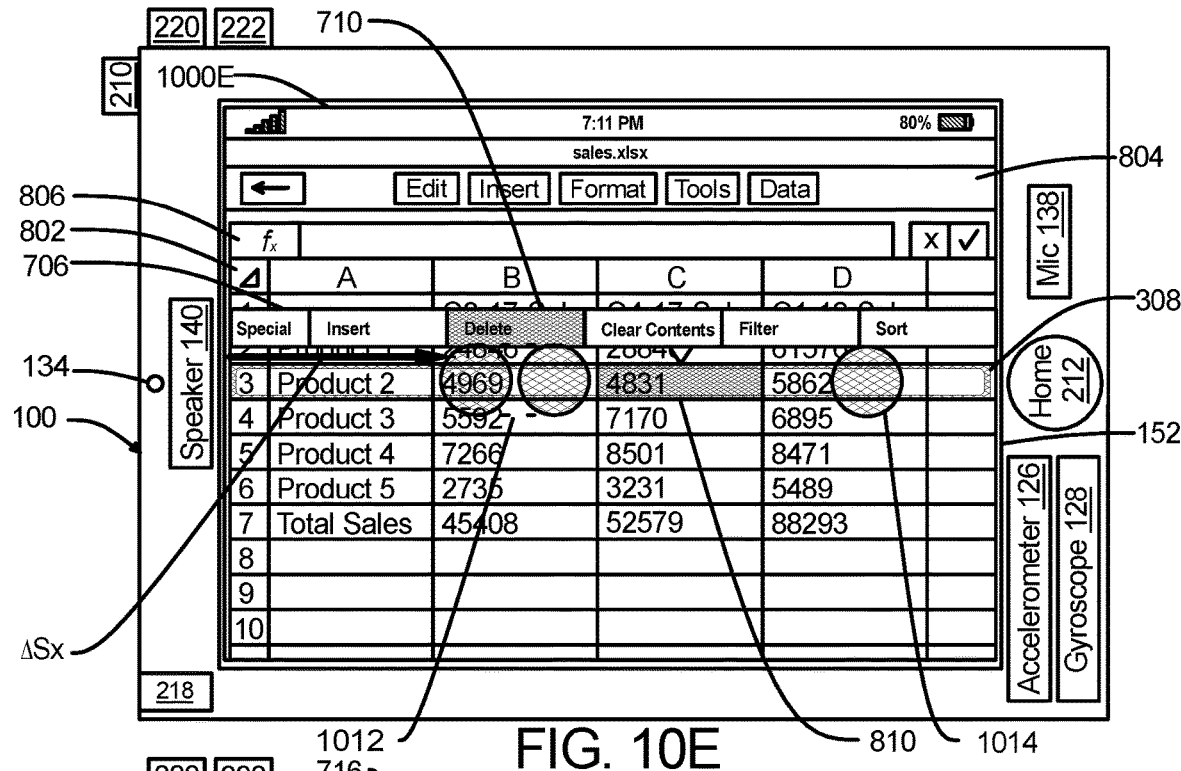

In one exemplary embodiment ΔSx (the change in the horizontal position of menu item preselection 710) is approximately proportional to ΔFx as illustrated in FIGS. 10D-10E. Kx is the proportionality constant for motion in the x-direction. ΔSx is not exactly proportional to ΔFx because the selection moves in discrete steps corresponding the width of each item in the menu. Kx can be a function of the slide gesture speed where Kx<1, Kx=1, or Kx>1. In the example shown, the user has performed a slide gesture right, until the device changes the horizontal position of menu item preselection 710 to the item "Delete" on secondary-click menu 706 as illustrated in FIGS. 10D-10E.

The secondary-click menu 706 in this example contains the following sequence of menu items: "Cut", "Copy", "Paste", "Paste Special", "Insert", "Delete", "Clear Contents", "Filter", and "Sort". In this example, secondary-click menu 706 has horizontal extent that exceeds the display horizontal extent and only a portion of the menu can be displayed as illustrated in FIG. 10D. The following items are visible in UI 1000D (FIG. 10D): "Cut", "Copy", "Paste", "Paste Special", "Insert", "Delete". In the example shown, the user has performed a slide gesture right on SPC icon 308 to change the position of preselection 710. When preselection 710 is moved to a position which is approximately one menu item from the right boundary, the device auto-scrolls secondary-click menu 706 left as shown in UI 1000E (FIG. 10E).

Cancel display of a secondary-click menu: a user can perform a secondary-click menu cancel gesture 1012 (a two-finger tap gesture for example) on selection positioning and control (SPC) icon 308 as illustrated in FIG. 10E. In response to detecting the secondary-click menu cancel gesture, the device redisplays UI 1000C (FIG. 10C).

Figure 10F:
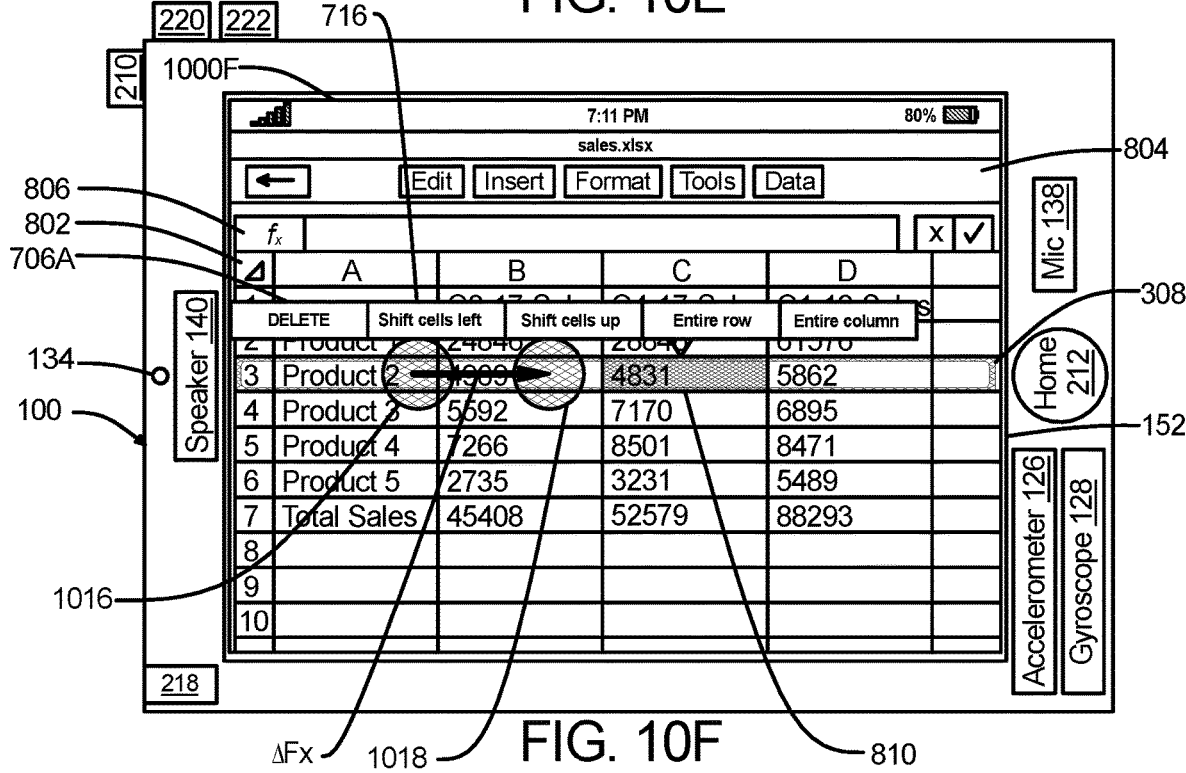

2) A user can perform tap gesture 1014 on SPC icon 308 as illustrated in FIG. 10E. In response, the device displays sub-menu 716 showing a list of "Delete" actions as illustrated in UI 1000F (FIG. 10F). The list of "Delete" actions is for the text-object (spreadsheet cell in this example) at the position of text-object selection 810 when the secondary-click gesture was performed. In this example text-object selection 810 is positioned at cell C3. The device can also display the selected menu item 706A to provide context for the displayed submenu 716.

3) A user can perform a horizontal slide finger gesture 1016 to 1018 beginning anywhere on SPC icon 308. In response to detecting a change in a horizontal position of a finger contact (ΔFx) on SPC icon 308, the device can display menu item preselection 710 at a position within a secondary-click menu and change a position (ΔSx) of menu item preselection 710 on sub-menu 716 to the "Delete" action "Entire Row" as illustrated in FIG. 10G.

In one exemplary embodiment ΔSX (the change in the horizontal position of menu item preselection 710) is approximately proportional to ΔFx. Kx is the proportionality constant for motion in the x-direction. ΔSx is not exactly proportional to ΔFx because the selection moves in discrete steps corresponding the horizontal distance between items in the menu. In the example shown the user has performed a slide gesture in the rightward direction, until the device changes the horizontal position of menu item preselection 710 to the item "Entire Row" on sub-menu 716 as illustrated in UI 1000G (FIG. 10G).

Figure 10G:
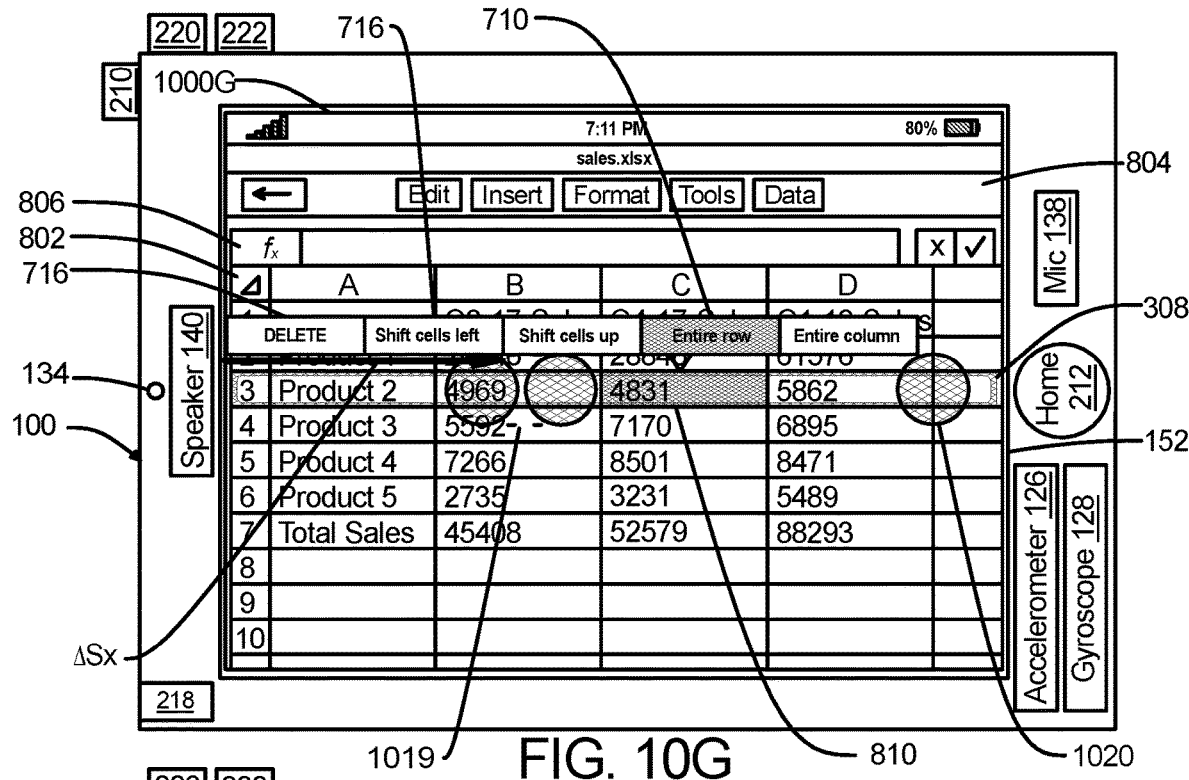

Cancel display of a secondary-click menu: a user can perform a secondary-click menu cancel gesture 1019 (a two-finger tap gesture for example) on selection positioning and control (SPC) icon 308 as illustrated in FIG. 10G. In response to detecting the secondary-click menu cancel gesture, the device redisplays menu 706 as UI 1000E (FIG. 10E)

Figure 10H:
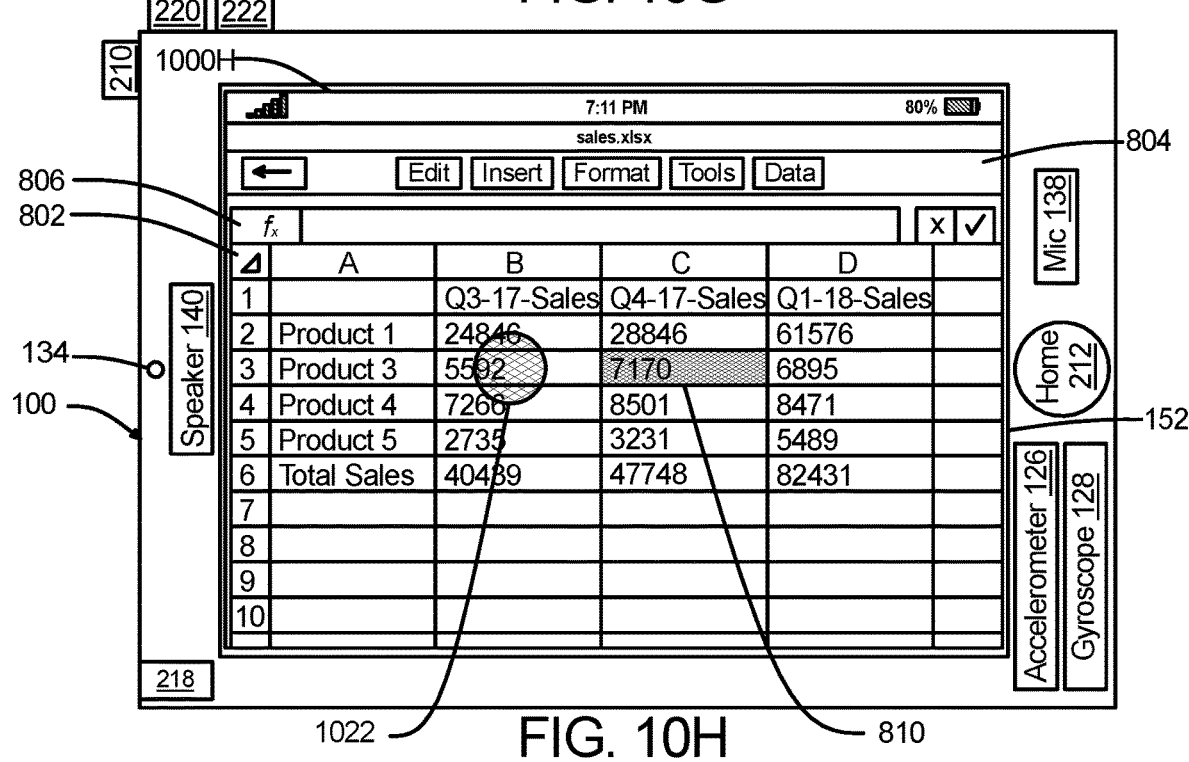

4) A user can perform tap gesture 1020 on SPC icon 308 as illustrated in FIG. 10G. In response, the device deletes the entire row containing data for "Product 2" as illustrated in FIG. 10H. The device also updates the "Total Sales" row.

Second Example: A user can perform a long-press finger gesture 1022 on the editable text-object content 802 as illustrated in UI 1100H (FIG. 10H). In response to detecting the long-press finger gesture on the content, the device can display UI 1000I (FIG. 10I) with selection positioning and control (SPC) icon 308 at an SPC icon first position and text-object selection 810 at a selection first position at cell B3. In one exemplary embodiment, the selection first position is the location of the finger gesture on the content.

Figure 10I:
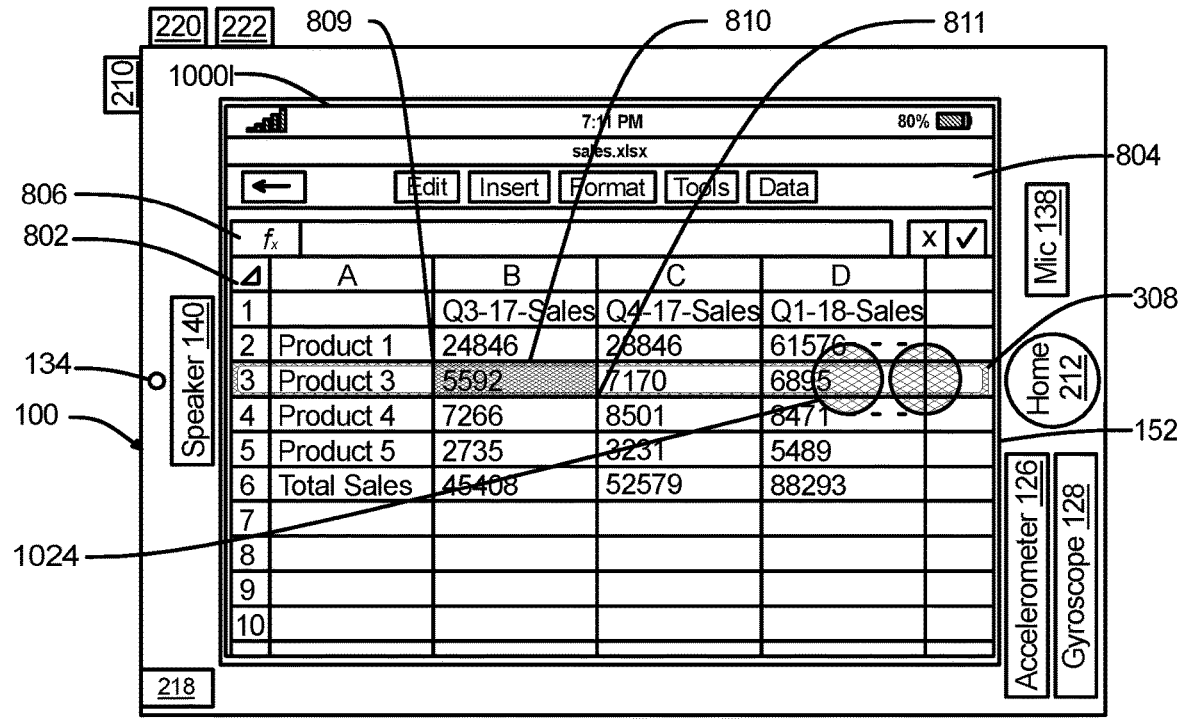
Figure 10J:
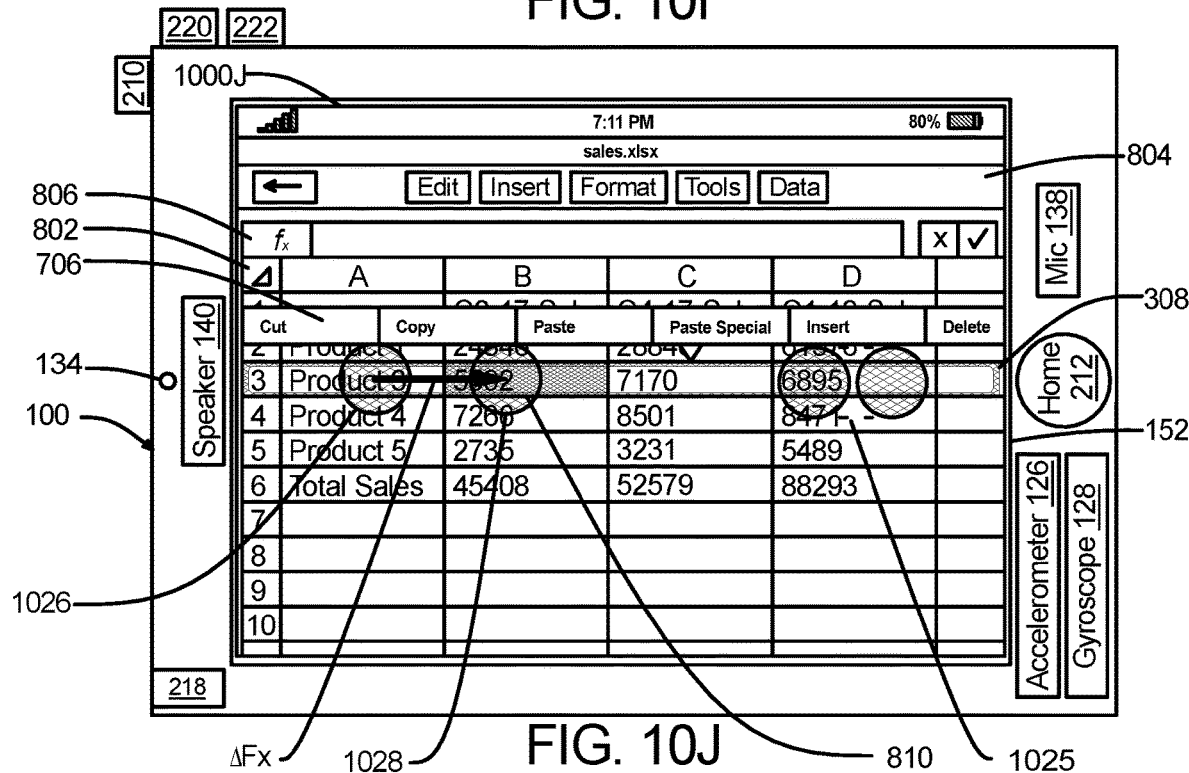

A user can perform secondary-click gesture 1024 (a two-finger tap gesture for example) on selection positioning and control (SPC) icon 308 as illustrated in UI 1000I (FIG. 10I). In response to detecting the secondary-click gesture on SPC icon 308, the device displays secondary-click menu 706 adjacent to text-object selection 810 as illustrated in UI 1000J (FIG. 10J). Secondary-click menu 706 displays a list of actions that can be performed with respect to text-object selection 810. A similar approach can be used to perform an action with respect to an extended selection of multiple text-objects.

1) A user can perform a horizontal slide finger gesture 1026 to 1028 beginning anywhere on SPC icon 308 as illustrated in UI 1000J (FIG. 10J). In response to detecting a change in a horizontal position of a finger contact ($\Delta Fx$) on SPC icon 308, the device can display menu item preselection 710 at a position within a secondary-click menu and change a position ($\Delta Sx$) of menu item preselection 710 to "Insert" within secondary-click menu 706 as illustrated in UI 1000K (FIG. 10K).

Figure 10K:
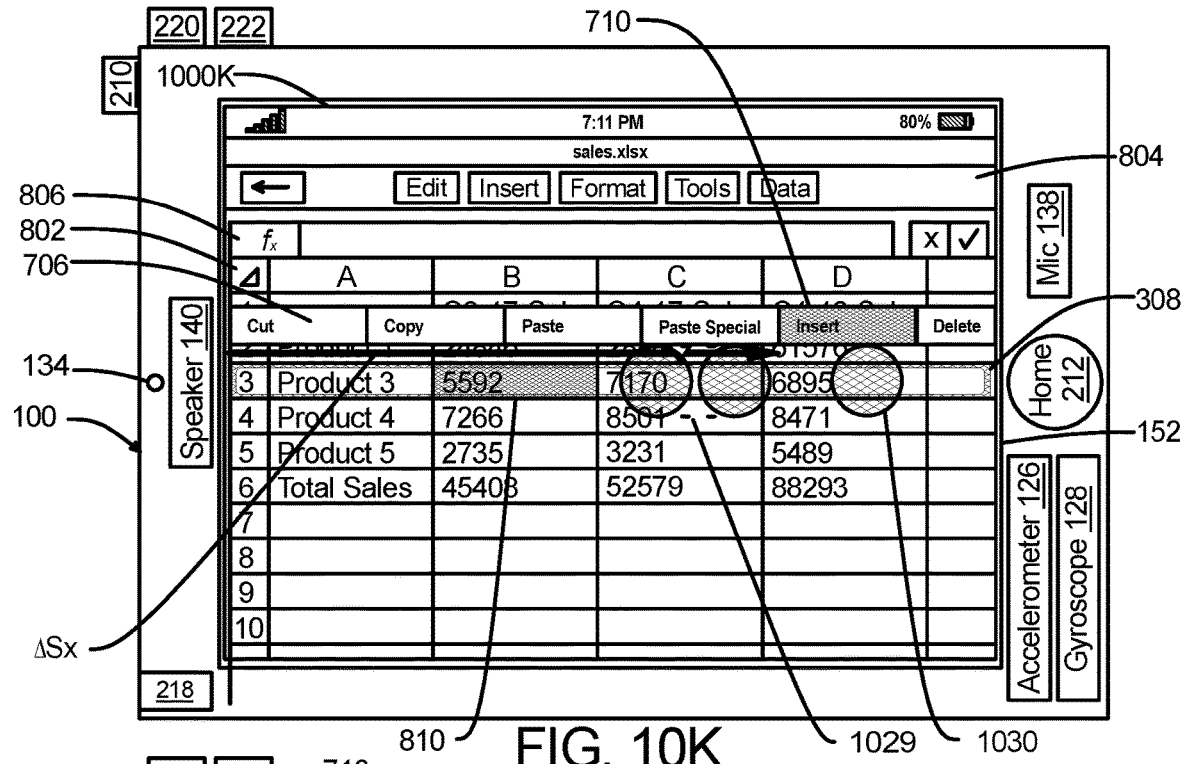

In one exemplary embodiment $\Delta Sx$ (the change in the horizontal position of menu item preselection 710) is approximately proportional to $\Delta Fx$ as illustrated in FIGS. 10J-10K. Kx is the proportionality constant for motion in the x-direction. $\Delta Sx$ is not exactly proportional to $\Delta Fx$ because the selection moves in discrete steps corresponding the width of each item in the menu. Kx can be a function of the slide gesture speed where Kx<1, Kx=1, or Kx>1. In the example shown, the user has performed a slide gesture right, until the device changes the horizontal position of menu item preselection 710 to the item "Insert" on secondary-click menu 706 as illustrated in FIG. 10K.

The secondary-click menu 706 in this example contains the following sequence of menu items: "Cut", "Copy", "Paste", "Paste Special", "Insert", "Delete", "Clear Contents", "Filter", and "Sort". In this example, secondary-click menu 706 has horizontal extent that exceeds the display horizontal extent and only a portion of the menu can be displayed. The following items are visible in UI 1000K (FIG. 10K): "Cut", "Copy", "Paste", "Paste Special", "Insert", "Delete".

Cancel display of a secondary-click menu: a user can perform a secondary-click menu cancel gesture 1029 (a two-finger tap gesture for example) on selection positioning and control (SPC) icon 308 as illustrated in FIG. 10K. In response to detecting the secondary-click menu cancel gesture, the device redisplays UI 1000I (FIG. 10I).

Figure 10L:
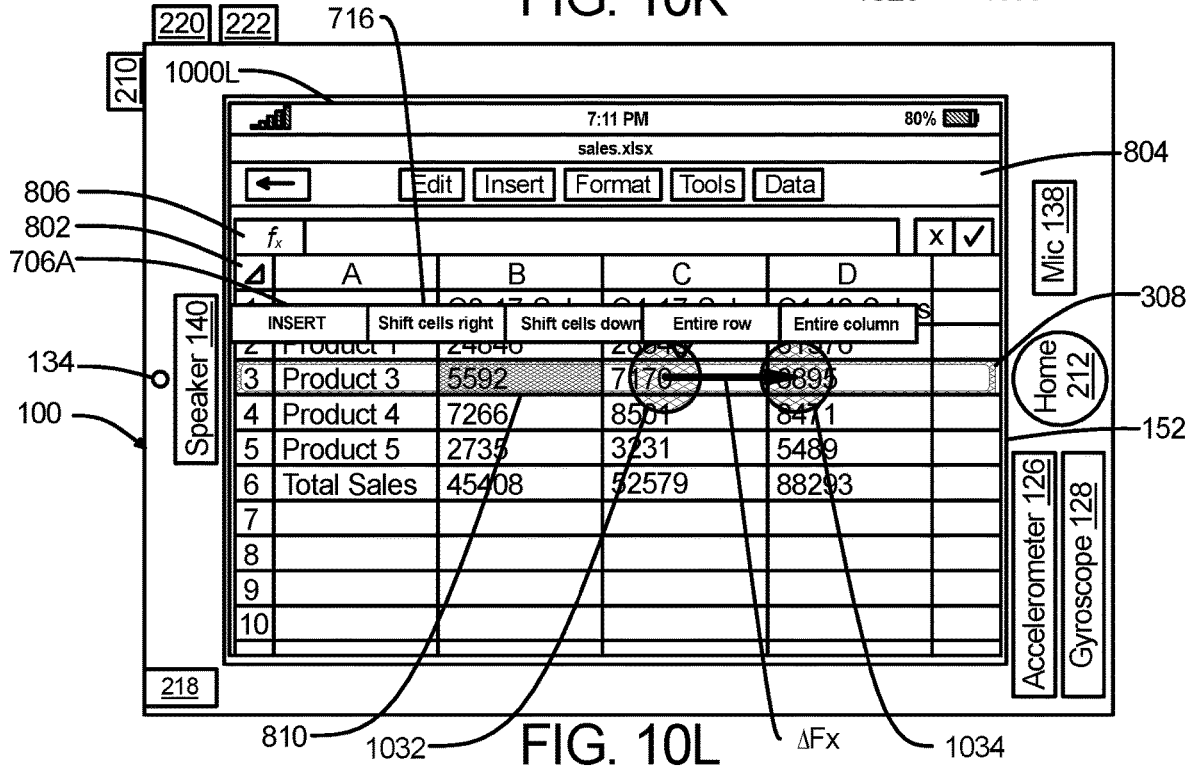

2) A user can perform tap gesture 1030 on SPC icon 308 as illustrated in FIG. 10K. In response, the device displays sub-menu 716 showing a list of "Insert" actions as illustrated in UI 1000L (FIG. 10L). The list of "Insert" actions is for the text-object (spreadsheet cell in this example) at the position of text-object selection 810 when the secondary-click gesture was performed. In this example text-object selection 810 is positioned at cell B3.

Figure 10M:
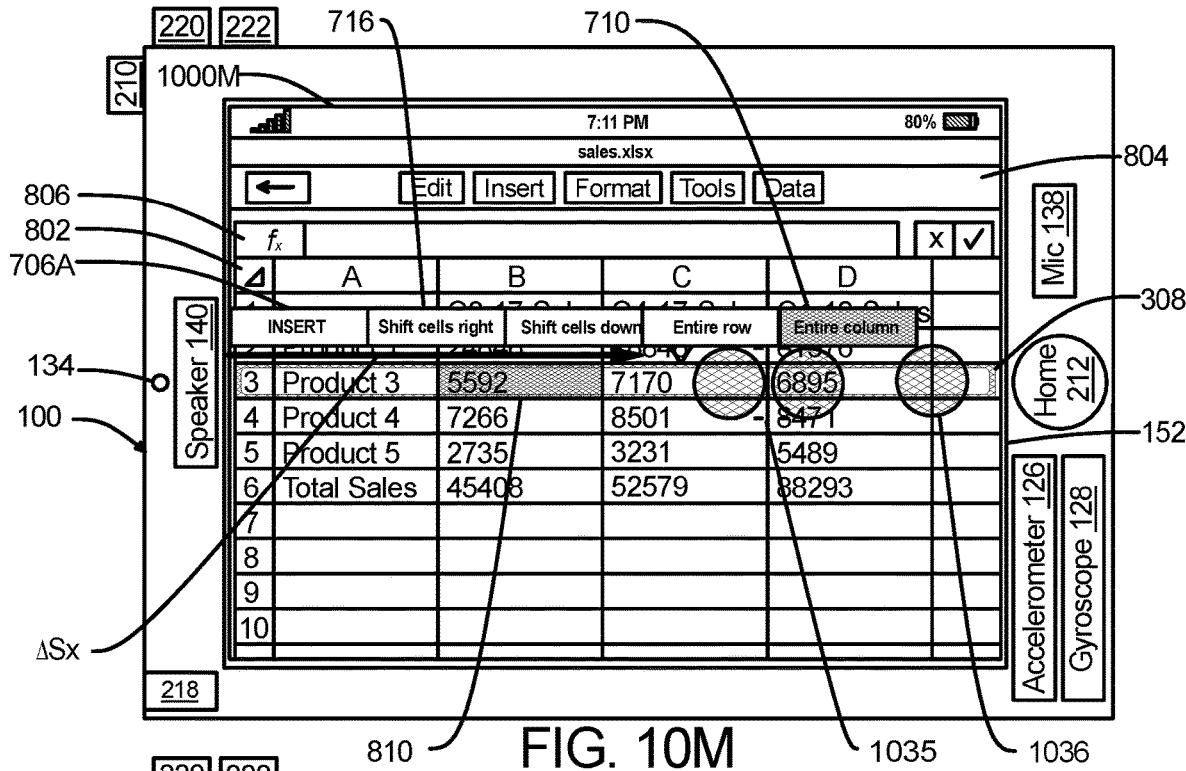
Figure 10N:
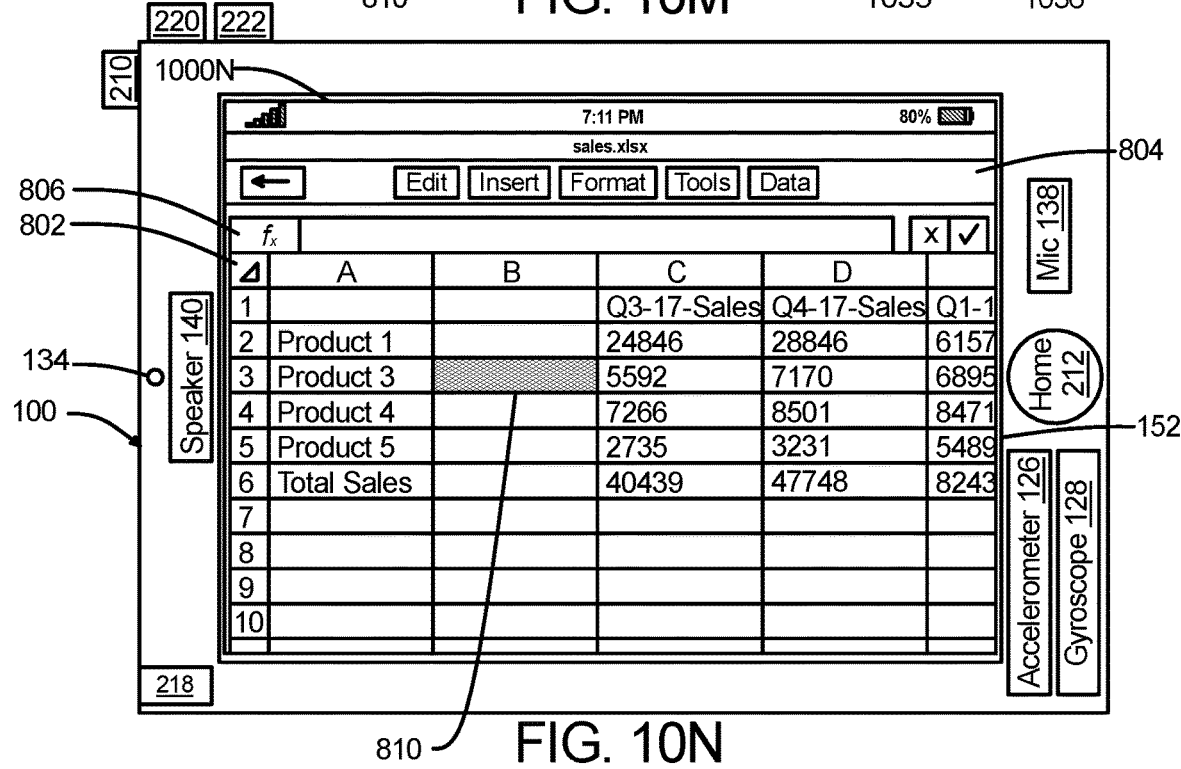

3) A user can perform a horizontal slide finger gesture 1032 to 1034 beginning anywhere on SPC icon 308. In response to detecting a change in a horizontal position of a finger contact ($\Delta Fx$) on SPC icon 308, the device can display menu item preselection 710 at a position within a secondary-click menu and change a position ($\Delta Sx$) of menu item preselection 710 within a secondary-click sub-menu 716 to the "Insert" action "Entire Column" as illustrated in FIG. 10M. In the example shown the user has performed a slide gesture in the rightward direction, until the device changes the horizontal position of menu item preselection 710 to the item "Entire Column" on sub-menu 716 as illustrated in UI 1000M (FIG. 10M).

Cancel display of a secondary-click menu: a user can perform a secondary-click menu cancel gesture 1035 (a two-finger tap gesture for example) on selection positioning and control (SPC) icon 308 as illustrated in FIG. 10M. In response to detecting the secondary-click menu cancel gesture, the device redisplays menu 706 as UI 1000K (FIG. 10K)

4) A user can perform tap gesture 1036 on SPC icon 308 as illustrated in FIG. 10M. In response, the device inserts an entire column prior to the column showing Q3-17-Sales as illustrated in FIG. 10N.

In this example, we have described methods for performing a secondary-click action with respect to text-object selection 810 within editable text-object content. These same methods can be used to perform a secondary-click action with respect to text-object selection 810 within read-only text-object content. These same methods can be used to perform a secondary-click action with respect to a selection of two or more text-objects within editable or read-only text-object content. The secondary-click menu can display those available actions that are applicable to the particular selection within text-object content (a spreadsheet in this example).

11.0 Displaying and moving a text-object selection, and selecting multiple text-objects within text-object content w/drag-lock off: FIGS. 11A-11M illustrate an exemplary graphical user interface and method for displaying a text-object selection, moving a text-object selection within text-object content (a spreadsheet), and selecting multiple text objects (spreadsheet cells) within text-object content (a spreadsheet) with drag-lock off in accordance with some embodiments.

Figure 11A:
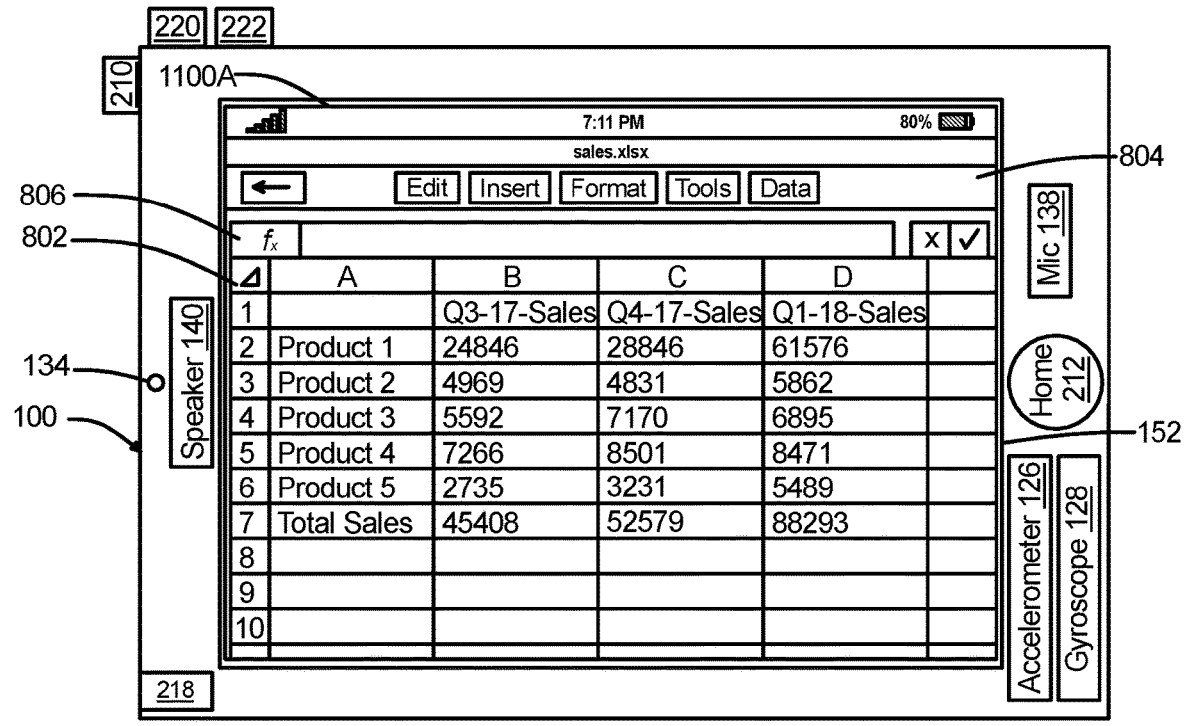
FIGS. 11A-11M illustrate an exemplary graphical user interface and method for displaying a text-object selection, moving a text-object selection within text-object content (a spreadsheet), and selecting multiple text objects (spreadsheet cells) within text-object content (a spreadsheet) with drag-lock off, on a mobile computing device with a touch-sensitive display, in accordance with some embodiments
Figure 11B:
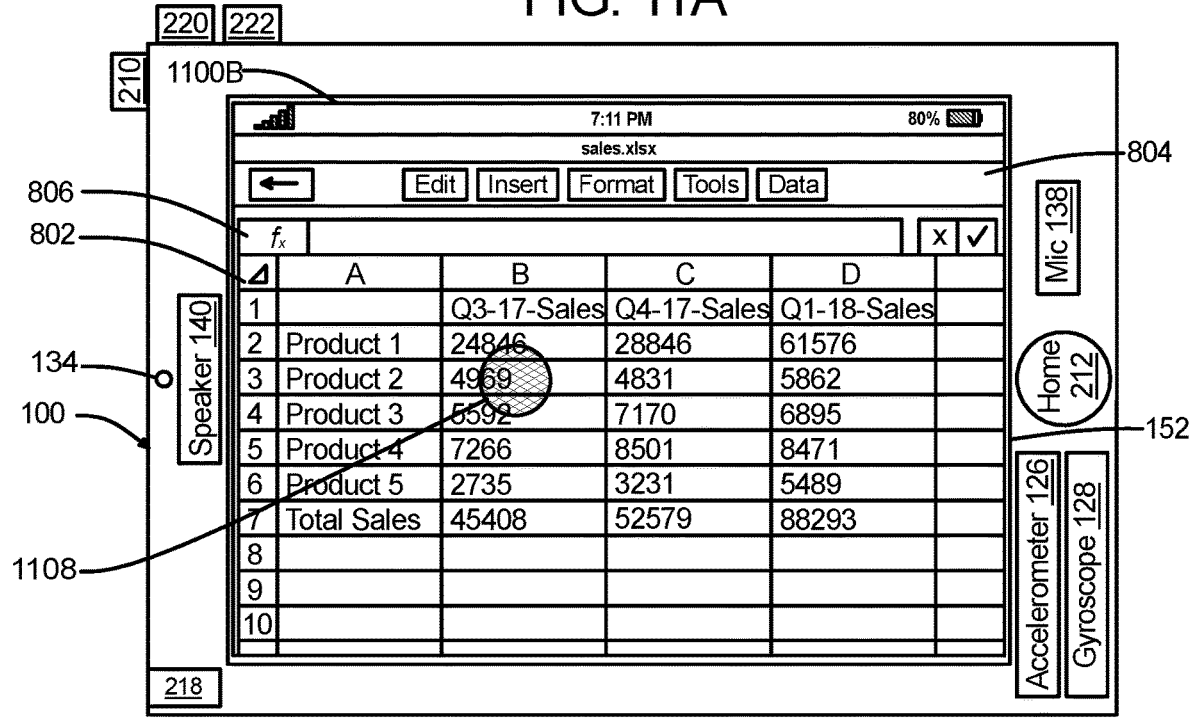
Figure 11C:
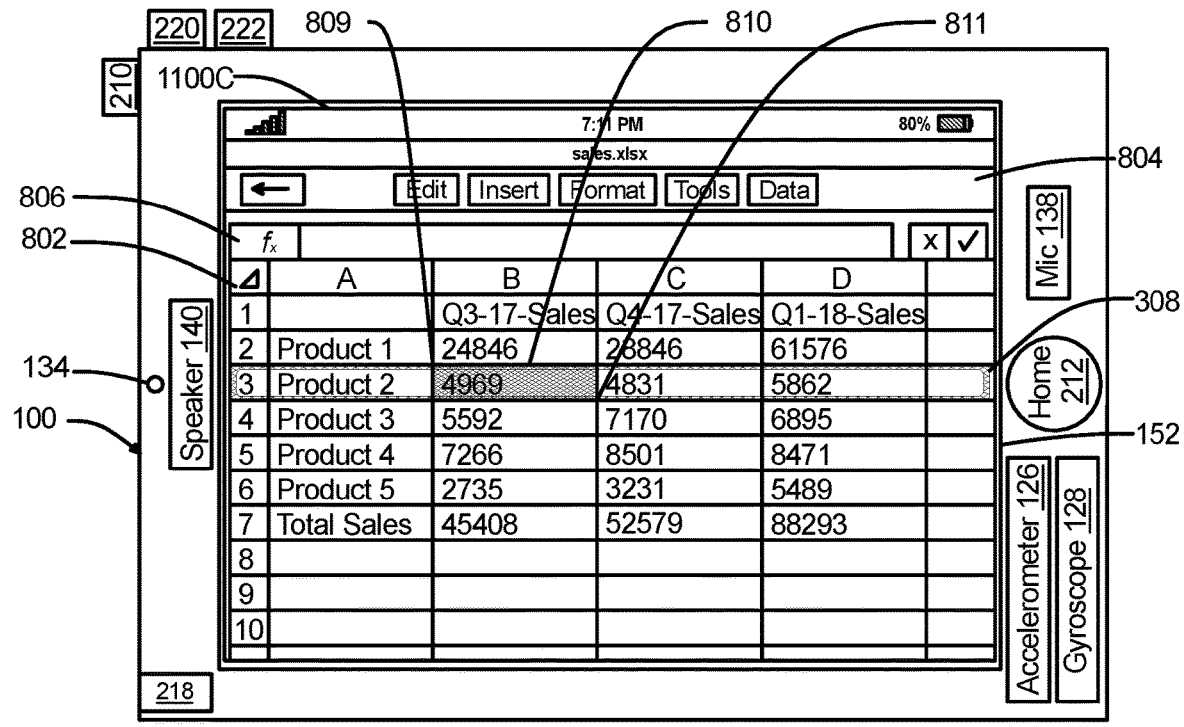

The device can display editable text-object content 802 as illustrated in FIG. 11A. The device can also display application navigation bar 804. A user can perform a long-press finger gesture 1108 on text-object content 802 as illustrated in FIG. 11B. In response to detecting the finger gesture on content 802, the device can display UI 1100C (FIG. 11C) with selection positioning and control (SPC) icon 308 at an SPC icon first position and text-object selection 810 at a selection first position with text-object selection start point 809 and text-object selection end point 811. In one exemplary embodiment, the selection first position is the location of the finger gesture on the content. In this disclosure we will sometimes refer to "text-object selection 810" simply as "selection 810".

Figure 11D:
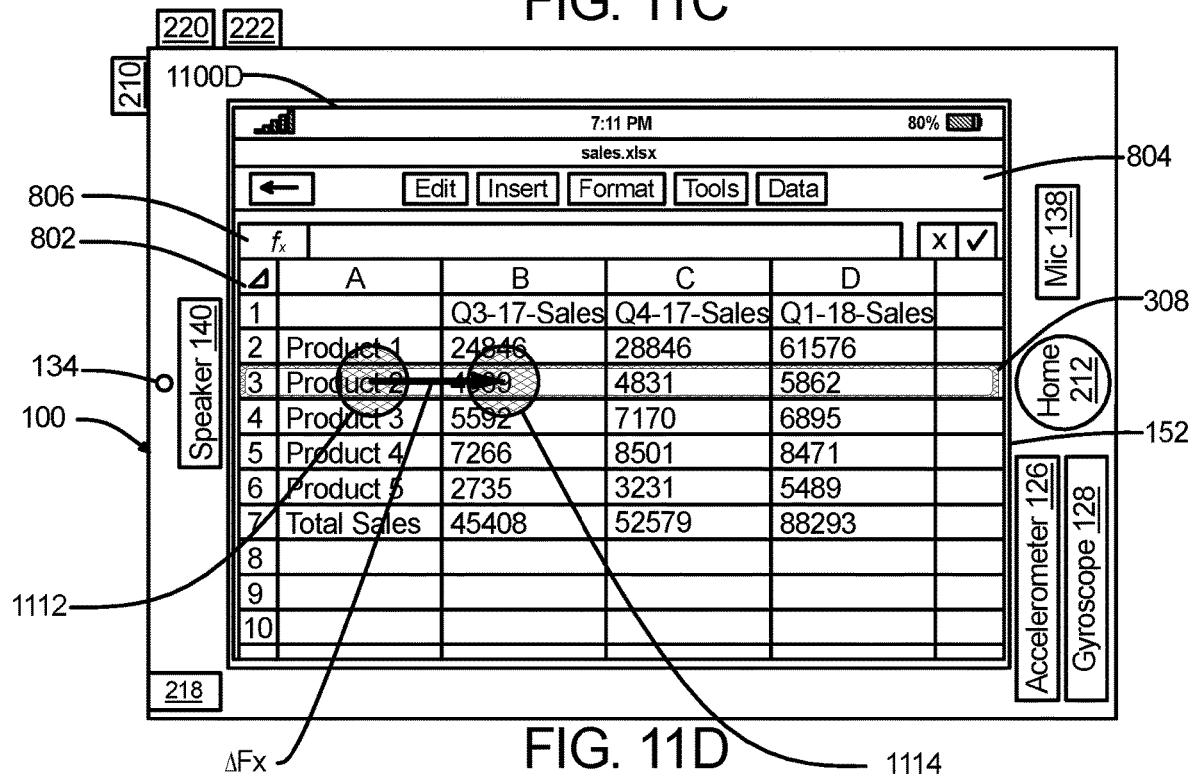
Figure 11E:
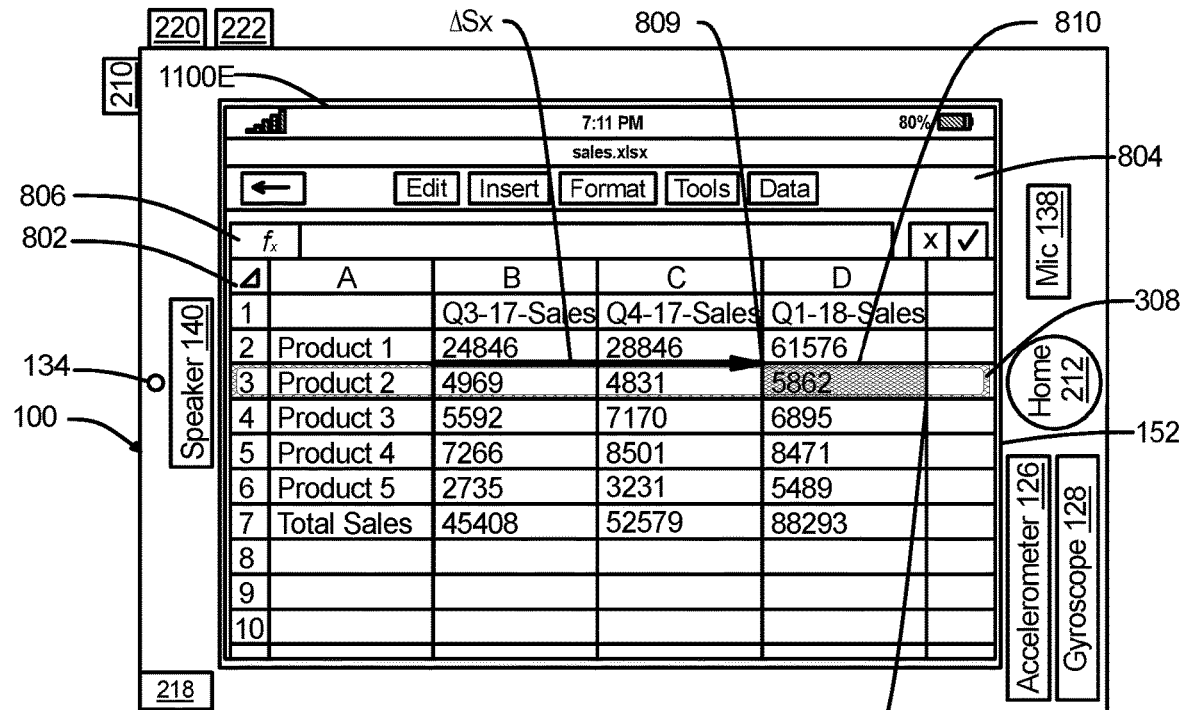

With text-object selection 810 at a first position, a user can perform a horizontal slide finger gesture 1112 to 1114 beginning anywhere on SPC icon 308 as illustrated in FIG. 11D. In response to detecting $\Delta Fx$ (a change in the horizontal position of a finger contact on the SPC icon), the device changes the position of text-object selection 810 on the display from a first position to a second position. In one example embodiment, $\Delta Sx$ (the change in the horizontal position of selection 810) is approximately proportional to $\Delta Fx$. This can be written as $\Delta Sx = Kx \Delta Fx$ where Kx is a proportionality constant. In this example, Kx>1. The device displays UI 1100E (FIG. 11E) with selection 810 at a second position. In this example, Kx>1 and text-object selection 810 is moved from cell B3 to cell D3. In some embodiments, Kx can be a function of the slide gesture speed in the x-direction.

Figure 11F:
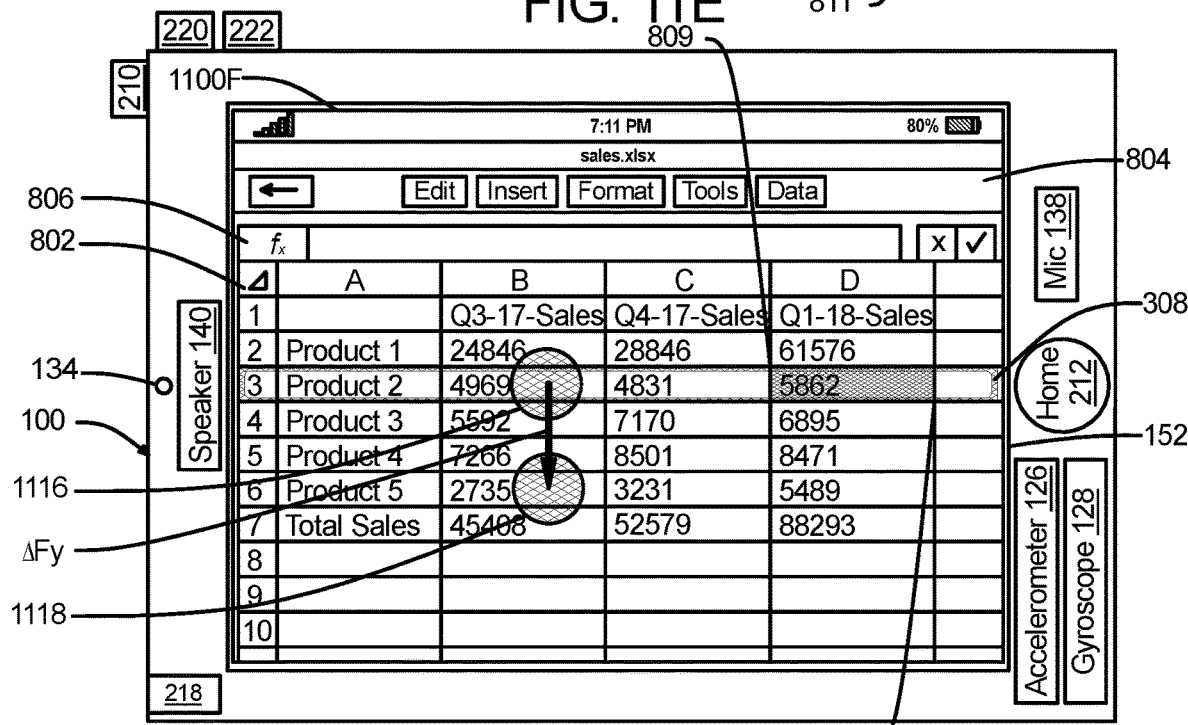
Figure 11G:
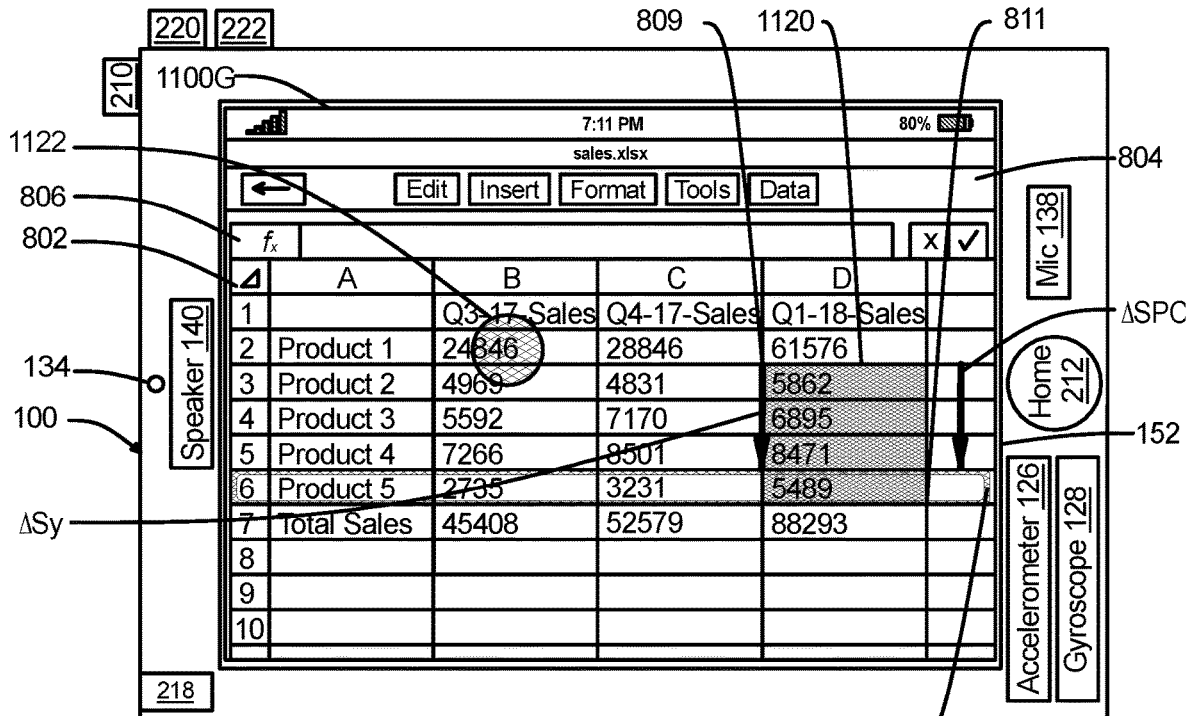

A user can perform a vertical tap-and-slide finger gesture 1116 to 1118 beginning anywhere on SPC icon 308 as illustrated in FIG. 11F). In response to detecting a tap and a change in the vertical position ($\Delta Fy$) of a finger contact on the SPC icon, the device selects a range of cells on the display from a first position beginning at text-object selection 810 to a second position (cells B3 to B6 in this example). In one example embodiment, $\Delta Sy$ (the change in the vertical position of selection 810) and $\Delta SPCy$ (the change in the vertical position of SPC icon 308) are equal and are approximately proportional to $\Delta Fy$ as illustrated in FIGS. 11F-11G. This can be written as $\Delta Sy=\Delta SPCy=Ky\Delta Fy$ where Ky is a proportionality constant. Again, in this exemplary embodiment Ky=1. The device displays UI 1100G (FIG. 11G) with a range of text-objects 1120 (spreadsheet cells in this example) selected within text-object content 802 (a spreadsheet in this example) from text-object selection start point 809 to text-object selection end point 811. In some embodiments, Kx can be a function of the slide gesture speed in the x-direction.

Figure 11H:
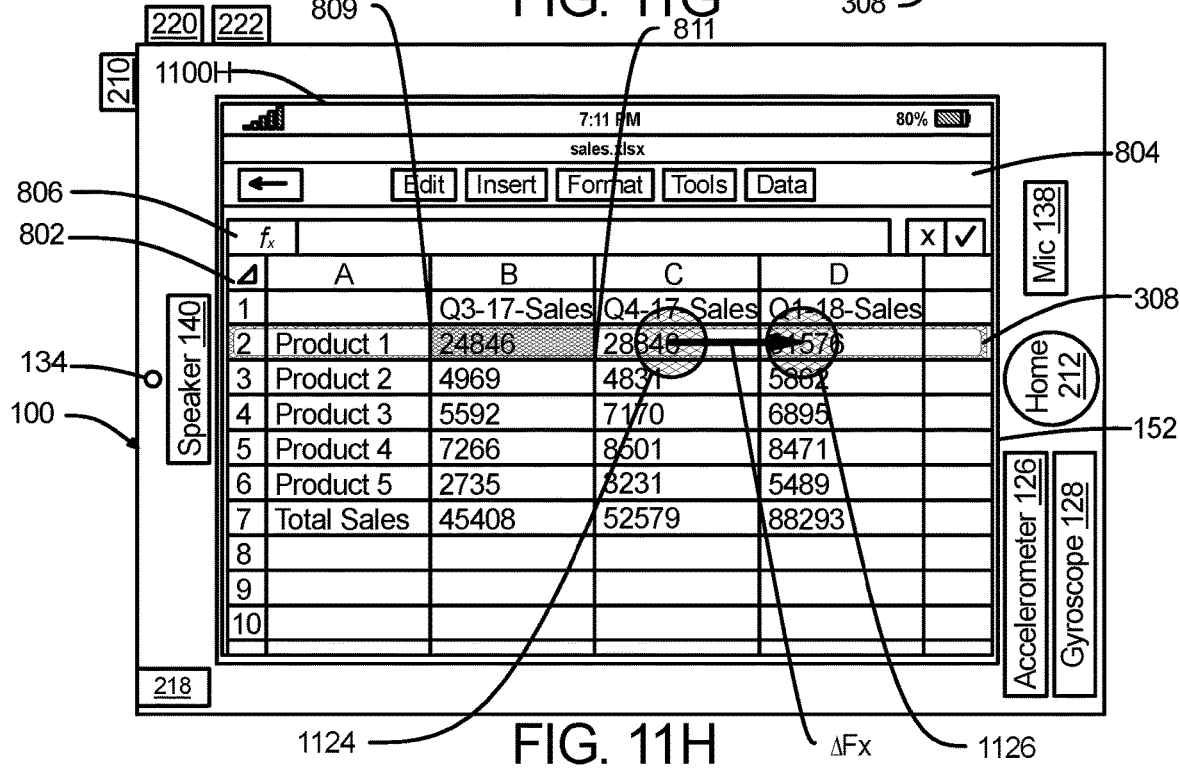
Figure 11I:
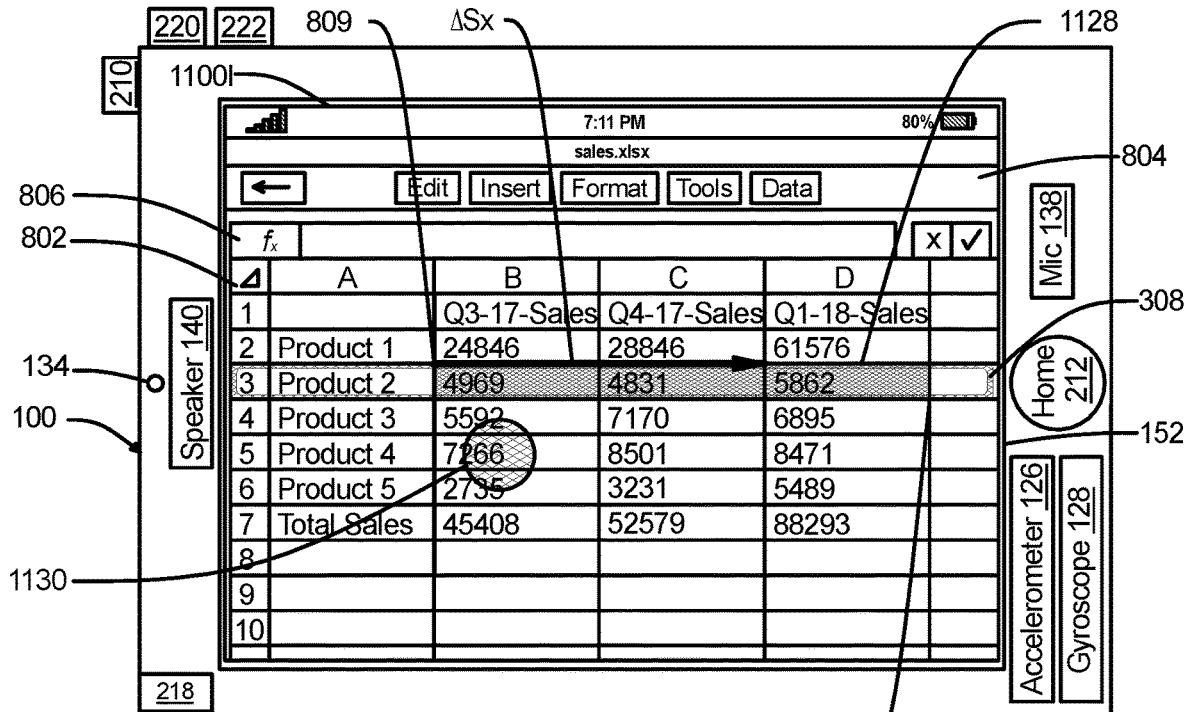

A user can perform a long-press finger gesture 1122 on text-object content 802 as illustrated in FIG. 11G. In response to detecting the finger gesture on content 802, the device can display UI 1100H (FIG. 11H) with selection positioning and control (SPC) icon 308 at an SPC icon first position and text-object selection 810 at a selection first position (cell B2 in this example). A user can perform a horizontal tap-and-slide finger gesture 1124 to 1126 beginning anywhere on SPC icon 308 as illustrated in FIG. 11H. In response to detecting a tap and a change in the horizontal position ($\Delta Fx$) of a finger contact on the SPC icon, the device selects a range of text-objects 1128 (cells B3 to D3 in this example) selected within text-object content 802 (a spreadsheet in this example) from a text-object selection start point 809 to a text-object selection end point 811 as illustrated in FIGS. 11H-11I. In one example embodiment, $\Delta Sx$ (the change in the horizontal position of text-object selection end point 811) is approximately proportional to $\Delta Fx$, as illustrated in FIGS. 11H-11I. This can be written as $\Delta Sx=Kx\Delta Fx$ where Kx is a proportionality constant. In this example, Kx>1. In some embodiments, Kx can be a function of the slide gesture speed in the x-direction. In this example, cells (text-objects) B3 through B6 are selected.

Figure 11J:
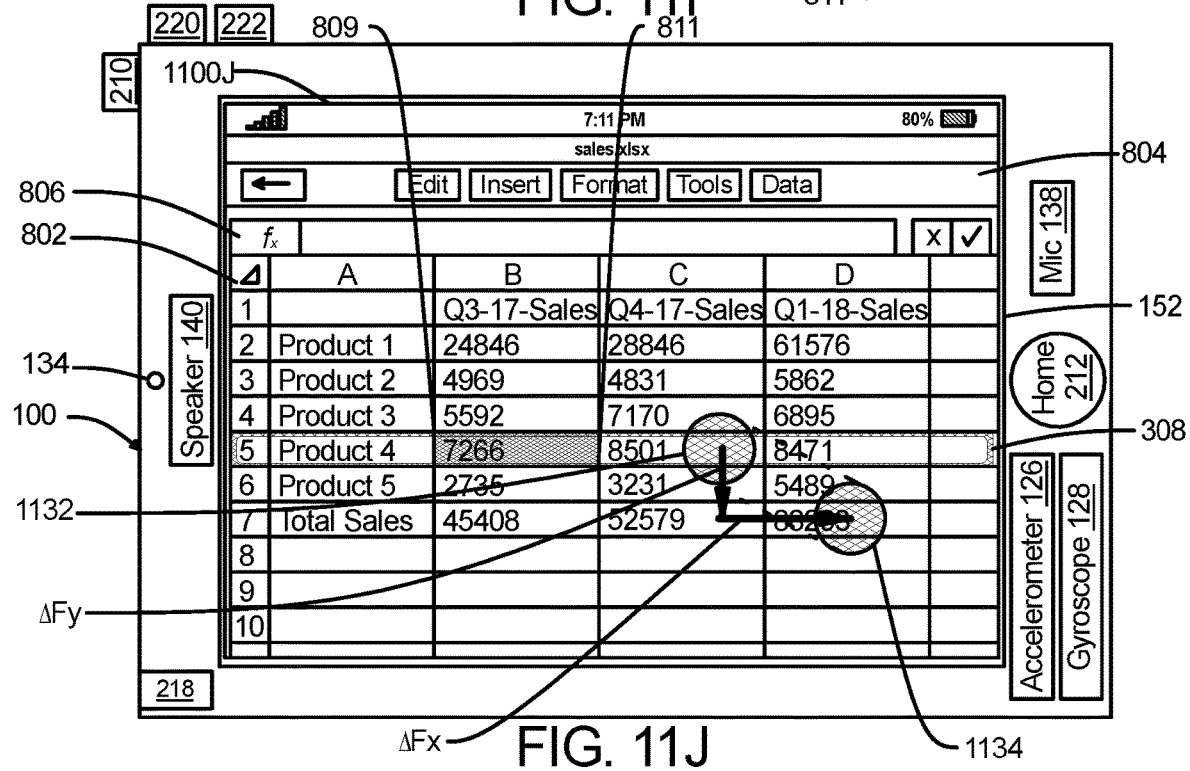

A user can perform a long-press finger gesture 1130 on text-object content 802 as illustrated in FIG. 11I. In response to detecting the finger gesture on content 802, the device can display UI 1100J (FIG. 11J) with selection positioning and control (SPC) icon 308 at an SPC icon first position and text-object selection 810 at a selection first position (at cell B5 in this example). A user can perform a diagonal tap-and-slide finger gesture 1132 to 1134 beginning anywhere on SPC icon 308 as illustrated in FIG. 11J. In response to detecting a tap and a change in the horizontal position ($\Delta Fx$) and change in vertical position ($\Delta Fy$) of a finger contact on the SPC icon, the device selects a range of text-objects 1136 (spreadsheet cells B3 through D7 in this example) selected within text-object content 802 (a spreadsheet in this example) from a text-object selection start point 809 to a text-object selection end point 811 as illustrated in FIG. 11K.

Figure 11K:
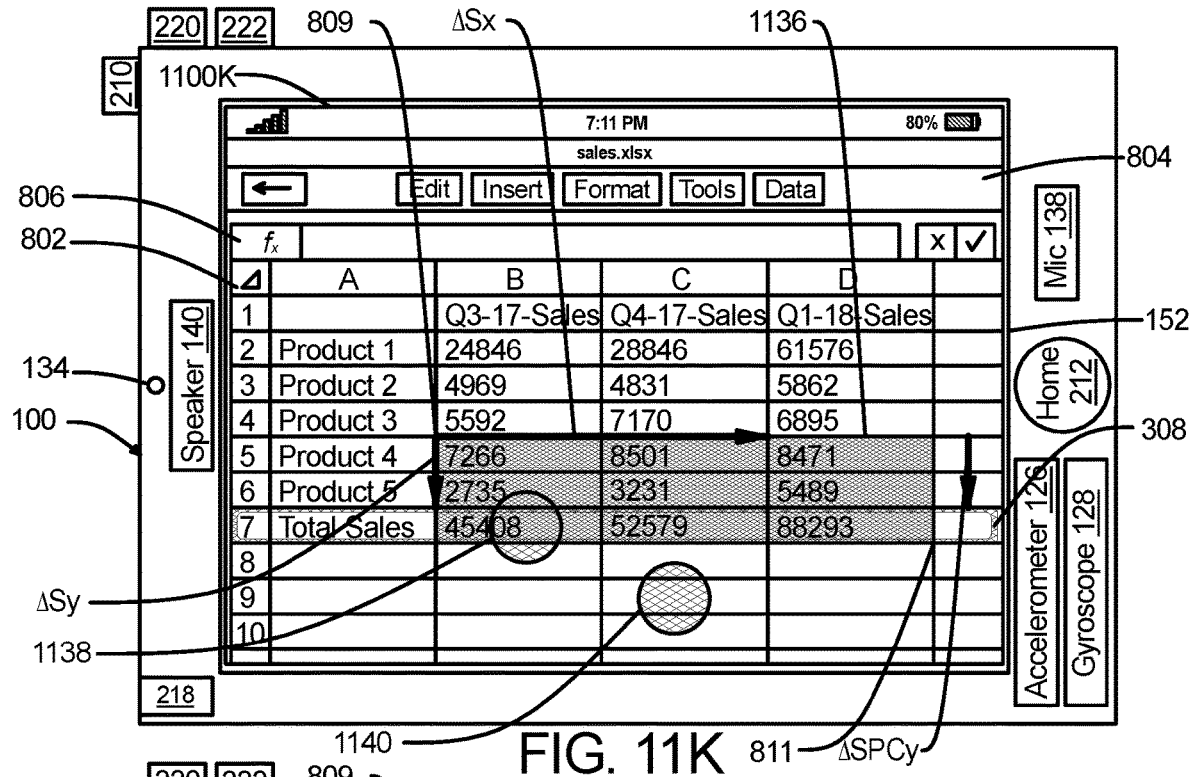

In one exemplary embodiment, $\Delta Sx$ (the change in the horizontal position of the selection end point) is proportional to $\Delta Fx$, and $\Delta Sy$ (the change in the vertical position of the selection end point) and $\Delta SPCy$ (the change in the vertical position of SPC icon 308) are equal and are approximately proportional to $\Delta Fy$, as illustrated in FIGS. 11J-11K. This can be written as $\Delta Sx=Kx\Delta Fx$ where Kx is a proportionality constant and $\Delta Sy=\Delta SPCy=Ky\Delta Fy$ where Ky is a proportionality constant. Again, in this exemplary embodiment Ky=1. Kx can be less than one, equal to one, or greater than one. In this example, Kx>1. In some embodiments, Kx can be a function of the slide gesture speed in the x-direction. In this example, cells (text-objects) B5 through D7 are selected.

Figure 11L:
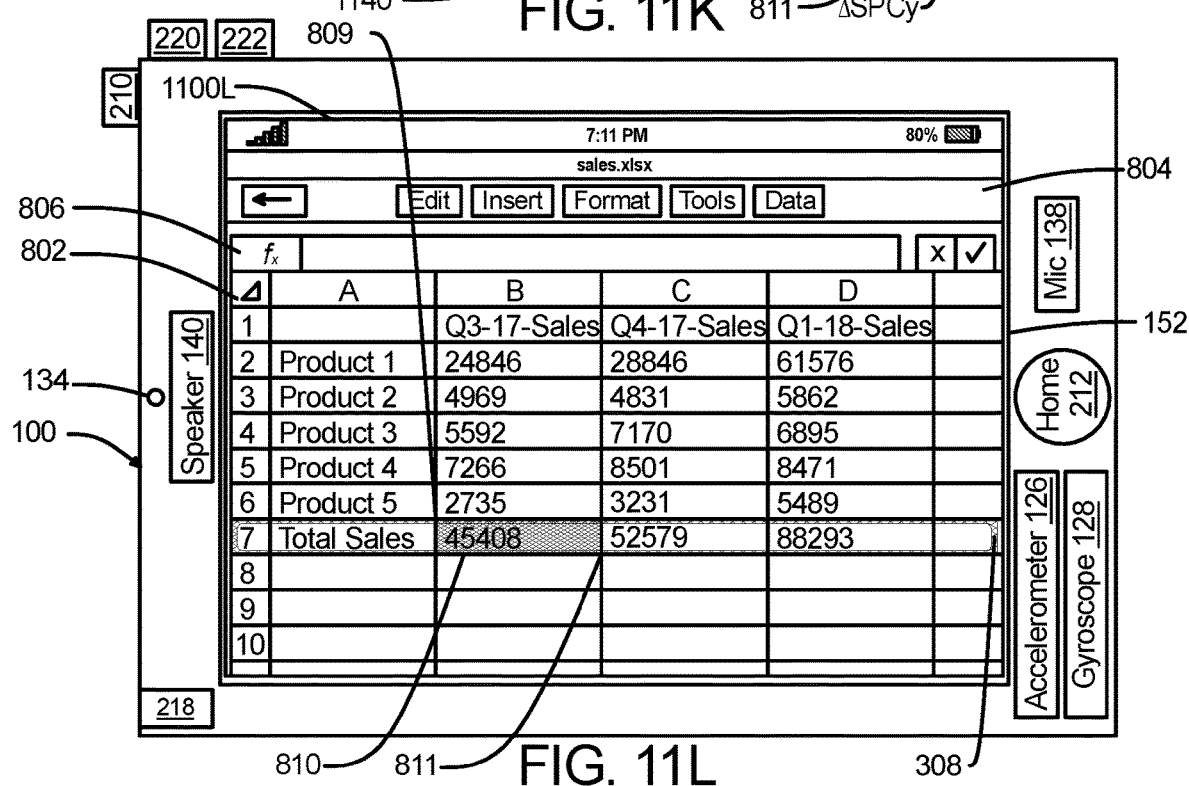
Figure 11M:
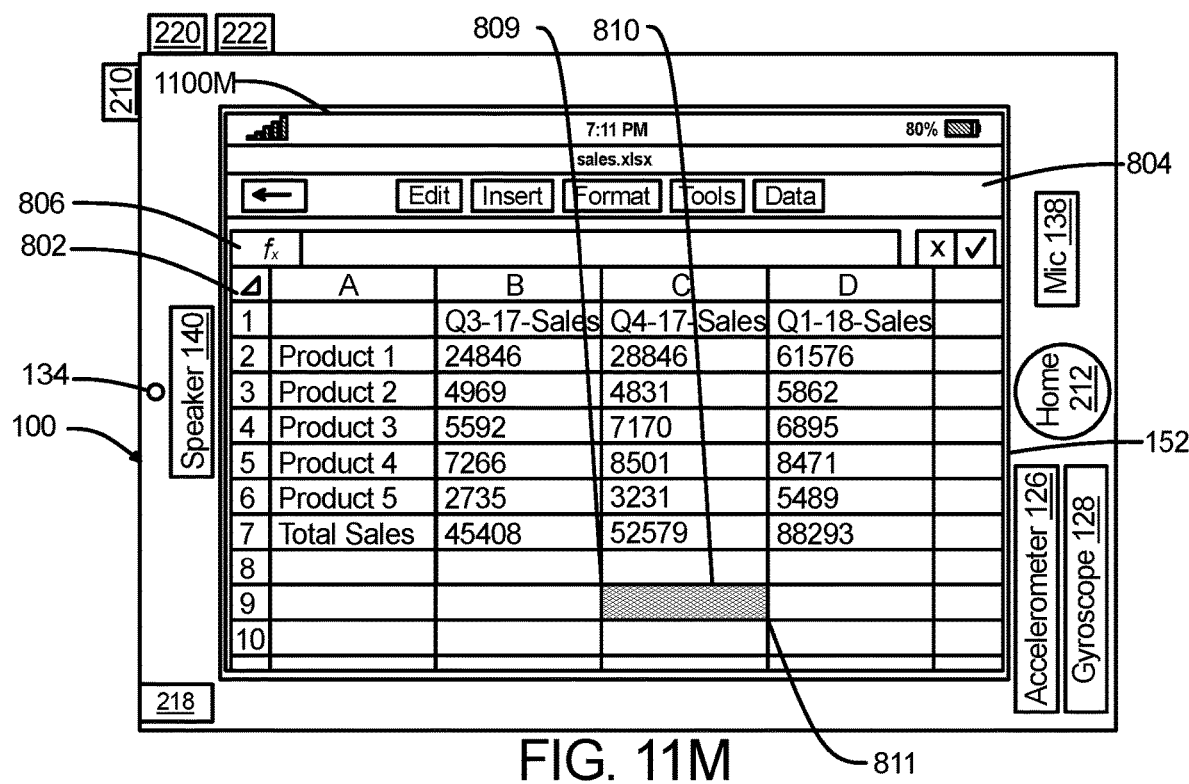

Text-object selection 1136 from cells B5 to D7 can be cancelled with tap gesture 1138 anywhere on selection positioning and control (SPC) icon 308 as illustrated in FIG. 11K. In response to the detection of tap gesture on SPC icon 308, the device cancels selection 1136 and selects cell B7 at the tap position as illustrated in FIGS. 11K-11L. The display of selection 1136, and selection positioning and control (SPC) icon 308, can be canceled with a tap gesture 1140 on editable text-object content 802 anywhere outside selection positioning and control (SPC) icon 308. In response to the detection of a tap gesture 1140 on editable text-object content 802 anywhere outside SPC icon 308, the device cancels the display of SPC icon 308 and displays text-object selection 810 at the tap position as illustrated in FIGS. 11K and 11M.

Content Vertical Auto-scroll: A user can move text-object selection 810 with a vertical slide gesture on SPC icon 308 until the position of selection 810 is less than one text-object from the bottom (top) boundary of the display. In response, the device scrolls the text-object content up (down) by one row until selection 810 is moved to the last (first) row of the text-object content, or until the text-object is moved to a position that is greater than or equal to one text object from the bottom (top) boundary of the display.

Content Horizontal Auto-scroll: A user can move text-object selection 810 until the position of selection 810 is less than one text-object from the right (left) boundary of the display. In response, the device scrolls the text-object content left (row) by one column until selection 810 is moved to the last (first) column of the text-object content, or until the text-object is moved to a position that is greater than or equal to one text object from the right (left) boundary of the display.

Content Scroll by User: Text-Object content 802 can be moved vertically (scrolled) or moved horizontally with a slide finger gesture on the content at any position outside selection positioning and control (SPC) icon 308 in a manner similar to that illustrated in FIGS. 3F-3G for text content.

A user can select multiple text-objects within read-only text-object content employing methods similar to those used to select multiple text-objects within editable text-object content.

Figure 12A:
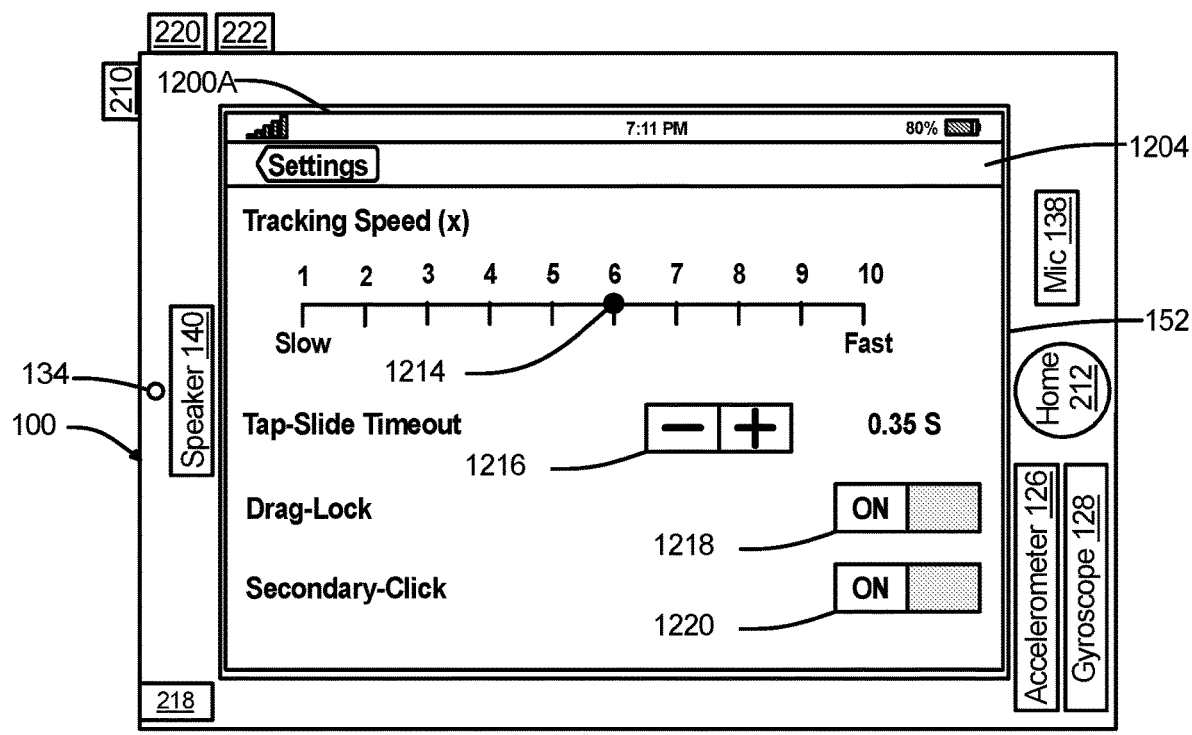
FIG. 12A illustrates an exemplary graphical user interface for user selectable settings for gestures on a selection positioning and control icon in accordance with some embodiments.
Figure 12B:
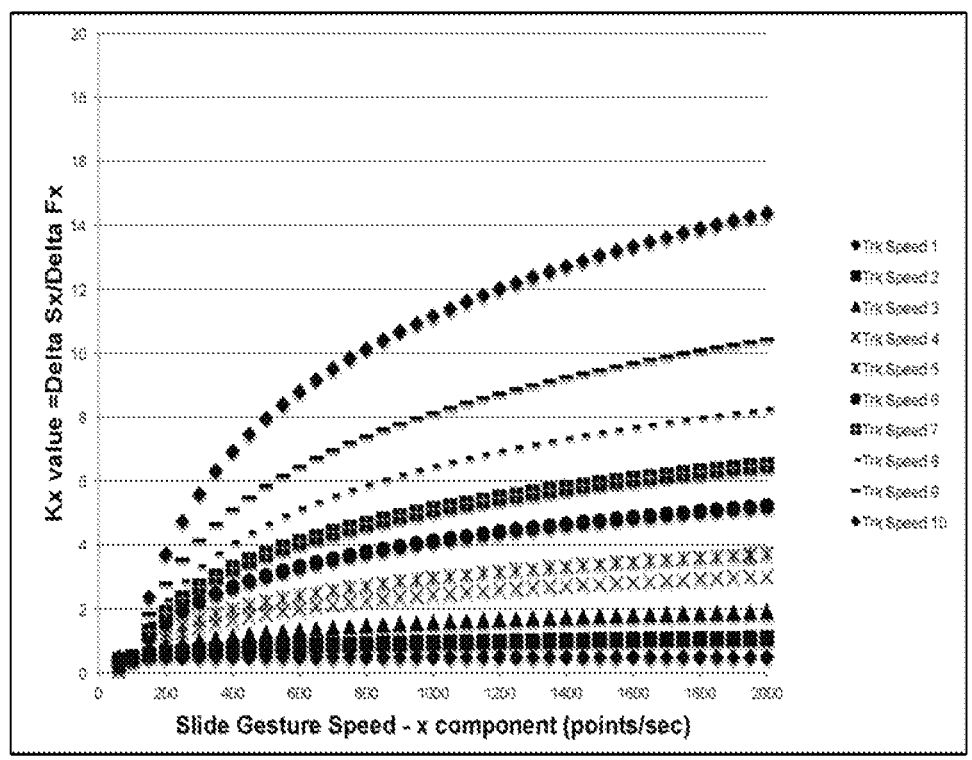
FIG. 12B illustrates an exemplary functional dependence of Kx on the x-component of the slide gesture speed, for gestures on a selection positioning and control icon, for a "tracking speed" setting ranging from of 1 to 10.

12.0 User selectable settings: FIG. 12A illustrates an exemplary graphical user interface for user selectable settings for gestures on selection positioning and control (SPC) icon 308. A user can select a settings icon. In response, the device can display UI 1200A (FIG. 12A). A user can perform a slide finger gesture on tracking speed slider control 1214 to set the tracking speed to a particular number as illustrated in FIG. 12A. The tracking speed can be set to any number from #1 to #10. In this example, the tracking speed has been set to #6. The tracking speed setting determines the functional dependence of Kx on the x-component of the slide gesture speed on selection positioning and control (SPC) icon 308, where the change in position of a selection in the x-direction is approximately proportional to the change in position of the finger in the x-direction ($\Delta Sx=Kx\Delta Fx$). A selection includes, but is not limited to, a selection within text content, a selection within text-object content, and a menu item preselection within a menu. Examples are described in reference to FIGS. 3A-3H, FIGS. 4A-4J, FIGS. 5A-5G, FIGS. 6A-6J, FIGS. 7A-7CC, FIGS. 8A-8N, FIGS. 9A-9P, FIGS. 10A-10N, FIGS. 11A-11M, FIGS. 24A-24L, and FIGS. 27A-27B. In response, the device uses the functional dependence of Kx for that particular tracking speed setting number. An example functional dependence Kx for 10 different tracking speed settings is illustrated in FIG. 12B. In the example shown, with a tracking speed setting of #6, the value of Kx can range from about 0.3 to about 5 depending upon the x-component of the slide gesture speed at any position along the slide gesture path. Accordingly, the user can roughly position the selection start point with Kx>1 with a high speed slide gesture on selection positioning and control (SPC) icon 308; the user can then precisely position the selection start point with Kx<1 with a low speed slide gesture on selection positioning and control (SPC) icon 308.

A user can set the tap-slide timeout, for a tap-and-slide gesture, with stepper control 1216 to a value between 0.2 seconds to 0.5 seconds. In the example shown the timeout is set to 0.35 seconds.

A user can set drag-lock OFF or ON with drag-lock switch 1218. Text selection with drag-lock set OFF is described in reference to FIGS. 4A-4J, FIGS. 6A-6J. Text selection with drag-lock set ON, is described in reference to FIGS. 5A-5G for read-only text. Text selection with drag-lock set ON, for editable text is similar to that described for read-only text. A user can enable the display of secondary-click menus with a secondary-click gesture by setting secondary-click switch 1220 to ON. With secondary-click set ON, a secondary-click gesture on selection positioning and control (SPC) icon 308, can display a secondary-click menu for a selection. With secondary-click switch set OFF, a secondary-click gesture on selection positioning and control (SPC) icon 308 does not display a secondary-click-menu.

The system can define the meaning of additional gestures on selection positioning and control (SPC) icon 308. These can include a two-finger tap gesture for example to perform a secondary-click. These can include a double-tap gesture, for example, to select a word at the position unit-length selection 310 or zero-length selection 608 as described in reference to FIGS. 4I-4J and FIGS. 6I-6J These can include a triple-tap gesture, for example, to select a paragraph at the position of unit-length selection 310 or zero-length selection 608. The system can also define the meaning of other gestures on selection positioning and control (SPC) icon 308, including, but not limited to, a three finger tap, a left-slide or right-slide gesture with two-fingers or three-fingers, a up-slide or down-gesture with three fingers. The device's response to these additional gestures on selection positioning and control icon 308 can be defined to be the same as the response to those gestures in a pointer-based operating system to enable those gestures to be readily discoverable by users.

Figure 13:
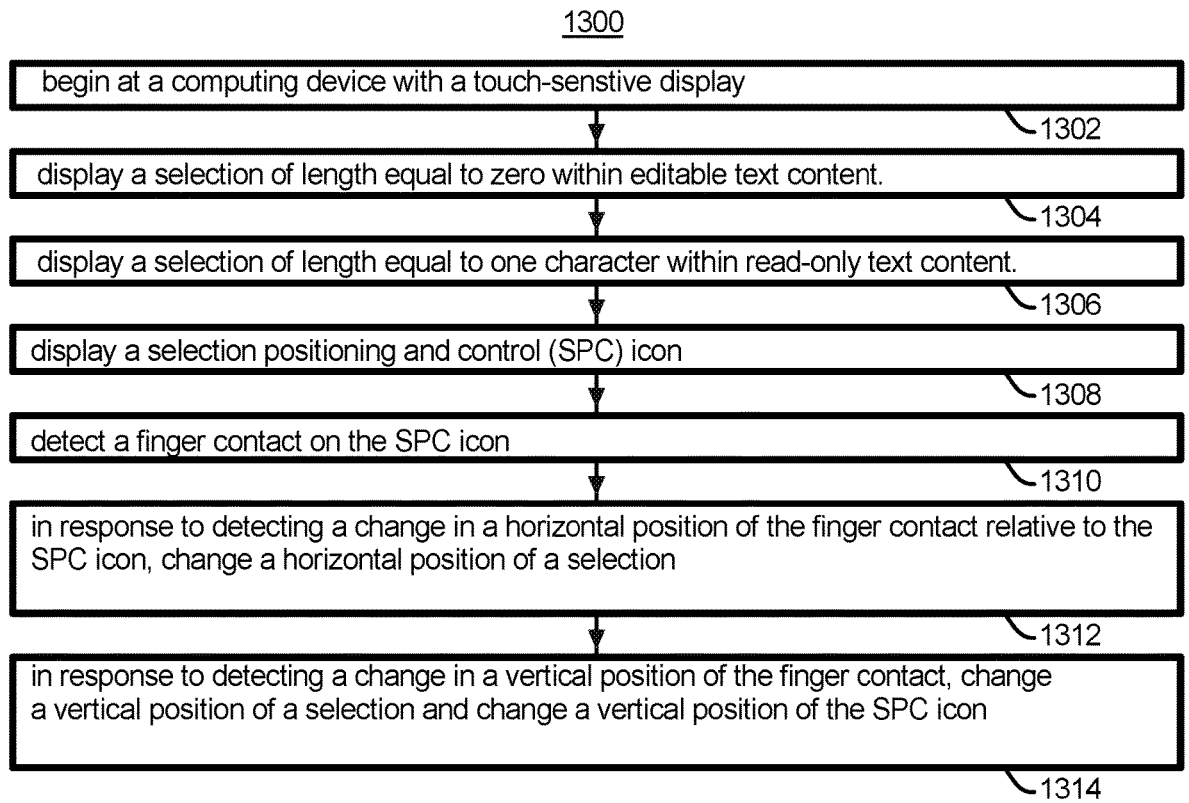
FIG. 13 is a flow diagram illustrating a method for positioning a selection within content on a computing device with a touch-sensitive display in accordance with some embodiments.

13.0 Method for positioning a selection within content: FIG. 13 is a flow diagram illustrating a method for positioning a selection within content on a computing device with a touch-sensitive display in accordance with some embodiments. FIGS. 3A-3H, FIGS. 4A-4J, FIGS. 5A-5G, FIGS. 6A-6J, and FIGS. 7A-7CC, illustrate exemplary user interfaces for use in implementing the methods presented in FIG. 13.

Figure 14:
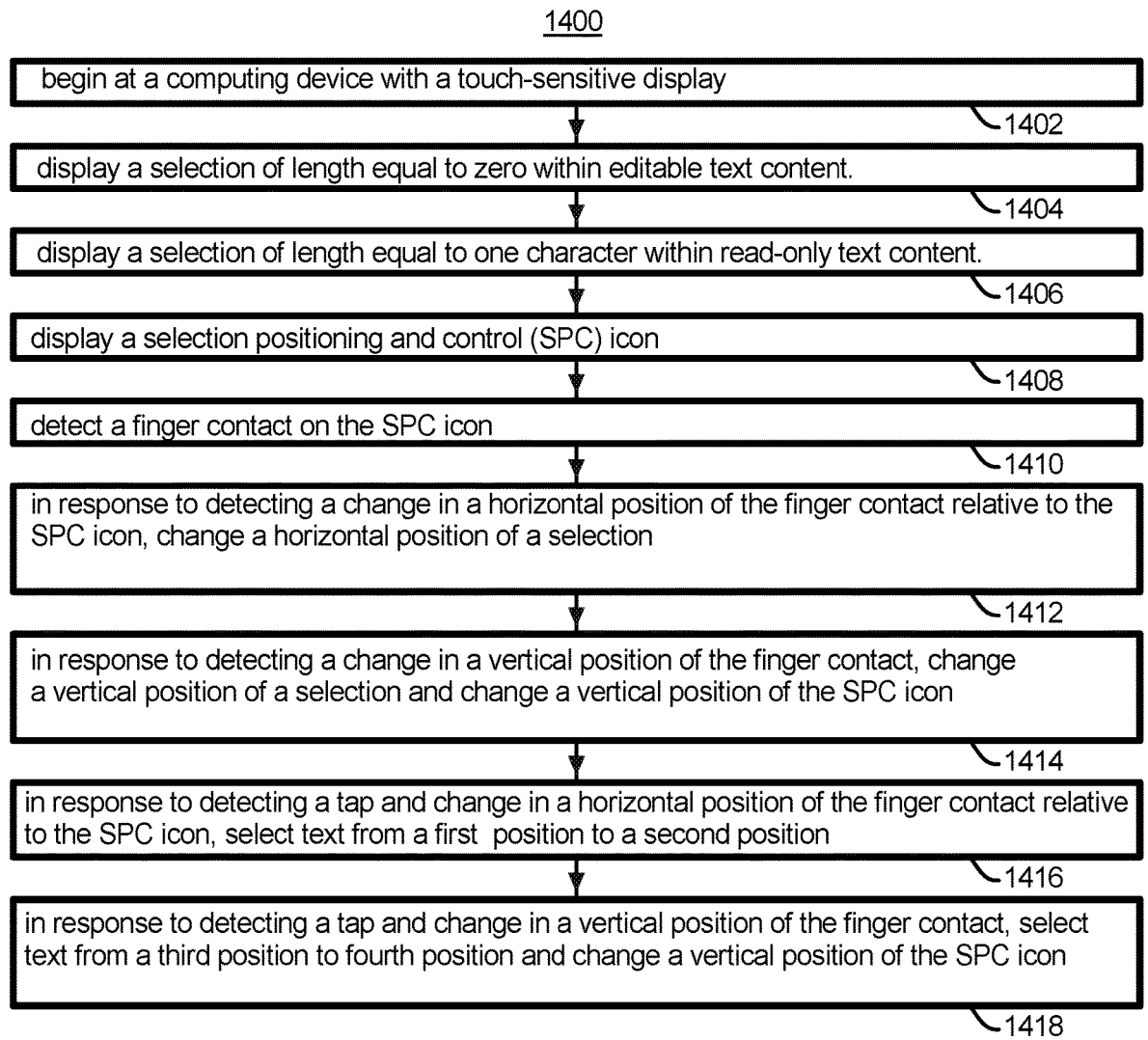
FIG. 14 is a flow diagram illustrating a method for positioning a selection and selecting text within content on a computing device with a touch-sensitive display in accordance with some embodiments.

14.0 Method for positioning a selection and selecting text within content: FIG. 14 is a flow diagram illustrating methods for positioning a selection and selecting text within content on a device with a touch-sensitive display in accordance with some embodiments. FIGS. 4A-4J, FIGS. 5A-5G, FIGS. 6A-6J, and FIGS. 7A-7CC, illustrate exemplary user interfaces for use in implementing the methods presented in the flow diagrams shown in FIG. 14.

Figure 15:
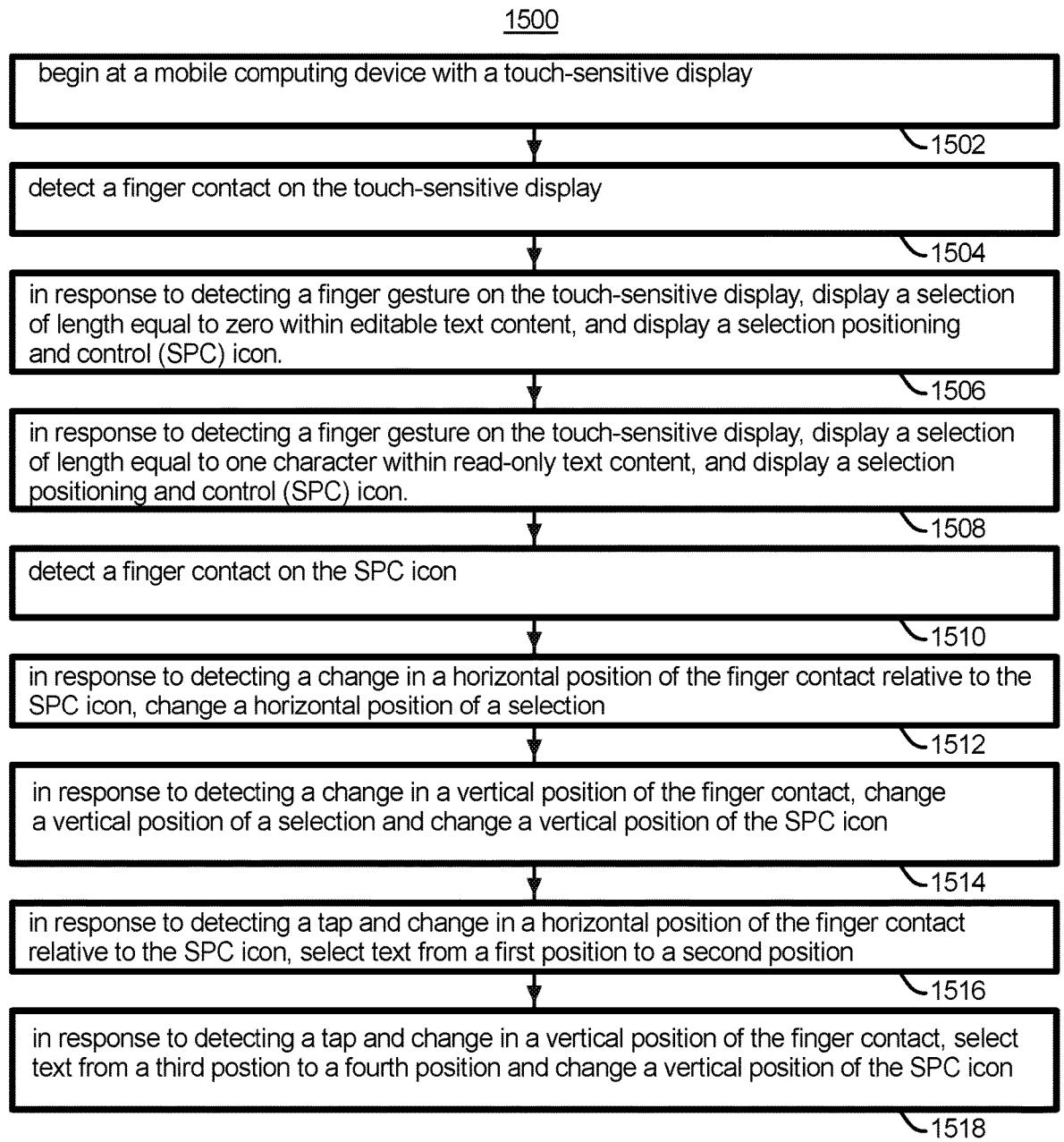
FIG. 15 is a flow diagram illustrating a method for displaying a selection, positioning the selection, and selecting text within content on a computing device with a touch-sensitive display in accordance with some embodiments.

15.0 Method for displaying a selection, positioning a selection, and selecting text within content: FIG. 15 is a flow diagram illustrating a method for displaying a selection, positioning the selection, and selecting text within content on a computing device with a touch-sensitive display in accordance with some embodiments. FIGS. 4A-4J, FIGS. 5A-5G, FIGS. 6A-6J, and FIGS. 7A-7CC, illustrate exemplary user interfaces for use in implementing the methods presented in the flow diagrams shown in FIG. 15.

Figure 16:
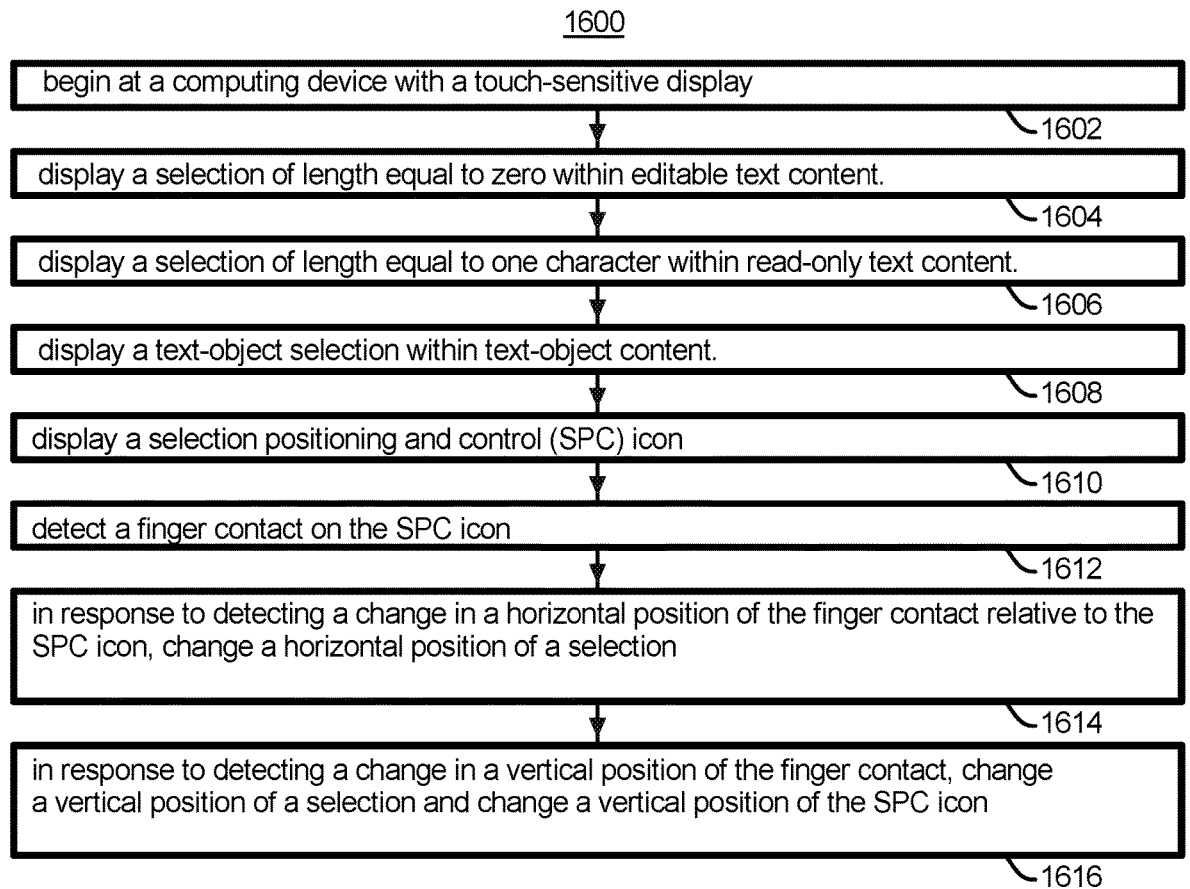
FIG. 16 is a flow diagram illustrating a method for positioning a text-object selection within text-object content (a spreadsheet for example) on a computing device with a touch-sensitive display in accordance with some embodiments.

16.0 Method for positioning a text-object selection within text-object content: FIG. 16 is a flow diagram illustrating a method for positioning a text-object selection within text-object content (a spreadsheet for example) on a computing device with a touch-sensitive display in accordance with some embodiments. FIGS. 8A-8N, FIGS. 9A-9P, 10A-10N, 11A-11M illustrate exemplary user interfaces for use in implementing the methods presented in the flow diagrams shown in FIG. 16.

Figure 17:
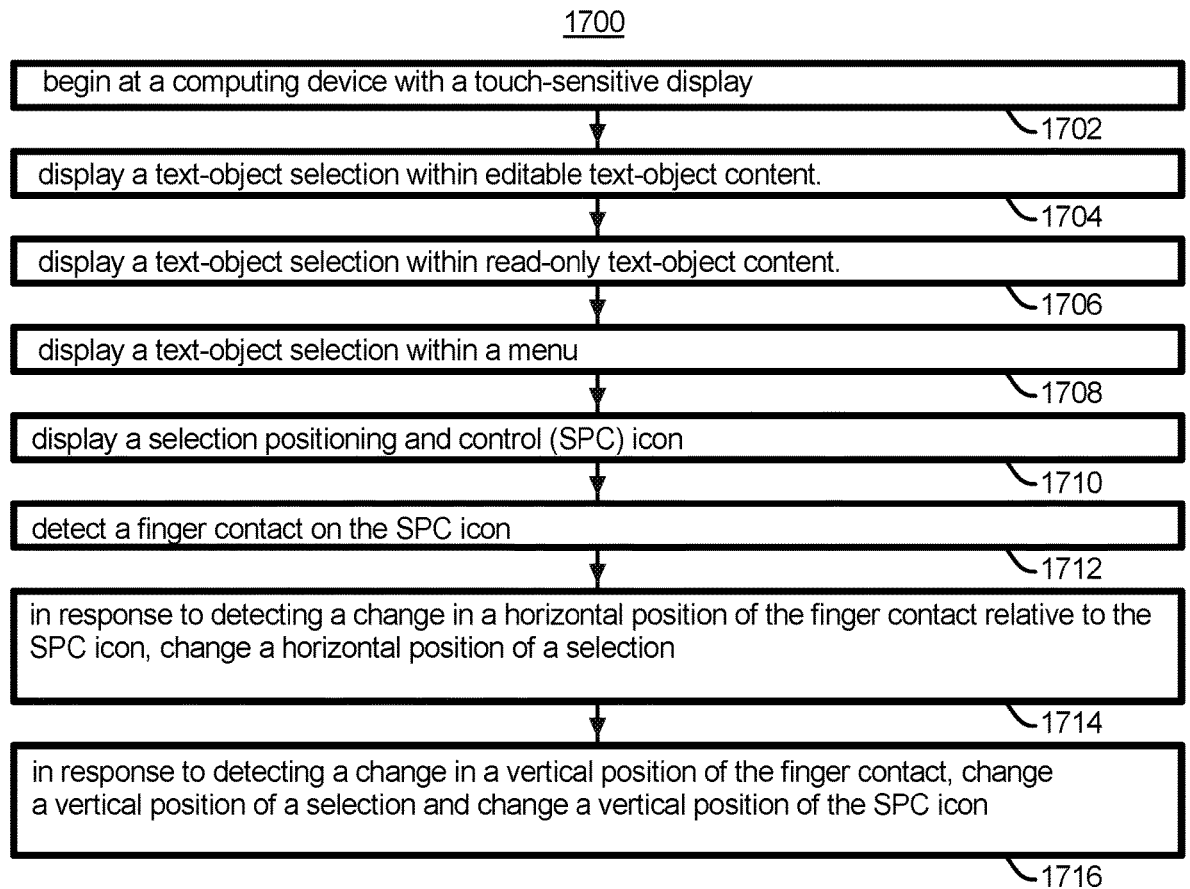
FIG. 17 is a flow diagram illustrating a method for displaying a text-object selection and positioning a text-object selection within text-object content (a spreadsheet for example) on a computing device with a touch-sensitive display in accordance with some embodiments.

17.0 Method for positioning a text-object selection within editable or read-only text-object content: FIG. 17 is a flow diagram illustrating a method for displaying a text-object selection and positioning a text-object selection within text-object content (a spreadsheet for example) on a computing device with a touch-sensitive display in accordance with some embodiments. FIGS. 8A-8N, FIGS. 9A-9P, 10A-10N, 11A-11M illustrate exemplary user interfaces for use in implementing the methods presented in the flow diagrams shown in FIG. 17.

Figure 18:
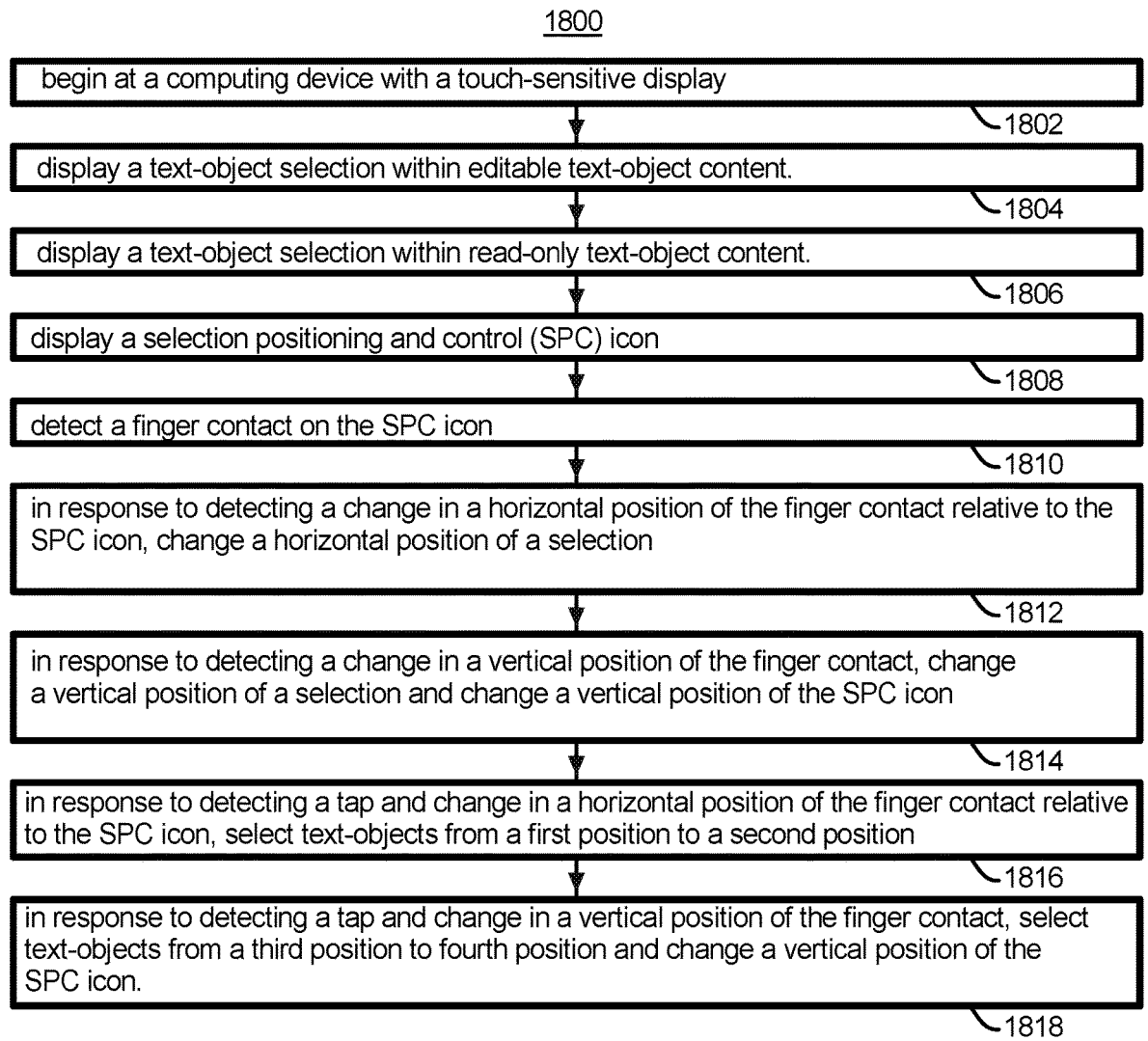
FIG. 18 is a flow diagram illustrating a method for displaying a text-object selection and positioning a text-object selection within text-object content (a spreadsheet for example) and selecting multiple text-objects (spreadsheet cells for example) on a computing device with a touch-sensitive display in accordance with some embodiments.

18.0 Method for positioning a text-object selection and selecting multiple text-objects within editable or read-only text-object content: FIG. 18 is a flow diagram illustrating a method for displaying a text-object selection and positioning a text-object selection within text-object content (a spreadsheet for example) and selecting multiple text-objects (spreadsheet cells for example) on a computing device with a touch-sensitive display in accordance with some embodiments. FIGS. 11A-11M, illustrate exemplary user interfaces for use in implementing the methods shown in FIG. 18.

Figure 19:
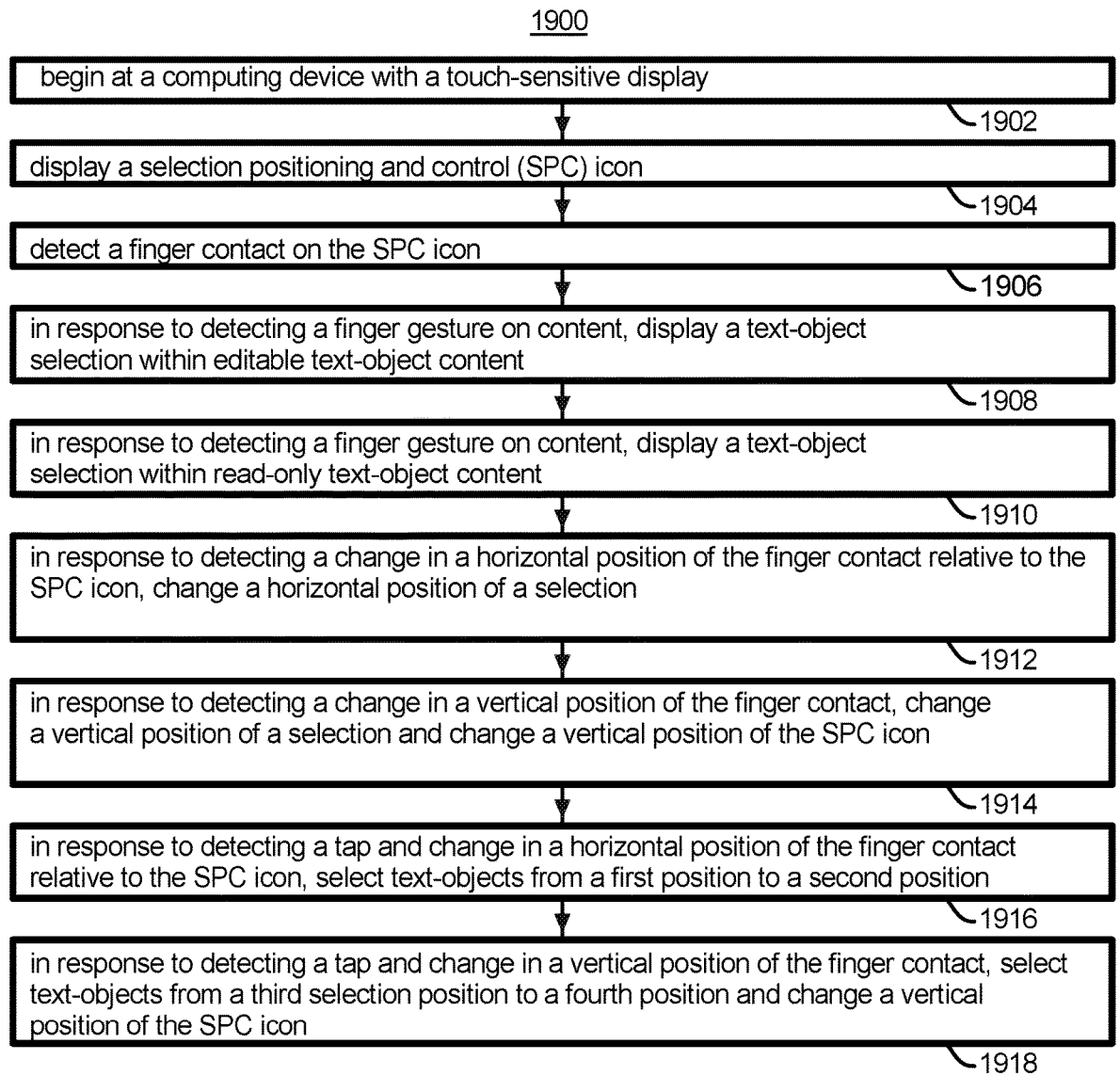
FIG. 19 is a flow diagram illustrating a method for displaying a text-object selection, positioning the text-object selection within text-object content (a spreadsheet for example), and selecting multiple text-objects (spreadsheet cells for example) on a computing device with a touch-sensitive display in accordance with some embodiments.

19.0 Method for displaying and positioning a text-object selection and selecting multiple text-objects within editable or read-only text-object content: FIG. 19 is a flow diagram illustrating a method for displaying a text-object selection, positioning the text-object selection within text-object content (a spreadsheet for example), and selecting multiple text-objects (spreadsheet cells for example) on a computing device with a touch-sensitive display in accordance with some embodiments. FIGS. 11A-11M, illustrate exemplary user interfaces for use in implementing the methods presented in the flow diagrams shown in FIG. 19.

Figure 20:
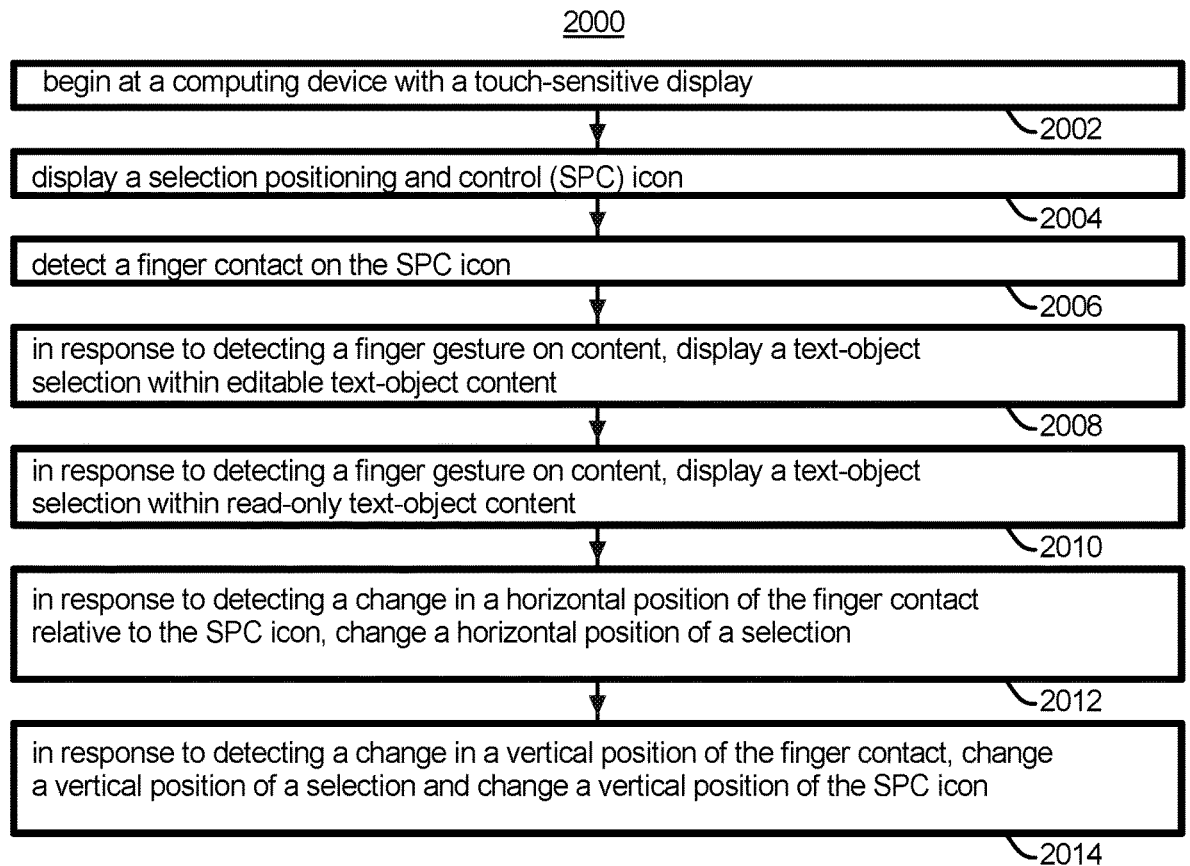
FIG. 20 is a flow diagram illustrating a method for displaying a text-object selection and positioning the text-object selection within text-object content (a spreadsheet for example) on a computing device with a touch-sensitive display in accordance with some embodiments.

20.0 Method for displaying and positioning a text-object selection within editable or read-only text-object content: FIG. 20 is a flow diagram illustrating a method for displaying a text-object selection and positioning the text-object selection within text-object content (a spreadsheet for example) on a computing device with a touch-sensitive display in accordance with some embodiments. FIGS. 11A-11M, illustrate exemplary user interfaces for use in implementing the methods presented in the flow diagrams shown in FIG. 20.

Figure 21:
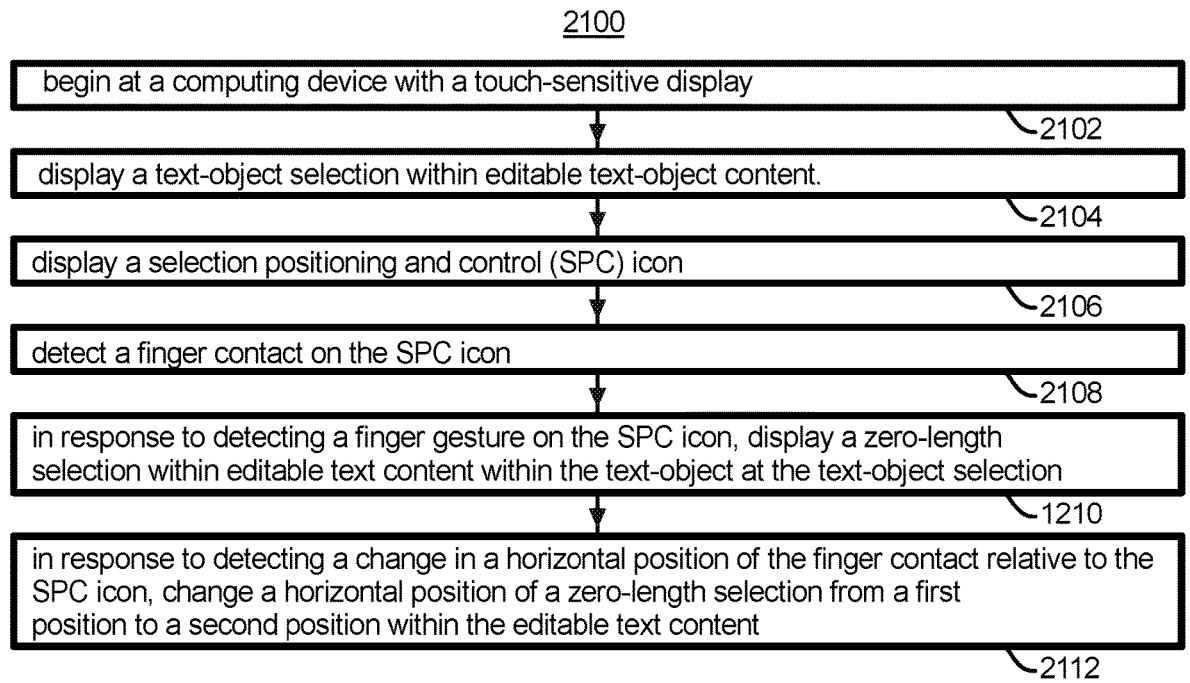
FIG. 21 is a flow diagram illustrating a method for displaying a zero-length selection within an editable text-object (a spreadsheet cell for example) and positioning the zero-length selection within the editable text-object (a spreadsheet cell for example) on a computing device with a touch-sensitive display in accordance with some embodiments.

21.0 Method for displaying and positioning a zero-length selection within editable text-object content: FIG. 21 is a flow diagram illustrating a method for displaying a zero-length selection within an editable text-object (a spreadsheet cell for example) and positioning the zero-length selection within the editable text-object (a spreadsheet cell for example) on a computing device with a touch-sensitive display in accordance with some embodiments. FIGS. 9A-9P, illustrate exemplary user interfaces for use in implementing the methods presented in the flow diagrams shown in FIG. 21.

Figure 22:
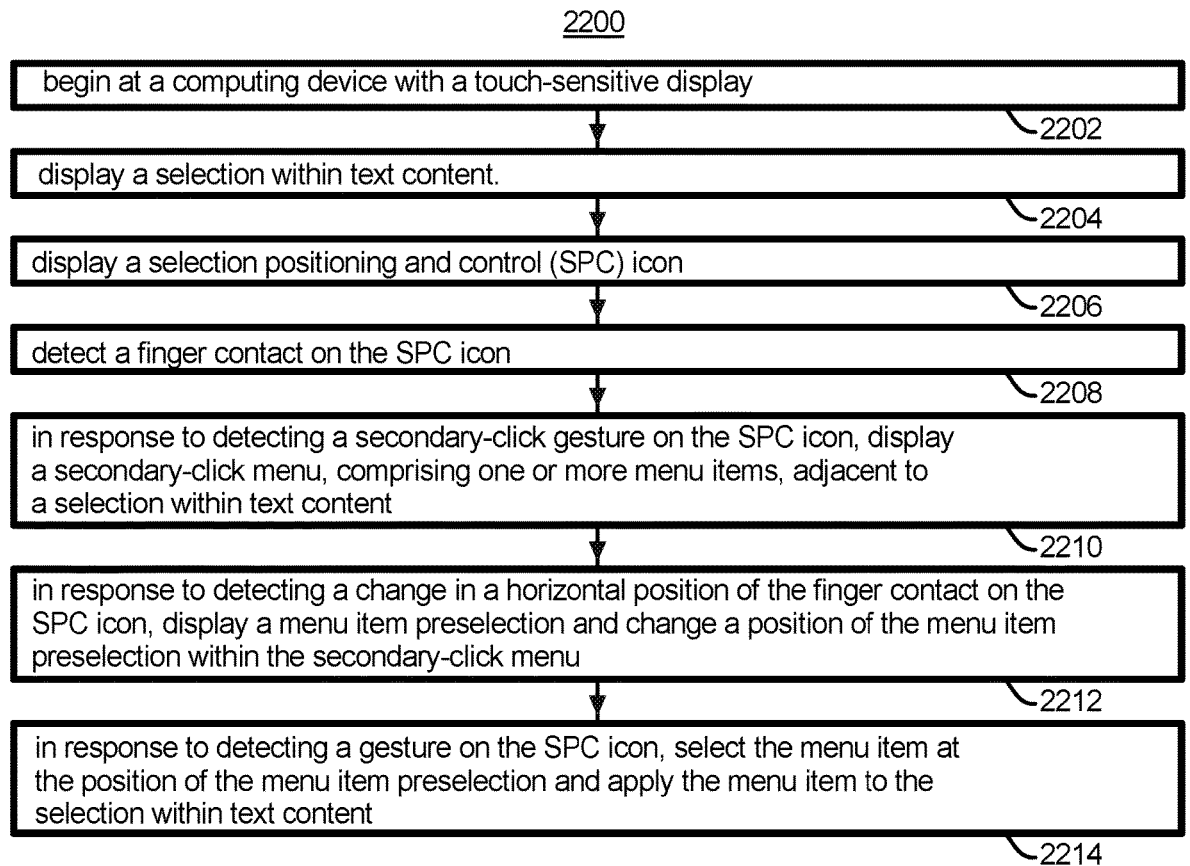
FIG. 22 is a flow diagram illustrating a method for performing a secondary-click action with respect to a selection within text content, on a computing device with a touch-sensitive display, in accordance with some embodiments.

22.0 Methods for performing a secondary-click action with respect to a selection with editable or read-only text: FIG. 22 is a flow diagram illustrating a method for performing a secondary-click action with respect to a selection within text content, on a computing device with a touch-sensitive display, in accordance with some embodiments. FIGS. 7A-7CC, illustrate exemplary user interfaces for use in implementing the methods presented in the flow diagrams shown in FIG. 22.

Figure 23:
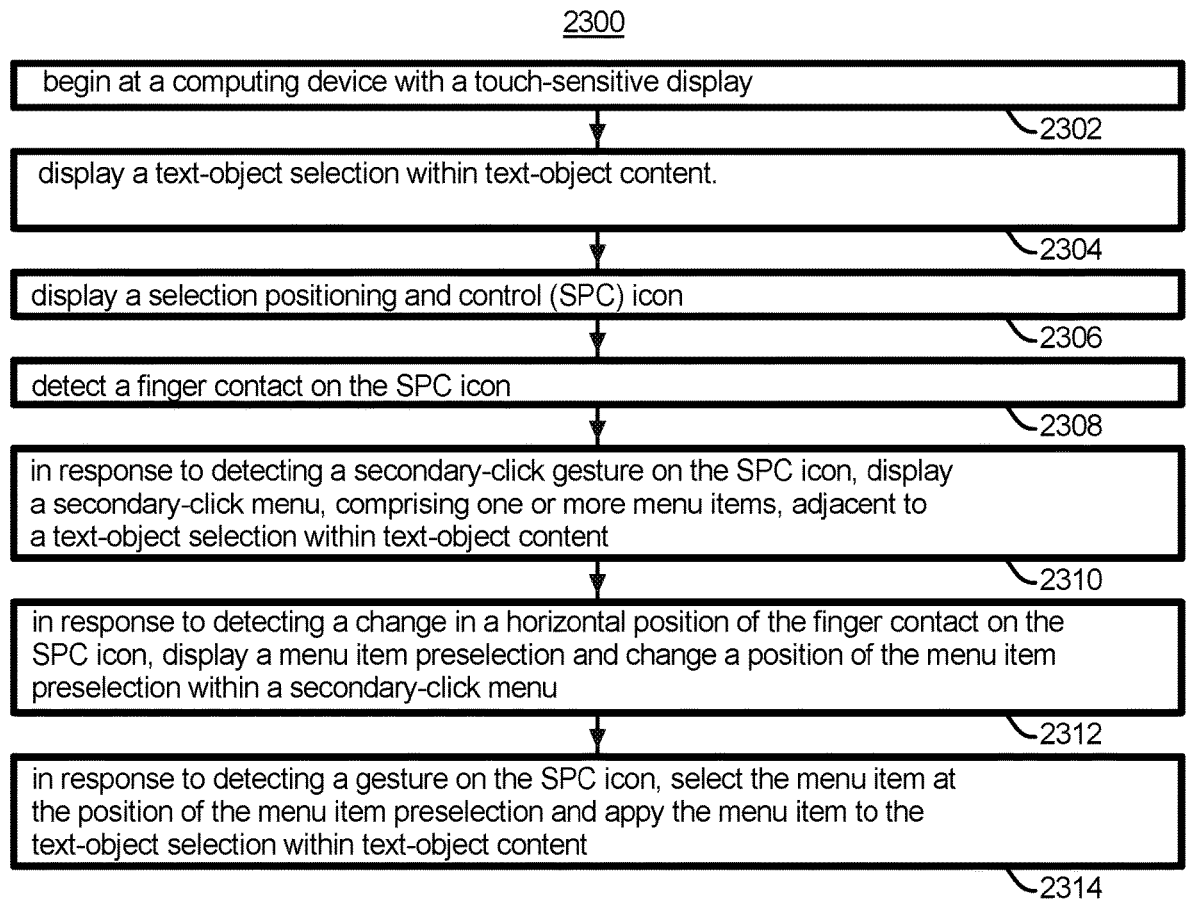
FIG. 23 is a flow diagram illustrating a method for performing a secondary-click action with respect to a text-object selection within text-object content (spreadsheet for example), on a computing device with a touch-sensitive display, in accordance with some embodiments.

23.0 Method for performing a secondary-click action with respect to a text-object selection with editable or read-only text-object content: FIG. 23 is a flow diagram illustrating a method for performing a secondary-click action with respect to a text-object selection within text-object content (spreadsheet for example), on a computing device with a touch-sensitive display, in accordance with some embodiments. FIGS. 10A-10N, illustrate exemplary user interfaces for use in implementing the methods presented in the flow diagrams shown in FIG. 23.

Figure 24A:
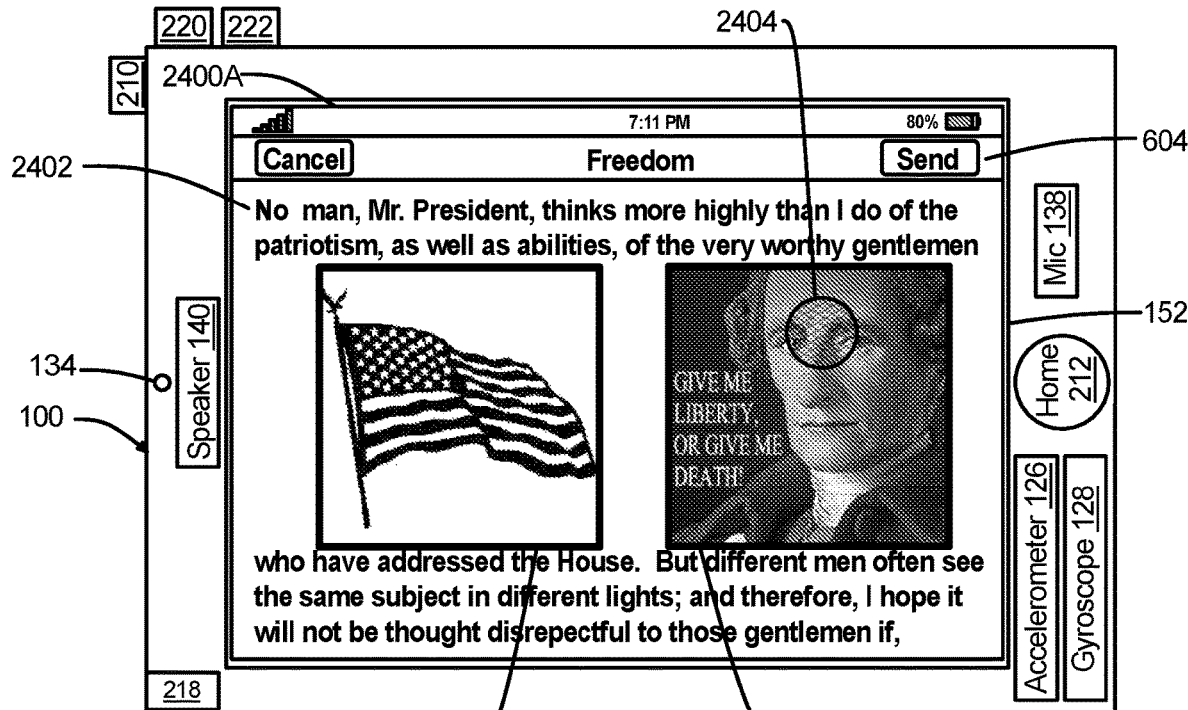
FIGS. 24A-24L Illustrate an exemplary graphical user interface and method for displaying an image-object selection and performing a secondary-click action with respect to an image-object selection on a mobile computing device with a touch-sensitive display, in accordance with some embodiments.

24.0 Performing a Secondary-Click Action with Respect to an Image-Object: FIGS. 24A-24L Illustrate an exemplary graphical user interface and method for displaying an image-object selection and performing a secondary-click action with respect to an image-object selection on a mobile computing device with a touch-sensitive display, in accordance with some embodiments. The device can display editable content 2402 containing one or more images 2406 and 2408 as illustrated in UI 2400A (FIG. 24A). The one or more images may be displayed within text content as illustrated in FIG. 24A; the one or more images can be displayed alone, within an application for displaying photos for example.

Figure 24B:
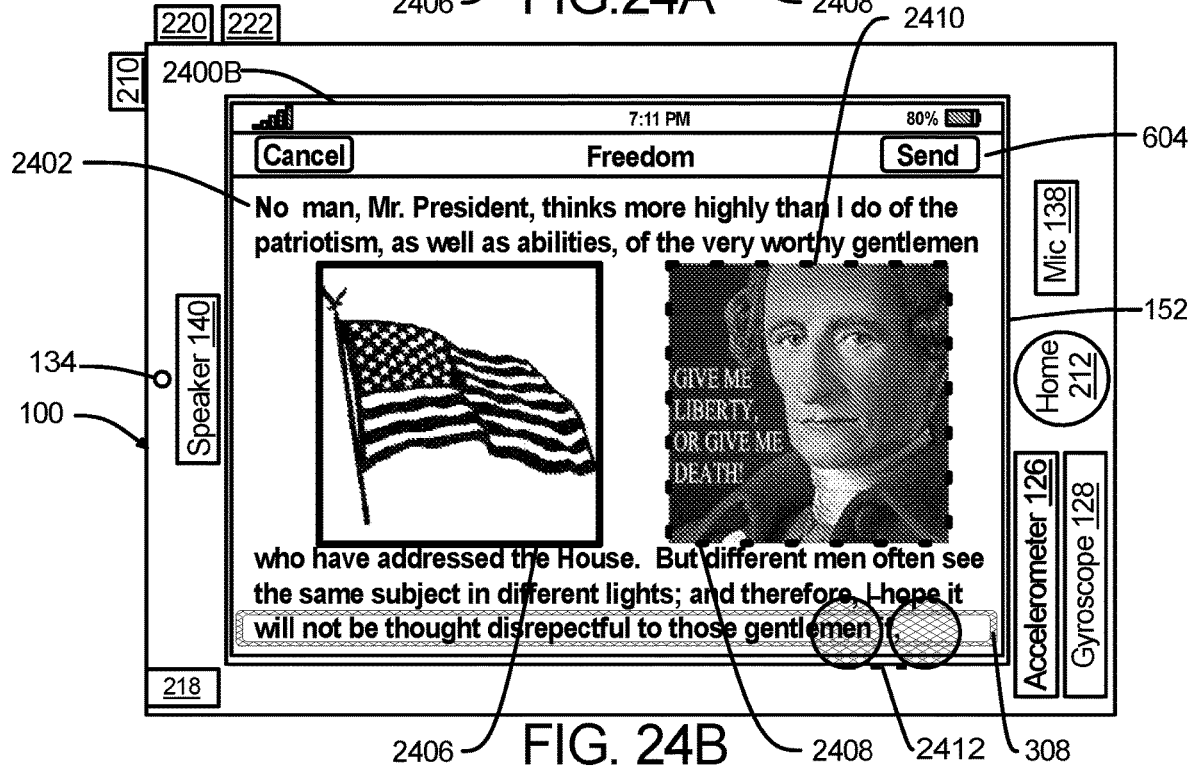
Figure 24C:
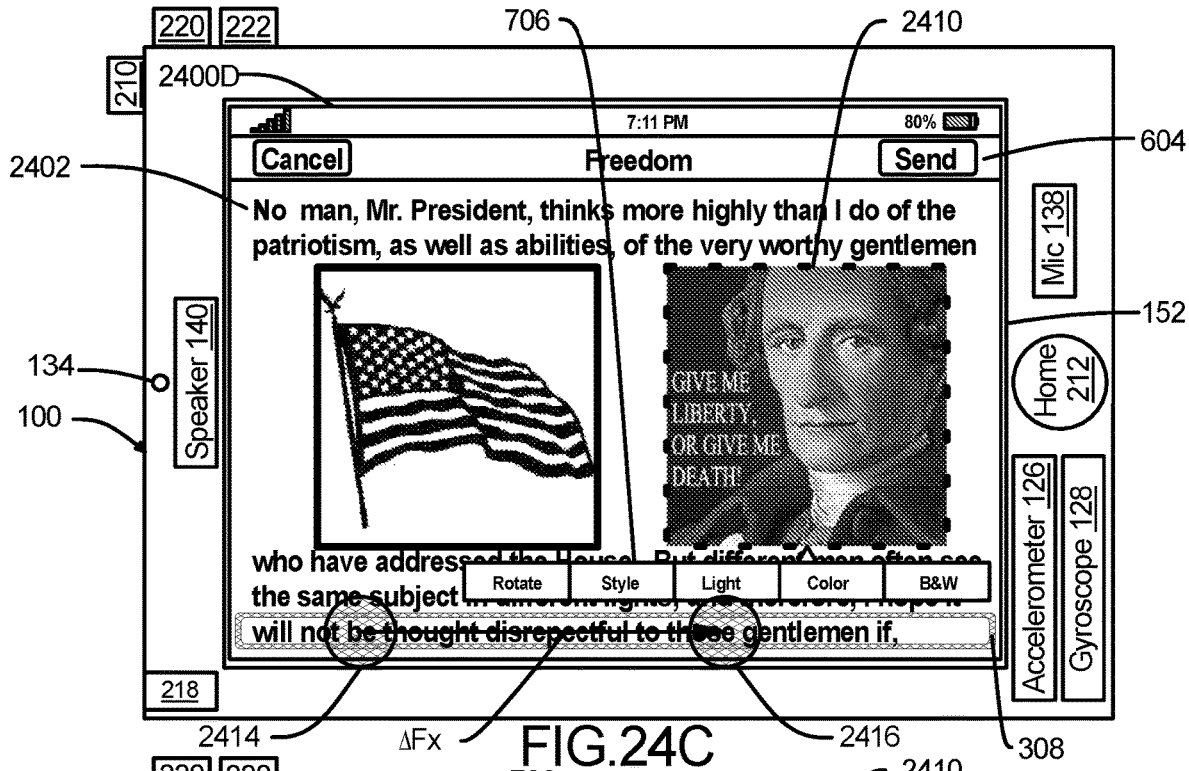

A user can perform a finger gesture (a long-press gesture for example) on image 2408. In response to detecting the long-press finger gesture on image 2408, the device can display image-object selection 2410 at image 2408 and display selection positioning and control (SPC) icon 308 adjacent to image-object selection 2410. A user can perform a secondary-click gesture 2412 (a two-finger tap gesture for example) on SPC icon 308 as illustrated in FIG. 24B. In response to detecting the secondary-click gesture on SPC icon 308, the device can display secondary-click menu 706 with respect to image-object selection 2410 as illustrated in FIG. 24C. Secondary-click menu 706 displays a list of actions that can be performed with respect to image-object selection 2410 as illustrated in FIG. 24C. In the example shown, the actions are Rotate, Style, Light, Color, B&W.

Figure 24D:
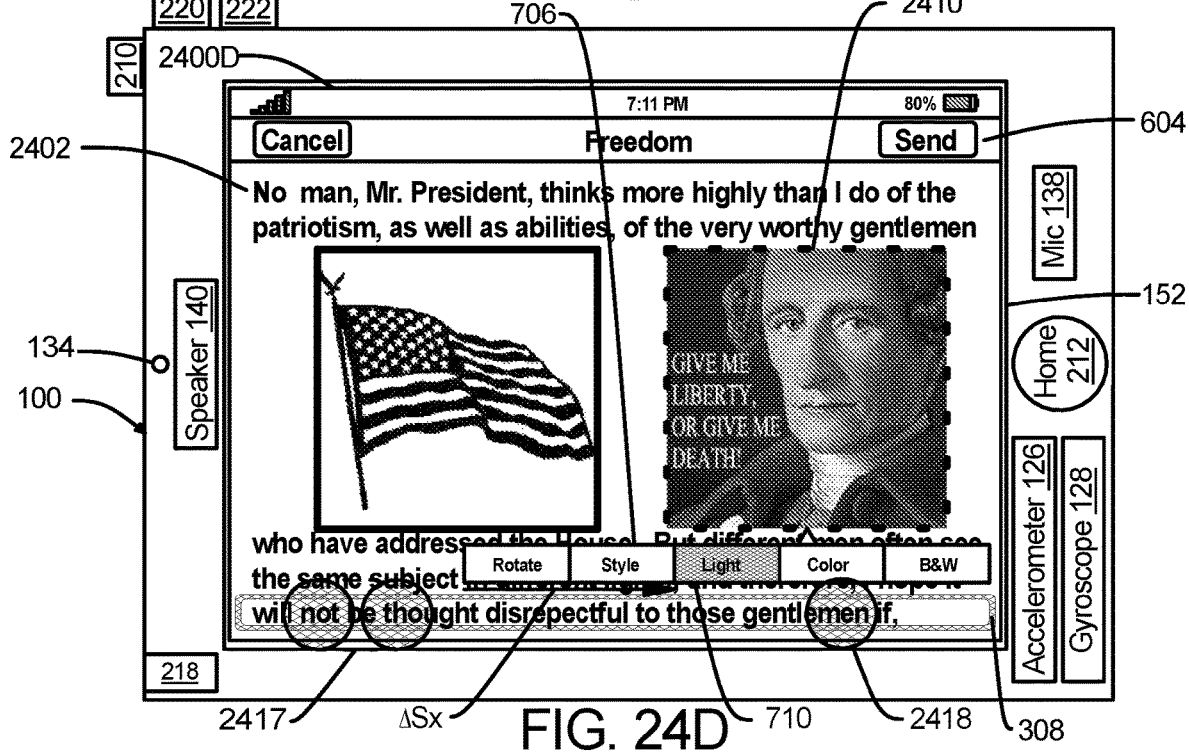
Figure 24E:
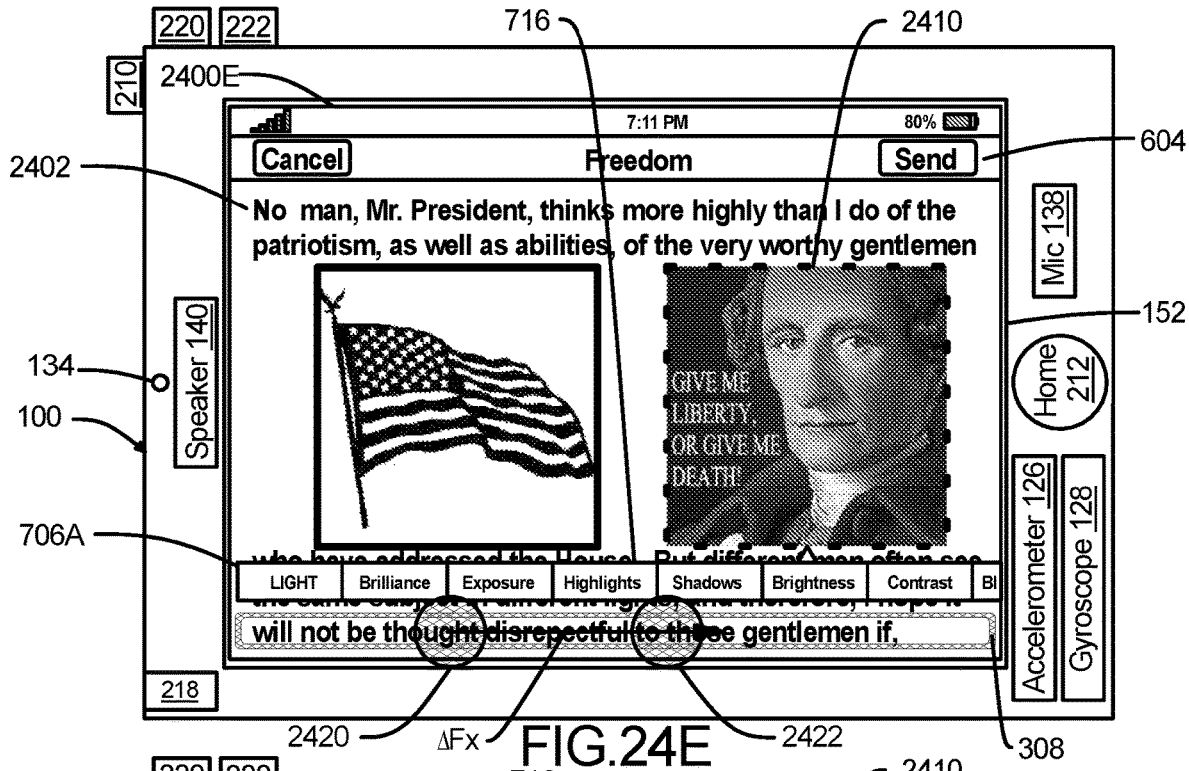

1) A user can perform a horizontal slide finger gesture 2414 to 2416 beginning anywhere on SPC icon 308 as illustrated in UI 2400E (FIG. 24E). In response to detecting a change in a horizontal position of a finger contact ($\Delta$Fx) on SPC icon 308, the device can display menu item preselection 710 at a position within a secondary-click menu and change a position ($\Delta$Sx) of menu item preselection 710 on secondary-click menu 706 as illustrated in UI 2400D (FIG. 24D). In this example, Kx<1.

In one exemplary embodiment $\Delta$Sx (the change in the horizontal position of menu item preselection 710) is approximately proportional to $\Delta$Fx as illustrated in FIGS. 24C-24D. Kx is the proportionality constant for motion in the x-direction. $\Delta$Sx is not exactly proportional to $\Delta$Fx because the selection moves in discrete steps corresponding to the width of each item in the menu. Kx can be a function of the slide gesture speed where Kx<1, Kx=1, or Kx>1. In the example shown, the user has performed a slide gesture right, until the device changes the horizontal position of menu item preselection 710 to the item "Light" on secondary-click menu 706 as illustrated in FIGS. 24C-24D.

In some instances, secondary-click menu 706 can have a horizontal extent that exceeds the display horizontal extent. In that case, a user can move menu item preselection 710 until the position of preselection 710 is approximately one menu item from the right (left) boundary of the display. In response, the device scrolls secondary-click menu 706 left (right) by one menu item until preselection 710 has moved to the last (first) menu item.

Cancel display of a secondary-click menu: a user can perform a secondary-click menu cancel gesture 2417 (a two-finger tap gesture for example) on selection positioning and control (SPC) icon 308. In response to detecting the secondary-click menu cancel gesture, the device redisplays UI 2400B (FIG. 24B).

2) A user can perform tap gesture 2418 on SPC icon 308 as illustrated in FIG. 24D. In response, the device displays sub-menu 716 showing a list of "Light" attributes as illustrated in UI 2400E (FIG. 24E). The list of light attributes is for the image 2408 at image-object selection 2410. In this example, sub-menu 716 shows the "Light" attributes "Brilliance", "Exposure", "Highlights", Shadows", "Brightness", Contrast", and "Black Point." The device can also display the parent menu item 706A showing the parent menu "Light" for sub-menu 716. In this instance, the sub-menu 716 has a horizontal extent that exceeds the display horizontal extent as illustrated in FIG. 24E.

Figure 24F:
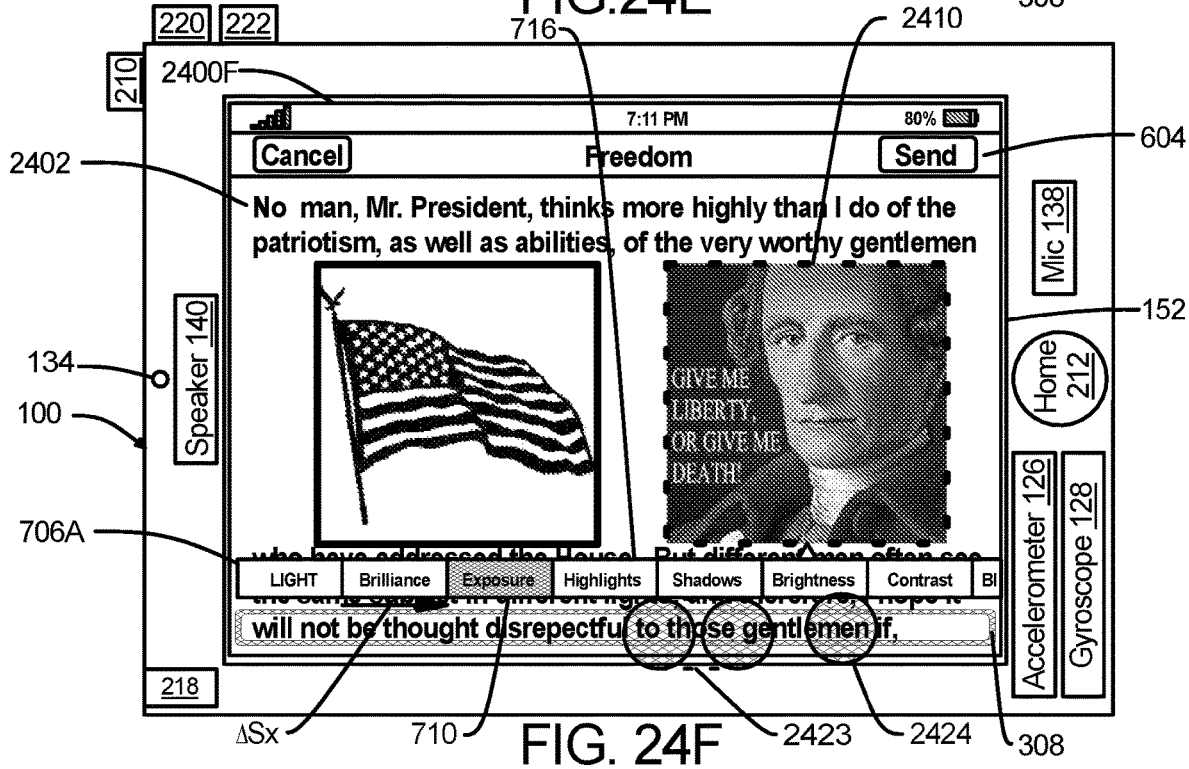

3) A user can perform a horizontal slide finger gesture 2420 to 2422 beginning anywhere on SPC icon 308. In response to detecting a change in a horizontal position of a finger contact ($\Delta$Fx) on SPC icon 308, the device can display menu item preselection 710 at a position within a secondary-click menu and change a position ($\Delta$Sx) of menu item preselection 710 on sub-menu 716 as illustrated in FIG. 24F. In this example, Kx<1, In the example shown the user has performed a slide gesture in the rightward direction, until the device changes the horizontal position of menu item preselection 710 to the item "Exposure" on sub-menu 716 as illustrated in UI 2400F (FIG. 24F).

Cancel display of a secondary-click menu: a user can perform a secondary-click menu cancel gesture 2423 (a two-finger tap gesture for example) on selection positioning and control (SPC) icon 308. In response to detecting the secondary-click menu cancel gesture, the device redisplays menu 706 as illustrated in UI 2400D (FIG. 24D).

Figure 24G:
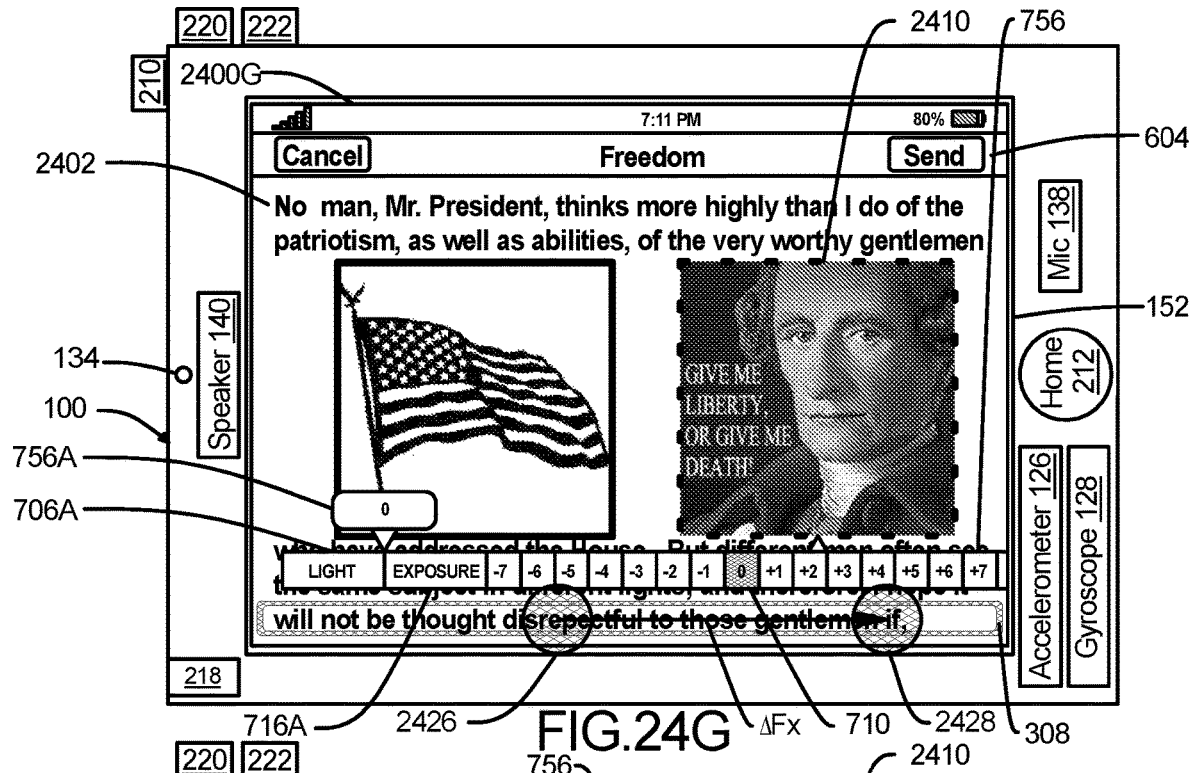

4) A user can perform tap gesture 2424 on SPC icon 308 as illustrated in FIG. 24F. In response, the device displays $2^{ND}$ sub-menu 756 showing a list of "Exposure" attributes ranging from −7 to +7 as illustrated in UI 2400G (FIG. 24G). In this example, the exposure attribute is a change in exposure relative to the current exposure. The device can also display the parent menu item 706A "Light" and parent sub-menu item 716A "Exposure" to provide context for the items listed in $2^{nd}$ sub-menu 756. The device can display menu item preselection 710 at the current "Exposure" attribute of "0" as illustrated in FIG. 24G. Finally, the device can also display detailed description 756A of the current selection within the $2^{nd}$ submenu 756. In this example, the detail shows a current exposure setting of "0". A detailed description can provide additional information to the user when an item within a menu, sub-menu, or $2^{nd}$ sub-menu as in this example, is marked with an abbreviated name, icon, or symbol that may not be familiar or readily understood by the user.

Figure 24H:
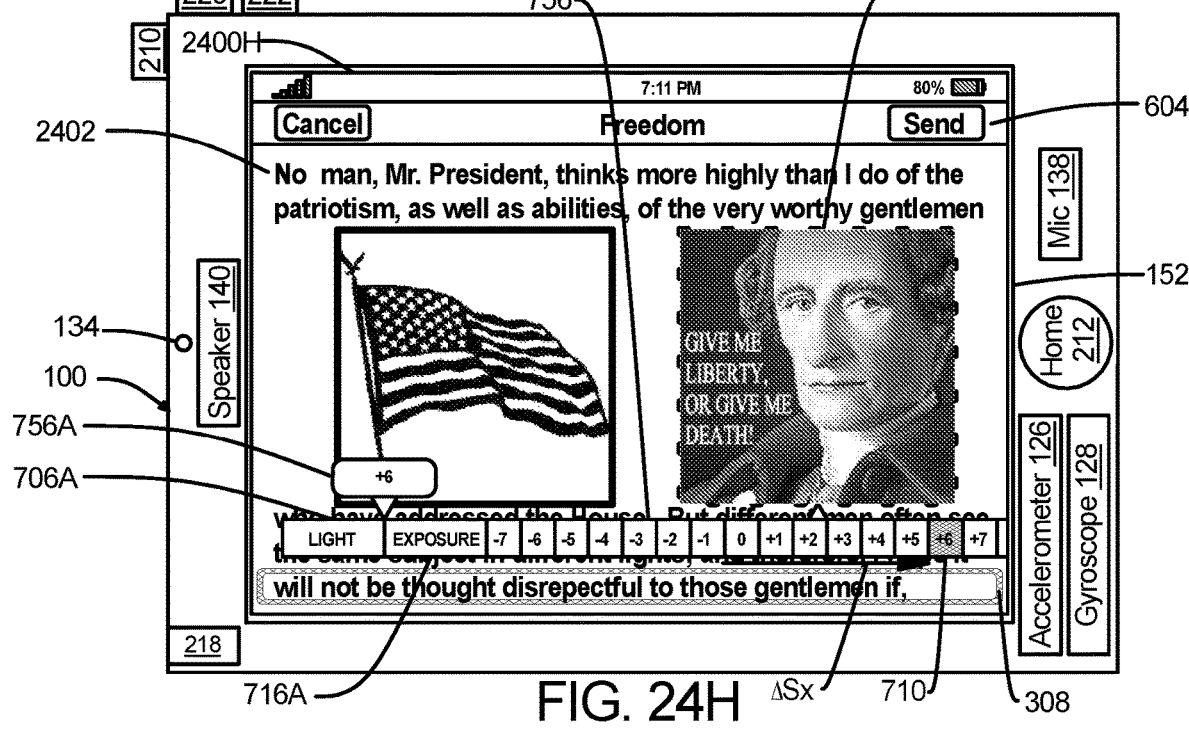

5) A user can perform a horizontal slide finger gesture 2426 to 2428 beginning anywhere on SPC icon 308. In response to detecting a change in a horizontal position of a finger contact ($\Delta Fx$) on SPC icon 308, the device can display menu item preselection 710 at a position within a secondary-click menu and change a position ($\Delta Sx$) of menu item preselection 710 within $2^{nd}$ sub-menu 756 as illustrated in FIG. 24H. In this example, Kx<1. In the example shown the user has performed a slide gesture in the rightward direction, until the device changes the horizontal position of menu item preselection 710 from item "0" to the item "+6" on $2^{nd}$ sub-menu 756 as illustrated in UI 2400H (FIG. 24H). This changes the "Light" "Exposure" from "0" to "+6". The exposure can be updated at each instance as the exposure setting is increased in discrete steps from an "Exposure" attribute of 0 to +1 to +2 to +3 to +4 to +5 to +6 as the menu item preselection 710 is moved from its position at the "Exposure" attribute of "0" to an exposure attribute of "6". This enables the user to "tune" the attribute (Light Exposure in this example) in real time while viewing the impact of a particular attribute value on the appearance of the image. In this example the image exposure has been increased to +6. This increase in image exposure causes the image 2408 to be lightened as illustrated in FIG. 24H.

Figure 24I:
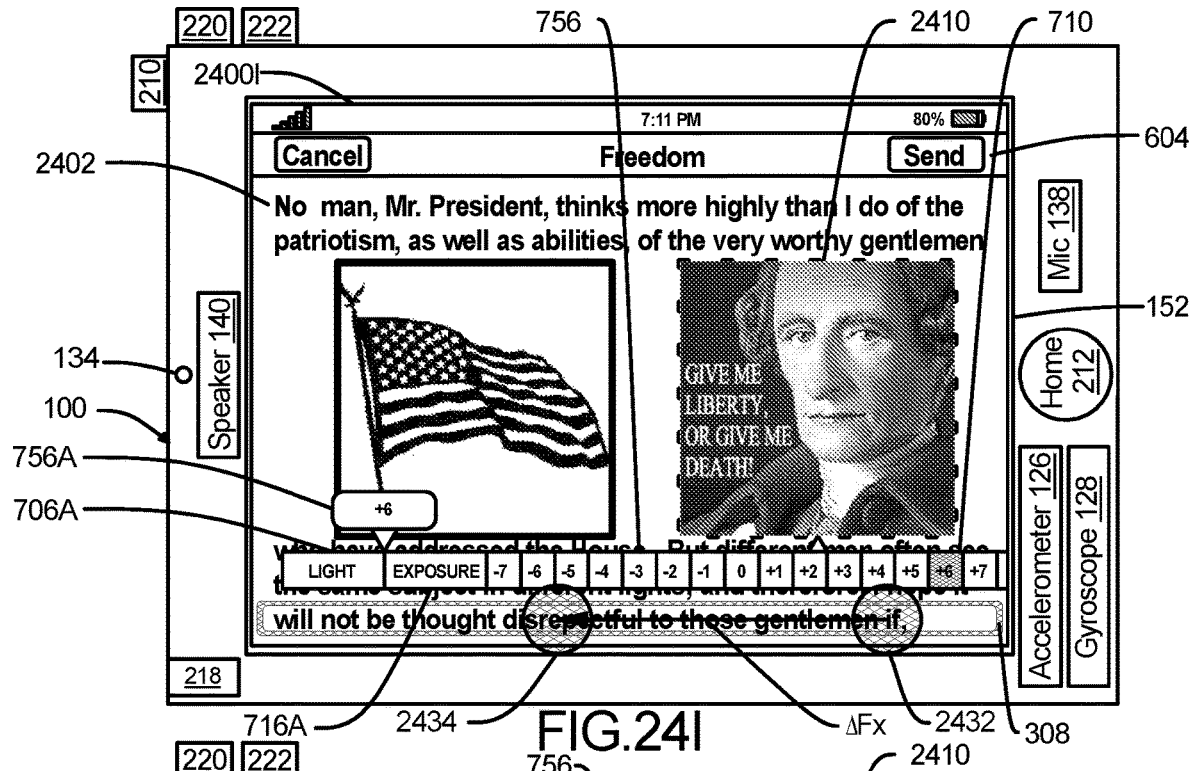
Figure 24J:
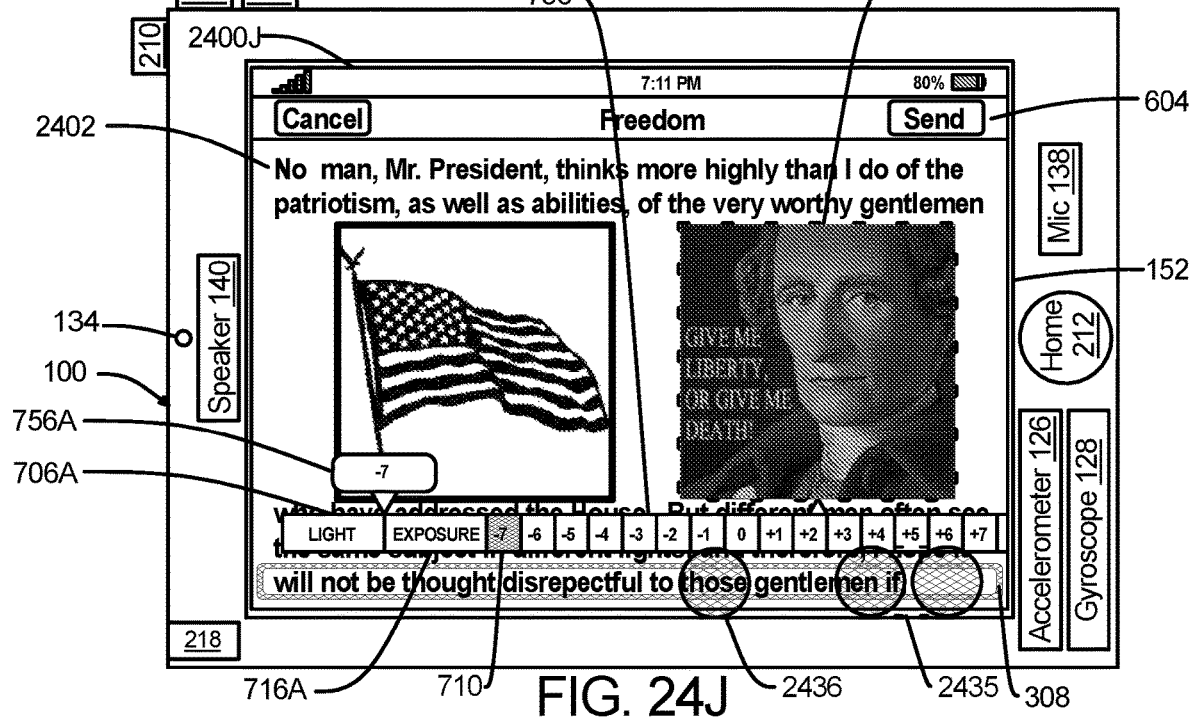

6) A user can perform a horizontal slide finger gesture 2432 to 2434 beginning anywhere on SPC icon 308 as illustrated in FIG. 24I. In response to detecting a change in a horizontal position of a finger contact ($\Delta Fx$) on SPC icon 308, the device can display menu item preselection 710 at a position within a secondary-click menu and change a position ($\Delta Sx$) of menu item preselection 710 within $2^{nd}$ sub-menu 756 as illustrated in FIG. 24J. In this example, Kx>1.

In the example shown the user has performed a slide gesture in the leftward direction, until the device changes the horizontal position of menu item preselection 710 from item "+6" to the item "−7" on $2^{nd}$ sub-menu 756 as illustrated in UI 2400J (FIG. 24J). This changes the "Light" "Exposure" from "+6" to "−7". The exposure can be updated at each instance as the exposure setting is changed in discrete steps from an "Exposure" attribute of +6 to +5 to +4 to +3 to +2 to +1 to 0 to −1 to −2 to −3 to −4 to −5 to −6 to −7 as the menu item preselection 710 is moved from its position at the "Exposure" attribute of "+6" to an exposure attribute of "−7". In this example the image exposure has been deceased to −7. This decrease in image exposure causes the image at image-object selection 2406 to be darkened as illustrated in FIG. 24J.

Cancel display of a secondary-click menu: a user can perform a secondary-click menu cancel gesture 2435 (a two-finger tap gesture for example) on selection positioning and control (SPC) icon 308. In response to detecting the secondary-click menu cancel gesture, the device redisplays sub-menu 716 as illustrated in UI 2400E (FIG. 24E).

Figure 24K:
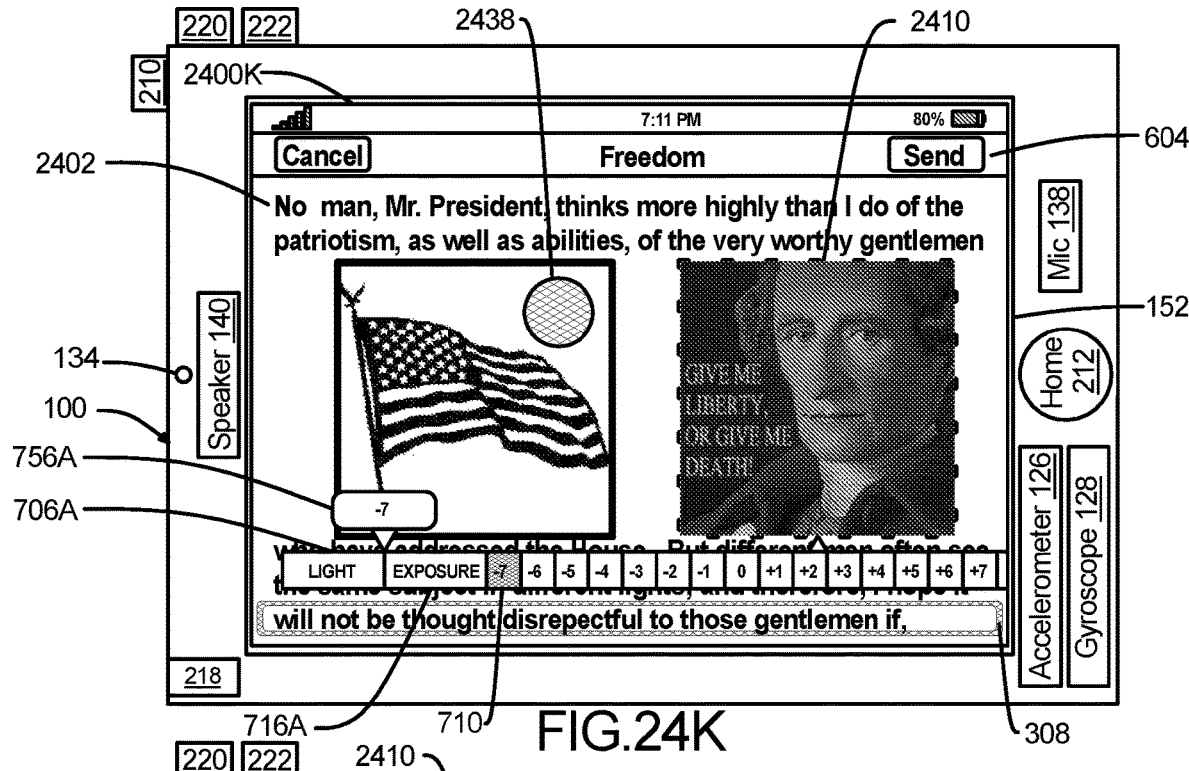
Figure 24L:
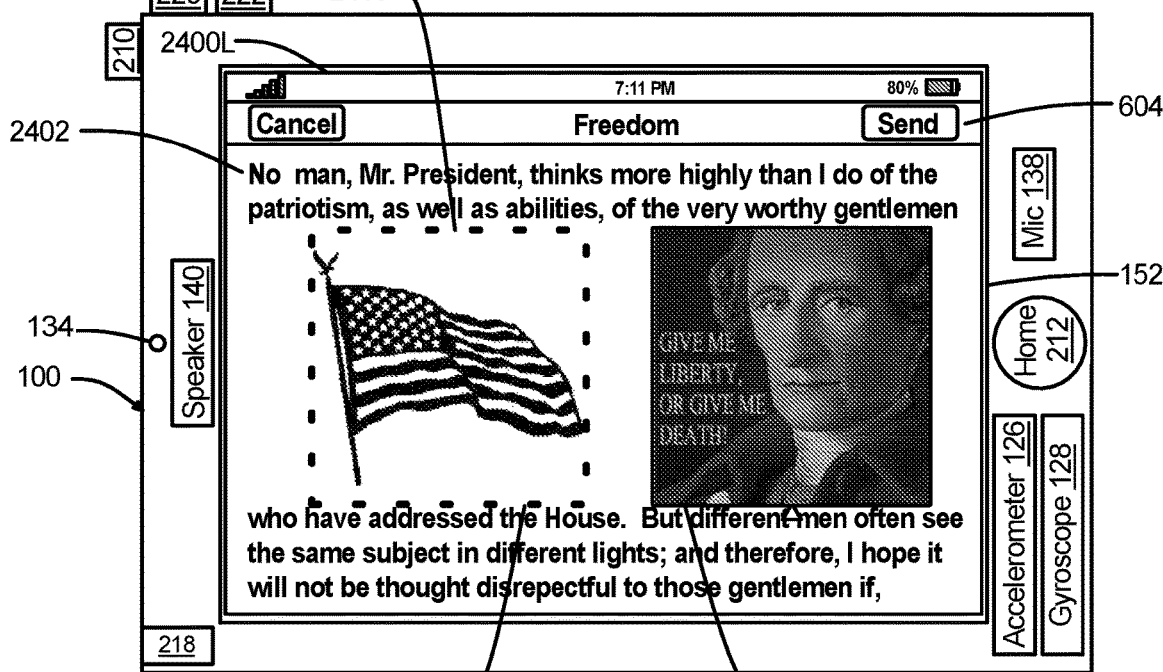

A user can perform a tap gesture 2436 on SPC icon 308 as illustrated in FIG. 24J. In response the device can display UI 2400K (FIG. 24K).

A user can perform a tap gesture 2438 outside image-object selection 2406 to cancel the selection of that image. For example, the user can perform a tap gesture on image 2406 as illustrated in FIG. 24K. In response to detecting tap gesture 2438 on image 2406, the device displays image-object selection 2410 at image 2406.

A user can perform a horizontal and vertical slide gesture on SPC icon 308 to move image-object selection 2410 from one image-object to another image-object within image-object content using methods similar to those described above in reference to FIGS. 8A-8N for moving text-object selection 810 from one text-object to another text-object within text-object content.

A user can perform a horizontal and vertical tap and slide gesture on SPC icon 308 to select multiple image-objects within image-object content using methods similar to those described above in reference to FIGS. 11A-11M for selecting multiple text-objects within text-object content.

Similar methods can be used for selecting shape-objects, positioning shape-objects, selecting multiple shape-objects, or performing a secondary-click action with respect to a shape-object selection within shape-object content. Shape-objects include lines, polygons, and arrows, and other shapes familiar to a user of a word processing application such as Microsoft Word. Similar methods can be used with respect to other-objects within other-object content.

25.0 Method for performing a secondary-click action with respect to an image-object selection: FIG. 25 is a flow diagram illustrating a method for displaying an image-object selection, performing a secondary-click action with respect to an image-object selection, on a computing device with a touch-sensitive display, in accordance with some embodiments. FIGS. 24A-24L, illustrate exemplary user interfaces for use in implementing the methods presented in the flow diagrams shown in FIG. 25.

A similar method can be used for displaying an object selection and performing a secondary-click action with respect to other objects including, but not limited to, a shape-object, a table-object, and a video-object.

Figure 26:
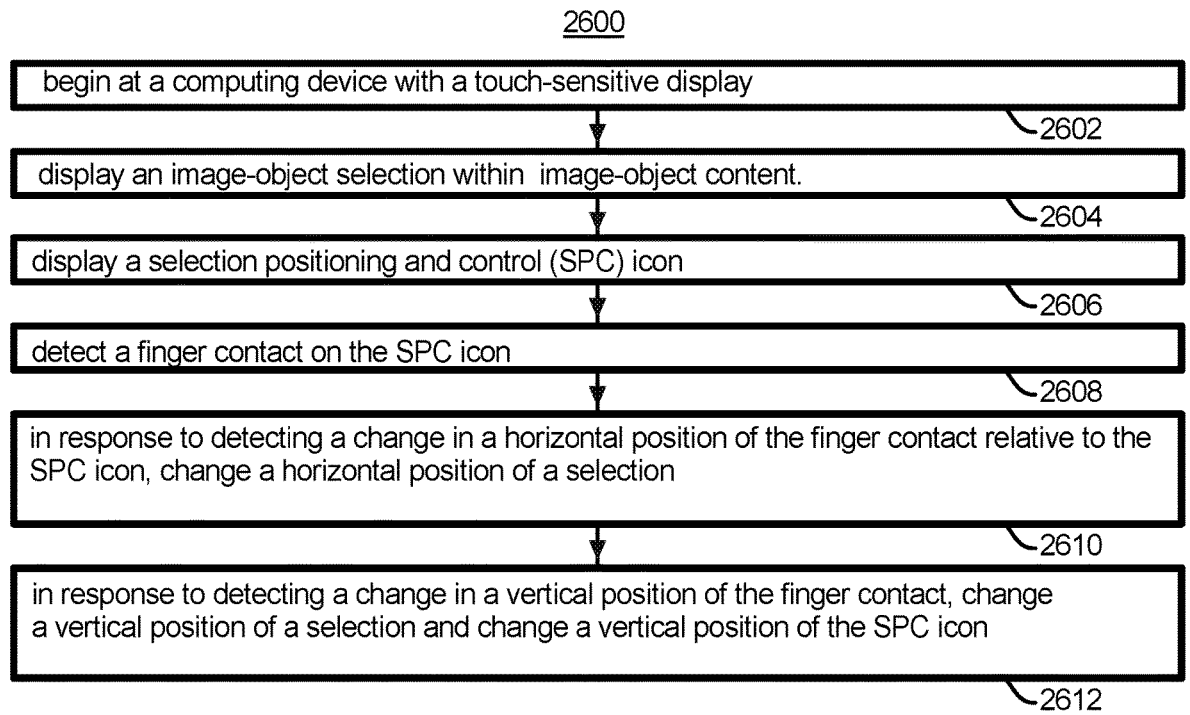
FIG. 26 is flow diagram illustrating a method for displaying an image-object selection and positioning an image-object selection within image-object content on a computing device with a touch-sensitive display in accordance with some embodiments.

26.0 Method for displaying and positioning an image-object selection within image-object content: FIG. 26 is flow diagram illustrating a method for displaying an image-object selection and positioning an image-object selection within image-object content on a computing device with a touch-sensitive display in accordance with some embodiments.

Figure 27A:
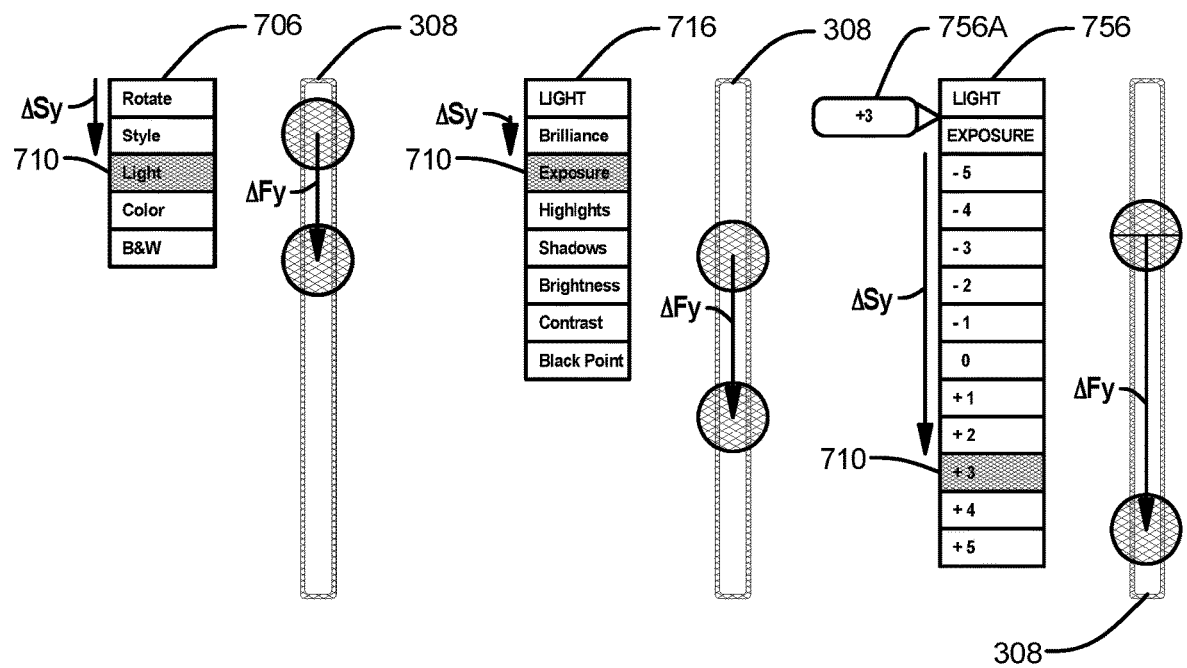
FIGS. 27A-27B Illustrate exemplary alternative graphical user interfaces for performing a secondary-click action with respect to a selection on a mobile computing device with a touch-sensitive display, in accordance with some embodiments.
Figure 27B:
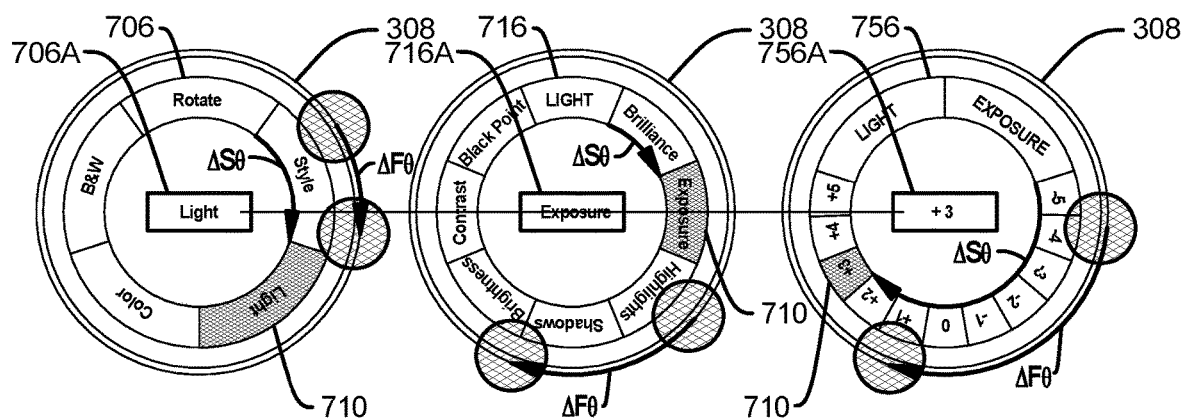

27.0 Alternative user interfaces for performing a secondary-click action with respect to a selection: FIGS. 27A-27B Illustrate exemplary alternative graphical user interfaces for performing a secondary-click action with respect to a selection on a computing device with a touch-sensitive display in accordance with some embodiments. The example user interfaces shown are for performing a secondary-click action with respect to an image-object selection.

In reference to FIG. 27A, in response to detecting a change in a vertical position of a finger contact ($\Delta Fy$) on SPC icon 308, the device can display menu item preselection 710 at a position within a secondary-click menu and change a position ($\Delta Sy$) of menu item preselection 710 within a secondary-click menu. In some embodiments the change in the vertical position of a selection ($\Delta Sy$) can be approximately proportional to the change in the vertical position of a finger contact ($\Delta Fy$.) This can be written as $\Delta Sy=Ky\Delta Fy$ where Ky is a proportionality constant for the y-component of the finger motion. The value of Ky can be less than one, equal to one, or greater than one. In some embodiments, Ky can be a function of the y-component of the slide gesture speed on SPC icon 308.

In reference to FIG. 27B, in response to detecting a change in an angular position of a finger contact ($\Delta F\theta$) on SPC icon 308, the device can display menu item preselection 710 at a position within a secondary-click menu and change a position (ΔSθ) of menu item preselection 710 within a secondary-click menu. In some embodiments the change in the angular position of a selection (ΔSθ) can be approximately proportional to the change in the angular position of a finger contact (AFO.) This can be written as ΔSθ=KθΔFθ where Kθ is a proportionality constant for the θ-component of the finger motion. The value of Kθ can be less than one, equal to one, or greater than one. In some embodiments, Kθ can be a function of the θ-component of the slide gesture speed on SPC icon 308.

28.0 Additional discussion:

28.1 Definition of terms: In this disclosure we have referred to four items: 1) unit-length selection 310 displayed within read-only text content 302, 2) zero-length selection 608 displayed within editable text content 602, 3) selection from selection start point 305 to selection end point 307 displayed within read-only text content 302 or displayed within editable text content 602, and 4) the user interface pointer displayed in a pointer-based operating system.

To insure there is no opportunity for confusion, each of these is described below in the context of existing computing devices, existing computer operating systems, and existing user interfaces for computing devices: 1) As disclosed and defined herein, unit-length selection 310 displayed within read-only text content 302 is the counterpart to zero-length selection 608 displayed within editable text content 602. In this disclosure, the unit-length selection is displayed as a one-character long selection. A unit-length selection 310 is associated with the content. If the text content is moved by scrolling or panning for example, then selection 310 moves with the content; 2) As disclosed and defined herein, zero-length selection 608 displayed within editable text content 602 defines the position where text can be added to, or removed from, the text content. The text can be added, for example with a keyboard entry or with a paste operation. In this disclosure the selection of zero-length is displayed as a narrow vertical bar. This zero-length selection is sometimes called an insertion mark or text cursor. A zero-length selection 608 is associated with the content. If the text content is moved by scrolling or panning, for example, then selection 608 moves with the content. The zero-length selection 608 is familiar to any user of a word processing application; 3) As disclosed and defined herein, a selection from selection start point 305 to selection end point 307 displayed within read-only or editable text content, is a selected range of words or characters within read-only or editable text content. A user can perform an operation with respect to the selected read-only text content 302—for example, a copy action. A user can perform an operation with respect to the selected editable text content 602—for example, a cut, copy, or paste action. If the text content is moved by scrolling or panning, for example, then the selection moves with the content. A selection from a selection start point to a selection end point, either within read-only text content or within editable text content, is familiar to any user of a word processing application; 4) A described and defined herein, the pointer is the graphical user interface pointer displayed on a computing device with a pointer-based operating system. A pointer-based operating system is familiar to any user of a notebook or desktop computer. The pointer is used to perform an action at any position on the display. The pointer is not associated with displayed content. Accordingly, a change in the position of the content on the display does not cause a change in the position of the pointer on the display. In a touch-based operating system, there is no separate user interface pointer. In a touch-based operating system, the user's finger is the pointer. A touch-based operating system is familiar to any user of a modern smart phone or tablet such as the iPhone or iPad sold by Apple.

In this disclosure we have referred to several additional items: 1) menu item preselection 710 displayed within a secondary-click menu for example), 2) text-object selection 810 displayed within text-object content (a spreadsheet for example), 3) image-object selection 1210 displayed within image-object content To insure there is no opportunity for confusion, each of these is described below in the context of existing computing devices, existing computer operating systems, existing user interfaces for computing devices, and existing computer applications: 1) As disclosed and defined herein, menu item preselection 710 displayed within a menu can be a displayed within a menu of secondary-click actions that can be performed with respect to selected text content or selected text-object content or selected image-object content. 2) As disclosed and defined herein, text-object selection 810 displayed within text-object content can be a selection of one or more spreadsheet cells displayed within a spreadsheet, for example. A text object selection 810 within content is associated with the content. If text-object content is moved by scrolling or panning, for example, then text-object selection 810 moves with the content. 3) As disclosed and defined herein, image-object selection 1210 displayed within image-object content can be a selection of one or more images displayed within a document, for example. An image-object selection 1210 within content is associated with the content. If content is moved by scrolling or panning, for example, then image-object selection 1210 moves with the content.

28.2 Methods: This disclosure includes methods comprising a computing device 100 with a touch-sensitive display implementing one or more of the methods selected from those described in reference to FIGS. 3A-3H, FIGS. 4A-4J, FIGS. 5A-5G, FIGS. 6A-6J, FIGS. 7A-7CC, FIGS. 8A-8N, FIGS. 9A-9P, FIGS. 10A-10N, FIGS. 11A-11M, FIGS. 12A-12B, FIGS. 24A-24L, FIGS. 27A-27B and those described in FIG. 13, FIG. 14, FIG. 15, FIG. 16, FIG. 17, FIG. 18, FIG. 19, FIG. 20, FIG. 21, FIG. 22, FIG. 23, FIG. 25, and FIG. 26.

28.3 Device: This disclosure includes a device 100 comprising a display, one or more processors, memory; and one or more programs, wherein one or more programs are stored in memory and configured to be executed by the one or more processors, the one or more programs including instructions for implementing one or more of the methods selected from those described in reference to FIGS. 3A-3H, FIGS. 4A-4J, FIGS. 5A-5G, FIGS. 6A-6J, FIGS. 7A-7CC, FIGS. 8A-8N, FIGS. 9A-9P, FIGS. 10A-10N, FIGS. 11A-11M, FIGS. 12A-12B, FIGS. 24A-24L, FIGS. 27A-27B and those described in FIG. 13, FIG. 14, FIG. 15, FIG. 16, FIG. 17, FIG. 18, FIG. 19, FIG. 20, FIG. 21, FIG. 22, FIG. 23, FIG. 25, and FIG. 26.

28.4 Computer readable storage medium: This disclosure includes a computer readable storage medium storage medium storing one or more programs, the one or more programs comprising instructions, which when executed by a device 100 with a touch-sensitive display, cause the device to implement one or more of the methods selected from those described in in reference to FIGS. 3A-3H, FIGS. 4A-4J, FIGS. 5A-5G, FIGS. 6A-6J, FIGS. 7A-7CC, FIGS. 8A-8N, FIGS. 9A-9P, FIGS. 10A-10N, FIGS. 11A-11M, FIGS. 12A-12B, FIGS. 24A-24L, FIGS. 27A-27B and those described in FIG. 13, FIG. 14, FIG. 15, FIG. 16, FIG. 17, FIG. 18, FIG. 19, FIG. 20, FIG. 21, FIG. 22, FIG. 23, FIG. 25, and FIG. 26.

28.5 User interfaces: This disclosure includes user interfaces on a computing device 100 with a touch-sensitive display selected from those described in reference to FIGS. 3A-3H, FIGS. 4A-4J, FIGS. 5A-5G, FIGS. 6A-6J, FIGS. 7A-7CC, FIGS. 8A-8N, FIGS. 9A-9P, FIGS. 10A-10N, FIGS. 11A-11M, FIGS. 12A-12B, FIGS. 24A-24L, FIGS. 27A-27B and those described in FIG. 13, FIG. 14, FIG. 15, FIG. 16, FIG. 17, FIG. 18, FIG. 19, FIG. 20, FIG. 21, FIG. 22, FIG. 23, FIG. 25, and FIG. 26.

28.6 Gestures to display a selection:

Display an initial selection within read-only text content: A user can perform a long-press gesture on selection positioning and control (SPC) icon 308 for displaying unit-length selection 310 within read-only content.

Display an initial selection within editable text content: A user can perform a tap or long-press gesture on selection positioning and control (SPC) icon 308 for displaying zero-length selection 608 within editable content.

Display an initial selection within editable text-object content: A user can perform a tap or long-press gesture on selection positioning and control (SPC) icon 308 for displaying text-object selection 810 (a spreadsheet cell selection for example) within editable text-object content (a spreadsheet for example).

Display zero-length selection 608 within a selected editable text-object: A user can perform a double-tap gesture on selection positioning and control (SPC) icon 308 for displaying zero-length selection 608 within a selected text-object for implementing one or more of the methods selected from those described at least in reference to FIGS. 15J-15W.

28.7 Gestures to display and move a selection:

Display selection and move selection within text content: A user can perform a gesture on selection positioning and control (SPC) icon 308 to display unit-length selection 310 within read-only text content or perform a gesture on selection positioning and control (SPC) icon 308 to display zero-length selection 608 within editable text content. A user can perform a slide gesture beginning anywhere on selection positioning and control (SPC) icon 308 for moving unit-length selection 310 within read-only text content or moving zero-length selection 608 within editable text content and implementing one or more of the methods selected from those described in reference to FIGS. 3A-3H and those described in FIG. 13, FIG. 14, FIG. 15, FIG. 16.

Display selection and move selection within a menu: A user can perform a gesture to display a secondary-click menu comprising one or more menu items. A user can perform a gesture on selection positioning and control (SPC) icon 308 to display menu item preselection 710 within the secondary-click menu. A user can perform a slide gesture beginning anywhere on selection positioning and control (SPC) icon 308 for moving menu item preselection 710 within a menu (a secondary-click menu for example) and implementing one or more of the methods selected from those described in reference to FIGS. 7A-7CC, FIGS. 10A-10N, FIGS. 24A-24L, FIGS. 27A-27B and those described in FIG. 22, FIG. 23, FIG. 25, and FIG. 26. In an alternative embodiment, the position of menu item preselection 710 within a menu can be moved by moving the menu relative to the menu item preselection 710.

Display selection and move selection within text-object content: A user can perform a gesture on selection positioning and control (SPC) icon 308 to display text-object selection 810 within text-object content. A user can perform a slide gesture beginning anywhere on selection positioning and control (SPC) icon 308 for moving text-object selection 810 within text-object content (a spreadsheet for example) and implementing one or more of the methods selected from those described in reference to FIGS. 8A-8N, FIGS. 10A-10N, FIGS. 11A-11M, and those described in FIG. 16, FIG. 17, FIG. 18, FIG. 19, and FIG. 20.

Display selection and move zero-length selection within an editable text-object: A user can perform a gesture on selection positioning and control (SPC) icon 308 to display zero-length selection 608 within a selected text-object. A user can perform a slide gesture beginning anywhere on selection positioning and control (SPC) icon 308 for moving zero-length selection 608 (text-cursor) within editable content in a selected text-object (within a spreadsheet cell for example) and implementing one or more of the methods selected from those described in reference to FIGS. 9A-9P, and those described in FIG. 21.

28.8 Proportional movement:

Change in a horizontal position of a selection for a change in a horizontal position of finger contact: In some embodiments the change in the horizontal position of a selection ($\Delta Sx$) can be approximately proportional to the change in the horizontal position of a finger contact ($\Delta Fx$.) This can be written as $\Delta Sx = Kx \Delta Fx$ where Kx is a proportionality constant for the x-component of the finger motion. $\Delta Sx$ is not exactly proportional to $\Delta Fx$ because the selection moves in discrete steps corresponding to the horizontal distance between characters within text content or the horizontal distance between text-objects within text-object content or the horizontal distance between menu item text-objects within a menu. The value of Kx can be less than one, equal to one, or greater than one. In some embodiments, Kx can be a function of the x-component of the slide gesture speed. The selection includes, but is not limited to, unit-length selection 310 within read-only text content, zero-length selection 608 within editable text content, and text-object selection 810 within text-object content. The selection includes, but is not limited to, selection end point 307 within text content and text-object selection end point 811 within text-object content. The selection includes, but is not limited to, menu item preselection 710 within a secondary-click menu 706, sub-menu 716, or $2^{nd}$ sub-menu 756.

Kx dependence on slide gesture speed: A user can change the dependence of Kx on the x-component of the slide gestures speed to better serve the needs of the user for quick and accurate positioning of the selection using on-screen gestures on selection positioning and control (SPC) icon 308 as previously described in reference to FIG. 12A. As previously described in reference to FIG. 12B, Kx can be a weak function of the x-component of the slide gesture speed, at a tracking-speed setting of 2 for example, or Kx can be a strong function of the x-component of the slide gesture speed, at a tracking-speed setting of 8 for example. The selection includes, but is not limited to, unit-length selection 310 within read-only text content, zero-length selection 608 within editable text content, menu item preselection 710 within a menu, and text-object selection 810 within text-object content. The selection includes, but is not limited to, selection end point 307 within text content and text-object selection end point 811 within text-object content. The selection includes, but is not limited to, menu item preselection 710 within a secondary-click menu 706, sub-menu 716, or $2^{nd}$ sub-menu 756.

28.9 Gestures to display a selection and select multiple characters or text-objects:

Display selection and select multiple characters within text content: A user can perform a gesture on selection positioning and control (SPC) icon 308 to display unit-length selection 310 within read-only text content or perform a gesture on selection positioning and control (SPC) icon 308 to display zero-length selection 608 within editable text content. A user can perform a tap-and-slide gesture beginning anywhere on selection positioning and control (SPC) icon 308 for selecting text beginning at unit-length selection 310 within read-only text content or beginning at zero-length selection 608 within editable text content and implementing one or more of the methods selected from those described in reference to, FIGS. 4A-4J, FIGS. 5A-5G, FIGS. 6A-6J, and those described in FIG. 14 and FIG. 15.

Display selection and select multiple text-objects within text-object content: A user can perform a gesture on selection positioning and control (SPC) icon 308 to display text-object selection 810 within text-object content. A user can perform a tap-and-slide gesture beginning anywhere on selection positioning and control (SPC) icon 308 for selecting multiple text-objects (multiple spreadsheet cells for example) beginning at text-object selection 810 within text-object content (a spreadsheet for example) and implementing one or more of the methods selected from those described in reference to FIGS. 11A-11M, and those described in FIG. 18.

Selecting text or text-object content w/drag-lock off: The user can set "drag-lock" OFF for gestures on selection positioning and control (SPC) icon 308. With "drag-lock" OFF, the user can finalize a selection of characters within read-only text, or within editable text, with a finger lift at the end of a tap-and-slide finger gesture beginning anywhere on selection positioning and control (SPC) icon 308. With "drag-lock" OFF, the user can finalize a selection of text-objects within read-only text-object content, or within editable text-object content, with a finger lift at the end of a tap-and-slide finger gesture beginning anywhere on selection positioning and control (SPC) icon 308. The selection extent is finalized with the finger lift at the end of the tap-and-slide finger gesture on selection positioning and control (SPC) icon 308.

Selecting text or text-object content w/drag-lock on: The user can set "drag-lock" ON for gestures on selection positioning and control (SPC) icon 308. With "drag-lock" ON, the user can make an initial selection of characters within read-only text, or within editable text, with a finger lift at the end of a tap-and-slide finger gesture beginning anywhere on selection positioning and control (SPC) icon 308. With "drag-lock" ON, the user can make an initial selection of text-objects within read-only text-object content, or within editable text-object content, with a finger lift at the end of a tap-and-slide finger gesture beginning anywhere on selection positioning and control (SPC) icon 308. The user can modify the selection extent with one or more additional slide gestures on selection positioning and control (SPC) icon 308. The selection extent is finalized with a finger tap after the finger lift at the end of the slide finger gesture on selection positioning and control (SPC) icon 308.

Display selection and select a single word within text content: A user can perform a gesture on selection positioning and control (SPC) icon 308 to display unit-length selection 310 within read-only text content or perform a gesture on selection positioning and control (SPC) icon 308 to display zero-length selection 608 within editable text content. A user can perform a double-tap gesture on selection positioning and control (SPC) icon 308 for selecting a word at the position of unit-length selection 310 or zero-length selection 608 and for implementing one or more of the methods selected from those described at least in reference to FIGS. 4L-4J and FIGS. 6A-6J.

28.10 Gestures to display secondary-click menu with respect to a selection:

Secondary-click-gesture with respect to a selection within text content or text-object content: A user can perform a two-finger tap gesture on selection positioning and control (SPC) icon 308 to display a secondary-click menu with respect to a unit-length selection 310 or zero-length selection 608 or a multiple-character selection. A user can perform a two-finger tap gesture on selection positioning and control (SPC) icon 308 to display a secondary-click menu with respect to text-object selection 810 or a multiple-text-object selection within text-object content (a spreadsheet for example). If a secondary-click menu is displayed, a user can perform a two-finger tap gesture on selection positioning and control (SPC) icon 308 to cancel the display of the secondary-click menu.

Alternatively, a user can perform a long-press gesture on selection positioning and control (SPC) icon 308 for displaying secondary-click menu. If a secondary-click menu is displayed, a user can perform a long-press gesture on selection positioning and control (SPC) icon 308 to cancel the display of the secondary-click menu.

Alternatively, a user can perform a tap gesture in a particular region of selection positioning and control (SPC) icon 308 to display a secondary-click menu. A tap gesture near the left-boundary or right-boundary of SPC icon 308 could be detected by the device as a secondary-click gesture. Alternatively, a different secondary-click gesture can be defined.

Secondary-click-gesture with respect to a selection within image-object content: A user can perform a two-finger tap gesture on an image to select the image, display secondary-click menu 706 with respect to the selected image, and display selection positioning and control (SPC) icon 308 adjacent to secondary click menu 710. If a secondary-click menu is displayed, a user can perform a two-finger tap gesture on the selected image to cancel the display of the secondary-click menu. Alternatively, a user can perform a long-press gesture on an image to select the image, display secondary-click menu 706 with respect to the selected image, and display selection positioning and control (SPC) icon 308 adjacent to secondary click menu. If a secondary-click menu is displayed, a user can perform a long-press gesture on the selected image to cancel the display of the secondary-click menu. Alternatively, a different secondary-click gesture can be defined.

28.11 Multi-Level Secondary-Click Menus:

In reference to FIGS. 7A-7CC, FIGS. 10A-10N, and FIGS. 24A-24L, we described a method and graphical user interface for performing a secondary-click action with respect to a selection within text content, text-object content, and image-object content. We described the use of gestures on selection positioning and control icon 308 to position menu item preselection 710 within a secondary-click menu 706, within sub-menu 716, or within $2^{nd}$ sub-menu 756.

This can offer the user methods for quickly and accurately navigating with a secondary-click menu, sub-menu, and $2^{nd}$ sub-menu that contains a large number of items. With left-right auto-scroll of a secondary-click menu, a very large number of menu items that can be presented to the user in a given menu or sub-menu or $2^{nd}$ sub-menu, within a small display area.

Menu and sub-menu example architectures: An example sequence of actions for performing a secondary-click action with respect to a selection within text content, or with respect to text-object selection within text-object content, with a menu item selected from a menu and sub-menu:

1) two-finger tap gesture on SPC icon to display a secondary-click menu with respect to a selection within content 2) finger slide gesture on SPC icon to position menu item preselection 710 at a menu item 3) finger tap gesture on SPC icon to select the menu item at a position of the menu item preselection and display sub-menu 4) finger slide gesture on SPC icon to position menu item preselection at a sub-menu item 5) finger tap gesture on SPC icon to select the sub-menu item and finalize the action of the sub-menu item at the position of the menu item preselection and applying the menu item to the selected content.

An example alternative sequence of actions for performing a secondary-click action with respect to a selection within text content, or with respect to a text-object selection within text-object content, with a menu item selected from a menu and sub-menu where the selected attribute (font color attribute for example) is updated in real time as the menu item preselection 710 is positioned at each successive sub-menu item:

1) two-finger tap gesture on SPC icon to display a secondary-click menu with respect to a selection within content 2) finger slide gesture on SPC icon to position menu item preselection 710 at a menu item 3) finger tap gesture on SPC icon to select the menu item at the position of the menu item preselection and display sub-menu 4) finger slide gesture on SPC icon to position the menu item preselection at a sub-menu item and apply the menu item at the position of the menu item preselection to the selection within the content 5) finger tap gesture on SPC icon to finalize the action of the sub-menu item at the selection Menu, sub-menu, and $2^{nd}$ sub-menu example architectures: In the case of a menu item, with a large number of characteristics and sub-characteristics, items can be selected using a menu, a $1^{st}$ sub-menu, and a $2^{nd}$ sub-menu architecture.

An example sequence of actions for performing a secondary-click action with respect to a selection within text content or with respect to text-object selection within text-object content with a menu item selected from a menu, a $1^{st}$ sub-menu, and $2^{nd}$ sub-menu:

1) secondary-click gesture (e.g. two-finger tap gesture) on SPC icon to display a secondary-click menu with respect to a selection within content 2) finger slide gesture on SPC icon to position menu item preselection 710 at a menu item 3) finger tap gesture on SPC icon to select the menu item at a position of the menu item preselection and display $1^{st}$ sub-menu 4) finger slide gesture on SPC icon to position menu item preselection 710 at a $1^{st}$ sub-menu item 5) finger tap gesture on SPC icon to select $1^{st}$ sub-menu item and display $2^{nd}$ sub-menu 6) finger slide gesture on SPC icon to position menu item preselection 710 at a $2^{st}$ sub-menu item 7) finger tap gesture on SPC icon to select the $2^{nd}$ sub-menu item and finalize the action of the $2^{nd}$ sub-menu item by updating the selected content An example alternative sequence of actions for performing a secondary-click action with respect to a selection within text content or with respect to text-object selection within text-object content with a menu item selected from a menu, a $1^{st}$ sub-menu, and $2^{nd}$ sub-menu where the selected attribute (font color attribute for example) is updated in real time as the menu item preselection is positioned at each successive $2^{nd}$ sub-menu item:

1) secondary-click gesture (e.g. two-finger tap gesture) on SPC icon to display a secondary-click menu with respect to a selection within content 2) finger slide gesture on SPC icon to position menu item preselection 710 at a menu item 3) finger tap gesture on SPC icon to select the menu item at a position of the menu item preselection and display $1^{st}$ sub-menu 4) finger slide gesture on SPC icon to position menu item preselection at a $1^{st}$ sub-menu item 5) finger tap gesture on SPC icon to select $1^{st}$ sub-menu item and display $2^{nd}$ sub-menu 6) finger slide gesture on SPC icon to position menu item preselection at a $2^{st}$ sub-menu item and update the content at the selection within the content 7) finger tap gesture on SPC icon to select the 2nd sub-menu item and finalize the action of the 2nd sub-menu item Other menu architectures: Other menu architectures could be employed as well. These include, but are not limited to, single-level menus, and other multi-level menu architectures. For example, a three-level menu could be reduced to a two-level menu with more options at the second level. For example, a two-level menu could be reduced to a single-level menu with more options at the top level.

The application of an attribute to a selection can be dependent upon the type of attribute. For example: 1) If only one attribute can be applied to a selection, then the attribute can be applied when the menu item preselection is positioned at that attribute; examples include font family, font color, font size, 2) If one or more attributes can be applied, then the attribute can be applied when the menu item preselection is positioned at that attribute and the user taps on the SPC icon. An example is font style in which a user can apply one or more of the following attributes to selected text: bold, italic, and underline.

Initial position of display of menu item preselection within a secondary-click menu: In response to detecting a change in a horizontal position of a finger contact (ΔFx) on SPC icon 308, the device can display menu item preselection 710 at a position within a secondary-click menu and change a position of menu item preselection 710 within a secondary-click menu (ΔSx). In some embodiments the change in the horizontal position of a preselection (ΔSx) can be approximately proportional to the change in the horizontal position of a finger contact (ΔFx.) This can be written as ΔSx=KxΔFx where Kx is a proportionality constant for the x-component of the finger motion. The value of Kx can be less than one, equal to one, or greater than one. In some embodiments, Kx can be a function of the x-component of the slide gesture speed.

If the slide gesture on SPC icon 308 is left-to-right, then preselection 710 can be displayed first at the leftmost item in menu 706, sub-menu 716, or $2^{nd}$ sub-menu 756. If the slide gesture on SPC icon 308 is right-to-left, then preselection 710 can be displayed first at the rightmost item in menu 706, sub-menu 716, or $2^{nd}$ sub-menu 756.

The preselection 710 can be displayed initially at the menu item corresponding to a current value of an attribute.

For example, if a secondary-click $2^{nd}$ sub-menu 756 is displayed to change the font color attribute of selected text as illustrated in FIG. 7V, and the current color of the font is black, then the menu item preselection 710 can be displayed initially at the black color item within the secondary-click $2^{nd}$ sub-menu 756.

Cancel display of a secondary-click menu: A user can perform a secondary-click menu cancel gesture (a two-finger tap gesture for example) on selection positioning and control (SPC) icon 308. In response to detecting the secondary-click menu cancel gesture, the device cancels the display of the menu; if the menu is not the top-level menu, the device displays the parent menu. 1) If secondary-click menu 706 is displayed, the device cancels the display of the secondary-click menu 706; and the device continues to display the selection and SPC icon 308. 2) If secondary-click sub-menu 716 is displayed, the device cancels the display of the secondary-click sub-menu 716; the device displays secondary click menu 706, and the device continues to display the selection and SPC icon 308. 3) If secondary-click $2^{nd}$ sub-menu 756 is displayed, the device cancels the display of the secondary-click $2^{nd}$ sub-menu 756; the device displays the selection and SPC icon 308; and the device displays secondary click sub-menu 716.

Cancel display of the secondary-click menu, cancel display of the selection, and cancel display of SPC icon: A user can perform a tap gesture outside of the SPC icon. In response to detecting a tap gesture outside of the selection positioning and control (SPC) icon, the device cancels display of the secondary-click menu, cancels display of the selection, cancels display of the SPC icon, and displays a selection at the tap position.

28.12 Auto-scroll of content:

Vertical auto-scroll of text content: When a selection is moved near the last (first) line of displayed text, the device can automatically scroll content up (down). The device can continue to scroll the content up (down), either until the user moves the selection up (down) from the last (first) line displayed text, or until the content has scrolled to last (first) line of the text content. The selection can be unit-length selection 310 within read-only text content, or zero-length selection 608 within editable text content, or selection end point 307 within text content.

Vertical auto-scroll of text-object content: When a selection is moved near the last (first) line of displayed text-object content, the device can automatically scroll content up (down). The device can continue to scroll the content up (down), either until the user moves the selection up (down) from the last (first) text-object of displayed text-object content, or until the content has scrolled to last (first) row of text-objects within the text-object content. The selection can be text-object selection 810 or a multiple-text-object selection within text-object content (a spreadsheet for example).

Horizontal auto-scroll of text content: When a selection is moved near the first (last) displayed character near the left (right) boundary of the displayed text, the device can scroll content right (left), either until the user moves the selection off the first displayed character to stop the scrolling, or until the content has scrolled to last (first) character of the text content. The selection can be unit-length selection 310 within read-only text content, or zero-length selection 608 within editable text content, or selection end point 307 within text content.

Horizontal auto-scroll of text-object content: When a selection is moved near the first (last) displayed text object near the left (right) boundary of the displayed text-object content, the device can scroll content right (left), either until the user moves the selection off the first displayed text-object to stop the scrolling, or until the content has scrolled to last (first) column of text-objects within the text-object content. The selection can be text-object selection 810 or a multiple-text-object selection within text-object content (a spreadsheet for example).

28.13 Auto-scroll of a menu:

Horizontal Auto-scroll of Secondary-Click Menu: In those instances when secondary-click menu 706 has a horizontal extent that exceeds the display horizontal extent, the device can auto-scroll secondary-click menu 706 left (right). When a menu item preselection is moved near the first (last) displayed menu item near the left (right) boundary of a displayed menu, the device can scroll the menu right (left), either until the user moves the menu item preselection off the first displayed menu item to stop the scrolling, or until the menu has scrolled to last (first) item within a list of menu items. The selection can be menu item preselection 710 within a secondary-click menu for example.

Vertical Auto-scroll of Secondary-Click Menu: In those instances when secondary-click menu 706 has a vertical orientation as illustrated in FIG. 27A for the example of image-object content editing, with a vertical extent that exceeds the display vertical extent, the device can auto-scroll secondary-click menu 706 up (down) by one menu item when menu item preselection 710 is moved to a position that is approximately one menu item from the bottom (top) boundary.

Additional gestures on selection positioning and control (SPC) icon 308, including other multi-finger tap gestures and multi-finger slide gestures, can be defined to perform additional functions. To enhance discoverability, those additional gestures can be defined in a manner consistent with the way they are defined in leading pointer-based operating systems. Additional gestures and user actions for performing actions include, but are not limited to, keyboard gestures, voice commands, hand gestures, force-press gestures on a force-sensitive display, gaze gestures. In addition, a stylus can be used for making gestures on a display.

28.14 Ending remarks:

The foregoing disclosure, for the purpose of explanation, has included reference to specific embodiments. However, the illustrative discussions above are not intended to be exhaustive or to limit the invention to the precise forms disclosed. Many modifications and variations are possible in view of the above teachings. The embodiments were chosen and described in order to explain the principals of the invention and its practical applications, to thereby enable others skilled in the art to best utilize the invention and various embodiments with various modifications as are suited to the particular use contemplated.

A portion of the disclosure of this patent document contains material that is subject to copyright protection. The applicant and copyright owner has no objection to the facsimile reproduction by anyone of the patent document or the patent disclosure, as it appears in the Patent and Trademark Office patent file or records, but otherwise reserves all copyright rights whatsoever.

I claim:

1. A mobile computing device, comprising:
    a touch-sensitive display;
    a processor;
    a memory configured to store one or more programs;
    wherein the processor is configured to execute the one or more programs to cause the mobile computing device to:

display a selection having a selection start point and a selection end point within a content having a content type;
display a control icon;
detect a contact on the touch-sensitive display;
in response to detecting a contact on the control icon comprising a secondary-click gesture, display a secondary-click-menu comprising one or more menu-items applicable to the selection within the content;
display a menu-item-preselection within the secondary-click-menu;
detect a change in a position of a contact on the touch-sensitive display;
in response to detecting a change in a position of a contact beginning anywhere on the control icon, change a position of the menu-item-preselection within the secondary-click-menu by an amount proportional to the change in the position of the contact; and
in response to detecting a contact on the control icon comprising a first gesture, select the menu-item at the position of the menu-item-preselection.

2. The computing device of claim 1, wherein:
the content type is text content.

3. The computing device of claim 1, wherein:
the content type is spreadsheet content.

4. The computing device of claim 1, wherein:
the content type is image content.

5. A non-transitory computer readable storage medium storing one or more programs, the one or more programs comprising instructions, when executed, cause a mobile computing device with a touch-sensitive display to:
display a selection having a selection start point and a selection end point within a content having a content type;
display a control icon;
detect a contact on the touch-sensitive display;
in response to detecting a contact on the control icon comprising a secondary-click gesture, display a secondary-click-menu comprising one or more menu-items applicable to the selection within the content;
display a menu-item-preselection within the secondary-click-menu;
detect a change in a position of a contact on the touch-sensitive display;
in response to detecting a change in a position of a contact beginning anywhere on the control icon, change a position of the menu-item-preselection within the secondary-click-menu by an amount proportional to the change in the position of the contact; and
in response to detecting a contact on the control icon comprising a first gesture, select the menu-item at the position of the menu-item-preselection.

6. The non-transitory computer readable storage medium of claim 5, wherein the content type is text content.

7. The non-transitory computer readable storage medium of claim 5, wherein the content type is spreadsheet content.

8. The non-transitory computer readable storage medium of claim 5, wherein the content type is image content.

9. The computing device of claim 1, the one or more programs further including instructions to cause the device to: apply the selected menu-item to the selection within the content.

10. The computing device of claim 1, the one or more programs further including instructions to cause the device to: display a sub-menu of the selected menu-item.

11. The computing device of claim 10, the one or more programs further including instructions to cause the device to:
in response to detecting a contact comprising a tap gesture on an end of the control icon, display a parent menu.

12. The computing device of claim 1, wherein a secondary-click gesture is a two-finger tap on the control icon.

13. The computing device of claim 1, wherein a menu-item-preselection is displayed as a rectangle surrounding a menu-item.

14. The computing device of claim 1, the one or more programs further including instructions to cause the device to:
detect the speed of the change in a position of the contact on the touch-sensitive display;
in response to detecting a change in position of the contact beginning anywhere on the control icon, change a position of the menu-item-preselection by an amount proportional to the change and the speed of the change in a position of the contact.

15. The computing device of claim 1, wherein the secondary-click menu is displayed horizontally.

16. The computing device of claim 1, wherein the secondary-click menu is displayed vertically.

17. The computing device of claim 1, wherein the control icon is displayed horizontally.

18. The computing device of claim 1, wherein the control icon is displayed vertically.

19. The computing device of claim 1, wherein the first gesture is a tap.

20. The non-transitory computer readable storage medium of claim 5, further including instructions that, when executed, cause the computing device to: apply the selected menu-item to the selection within the content.

21. The non-transitory computer readable storage medium of claim 5, further including instructions that, when executed, cause the computing device to: display a sub-menu of the selected menu-item.

22. The non-transitory computer readable storage medium of claim 21, further including instructions that, when executed, cause the computing device to: in response to detecting a contact comprising a tap gesture on an end of the control icon, display a parent menu.

23. The non-transitory computer readable storage medium of claim 5, wherein a secondary-click gesture is a two-finger tap on the control icon.

24. The non-transitory computer readable storage medium of claim 5, wherein a menu-item-preselection is displayed as a rectangle surrounding a menu-item.

25. The non-transitory computer readable storage medium of claim 5, further including instructions that, when executed, cause the computing device to:
detect the speed of the change in a position of the contact on the touch-sensitive display;
in response to detecting a change in position of the contact beginning anywhere on the control icon, change a position of the menu-item-preselection by an amount proportional to the change and the speed of the change in a position of the contact.

26. The non-transitory computer readable storage medium of claim 5, wherein the secondary-click-menu is displayed horizontally.

27. The non-transitory computer readable storage medium of claim 5, wherein the secondary-click-menu is displayed vertically.

28. The non-transitory computer readable storage medium of claim 5, wherein the control icon is displayed horizontally.

29. The non-transitory computer readable storage medium of claim 5, wherein the control icon is displayed vertically.

30. The non-transitory computer readable storage medium of claim 5, wherein the first gesture is a tap.

* * * * *